United States Patent
Imamura et al.

(10) Patent No.: US 7,670,700 B2
(45) Date of Patent: Mar. 2, 2010

(54) FUEL CELL SYSTEM, RELATED METHOD AND CURRENT MEASURING DEVICE FOR FUEL CELL SYSTEM

(75) Inventors: Tomonori Imamura, Nagoya (JP);
Toshiyuki Kawai, Toyohashi (JP);
Shinya Sakaguchi, Bisai (JP); Kunio Okamoto, Okazaki (JP); Hideshi Izuhara, Nishi Kamo-gun (JP); Hideki Kashiwagi, Nagoya (JP); Tetsuroh Kikuchi, Nishio (JP)

(73) Assignee: Denso Corporation, Kariya (JP)

( * ) Notice: Subject to any disclaimer, the term of this patent is extended or adjusted under 35 U.S.C. 154(b) by 1542 days.

(21) Appl. No.: 10/931,981

(22) Filed: Sep. 2, 2004

(65) Prior Publication Data
US 2005/0053814 A1    Mar. 10, 2005

(30) Foreign Application Priority Data

| Sep. 5, 2003 | (JP) | ............................. 2003-313821 |
| Sep. 24, 2003 | (JP) | ............................. 2003-331713 |
| Nov. 4, 2003 | (JP) | ............................. 2003-374599 |
| Nov. 4, 2003 | (JP) | ............................. 2003-374600 |
| Dec. 3, 2003 | (JP) | ............................. 2003-404766 |
| Dec. 3, 2003 | (JP) | ............................. 2003-404767 |
| Dec. 24, 2003 | (JP) | ............................. 2003-427323 |
| Jul. 22, 2004 | (JP) | ............................. 2004-214418 |
| Jul. 23, 2004 | (JP) | ............................. 2004-216016 |

(51) Int. Cl.
*H01M 8/04* (2006.01)
*H01M 8/18* (2006.01)
*H01M 8/00* (2006.01)
*H01M 8/12* (2006.01)
*C25B 1/00* (2006.01)

(52) U.S. Cl. ............................. 429/22; 429/13; 429/19; 429/23; 205/337; 205/343

(58) Field of Classification Search .................. 429/22, 429/19, 23, 13; 205/337, 343
See application file for complete search history.

(56) References Cited

U.S. PATENT DOCUMENTS 5,646,852 A    7/1997    Lorenz et al.

(Continued)

FOREIGN PATENT DOCUMENTS

JP            A 7-75214            3/1995

(Continued)

OTHER PUBLICATIONS

Japanese Office Action issued in counterpart foreign application (JP 2003-374600) on Oct. 20, 2009 (w/translation).

*Primary Examiner*—Patrick Ryan
*Assistant Examiner*—Karie O'Neill
(74) *Attorney, Agent, or Firm*—Oliff & Berridge, PLC

(57) ABSTRACT

A fuel cell system, control method and current measuring device for a power unit are disclosed. The fuel cell system includes a fuel cell having local areas, a current measuring device associated with at least one of the local areas to measure localized current related to a specified operating characteristic, and a control section for diagnosing an operating condition of the fuel cell in response to localized current to enable optimum control of the fuel cell depending upon a specified operating characteristic determined by localized current. The control method controls the operating condition of the fuel cell in response to localized current indicative of the specified operating characteristic of the fuel cell. The current measuring device includes an electrical conductor formed with a recessed portion, a localized current conductor received in the recessed portion, and a current sensor for detecting current flowing across the localized current conductor.

15 Claims, 61 Drawing Sheets

U.S. PATENT DOCUMENTS

| | | | |
|---|---|---|---|
| 6,815,117 | B2 | 11/2004 | Hauer |
| 2002/0180448 | A1 | 12/2002 | Imamura et al. |
| 2002/0182461 | A1 | 12/2002 | Hasuka et al. |
| 2002/0192520 | A1* | 12/2002 | Nonobe .................. 429/23 |
| 2004/0095127 | A1 | 5/2004 | Mohri et al. |

FOREIGN PATENT DOCUMENTS

| | | |
|---|---|---|
| JP | A 9-259913 | 10/1997 |
| JP | A-09-306519 | 11/1997 |
| JP | A 2000-243417 | 9/2000 |
| JP | A 2002-164069 | 6/2002 |
| JP | A-2002-246054 | 8/2002 |
| JP | A 2002-313395 | 10/2002 |
| JP | A 2002-343397 | 11/2002 |
| JP | A-2003-036875 | 2/2003 |
| JP | A-2003-051331 | 2/2003 |
| JP | A 2004-500689 | 1/2004 |
| JP | A 2004-152501 | 5/2004 |

* cited by examiner

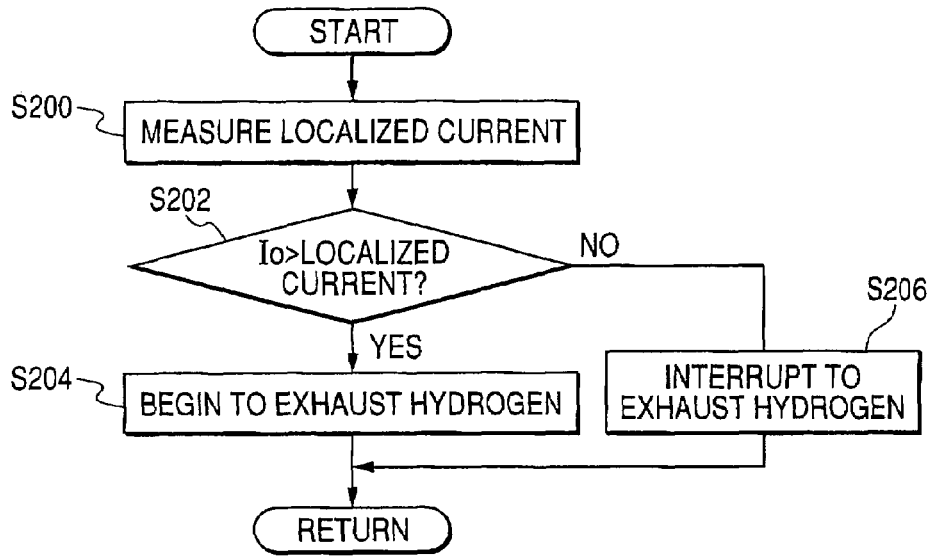
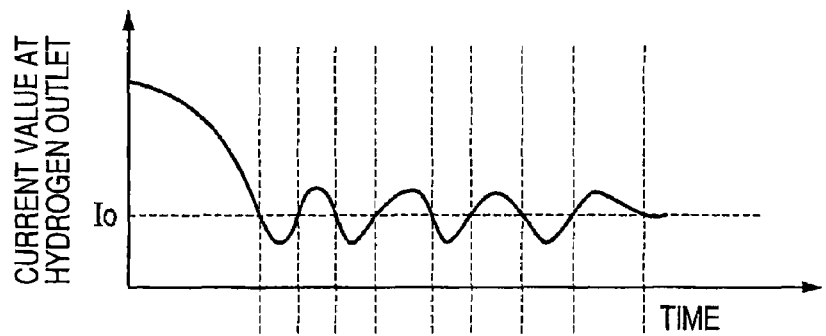
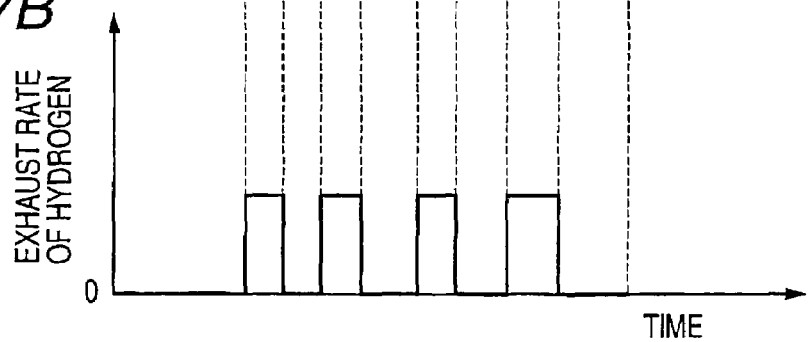

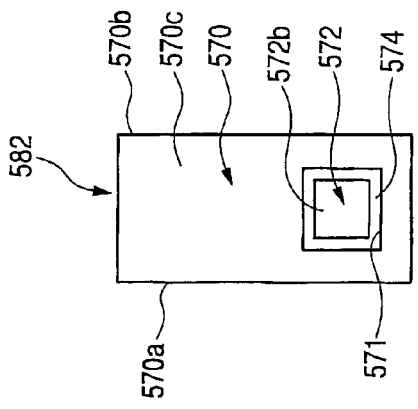
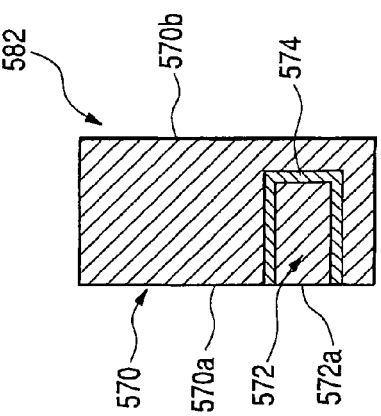
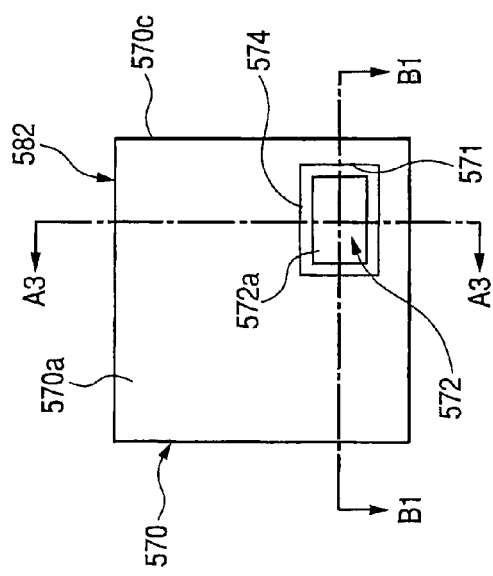
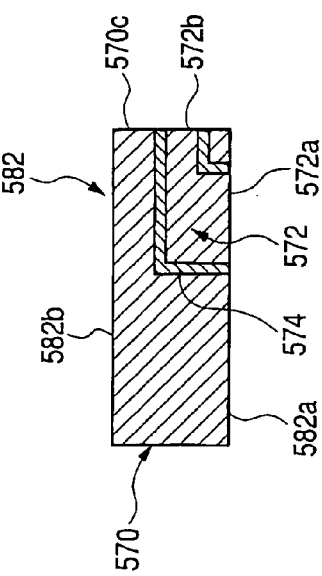

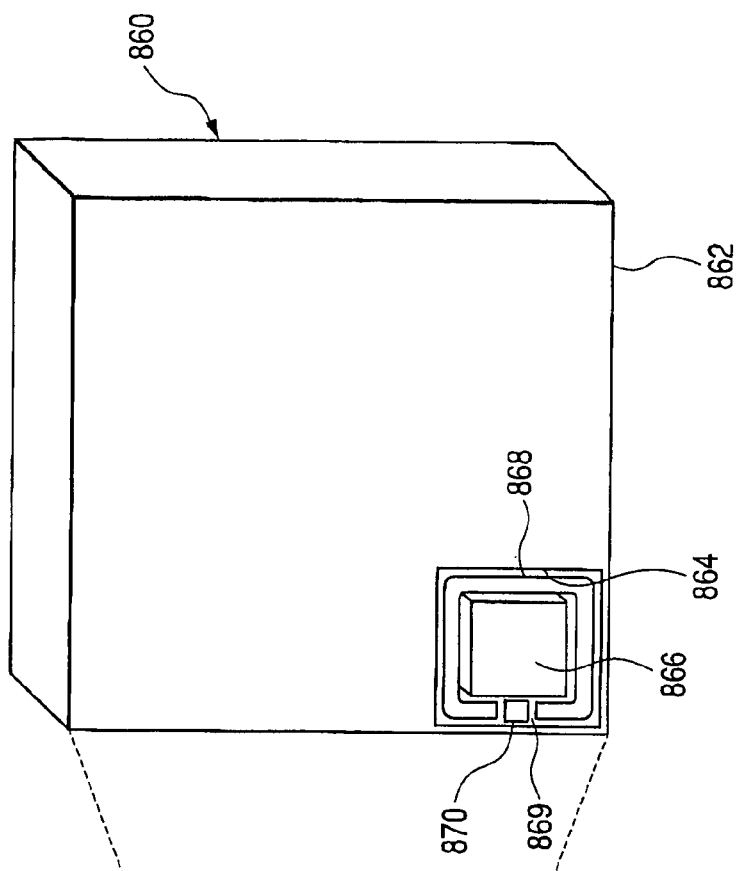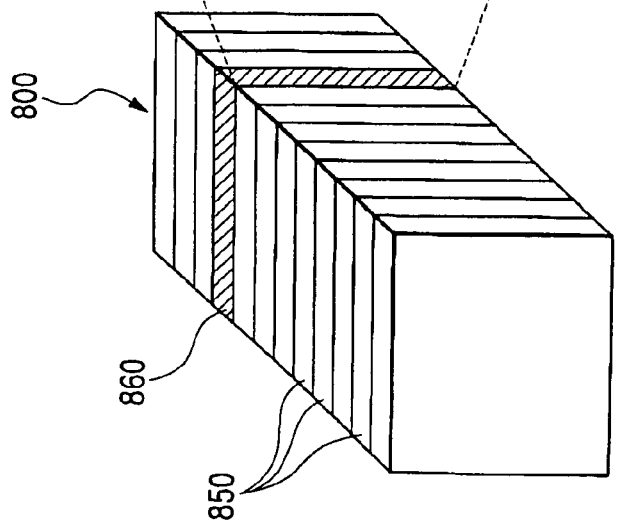

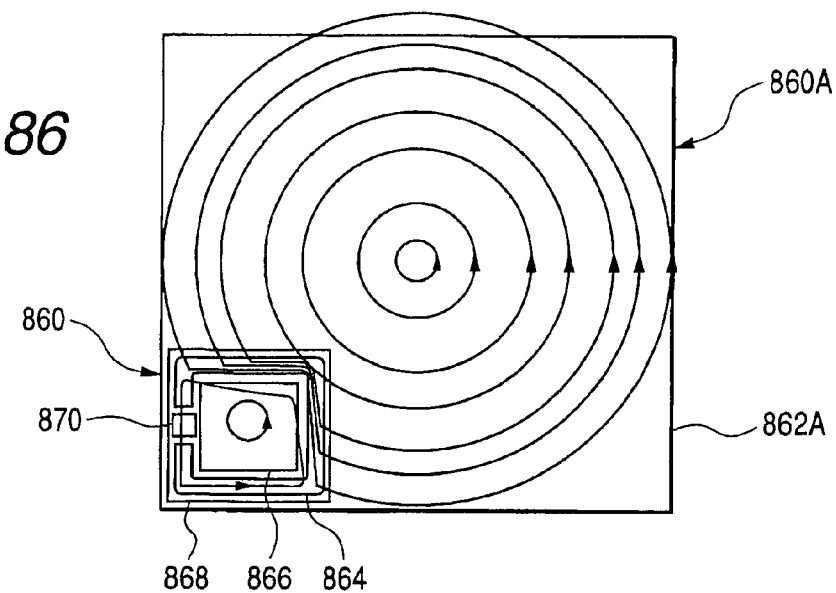
FIG. 86
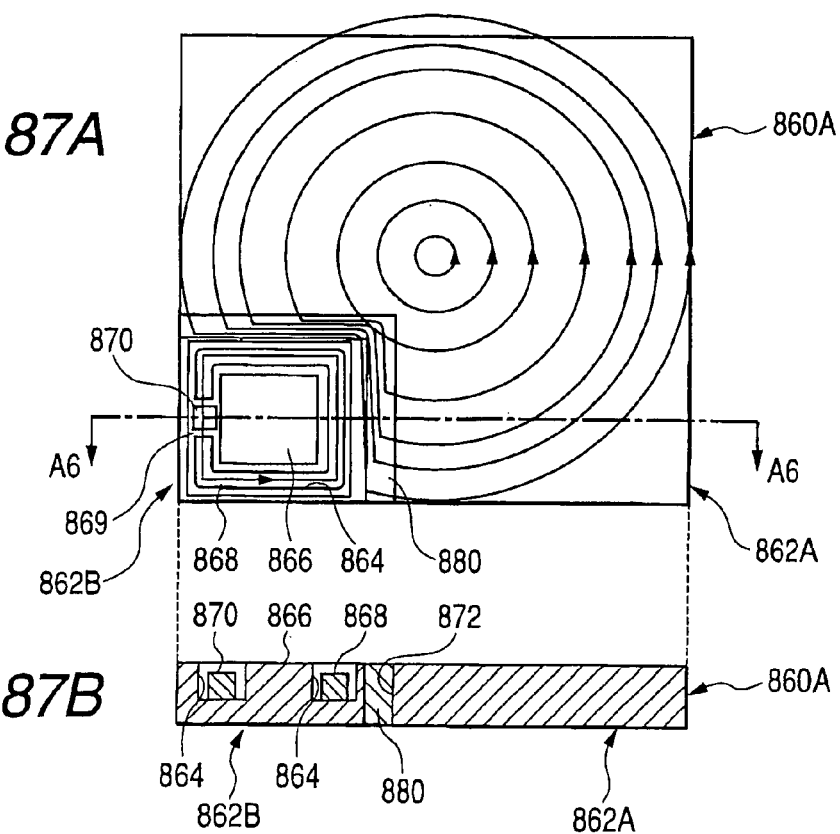
FIG. 87A
FIG. 87B

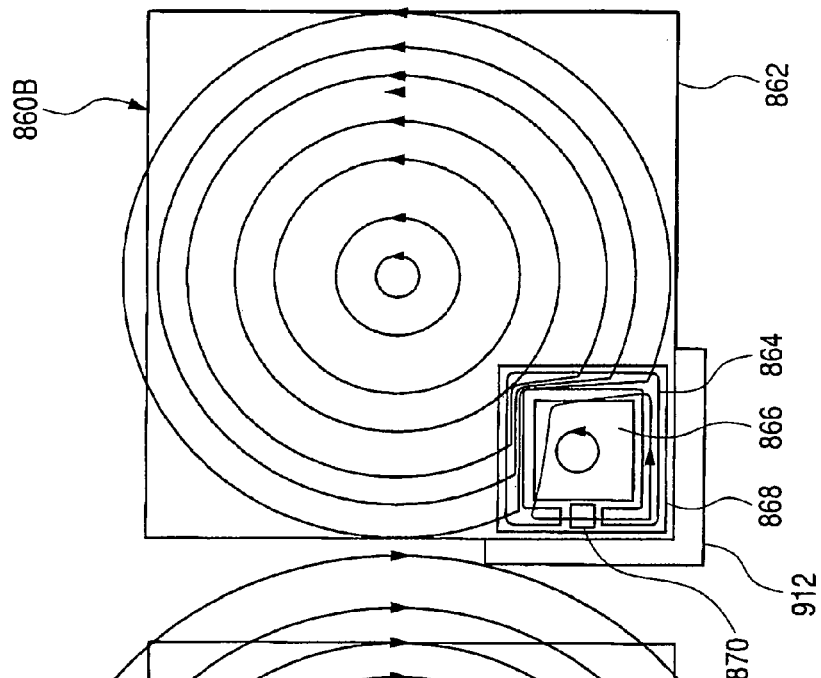
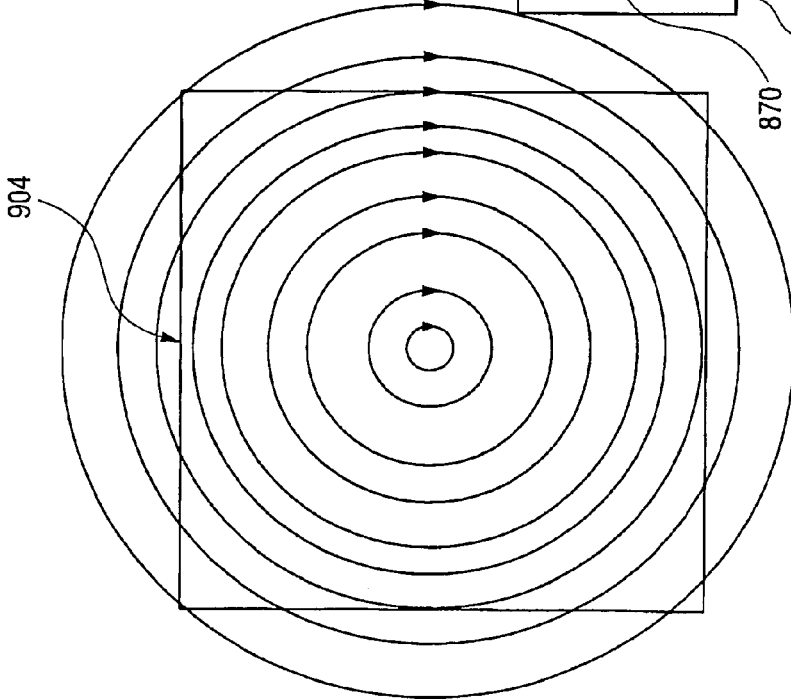
FIG. 89B
FIG. 89A

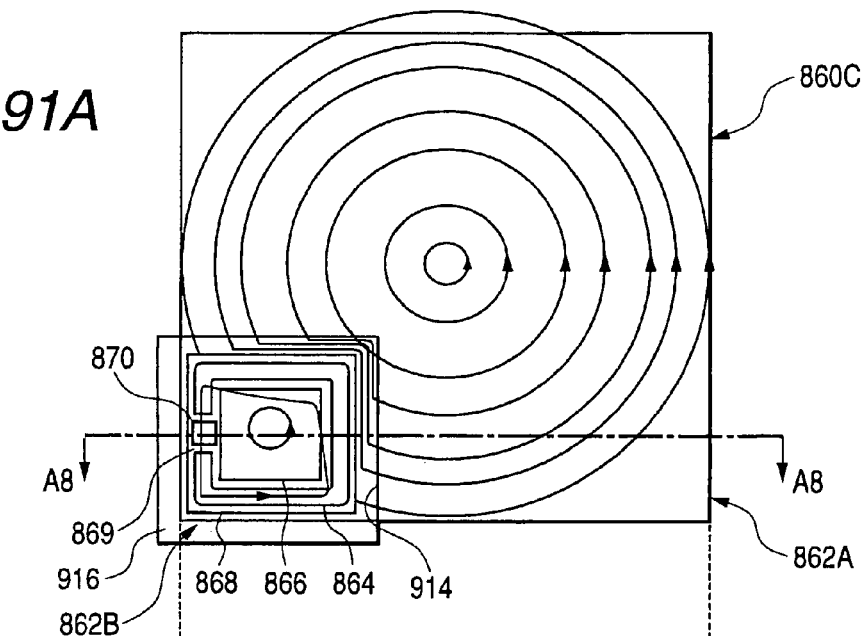
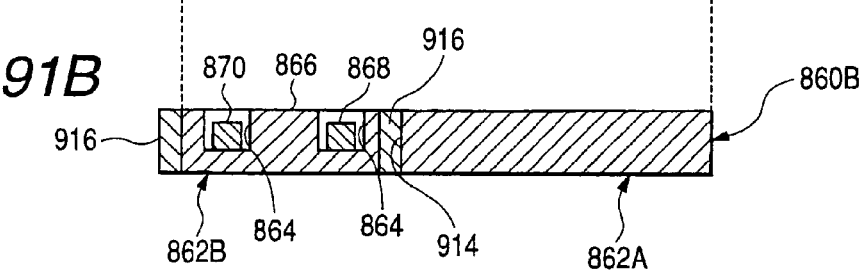

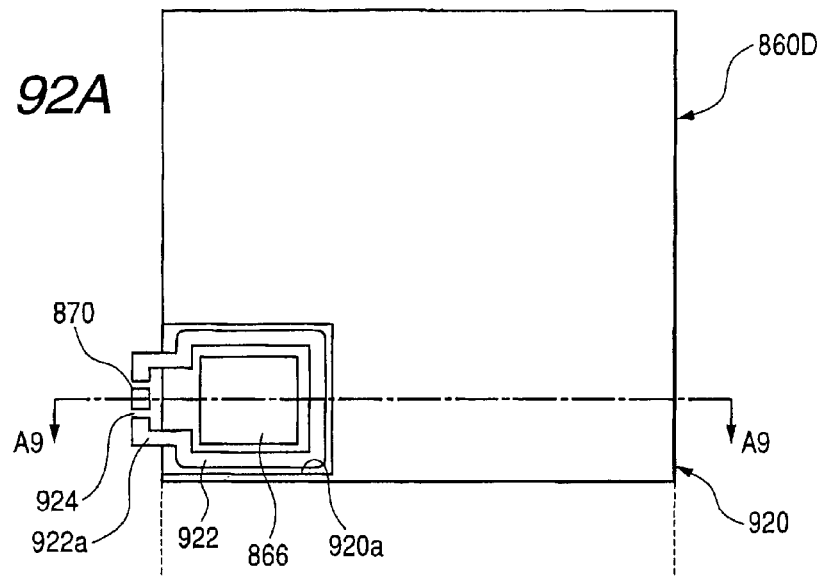
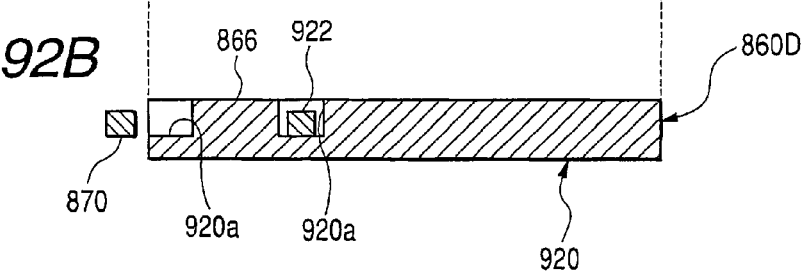

FUEL CELL SYSTEM, RELATED METHOD AND CURRENT MEASURING DEVICE FOR FUEL CELL SYSTEM

BACKGROUND OF THE INVENTION

1. Field of the Invention

The present invention relates to fuel cell systems, related operating methods and current measuring devices for use in fuel cell systems and, more particularly, to a fuel cell system, related method and current measuring device for use in the fuel cell system.

2. Description of the Related Art

Considerable research and development work has heretofore been undertaken in the past to provide fuel cell systems, employing fuel cells, serving as electric power generators for moving objects, such as vehicles, ships, portable electric power generators and electric power generators for domestic use.

In the state of the art fuel cell systems incorporating fuel cells that generate electric power through electrochemical reaction between hydrogen and oxygen, various defects take place during operations of the fuel cells. For instance, if the fuel cell encounters a shortage of moisture content, then, an electrolyte membrane is dried, causing a drop in power output. On the contrary, if liquid droplets collect in excess inside the fuel cell, electrodes of the fuel cell are covered with water to disturb gases to permeate, resulting in a drop in power output. Accordingly, a need arises in diagnosing a drying characteristic of the electrolyte membrane and a wetting characteristic of the electrode for appropriately controlling a water collecting condition and a wet condition inside the fuel cell. Also, another issue arises in a shortage of reaction gases to be supplied to the fuel cell with a resultant drop in power output. Thus, there is a need for properly diagnosing the occurrence of shortage of reaction gases to appropriately control the flow rates of reaction gases.

To overcome the above issues, various proposals have been made to provide technologies of detecting the occurrence of a drop in a cell voltage to diagnose defective conditions for thereby discriminating an operating condition of the fuel cell.

Japanese Patent Provisional Publication No. 9-259913 discloses technology of diagnosing a shortage of reaction gases depending upon an electric current distribution pattern of the fuel cell for controlling the flow rates of reaction gases or load current to avoid damage to a fuel cell.

With such technology of diagnosing the defective condition of the fuel cell depending upon the drop in cell voltage, since the cell voltage drops for any of reasons caused by the electrolyte membrane being dried, reaction disturbance as a result of water collected in excess inside the fuel cell and the shortage of reaction gases being supplied, a difficulty is encountered in specifying individual factors for the drop in power output and, therefore, an issue arises in a difficulty of appropriately controlling the fuel cell depending on the individual factors for the drop in power output.

In the meanwhile, with the above diagnosing technology, diagnosis has been done based on only the shortage of reaction gases and, so, it becomes impossible to properly diagnose other specific factors for the drop in power output. Therefore, it is hard to distinguish the occurrence of excess collected water and the occurrence of a dried status of the electrolyte membrane except for the flow rates of reaction gases to be supplied to the fuel cell. Consequently, serious issues occur in properly controlling the fuel cell on the individual factors that could have caused the drop in power output.

Further, during warmup operation immediately after startup of the fuel cell, pressures of fuel gas and air to be supplied to the fuel cell are insufficient and a reaction temperature of a fuel cell body is not adequately raised. Thus, an electric power generating capacity of the fuel cell does not reach a rated capacity of generating electric power, and the fuel cell remains in a low capacity of generating electric power. Under such a condition, if attempts are made to use electric power from the fuel cell at a rate exceeding the rated capacity of available electric power, a rapid drop occurs in cell voltage, causing deterioration in operating performance of the fuel cell.

U.S. Pat. No. 5,646,852 (issued to Lorenz et al) discloses a fuel cell system wherein an upper limit of electric power to be generated is restricted depending on a temperature of a fuel cell to preclude a power demand from being commanded at a rate greater than available power output.

With such an operating method, since the fuel cell takes the form of a structure wherein power output is limited depending upon the temperature of the fuel cell, the fuel cell encounters probabilities wherein during operation of the fuel cell at a low temperature, available power output to be generated by the fuel cell is restricted to a lower level than that available at normal operation and, hence, heat buildup is also restricted in the fuel cell, causing an increase in warmup time of the fuel cell. In addition, in cases where power output of the fuel cell is controlled depending on the temperature of the fuel cell, probabilities occur in which power output is controlled depending on the temperatures to an extent more than necessary.

Japanese Patent Provisional Publication No. 2002-343397 discloses a fuel cell system that is arranged to execute control to vary the flow rates and pressures of reaction gases in accordance with irregularities in output voltages of unit cells forming a fuel cell.

With such a control method, when detecting irregularities in cell voltages, an overall voltage of the unit cells is monitored. Under such a condition, if a drop occurs in a voltage of a defective unit cell to cause irregularities in cell voltages, the defective unit cell entirely undergoes an abnormal condition.

For this reason, even when attempting to recover the operation of the fuel cell subsequent to the occurrence of irregularities in cell voltages, a recovery time is prolonged or no recovery can be made. If no recovery of the fuel cell can be achieved, there occurs an issue in that a fuel cell powered vehicle comes to a halt on a road.

Furthermore, if water remains inside the fuel cell during stop thereof, water inside the fuel cell freezes under low temperature environments. When starting up the fuel cell under such low temperature circumstances, due to clogging occurring in reaction gas flow passages or the occurrence of disturbances in delivering reaction gases (hydrogen and air) to the electrolyte membrane, no electrochemical reaction takes place in the presence of fuel gas being supplied, causing a difficulty in starting up the fuel cell.

To address such an issue, Japanese Patent Provisional Publication No. 2002-343397 proposes a fuel cell system in which during stop of a fuel cell, air is supplied to the fuel cell for a given time interval to allow a stream of air to achieve air purge operation to remove moisture content from the fuel cell.

With such a fuel cell system, since the time interval for which purge air is supplied is preliminarily fixed, the air purge operation is carried out for a certain time interval regardless of moisture content inside the fuel cell. For this reason, if less moisture content exists in the fuel cell, probabilities occur where the air purge operation is carried for longer than required. Under such a situation, the fuel cell has a shortage of moisture content to cause an electrolyte membrane to be dried, causing a fear of the occurrence of a drop in power output during restart of the fuel cell.

In contrast, if much moisture content remains in the fuel cell, probabilities take place in which the air purge operation is terminated with no adequate removal of moisture content from the fuel cell. Under such a situation, excess moisture content remains in the fuel cell, thereby causing fears in that reaction gases cannot permeate while causing moisture content to freeze under low temperature environments.

As set forth above, if the fuel cell suffers from the shortage of moisture content, the electrolyte membrane is dried with an increase in internal resistance, resulting in a drop in power output.

On the contrary, if the fuel cell has moisture content in excess, catalysts of the electrode are covered with water, causing disturbance in diffusing reaction gases. Therefore, there is a need for air to be supplied at a higher flow rate than that of air to be supplied during normal operation to push out water from the fuel cell or for exhausting hydrogen to the outside of the system for thereby purging water. This results in an extra amount of power consumption and an extra amount of hydrogen being wastefully discharged to the system outside, resulting in a reduction in operating efficiency.

In order to operate the fuel cell at a high efficiency, a need arises in providing a control method of precluding both the shortage of moisture content and the occurrence of excess moisture content.

To this end, Japanese Patent Provisional Publication No. 2002-164069 proposes a fuel cell system in which a wet condition of an electrolyte membrane is discriminated whereupon when the wet condition remains insufficient, a coolant water temperature is lowered to decrease an operating temperature of a fuel cell for thereby increasing a relative humidity to facilitate the wetting of the electrolyte membrane.

With such a fuel cell system, although only the occurrence of the shortage of water is discriminated to decrease the operating temperature of the fuel cell, if the operating temperature of the fuel cell is regulated at an excessively low level, excess moisture content occurs inside the fuel cell. In this respect, no suggestion is made in the above patent literature about a method of controlling moisture content in the fuel cell in just proportion during the occurrence of a drop in the temperature of the fuel cell.

In the related art fuel cell system, further, proposals have heretofore been made to utilize a circulation system wherein unreacted hydrogen (unreacted fuel gas), which is not used for reaction, is circulated through a hydrogen circulation flow passage to a fuel gas supply flow passage for reuse. Another technology is to expel unreacted hydrogen to a system outside through a hydrogen exhaust flow passage.

In any system set forth above, if the fuel cell is caused to operate under a condition where the hydrogen circulation flow passage or the hydrogen exhaust flow passage are closed or nearly closed, nitrogen and steam pearmeate through a positive electrode (oxidant electrode), causing a remarkable drop in hydrogen concentration especially at an area close proximity to a hydrogen outlet portion. This is because resulting nitrogen and steam mearmeating through the electrode disturbs the flow of hydrogen.

If the fuel cell continues to operate under such a condition where hydrogen does not sufficiently diffuse to the hydrogen outlet portion in the unit cell, a drop occurs in the cell voltage not only with a resultant drop in efficiency but also with a resultant deterioration in the electrode at an area where a shortage of hydrogen takes place. Such an issue can be addressed by increasing a rate of supplying hydrogen or by periodically exhausting hydrogen to the system outside. However, blindly exhausting hydrogen to the system outside leads not only to deterioration in efficiency but also to deterioration in safety. Therefore, there is a need for a control method that satisfies requirements both for permitting the hydrogen concentration at the hydrogen outlet portion of the unit cell to be maintained at a level not less than a lower limit and for reducing the flow rate of hydrogen to be exhausted.

To this end, Japanese Patent Provisional Publication No. 2000-243417 proposes a fuel cell system wherein a hydrogen concentration in a hydrogen circulation flow passage is detected by a hydrogen concentration censor whereby when the hydrogen concentration decreases in the hydrogen circulation flow passage, hydrogen is exhausted to the atmosphere.

With such a fuel cell system, there is a need for gas to be sufficiently brought into contact with the hydrogen concentration sensor and the rate of hydrogen to be circulated is ensured to some extent, causing an increase in load of a pump for circulating hydrogen gas.

Moreover, in the non-circulation system, almost no circulation of hydrogen occurs and, hence, it is hard to correctly measure hydrogen concentration. In the non-circulation system, if hydrogen is exhausted to the system outside at increased frequencies for the purpose of correctly measuring the hydrogen concentration, another issue arises where the flow rate of hydrogen to be expelled to the system outside increases.

Besides, as already noted above, in order to precisely control the operating conditions of the fuel cell depending on individual factors, related to individual operating characteristics of the fuel cell, an output voltage of the unit cell forming the fuel cell is measured and depending upon the resulting measured values, the occurrence of a defect in the fuel cell is detected during operation of the fuel cell. Also, it has been a usual practice to inspect electric current-voltage characteristics of the fuel cell.

However, abnormal occurrence factors occurring during operation of the fuel cell include a shortage of oxygen to be supplied, a shortage of hydrogen to be supplied and an increase in internal resistance of the electrolyte membrane, and these defects are resulted in the form of a drop in voltage of the unit cell. As a consequence, merely measuring the voltage of the unit cell makes it hard to specify the abnormal occurrence factors during operation of the fuel cell, causing a difficulty of executing proper operation so as to count the issue depending on a particular factor.

Further, in the event of an increase in irregularities in quality of a processed surface of the unit cell, irregularities in contact resistance of the processed surface of the unit cell increases, causing an increase in irregularities of current density. The unit cell, with such an increase in the processed quality, undergoes an issue where electric current tends to collectively flow through a partial area, resulting in deterioration of the unit cell at increased speeds as compared to another unit cell processed with an appropriate quality. If the stack of unit cells partly contains a defective unit cell with increased irregularities in the processed quality, that unit cell comes to be inoperative in an early stage and even if the other non-defective unit cells operates normally, a battery stack becomes inoperative. If the fuel cell is made of a stack of non-defective unit cells by preliminary rejecting the defective unit cell that has increased irregularities in the processed quality, the battery stack is able to have a prolonged battery life. However, when inspecting the electric current-voltage characteristics on a manufacturing stage, a difficulty is encountered in finding out whether the stacked unit cells partly include the defective unit cell having increased irregularities in the processed quality.

Additionally, another issue arises in a difficulty of specifying the abnormal occurrence factors of the electric power unit, such as the air battery, secondary battery and the capacitors, etc., each including unit cells to generate electric energy, in use or detecting the defective unit cell on the manufacturing stage.

U.S. patent application Publication NO. 2004/95127A1 discloses a current density measuring apparatus arranged to detect current densities of an electrode of a fuel cell. The current density measuring apparatus includes a sensor mounting plate that carries a large number of Hall elements provided at positions corresponding to measuring points on an electrode surface.

With such a structure, the current density measuring apparatus is complex in construction and expensive to manufacture. Another big problem arises in a difficulty with measuring individual operating characteristics related to various parts of the electrolyte membrane or the electrode of the electric power unit in order to specify a particular operating factor for diagnosing individual defects occurring in the electric power unit. Also, if the fuel cell carrying such a current density measuring apparatus is placed in the vicinity of other electric power units, such as an inverter, and an electric motor, the current density measuring apparatus suffers from disturbances of magnetic fields generated by the inverter and the electric motor, resulting in reduction in reliability of measuring the current density. No measure is undertaken in the above related art to count the magnetic disturbances, resulting in a difficulty of increasing reliability of operation.

SUMMARY OF THE INVENTION

The present invention has been completed with the above view in mind and has an object to provide a fuel cell system, a related method and a current measuring device for use in the fuel cell system that are able to overcome various issues encountered in the related art and able to operate the fuel cell system and the current measuring device in a highly reliable manner based on individual localized currents measured by the current measuring device.

A first aspect of the present invention provides a fuel cell system which comprises a fuel cell operative to electrochemically react oxidant gas and fuel gas to generate electric energy and having a given local area. A current measuring device is associated with the local area of the fuel cell to measure localized current of the fuel cell, and a diagnosis device for diagnosing an operating condition of the fuel cell in response to the localized current measured by the current measuring device.

With such a structure, a particular operating characteristic of the fuel cell can be specified to allow the diagnosis device to diagnose the operating condition of the fuel cell in a highly reliable manner. This enables the fuel cell to be controlled in an optimum operating condition, resulting in a highly increased operating performance of the fuel cell.

According to a second aspect of the present invention, there is provided a method of diagnosing an operating condition of a fuel cell, which comprises providing the fuel cell operative to electrochemically react oxidant gas and fuel gas to generate electric energy, and providing a current measuring device associated with a specified local area of the unit cell indicative of an operating characteristic. Localized current flowing through the local area of the fuel cell is measured and an operating condition of the fuel cell is diagnosed in response to the localized current representing the operating characteristic of the fuel cell.

With such a diagnosing method, a particular operating characteristic of the fuel cell can be specified and the operating condition of the fuel cell can be diagnosed in a highly reliable manner. This enables the fuel cell to be controlled in an optimum operating condition, resulting in a highly increased operating performance of the fuel cell.

According to a third aspect of the present invention, there is provided a method of diagnosing an operating condition of a fuel cell, comprising providing the fuel cell operative to electrochemically react oxidant gas and fuel gas to generate electric power, and providing a current measuring device associated with a specified local area of the unit cell, which is apt to be dried and indicative of a drying characteristic. Localized current flowing through the local area of the fuel cell is measured, and an operating condition of the fuel cell is diagnosed depending on the localized current indicative of the drying characteristic.

With such a diagnosing method, the drying characteristic of the fuel cell can be correctly specified based on localized current, and the dried condition of the fuel cell can be diagnosed in a highly reliable manner. This enables the fuel cell to be controlled so as to counter the dried state of the fuel cell in a highly reliable manner, thereby preventing damage to the fuel cell to provide an extended battery life.

According to a fourth aspect of the present invention, there is provided a method of diagnosing an operating condition of a fuel cell, which comprises the steps of providing the fuel cell operative to electrochemically react oxidant gas, which contains a principal component of oxygen, and fuel gas, which contains a principal component of hydrogen, to generate electric power, and providing a current measuring device associated with a local area of the unit cell, which is apt to be dried and indicative of a drying characteristic. Localized current flowing through the local area of the fuel cell is measured, and diagnosis is made that the fuel cell lies in a dried condition when the localized current indicative of the drying characteristic is less than a given current value.

With such a diagnosing method, the drying characteristic of the fuel cell can be correctly specified based on comparison between localized current and the given current value, and the dried condition of the fuel cell can be diagnosed in a highly reliable manner. This enables the fuel cell to be controlled so as to counter the dried state of the fuel cell in a highly reliable manner, thereby preventing damage to the fuel cell to provide an extended battery life.

According to a fifth aspect of the present invention, there is provided a method of diagnosing an operating condition of a fuel cell, comprising the steps of providing the fuel cell operative to electrochemically react oxidant gas and fuel gas to generate electric energy, and providing a current measuring device associated with a specified local area, which is apt to have excessive moisture content, of the unit cell. Localized current flowing through the specified local area of the fuel cell is measured, and an excess moisture condition of the specified fuel cell is diagnosed depending on the localized current measured by the current measuring step.

With such a diagnosing method, the excess moisture condition of the fuel cell can be diagnosed depending on the localized current in a reliable manner. This enables the fuel cell to be controlled so as to counter a clogging state of the fuel cell in a highly reliable manner, resulting in a high reliability in operation of the fuel cell.

According to a sixth aspect of the present invention, there is provided a method of diagnosing an operating condition of a fuel cell, which comprises the steps of providing the fuel cell operative to electrochemically react oxidant gas, which contains a principal component of oxygen, and fuel gas, which contains a principal component of hydrogen, to generate electric energy, and providing a current measuring device associated with a local area of the unit cell, indicative of a wetting characteristic, where liquid droplets are easy to collect. Localized current flowing through the local area of the fuel cell is measured, and diagnosis is made that when the value of the localized current is less than a given current value and a drop speed of the localized current is less than a given drop speed, the liquid droplets have collected in the fuel cell.

With such a diagnosing method, the wetting characteristic of the fuel cell can be correctly specified based on comparison between localized current and the given current value, and the wetting characteristic of the fuel cell can be diagnosed in a highly reliable manner. That is, diagnosis is made that when the value of the localized current is less than the given current value and the drop speed of the localized current is less than the given drop speed, making it possible to correctly find whether the liquid droplets have collected in the fuel cell. This enables the fuel cell to be controlled so as to counter a clogging state of the fuel cell in a highly reliable manner.

According to a seventh aspect of the present invention, there is provided a method of diagnosing an operating condition of a fuel cell, comprising the steps of providing the fuel cell operative to electrochemically react oxidant gas and fuel gas, and providing a current measuring device associated with a specified local area of the unit cell, indicative of a hydrogen concentrating characteristic, where a shortage of hydrogen is apt to take place. Localized current flowing through the specified local area of the fuel cell is measured, and a shortage of fuel gas in the fuel cell is diagnosed depending on the localized current related to the specified local area of the unit cell.

With such a diagnosing method, the shortage of fuel gas in the fuel cell can be correctly detected depending on the localized current related to the specified local area of the unit cell. This enables the fuel cell to be controlled so as to counter the shortage of fuel cell occurring in the fuel cell in a highly reliable manner so as to regulate the flow rate of fuel gas in an optimum range, providing an increased operating performance of the fuel cell.

According to an eighth aspect of the present invention, there is provided a method of diagnosing an operating condition of a fuel cell, which comprises the steps of providing the fuel cell operative to electrochemically react oxidant gas and fuel gas containing hydrogen to generate electric energy, and providing a current measuring device associated with a specified local area of the unit cell, indicative of a hydrogen concentrating characteristic, where a shortage of hydrogen is apt to take place. Localized current flowing through the local area of the fuel cell is measured, and diagnosis is made that when the value of the localized current, measured by the current measuring device, is less than a given current value and a drop speed of the localized current exceeds a given drop speed, the shortage of hydrogen had occurred in the fuel cell.

With such a diagnosing method, the hydrogen concentrating characteristic of the fuel cell can be correctly detected to specify the shortage of hydrogen occurring in the fuel cell. That is, diagnosis is made that when the value of the localized current, measured by the current measuring device, is less than the given current value and the drop speed of the localized current exceeds the given drop speed, the shortage of hydrogen had occurred in the fuel cell, making it possible to correctly find whether the fuel cell has the shortage of hydrogen in the fuel cell. This enables the fuel cell to be controlled so as to counter the shortage of hydrogen occurring in the fuel cell in a highly reliable manner so as to regulate a hydrogen concentration in an optimum range, providing an increased operating performance of the fuel cell.

According to a ninth aspect of the present invention, there is provided a method of diagnosing an operating condition of a fuel cell, comprising the steps of providing the fuel cell operative to electrochemically react oxidant gas and fuel gas and providing a current measuring device associated with a specified local area of the unit cell, where an excess moisture condition is apt to take place and a shortage of fuel gas is apt to occur. Localized current at the specified local area of the unit cell is measured, and an occurrence of the excess moisture condition and an occurrence of the shortage of fuel gas are diagnosed to be distinguished from one another depending on a drop speed of the localized current associated with the specified local area of the unit cell.

With such a diagnosing method, the occurrence of the excess moisture condition and the occurrence of the shortage of fuel gas in the fuel cell can be diagnosed in discriminated mode depending on the current drop speed of the localized current of the unit cell. This enables the fuel cell to be controlled so as to counter the clogging state and the shortage of fuel cell occurring in the fuel cell in a highly reliable manner, providing an increased operating performance of the fuel cell.

According to a tenth aspect of the present invention, there is provided a method of diagnosing an operating condition of a fuel cell, which comprises the steps of providing the fuel cell operative to electrochemically react oxidant gas and fuel gas containing hydrogen to generate electric energy and providing a current measuring device associated with a local area of the unit cell, indicative of a wetting characteristic and a hydrogen concentrating characteristic, where liquid droplets are easy to collect and a shortage of hydrogen is apt to take place. Localized current indicative of the wetting characteristic and the hydrogen concentrating characteristic is measured, and diagnosis is made that when the value of the localized current, measured by the current measuring device, is less than a given current value and a drop speed of the localized current is less than a given drop speed, the liquid droplets have collected in the fuel cell and diagnosing that when the value of the localized current is less than the given current value and the drop speed of the localized current exceeds the given drop speed, the shortage of hydrogen had occurred in the fuel cell.

With such a diagnosing method, the wetting characteristic and the hydrogen concentrating characteristic of the fuel cell can be detected to correctly specify a clogging state and the shortage of hydrogen occurring in the fuel cell. That is, diagnosis is made that when the value of the localized current, measured by the current measuring device, is less than a given current value and a drop speed of the localized current is less than a given drop speed, the liquid droplets have collected in the fuel cell and diagnosing that when the value of the localized current is less than the given current value and the drop speed of the localized current exceeds the given drop speed, the shortage of hydrogen had occurred in the fuel cell, making it possible to correctly find the presence of the clogging state and occurrence of the shortage of hydrogen in the fuel cell. This enables the fuel cell to be controlled so as to counter the clogging state and the shortage of hydrogen occurring in the fuel cell in a highly reliable manner, providing an increased operating performance of the fuel cell.

According to an eleventh aspect of the present invention, there is provided a method of controlling an operating condition of a fuel cell, which comprises the steps of providing the fuel cell operative to electrochemically react oxidant gas and fuel gas to generate electric energy and providing a current measuring device associated with a local area of the unit cell, indicative of a wetting characteristic, where liquid droplets are easy to collect. Localized current indicative of the wetting characteristic is measured, and output-limit operation is executed in response to the localized current indicative of the wetting characteristic to limit a power output of the fuel cell when the value of the localized current is less than a given output-limit initiating current.

With such a controlling method, the wetting characteristic of the fuel cell can be specified to correctly find out the presence of clogging occurring in the fuel cell. This enables the occurrence of defects in the fuel cell to be detected in an earlier stage. Also, the output-limit operation can be properly carried out to enable recovery of the fuel cell at the earliest time, enabling application of the fuel cell to a fuel cell powered vehicle as a power source that is able to preclude the vehicle from undesired stop.

According to a twelfth aspect of the present invention, there is provided a method of controlling an operating condition of a fuel cell, which comprises the steps of providing the fuel cell operative to electrochemically react oxidant gas and fuel gas to generate electric energy, providing an air purge unit operative to supply a stream of purge air to the fuel cell to remove water collected in the fuel cell and providing a current measuring device associated with a local area, indicative of an operating characteristic, of the unit cell. Localized current indicative of the operating characteristic is measured, and the air purge unit is activated in response to the localized current such that when interrupting operation of the fuel cell, if the localized current exceeds a given current value, air purge operation is initiated to supply the stream of purge air to the fuel cell.

With such a control method, localized current indicative of the operating condition of the fuel cell is measured to specify a particular operating condition and the air purge operation is executed based on the specified operating condition of the fuel cell. This allows the air purge operation to be executed at a proper timing with moisture content being maintained at an appropriate level to obtain increased operating performance. Thus, no excessive air purge operation is executed, thereby shortening a purge time interval while precluding an electrolyte membrane from being dried. This increases the reliability in operation of the fuel cell.

According to thirteenth aspect of the present invention, there is provided a method of controlling an operating condition of a fuel cell, which comprises the steps of providing the fuel cell operative to electrochemically react oxidant gas and fuel gas to generate electric energy, and providing a current measuring device associated with a local area, indicative of an operating characteristic, of the unit cell. Localized current indicative of the operating characteristic is measured, and an operating condition of the fuel cell is controlled in response to the localized current indicative of the operating characteristic in a way to allow the localized current to remain in a given range.

With such a control method, localized current can specify the operating condition of the fuel cell, and controlling localized current to lie in an appropriate range results in a capability of regulating moisture content of the fuel cell at an optimum level in a reliable manner due to the presence of correlation between localized current and a humidified condition (moisture content) of the fuel cell. Also, since localized current quickly responds to fluctuation in moisture content, the fuel cell can be quickly controlled in a highly increased performance.

According to a fourteenth aspect of the present invention, there is provided a method of controlling an operating condition of a fuel cell, which comprises the steps of providing the fuel cell operative to electrochemically react oxidant gas and fuel gas containing hydrogen to generate electric energy and providing a current measuring device associated with a local area of the unit cell, indicative of a hydrogen concentrating characteristic, where a shortage of hydrogen is apt to take place. Localized current indicative of the hydrogen concentrating characteristic is measured, and the fuel cell is controlled in response to the localized current indicative of the hydrogen concentrating characteristic so as to increase a hydrogen concentration in the fuel cell when the localized current is less than a given current value.

With such a control method, the hydrogen concentrating characteristic of the local area of the fuel cell is detected to specify a hydrogen concentration that has a correlation with localized current. Thus, by increasing the hydrogen concentration of the fuel cell when localized current remains below the given current value, the shortage of hydrogen in the fuel cell can be addressed without causing an increase in the flow rate of unreacted fuel gas to be circulated or an increase in the flow rate of unreacted fuel gas to be expelled to an outside of the system. This precludes deterioration in operating performance and safety of the fuel cell.

According to fifteenth aspect of the present invention, there is provided a current measuring device for use in a fuel cell system operative to electrochemically react oxidant gas and fuel gas to generate electric energy, comprising an electrical conductor adapted to be held in electrical contact with the unit cell to allow electric current to flow from the unit cell into the electrical conductor and having a recessed portion. A current conductor is disposed in the recessed portion of the electrical conductor and adapted to be held in electrically contact with a local area of the unit cell to allow localized current to flow from the local area into The current conductor. A current sensor is provided for detecting the localized current flowing through The current conductor.

With such a structure, a simplified current measuring device is provided to measure localized current of the electric power unit, enabling abnormal occurrence factors in the electric power unit to be specified. Also, it becomes possible to detect a defective unit cell of the electric power unit on a manufacturing stage, making it possible to reject the defective unit cell with a resultant increase in quality of the electric power unit. Additionally, since fluctuation in electric current remarkably occurs in an earlier stage than fluctuation in voltage, measuring electric current enables detection of effects in the earliest time.

According to a sixteenth aspect of the present invention, there is provided a current measuring device for use in a fuel cell system operative to electrochemically react oxidant gas and fuel gas to generate electric energy, comprising a first electrical conductor adapted to be held in electrical contact with the unit cell to allow electric current to flow from the unit cell into the electrical conductor and having a recessed portion. A columnar portion is disposed in the recessed portion of the first electrical conductor and held in electrically contact with a local area of the unit cell to allow localized current to flow from the local area into the columnar portion. A magnetic sensor is disposed in the recessed portion for detecting a magnetic field generated around the columnar portion by the localized current flowing through the columnar portion.

With such a structure, since localized current flows through the columnar portion to create the magnetic field around the columnar portion, electric current of the localized area of the electric power unit can be measured depending on the magnitude of the magnetic field. Thus, using the current measuring device with such a structure makes it possible to specify the abnormal occurrence factors in use of the fuel cell. Also, it becomes possible to detect a defective unit cell of the electric power unit on a manufacturing stage, making it possible to reject the defective unit cell with a resultant increase in quality of the fuel cell.

According to a seventeenth aspect of the present invention, there is provided a current measuring device for use in a fuel cell system having a fuel cell, operative to generate electric energy through electrochemical reaction between oxidant gas and fuel gas, which has a membrane electrode assembly composed of an electrolyte membrane and a pair of electrodes formed on both surfaces of the membrane electrode assembly. The current measuring device comprises an electrically conductive separator, formed with at least one of a fuel gas flow passage through which the fuel gas flows and an oxidant gas flow passage through which the oxidant gas flows, which is disposed in the unit cell to be placed over an outer surface of the electrolyte membrane assembly and formed with a recessed portion. A columnar portion is formed in the recessed portion of the separator and held in electrically contact with a local area of the membrane electrode assembly to allow localized current to flow from the local area into the columnar portion. A magnetic sensor is disposed in the recessed portion for detecting a magnitude of a magnetic field generated around the columnar portion.

With such a structure, the current measuring device has the same advantage as that of the current measuring device set forth above, In addition, since separator is electrically conductive and serves as the electrical conductor, no needs arises in preparing additional component parts, resulting in reduction in the number of component parts.

According to an eighteenth aspect of the present invention, there is provided a current measuring device for use in a fuel cell system operative to provide electric energy, comprising an electrical conductor adapted to be held in electrical contact with the unit cell to allow electric current to flow from the unit cell into the electrical conductor and having a recessed portion. A columnar portion is formed in the recessed portion of the electrical conductor and held in electrical contact with a local area of the unit cell to allow localized current to flow from the local area into the columnar portion. A magnetic sensor is disposed in an area remote from a center of the electrical conductor for measuring a magnitude of a magnetic field generated around the columnar portion.

With such a structure, magnetic disturbance resulting from electric current other than localized current can be minimized, enabling the magnetic field resulting from localized current flowing through the columnar portion to be accurately measured, resulting in an increased precision in measuring localized current in a simplified structure.

BRIEF DESCRIPTION OF THE DRAWINGS

For a better understanding of the present invention and to show how the same may be carried into effect, there will now be described by way of example only, specific embodiments and methods according to the present invention with reference to the accompanying drawings, in which:

FIG. 56 is a flowchart illustrating a basic sequence of operations to be executed by a control section of the fuel cell system shown in FIG. 54 to carry out a related control method of the present invention:

FIG. 57A is a characteristic view illustrating variation in current value associated with a hydrogen outlet portion of a fuel cell shown in FIG. 54;

FIG. 57B is a view illustrating variation in rate of hydrogen to be exhausted;

FIG. 62A is a front view of an electrical conductor of the current measuring device shown in FIG. 61;

FIG. 62B is a side view of the electrical conductor of the current measuring device shown in FIG. 62A;

FIG. 62C is a cross sectional view taken on line A3-A3 of FIG. 62A;

FIG. 62D is a cross sectional view taken on line B1-B1 of FIG. 62A;

FIG. 83A is a perspective view of a fuel cell incorporating a current measuring device of a twenty-fifth embodiment according to the present invention;

FIG. 83B is a perspective view of the current measuring device shown in FIG. 83A;

FIG. 86 is a conceptual view illustrating a magnetic field in the current measuring device shown in FIG. 83B;

FIG. 87A is a front view of a current measuring device of a twenty-sixth embodiment according to the present invention;

FIG. 87B is a cross sectional view taken on line A6-A6 of FIG. 87A;

FIGS. 89A and 89B are conceptual views illustrating magnetic fields in a current measuring device incorporated in the fuel cell system shown in FIG. 88;

FIG. 91A is a front view of a current measuring device of a modified form of the twenty-eighth embodiment shown in FIGS. 90A and 90B;

FIG. 91B is a cross sectional view taken on line A8-A8 of FIG. 91A;

FIG. 92A is a front view of a current measuring device of a twenty-ninth embodiment according to the present invention; and FIG. 92B is a cross sectional view taken on line A9-A9 of FIG. 92A.

DETAILED DESCRIPTION OF THE PREFERRED EMBODIMENTS

Figure 1:
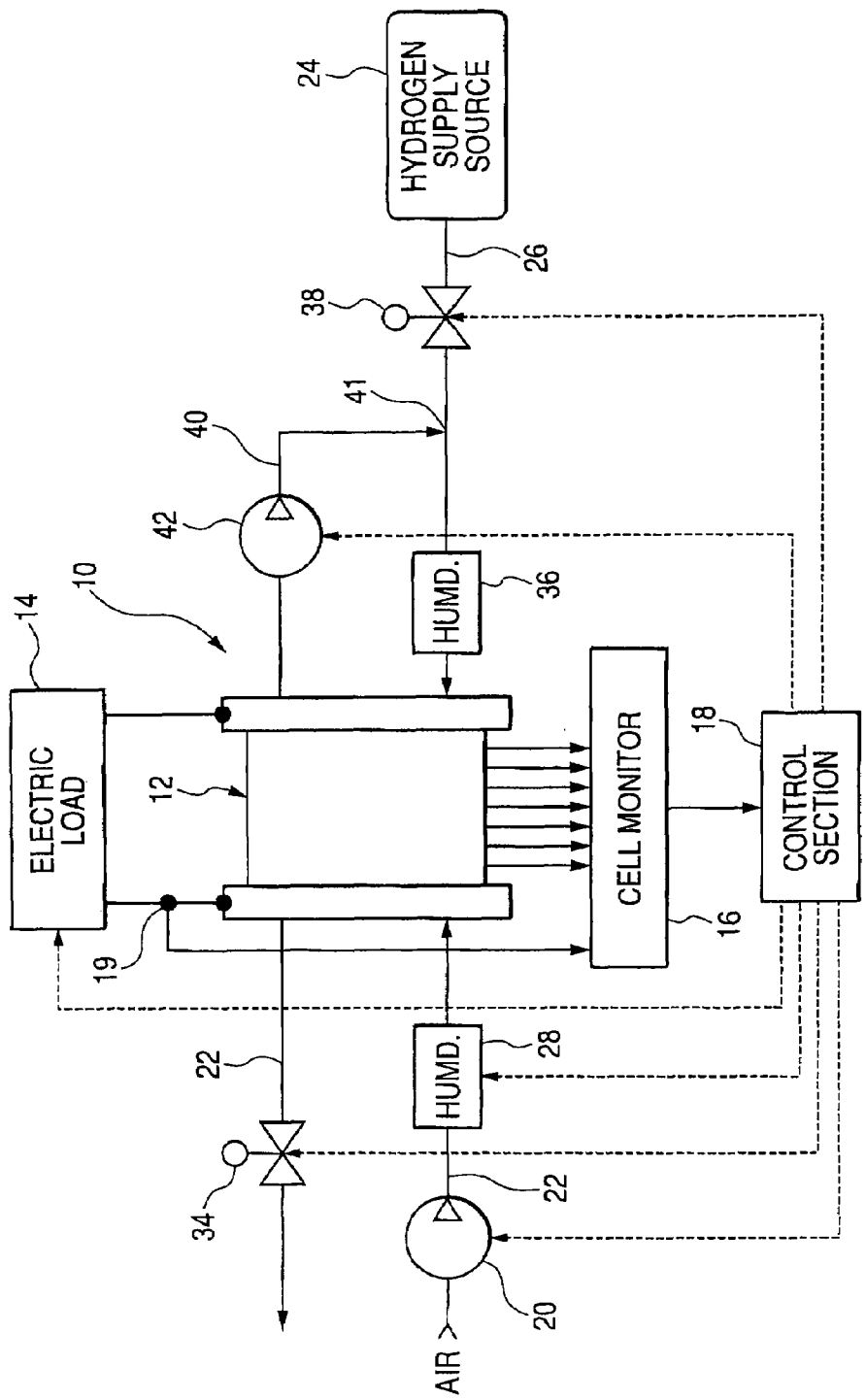
FIG. 1 is a typical view illustrating an overall structural of a fuel cell system of a first embodiment according to the present invention.

Hereinafter, various embodiments of the present invention will be described with reference to the accompanying drawings. In the following description of the various embodiments, like reference characters or numerals designate like or equivalent component parts throughout the several views.

As used herein, the term in a bracket refers to a term expressed in another way to mean a detailed component described later in description of the embodiment.

As used herein, the term "power unit" refers to a fuel cell, an air battery, a secondary battery and a capacitor, etc., which have features to have a plurality of unit cells to provide electric energy.

First Embodiment

FIG. 1 is a typical view illustrating a fuel cell system, serving as an electric power unit system, of a first embodiment according to the present invention and a related method. The fuel cell system has application to, for instance, an electric vehicle.

As shown in FIG. 1, the fuel cell system 10 of the presently filed embodiment shown as comprising a fuel cell 12 that is operative to electrochemically react oxidant gas, such as air containing oxygen, and fuel gas, such as hydrogen, to generate electric power. The fuel cell 12 is adapted to supply electric power to electrical equipment such as electric load 14 and a secondary battery (not shown). In this connection, if applied to the electric vehicle, an electric motor serving as a vehicle drive source corresponds to electric load 14.

In the presently filed embodiment, the fuel cell 12 is comprised of a solid polymer electrolyte fuel cell that includes a stack of a plurality of unit cells that are electrically connected in series. In the fuel cell 12, electrochemical reaction takes place between hydrogen and oxygen to generate electric energy in a manner expressed as:

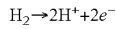  (On Negative Electrode)

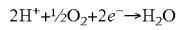  (On Positive Electrode)

In order to detect output voltages of the unit cells, a cell monitor 16 is connected to the fuel cell 12 as a cell voltage measuring unit, and cell voltage signals detected by the cell monitor 16 are inputted to a control section 18 in a manner described below. Also, a current sensor 19 is connected to an output of the fuel cell 12 to measure total current of the fuel cell 12, with a total current value measured by the current sensor 19 being applied through the cell monitor 16 to the control section 18 for the purpose described below.

The fuel cell system 10 is further comprised of an air supply source such as a pump 20 that draws air from the atmosphere to supply air (oxygen) under pressure to air electrodes (positive electrodes) of the fuel cell 12 through an air flow passage 22, and a hydrogen supply source 24.

The air pump 20 includes an air compressor such as, for instance, an adiabatic compression type compressor from which air under pressure is supplied to the fuel cell 112.

The hydrogen supply source 24 is comprised of a hydrogen tank filled with hydrogen, or a reformer (not shown) to reform hydrocarbon fuel into hydrogen, which is supplied through a hydrogen flow passage 26 to hydrogen electrodes (negative electrodes) of the fuel cell 12. As used herein, air corresponds to oxidant gas and hydrogen corresponds to fuel gas.

As shown in FIG. 1, a humidifier 28 is disposed in the air flow passage 22 between the air pump 20 and the fuel cell 12 to humidify air to be supplied to the fuel cell 12. An air exhaust passage 22 extends the fuel cell 12, and an air pressure regulator valve 34 is disposed in the air exhaust passage 32 downstream of the fuel cell 12 to regulate pressure of air to be supplied to the fuel cell 12 through the air flow passage 22.

Likewise, a humidifier 36 is disposed in the hydrogen flow passage 26 between the fuel cell 12 and the hydrogen supply source 24 to humidify hydrogen to be supplied to the fuel cell 12. A hydrogen pressure regulator valve 38 is disposed in the hydrogen flow passage 26 between the fuel cell 12 and the hydrogen supply source 24 to regulate pressure of hydrogen to be supplied to the fuel cell 12 through the hydrogen flow passage 26.

A fuel gas circulation passage 40 has one end connected to a hydrogen exhaust port of the fuel cell 12 and the other end connected to the hydrogen flow passage 26 at a junction 41 between the hydrogen supply source 24 and the humidifier 36. This enables unreacted hydrogen, expelled from the fuel cell 12, to be circulated again to the fuel cell 12 through the fuel gas circulation passage 40 for reuse. In order to circulate exhaust hydrogen through the fuel gas circulation passage 40, a hydrogen pump 42 is disposed in the fuel gas circulation passage 40 downstream of the fuel cell 12.

The control section 18 includes controller, serving as a diagnosis device, that includes an electronic control unit (ECU), serving as a diagnosis device, which includes a microcomputer composed of a CPU, a ROM, a RAM and associated peripheral circuitry. The diagnosis device 18 is applied with the cell voltage signals, delivered from the cell monitor 16, and other detection signals delivered from a current measuring device that will be described below. The diagnosis device 18 executes calculation based on the cell voltage signals and the detection signals to generate control signals that are applied to the air pump 20, the humidifiers 28, 36, the air pressure regulator valve 34, the hydrogen pressure regulator valve 38 and the hydrogen pump 42. Thus, the diagnosis device 18 is operative to diagnose an operating condition of the fuel cell 12.

Figure 2:
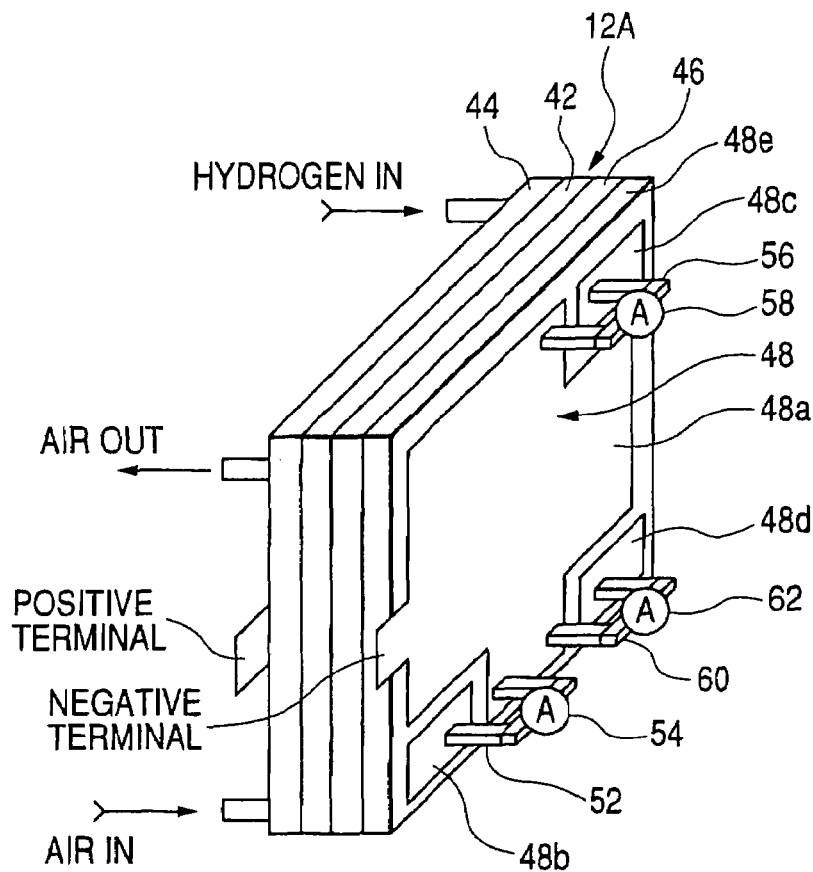
FIG. 2 is a perspective view of a unit cell forming the fuel cell shown in FIG. 1.

FIG. 2 is a perspective view showing a unit cell 12A forming part of the stack of the fuel cell 12. The unit cell 12A is comprised of an MEA (Membrane Electrode Assembly: Electrolyte/Electrode/catalyst Composite Body) 42 that includes an electrolyte membrane and a pair of electrodes formed on both sides of the electrolyte membrane, an air separator 44 placed on one side of the MEA 12A, and a hydrogen separator 46 placed on the other side of the MEA 12A. Further, disposed on one surface of the hydrogen separator 46 is a current collector plate 48 with a negative terminal. In this connection, the air separator 44 serves a current collector plate with a positive terminal.

Figure 3:
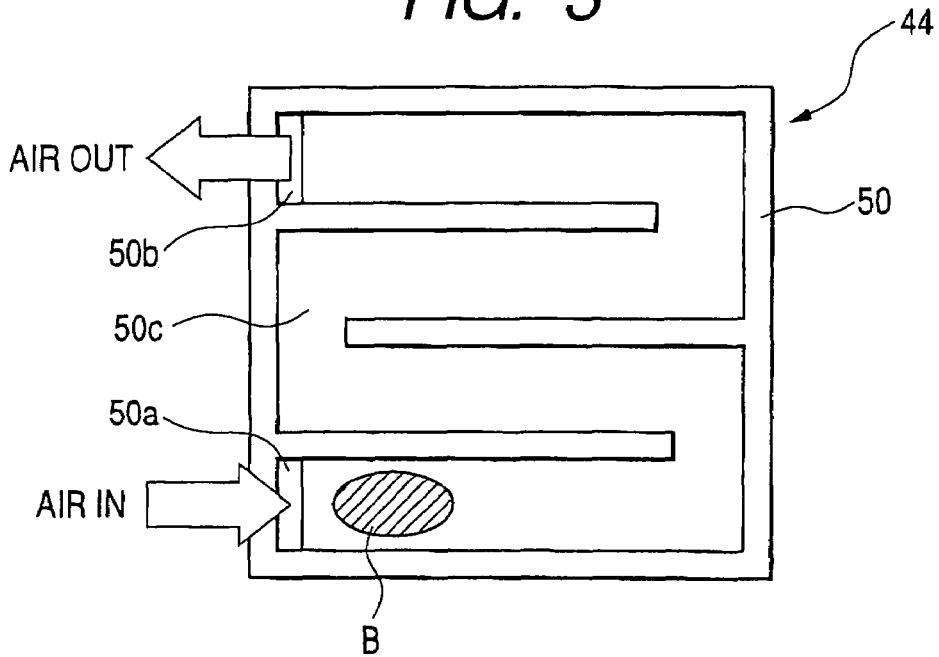
FIG. 3 is a transparent view of an air separator as viewed from a right side in FIG. 2.

FIG. 3 is a transparent view of the air separator 44 as viewed from a right side in FIG. 2. The air separator 44 is comprised of a separator body 50 formed with an air inlet portion 50a connected to the air flow passage 22 of the fuel cell 12 (see FIG. 1), an air outlet portion 50b connected to the air exhaust passage 32 of the fuel cell 12 (see FIG. 1), and an air flow channel 50c extending between the air inlet portion 50a and the air outlet portion 50b to allow a stream of air to flow therebetween. As used herein, the air separator 44 corresponds to a first separator of the present invention, and the air flow channel 50c corresponds to an oxidant gas flow passage. Likewise, the air inlet portion 50a corresponds to an oxidant gas inlet portion of the present invention, and the air outlet portion 50b corresponds to an oxidant gas outlet portion of the present invention.

As shown in FIGS. 2 and 3, the electrolyte membrane forming part of the MEA 12A has a specified local area, close proximity to the air inlet portion 50a of the air separator 44, where the electrolyte membrane is apt to dry. For the sake of convenience, the specified local area of the MEA 12A is shown in a hatched area B in FIG. 3 as a part representing a drying characteristic, associated with the air inlet portion 50a, of the MEA 12A.

Figure 4:
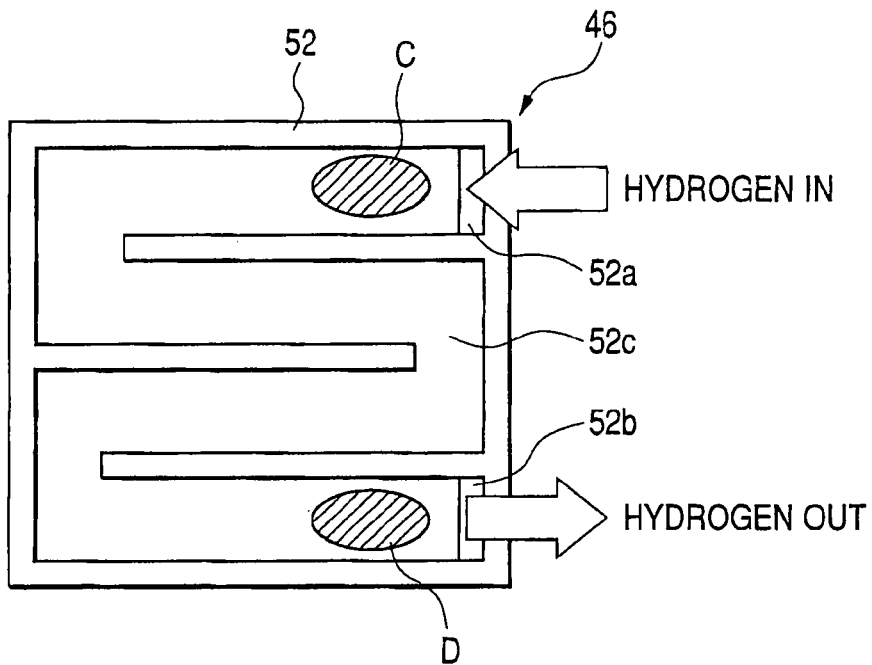
FIG. 4 is a transparent view of a hydrogen separator as viewed from a right side in FIG. 2.

FIG. 4 is a perspective view of the hydrogen separator 46 as viewed from a right side in FIG. 2. The hydrogen separator 46 is comprised of a separator body 52 formed with a hydrogen inlet portion 52a connected to the hydrogen flow passage 26 of the fuel cell 12 (see FIG. 1), a hydrogen outlet portion 52b connected to the hydrogen exhaust flow passage 40 of the fuel cell 12 (see FIG. 1), and a hydrogen flow channel 52c extending between the hydrogen inlet portion 52a and the hydrogen outlet portion 52b to allow a stream of hydrogen to flow therebetween. As used herein, the hydrogen separator 46 corresponds to a second separator of the present invention, and the hydrogen flow channel 52c corresponds to a fuel gas flow passage. Likewise, the hydrogen inlet portion 52a corresponds to a fuel gas inlet portion of the present invention, and the hydrogen outlet portion 52b corresponds to a fuel gas outlet portion of the present invention.

As shown in FIGS. 2 and 4, the electrolyte membrane forming part of the MEA 12A has another specified local area, close proximity to the hydrogen inlet portion 52a of the hydrogen separator 46, where the electrolyte membrane is apt to dry. For the sake of convenience, the specified local area of the MEA 12A is shown in a hatched area C in FIG. 4 as a part representing a drying characteristic, associated with the hydrogen inlet portion 50a, of the MEA 12A. Additionally, the electrolyte membrane also has the other specified local area, close proximity to the hydrogen outlet portion 52b of the hydrogen separator 46, where the electrolyte membrane is apt to have excess moisture content and where the electrolyte membrane is apt to have a shortage of fuel gas such as hydrogen. For the sake of convenience, this specified local area of the MEA 12A is shown in a hatched area D in FIG. 4 as a part representing a wetting characteristic and a hydrogen concentrating characteristic, associated with the hydrogen outlet portion 52b, of the MEA 12A.

Figure 5:
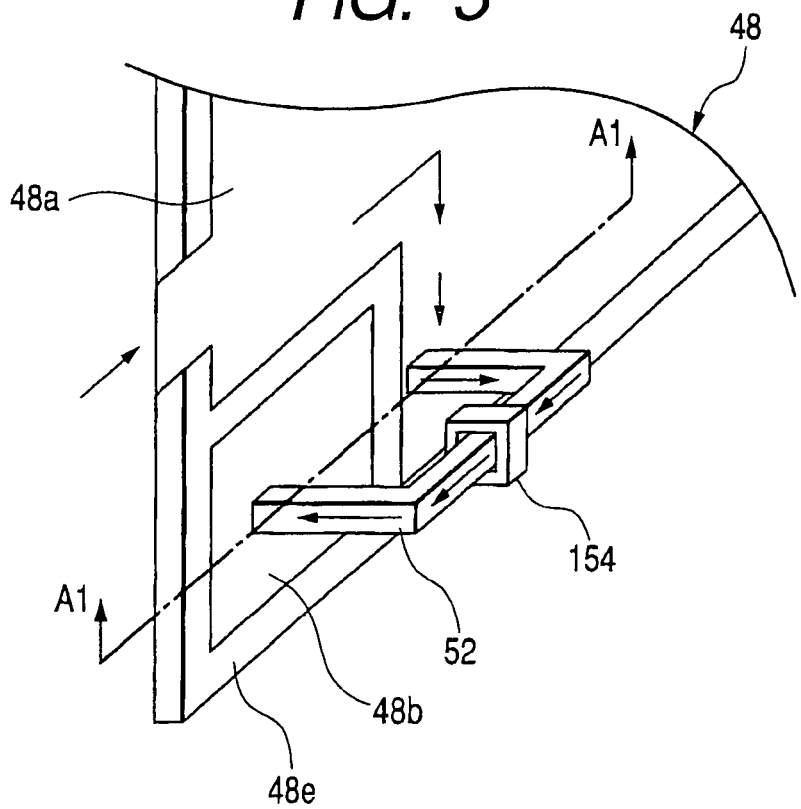
FIG. 5 is an enlarged perspective view illustrating an essential part related to a current measuring device shown in FIG. 2.
Figure 6:
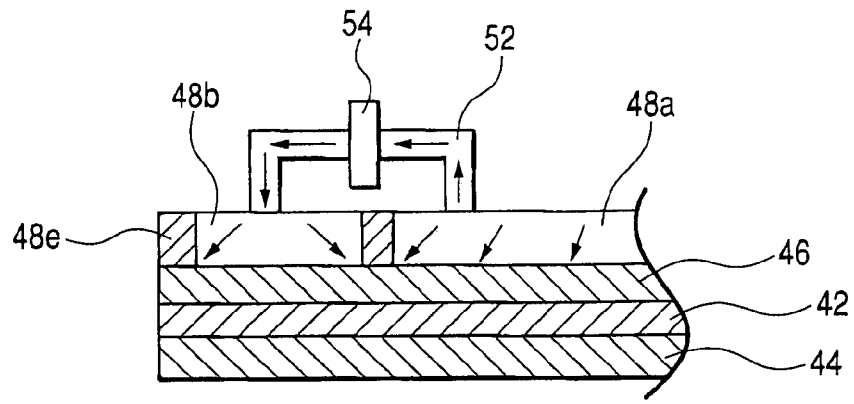
FIG. 6 is a cross sectional view taken on line A1-A1 of FIG. 5.

FIG. 5 is an enlarged perspective view illustrating an essential part of the current collector plate 48 with the negative terminal, and FIG. 6 is a cross sectional view taken on line A1-A1 of FIG. 5.

As shown in FIGS. 2, 5 and 6, the current collector plate 48 is divided into a main current collector plate 48a, and three auxiliary current collector plates 48b, 48c, 48d that are formed on an insulator frame 48e, made of insulation material, in specified local areas of the current collector plate 48 to be electrically insulated from one another.

That is, the first auxiliary current collector plate 48b is disposed on the insulator frame 48e in a first local area closer to the air inlet portion 50a of the air flow channel 50c of the air separator 44 than the air outlet portion 50b, i.e., in an area (corresponding to the hatched area B in FIG. 3), close proximity to the air inlet portion 50a and indicative of a drying characteristic of the fuel cell 12, which is apt to dry and, more particularly, in an area where the first auxiliary current collector plate 48b partly overlaps the air inlet portion 50a in opposition thereto. Connected between the main current collector plate 48a and the first current collector plate 48b is a first current collector wiring 52 that is electrically conductive to allow first localized current to flow therethrough. Mounted on the first current collector wiring 52 is a first current sensor 54 that detects first localized current flowing through the first current collector wiring 52.

Similarly, the second auxiliary current collector plate 48c is disposed on the insulator frame 48e in a second local area closer to the hydrogen inlet portion 52a than the hydrogen outlet portion 52b, i.e., in an area (corresponding to a hatched area C in FIG. 4), close proximity to the hydrogen inlet portion 52a than the hydrogen outlet portion 52b of the hydrogen flow channel 52c and indicative of the drying characteristic of the fuel cell 12, which is apt to dry and, more particularly, in an area where the second auxiliary current collector plate 48c partly overlaps the hydrogen inlet portion 52a in opposition thereto. Connected between the main current collector plate 48a and the second current collector plate 48c is a second current collector wiring 56 that is electrically conductive to allow second localized current to flow therethrough. Mounted on the second current collector wiring 56 is a second current sensor 58 that detects second localized current flowing through the second current collector wiring 56.

Likewise, the third auxiliary current collector plate 48d is disposed on the insulator frame 48e in a third local area closer to the hydrogen outlet portion 52b than the hydrogen inlet portion 52a of the hydrogen flow channel 52c, i.e., in an area (corresponding to a hatched area D in FIG. 4), close proximity to the hydrogen outlet portion 52b than the hydrogen inlet portion 52a of the hydrogen flow channel 52c and indicative of the wetting characteristic and hydrogen concentrating characteristic of the fuel cell 12, where liquid droplets are easy to collect and a shortage of hydrogen is apt to take place and, more particularly, in an area in which the third auxiliary current collector plate 48d partially overlaps the hydrogen outlet portion 52b in opposition thereto. Connected between the main current collector plate 48a and the third current collector plate 48d is a third current collector wiring 60 that is electrically conductive to allow third localized current to flow therethrough. Mounted on the third current collector wiring 60 is a third current sensor 62 that detects third localized current flowing through the third current collector wiring 60.

Also, the current sensors 54, 58, 62 may be preferably comprised of, for instance, Hall elements, respectively. In such a case, an iron core having an air gap is disposed around each of the current collector wirings 52, 56, 60, and the Hall elements may be disposed in the air gaps, respectively. When localized currents flow through the current collector wirings 52, 56, 60, respectively, magnetic fields proportional to respective localized currents are generated around the current collector wirings 52, 56, 60. The Hall elements diet the magnetic fields generated by localized currents and convert them into respective voltages. Also, examples of the magnetic sensor include an MR element, an MI element and flux gate or the like. In another alternative, it may be possible to employ a current sensor, etc., using a shunt resistance.

It will be appreciated that the first auxiliary current collector plate 48b formed in the first local area of the current collector plate 48, the first current collector wiring 52 and the first current sensor 54, the second auxiliary current collector plate 48c formed in the second local area of the current collector plate 48, the second current collector wiring 56 and the second current sensor 58, and the third auxiliary current collector plate 48d formed in the third local area of the current collector plate 48, the third current collector wiring 60 and the third current sensor 62 form current measuring devices, respectively, that are associated with the respective local areas of the fuel cell to measure localized currents flowing through the first to third local areas.

Now, description is made of the operation of the fuel cell system 10 with such a structure set forth above and a related method.

First, in response to electric power demand from electric load 14, the control section 18 controls the flow rates of air and hydrogen to be supplied to the fuel cell 12. In particular, the control section 18 controls a rotational speed of the air pump 20 for thereby controlling the flow rate of air to be supplied to the fuel cell 12 and controls a rotational speed of the hydrogen pump 42 for thereby controlling the flow rate of hydrogen to be supplied to the fuel cell 12. When this takes place, the flow rate of air to be supplied is preliminarily set to a given flow rate not to cause fluctuations in an output voltage of the fuel cell 12. Under such a situation, supplying air and hydrogen to the fuel cell 12 causes electrochemical reaction to take place for generating electric power, which in turn is supplied to electric load 14.

Electric current passing across electric load 14 flows into the current collector plate 48 with the negative terminal. Electric current flowing into the current collector plate 48 is divided into main current that flows into the MEA 42, first current flowing into the MEA 42 through the first current collector wiring 52 and the first auxiliary current collector plate 48b, second current flowing into the MEA 42 through the second current collector wiring 56 and the second auxiliary current collector plate 48c, and third current flowing into the MEA 42 through the third current collector wiring 60 and the third auxiliary current collector plate 48d.

First current, flowing through the first current collector wiring 52, corresponds to first localized current (hereinafter referred to as air-inlet current Ia·in) that flows through the first local area, which is close proximity to the air inlet portion 50a of the MEA 42, of the current collector plate 48, thereby enabling the first current sensor 54 to detect air-inlet current Ia·in.

Further, second current, flowing through the second current collector wiring 56, corresponds to second localized current (hereinafter referred to as hydrogen-inlet current Ih·in) that flows through the second local area, which is close proximity to the hydrogen inlet portion 52a of the MEA 42, of the current collector plate 48, thereby enabling the second current sensor 58 to detect hydrogen-inlet current Ih·in.

In addition, third current, flowing through the third current collector wiring 98, corresponds to third localized current (hereinafter referred to as hydrogen-outlet current Ih·out) that flows through the third local area, which is close proximity to the hydrogen outlet portion 52b of the MEA 42, of the current collector plate 48, thereby enabling the third current sensor 62 to detect hydrogen-outlet current Ih·out.

Figure 7:
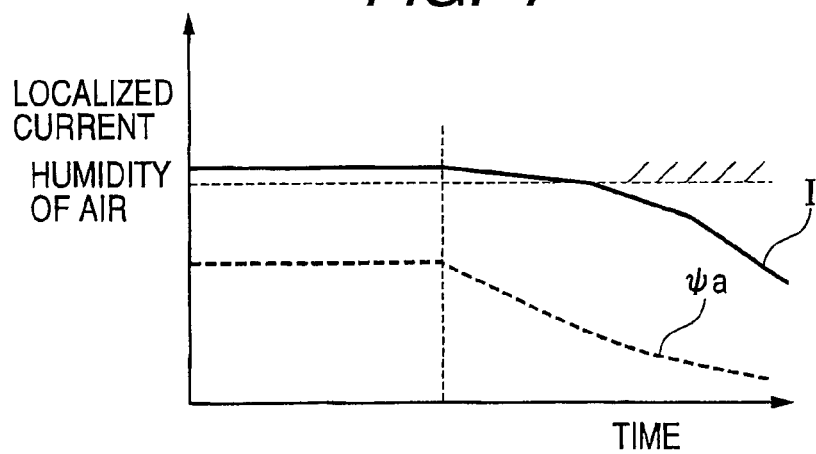
FIG. 7 is a characteristic view illustrating variation in localized current and variation in a humidity of air to be supplied to the fuel cell under a situation where an electrolyte membrane is dried.

By the way, if a rate of humidifying air to be supplied to the fuel cell 12 decreases, the first local area, which is closer to the air inlet portion 50a, of the electrolyte membrane of the MEA 42 is caused to dry. FIG. 7 shows variations in localized current I, in terms of time, at a dried area resulting from the occurrence of a dried state of the electrolyte membrane caused by a decrease in an air humidity Ψa. As shown, proton conductivity resistance increases in the dried area of the electrolyte membrane, causing a drop in localized current.

Similarly, if a rate of humidifying hydrogen to be supplied to the fuel cell 12 decreases, the second local area, which is closer to the hydrogen inlet portion 52a, of the electrolyte membrane of the MEA 42 is caused to dry, and proton conductivity resistance increases in the dried area of the electrolyte membrane, causing a drop in second localized current. Also, it will be appreciated that second localized current, indicative of the drying characteristic, of the dried area of the electrolyte membrane resulting from the dried condition thereof caused by reduction in the rate of humidifying hydrogen, varies in the same manner as the first localized current in which a drop occurs due to reduction in the air humidity Ψ As shown in FIG. 7.

From this phenomenon, by measuring localized currents I, i.e., air-inlet current Ia·in and hydrogen-inlet current Ih·in, related to the first and second local areas, close proximity to the air inlet portion 50a and the hydrogen inlet portion 52a, in both of which it is apt to dry, it becomes possible for the dried state of the electrolyte membrane of the fuel cell 12 to be diagnosed. In particular, if air-inlet current Ia·in and hydrogen-inlet current Ih·in are less than a given current value, then, it can be estimated that there is a dried area in the electrolyte membrane. Also, the given current value may be preferably set to a value of approximately 90% of a current value appearing when no dried area exists in the electrolyte membrane.

On the contrary, in an event that air and hydrogen are humidified at excessively high rates, respectively, a wet condition with excessive moisture content occurs on the electrode. When this takes place, liquid droplets mostly collect in the local area D (see FIG. 4) of the electrolyte membrane at a position close proximity to the hydrogen outlet portion 52b to cause excess moisture content therein, and this tendency becomes quite noticeable in the electrode of the MEA 42 at the local area closer to the hydrogen outlet portion 52b. The reason why the liquid droplets are easy to collect in the local area closer to the hydrogen outlet portion 52b resides in that water is transferred from the hydrogen inlet portion 52a to the hydrogen outlet portion 52b through the hydrogen flow channel 52c and, in addition thereto, the flow rate of hydrogen decreases due to consumption of hydrogen with a resultant drop in a capacity of exhausting water.

Figure 8:
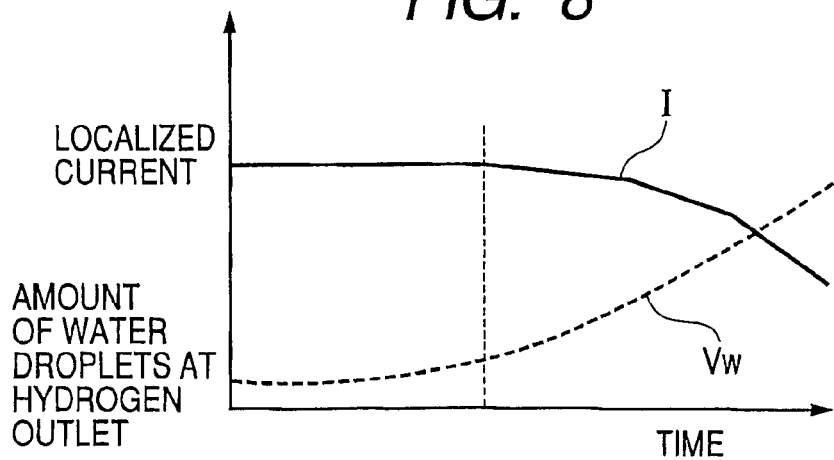
FIG. 8 is a characteristic view illustrating variation in localized current under a situation where an electrode is wet in excess due to an increase in the amount of water droplets collected at a hydrogen outlet portion of the fuel cell.

FIG. 8 shows variation in localized current I at the excessively wet local area under a situation where the electrolyte is brought into an excess moisture condition as a result of an increase in a volume Vw of water droplets collected in the hydrogen outlet portion 52b. As shown in FIG. 8, as the water droplets Vw increases, the permeation of gas is disturbed with a resultant drop in the output of the fuel cell 12.

Figure 9:
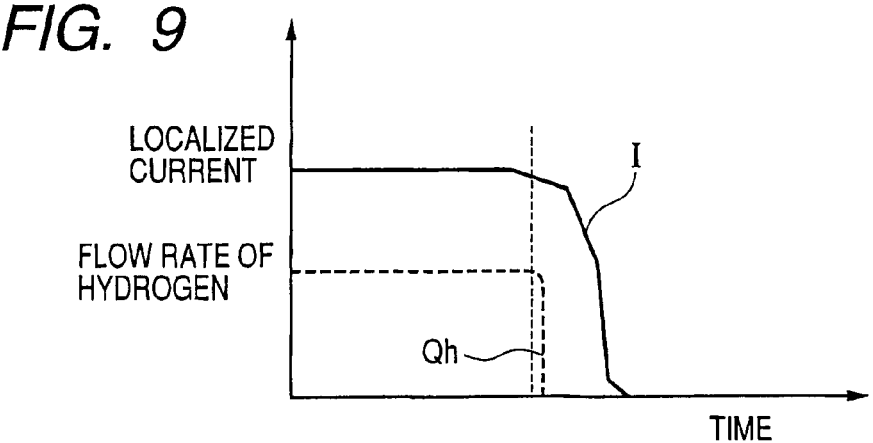
FIG. 9 is a characteristic view illustrating variation in localized current under a situation where a shortage of hydrogen takes place in the fuel cell.

Further, in cases where the flow rate of hydrogen is in shortage in terms of the amount of electric power to be generated, a shortage of hydrogen occurs on the localized area, near the hydrogen outlet portion 52b, of the MEA 42, thereby causing a drop in third localized current on the third local area of the MEA 42 at the position associated with the hydrogen outlet portion 52b. FIG. 9 shows variation in localized current I in the third local area, closer to the hydrogen outlet portion 52b, of the MEA 42 when subjected to the shortage in the flow rate Qh of hydrogen to be supplied to the fuel cell 12 and, As shown, if the fuel cell 12 has the shortage of hydrogen, localized current I immediately and rapidly drops.

From this phenomenon, localized current I, i.e., hydrogen-outlet current Ih·out at the third local area, close proximity to the hydrogen outlet portion 52b, of the MEA 42 is less than a given current value, then, it can be estimated that there occurs excess moisture content or the shortage of hydrogen takes place. Also, the given current value may be preferably set to a value of approximately 90% of a current value resulting from the occurrence of excess moisture content and the shortage of hydrogen.

Here, during the occurrence of excess moisture content or the occurrence of the shortage in hydrogen, a drop occurs in localized current I at the local area, closer to the hydrogen outlet portion 52b, of the MEA 42 in both cases, and a need arises in specifying what factor is a cause of a drop in localized current I.

Figure 10:
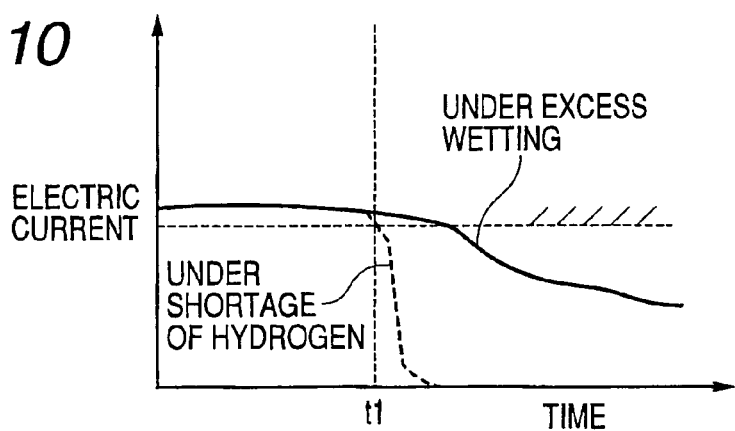
FIG. 10 is a characteristic view illustrating variation in localized current under a situation where the electrode is wet in excess and the shortage of hydrogen takes place in the fuel cell.
Figure 11:
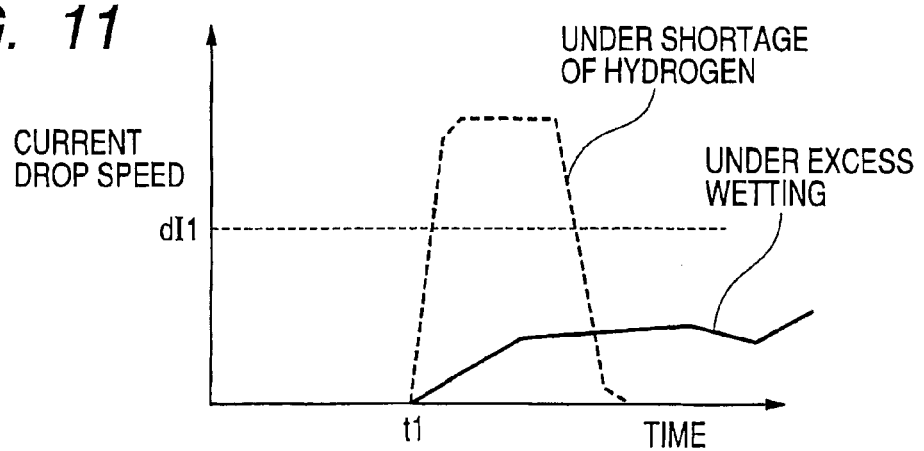
FIG. 11 is a characteristic view illustrating variation in a drop speed of localized current under a situation where the electrode is wet in excess and the shortage of hydrogen takes place in the fuel cell.

FIG. 10 shows variation in localized current I at the local area, closer to the hydrogen outlet portion 52b, of the MEA 42 during the occurrence of excess moisture content and variation in localized current I at the local area, closer to the hydrogen outlet portion 52b, of the MEA 42 during the occurrence of the shortage of hydrogen. Also, FIG. 11 shows a drop speed (hereinafter referred to as a current drop speed) of localized current I at the local area, closer to the hydrogen outlet portion 52b, of the MEA 42 during the occurrence of excess moisture content and the shortage of hydrogen. Also, as used herein, the term "current drop speed" refers to an absolute value in rate of variation in electric current per unit time. In FIGS. 10 and 11, solid lines indicate characteristic curves during the occurrence of excess moisture content while broken lines indicate characteristic curves in the event of the shortage of hydrogen, and t1 designates a time instant at which the excess moisture condition and the shortage of hydrogen take place.

As shown in FIGS. 10 and 11, when compared to localized current I during the occurrence of the excess moisture condition, rapid drop occurs in localized current I in the event of the shortage of hydrogen. From this phenomenon, the presence of the current drop speed resulting when drop occurs in localized current I enables the factor of drop in localized current I to be specified. In particular, if hydrogen-outlet current Ih·out is less than the given current value and the current drop speed is less than a given drop speed dI1 (see FIG. 11), then, it can be estimated that there is excess moisture content. Likewise, if hydrogen-outlet current Ih·out is less than the given current value and the current drop speed exceeds the given drop speed dI1, then, it can be estimated that the shortage of hydrogen takes place. Also, the given drop speed dI1 is preliminarily set to a value of approximately 1.0 (mA/SEC/cm$^2$).

Figure 12:
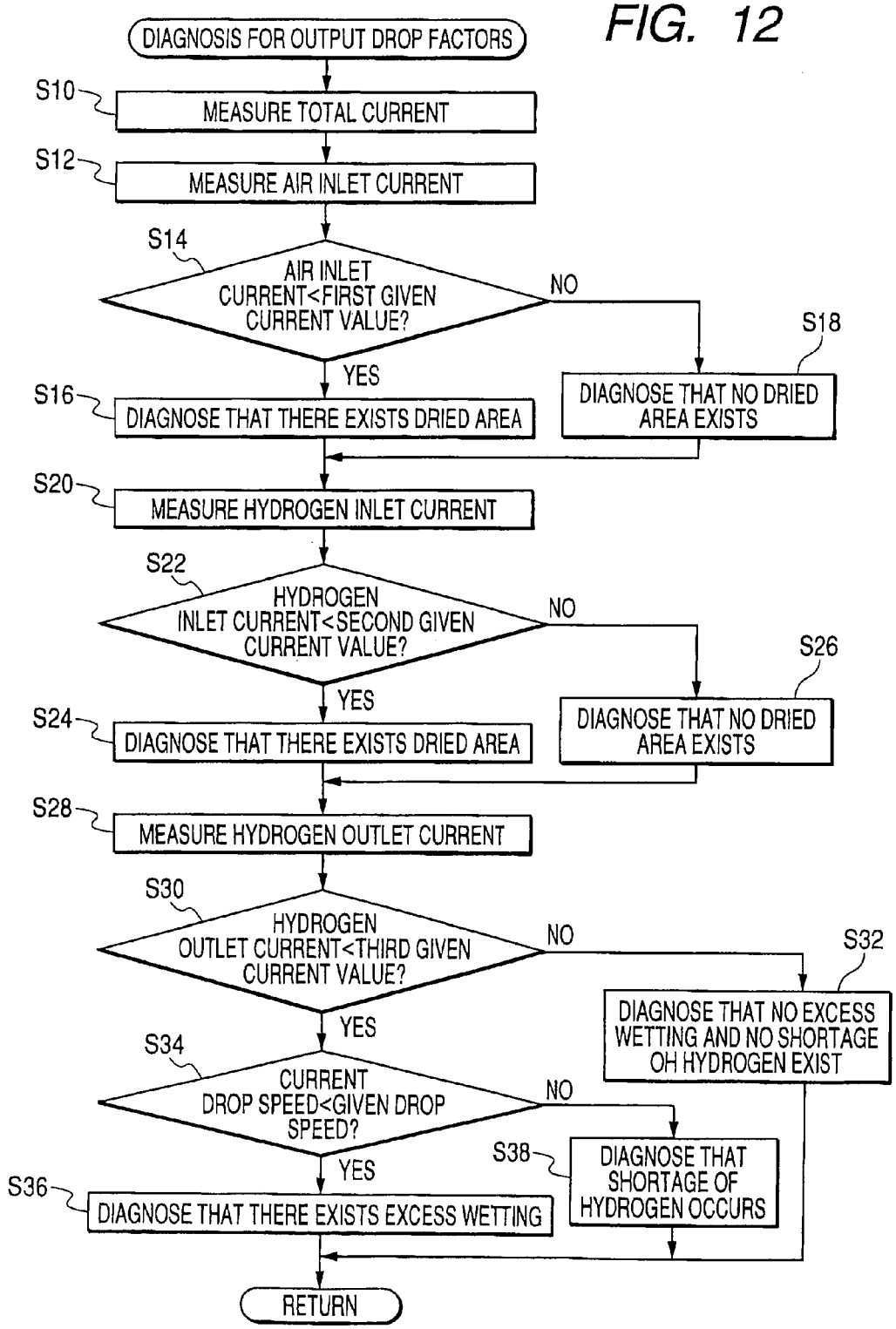
FIG. 12 is a flowchart illustrating a basic sequence of operations to be executed by a control section of the fuel cell system shown in FIG. 1 to carry out a related diagnosing method of the present invention.

Next, description is made of a method of diagnosing an output drop factor of the fuel cell 12 with reference to FIG. 12. FIG. 12 is a flowchart illustrating a basic sequence of diagnosing operations, for diagnosing the output drop factor of the fuel cell 12, among control operations to be executed by the control section 18 (see FIG. 1) of the fuel cell system 10.

Figure 13:
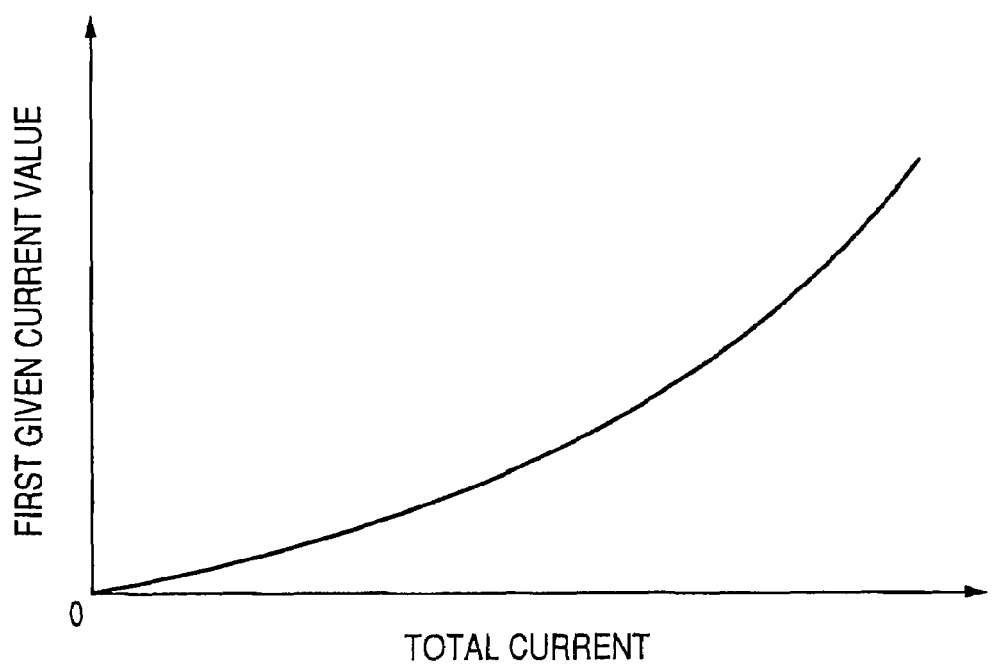
FIG. 13 is a characteristic view illustrating the relationship between a total current value, occurring when diagnosing a dried status, and a given current value.

First in step S10, the current sensor 19 operates to measure total electric current of the fuel cell 12 flowing to electric load 14 and in next step S12, the first current sensor 54 measures air-inlet current Ia·in as first localized current that is applied to the control section 18. In succeeding step S14, judgment is made whether air-inlet current Ia·in is less than a given current value. The "first given current value" is a value that is preliminarily determined for the purpose of diagnosing a dried status of the fuel cell 12 at an area close proximity to the air inlet portion 50a. As shown in FIG. 13, the first given current value is mapped in relation to total current of the fuel cell 12 and can be obtained based on total current measured in step S10.

If in step S14, air-inlet current Ia·in is fond to be less than the first given current value, then in consecutive step S16, diagnosis is made that there exists a dried area in the electrolyte membrane of the MEA 42. In contrast, if in step S14, air-inlet current Ia·in is found to exceed the first given current value, then in subsequent step S18, diagnosis is made that no dried area exists in the electrolyte membrane of the MEA 42. In this connection, if diagnosis is made in step S16 that the electrolyte membrane has the dried area, it is estimated that air to be supplied to the fuel cell 12 has a low humidity Ψa and, hence, the control section 18 provides a command to the humidifier 28 so as to increase the rate of humidifying air to be supplied to the fuel cell 12.

Next, in consecutive step S20, the second current sensor 58 measures hydrogen-inlet current Ih·in as second localized current that is applied to the control section 18. In subsequent step S22, discrimination is made to find whether hydrogen-inlet current Ih·in is less than a second given current value. The "second given current value" is a value that is preliminarily determined for the purpose of diagnosing a dried status of the fuel cell 12 at an area close proximity to the hydrogen inlet portion 52a. The "second given current value" is mapped in relation to total current of the fuel cell 12, like the first given current value, and can be obtained based on total current measured in step S10.

If in step S22, hydrogen-inlet current Ih·in is fond to be less than the second given current value, then in succeeding step S24, diagnosis is made that the electrolyte membrane has the dried area. In contrast, if in step S22, hydrogen-inlet current Ih·in is found to exceed the second given current value, then in step S26, diagnosis is made that the electrolyte membrane has no dried area. In this connection, if diagnosis is made in step S24 that the electrolyte membrane has the dried area, it can be estimated that less humidification occurs in hydrogen to be supplied to the fuel cell 12 and, hence, the control section 18 controls the humidifier 36 so as to increase the rate of humidifying hydrogen to be supplied to the fuel cell 12.

In next step S28, the third current sensor 62 measures hydrogen-outlet current Ih·out. In subsequent step S30, discrimination is made to find whether hydrogen-outlet current Ih·out is less than a third given current value. The "third given current value" is a value that is preliminarily determined for the purpose of diagnosing an excess moisture condition of the fuel cell 12 at an area close proximity to the hydrogen outlet portion 52b. The "second given current value" is mapped in relation to total current of the fuel cell 12, like the first given current value, and can be obtained based on total current measured in step S10.

On the contrary, if in step S30, hydrogen-outlet current Ih·out is found to exceed the third given current value, then in succeeding step S32, diagnosis is made that the electrolyte membrane has no excess moisture content or no shortage of hydrogen. If in subsequent step S34, the current drop speed of hydrogen-outlet current Ih·out is less than a given drop speed, then in consecutive step S36, diagnosis is made that the electrolyte membrane remains in the excess moisture condition. In this connection, if in step S36, diagnosis is made that the electrolyte membrane remains in the excess moisture condition, it can be estimated that air or hydrogen to be supplied to the fuel cell 12 are humidified at excessively high rates or that a drop occurs in a capacity of exhausting water due to reduction in the flow rate of hydrogen passing across the MEA 42. Thus, the control section 18 controls the humidifier 28 so as to reduce the rate of humidifying air and controls the humidifier 36 so as to decrease the rate of humidifying hydrogen, while increasing the flow rate of hydrogen to be supplied to the fuel cell 12.

Further, if in step S30, hydrogen-outlet current Ih·out is found to be less than the third given current value and in step S34, the current drop speed of hydrogen-outlet current Ih·out is found to exceed the given drop speed, then in step S38, diagnosis is made that the electrolyte membrane has the shortage of hydrogen to be supplied to the fuel cell 12. In this connection, if in step S38, diagnosis is made that the flow rate of hydrogen to be supplied is in shortage, then, the control section 18 executes operation to increase the flow rate of hydrogen to be supplied to the fuel cell 12.

With the fuel cell system 10 of the presently filed embodiment with such a structure set forth above, the control section 18 diagnoses the dried condition of the electrolyte membrane on the basis of air-inlet current Ia·in while diagnosing excess moisture content and the shortage of hydrogen on the basis of hydrogen-outlet current Ih·out and the current drop speed of hydrogen-outlet current Ih·out, providing a capability of appropriately diagnosing the output drop factors of the fuel cell 12. Further, the output drop factors of the fuel cell 12 can be specified, enabling the control section 18 to execute appropriate control depending on the specified output drop factors.

Further, with the fuel cell system 10 of the presently filed embodiment, the use of the current measuring devices combined with the MEA 12 to measure localized currents associated with the local areas, representative of operating characteristics such as the drying characteristic, the wetting characteristic and the hydrogen concentrating characteristic, etc., of the fuel cell 12 enables the diagnosis device 18 to accurately diagnose a particular operating condition of the fuel cell 12 based on the specified operating characteristics determined by relevant localized currents. Thus, the output drop factors, such as the dry state, the excessive moisture condition and the shortage of fuel gas or the like, can be precisely diagnosed, resulting in a highly increased operating performance of the fuel cell 12.

Moreover, with the fuel cell system 10 of the presently filed embodiment, the use of the current collector plate 48 combined with the MEA 12A to enable localized currents at any points of the MEA 12A to specify the particular operating characteristics of the fuel cell 12 enables the fuel cell system 10 to operate in a reliable manner in a simplified structure.

In addition, with the fuel cell system 10 of the presently filed embodiment, electric current measured by the current measuring device is compared with a given current value whereby when a value of the current measuring device is less than the given current value, the diagnosis device 18 is able to diagnose that the fuel cell remains in the dried state.

Second Embodiment

Next, a fuel cell system of a second embodiment according to the present invention is described below with reference to FIGS. 14 to 16.

Figure 14:
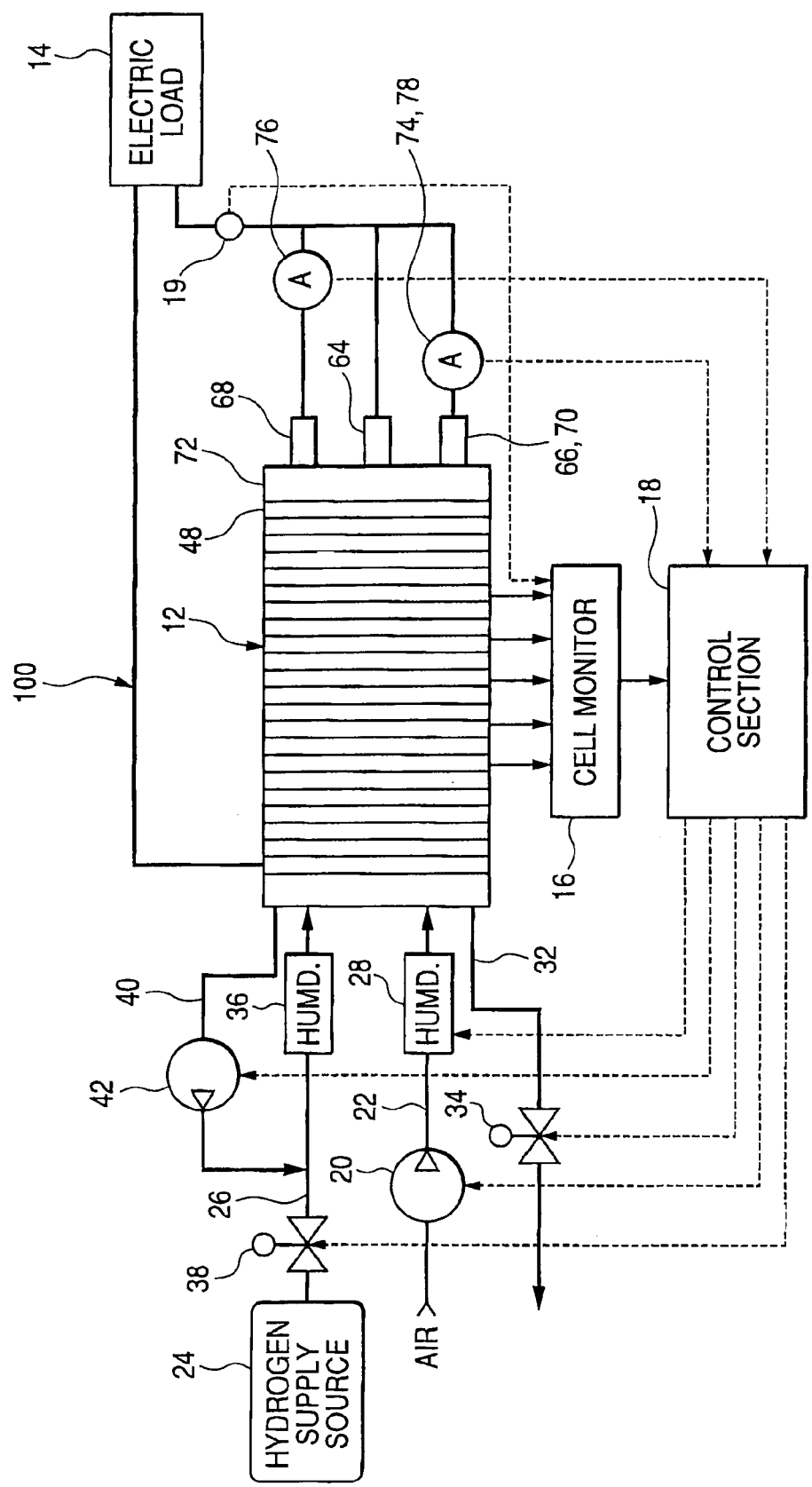
FIG. 14 is a typical view illustrating an overall structure of the fuel cell system of a second embodiment according to the present invention.

FIG. 14 is a schematic view illustrating an overall structure of the fuel cell system of the second embodiment; FIG. 15 is a perspective view of a fuel cell forming part of the fuel cell system of the presently filed embodiment; and FIG. 16 is a perspective view of a unit cell of the fuel cell.

The fuel cell system 100 of the presently filed embodiment differs from that of the first embodiment in respect of a structure of the current measuring device and the same component parts as those of the first embodiment bear like reference numerals to simplify description.

Figure 16:
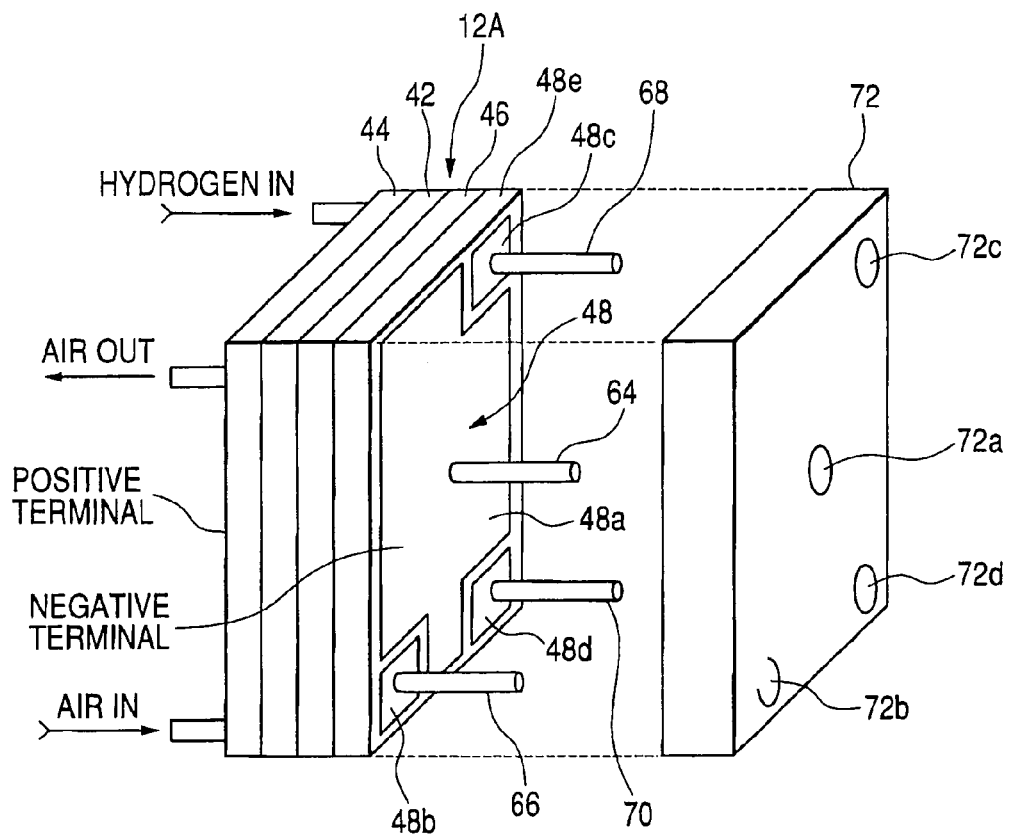
FIG. 16 is a typical perspective view illustrating a unit cell of the fuel cell shown in FIG. 14.

As shown in FIG. 16, with the presently filed embodiment, the first current collector plate 48 has current collector members 64 to 70. The current collector members 64 to 70 are made of bar-like electrically conductive bar-like material and formed in a way to protrude from a plate surface of the first current collector plate 48. The central current collector member 64 is formed on the main current collector plate 48*a*; the first current collector member 66 is formed on the first auxiliary current collector plate 48*b*; the second current collector member 68 is formed on the second auxiliary current collector plate 48*c*; and the third current collector member 70 is formed on the third auxiliary current collector plate 48*d*. Disposed over the first current collector plate 48 is a second current collector plate 72 that is formed with through-bores 72*a* to 72*d* at positions corresponding to the current collector members 64 to 70.

As shown in FIG. 14, electric current generated by the fuel cell 12 flows to the electric load 14 through the respective current collector members 64 to 70.

Figure 15:
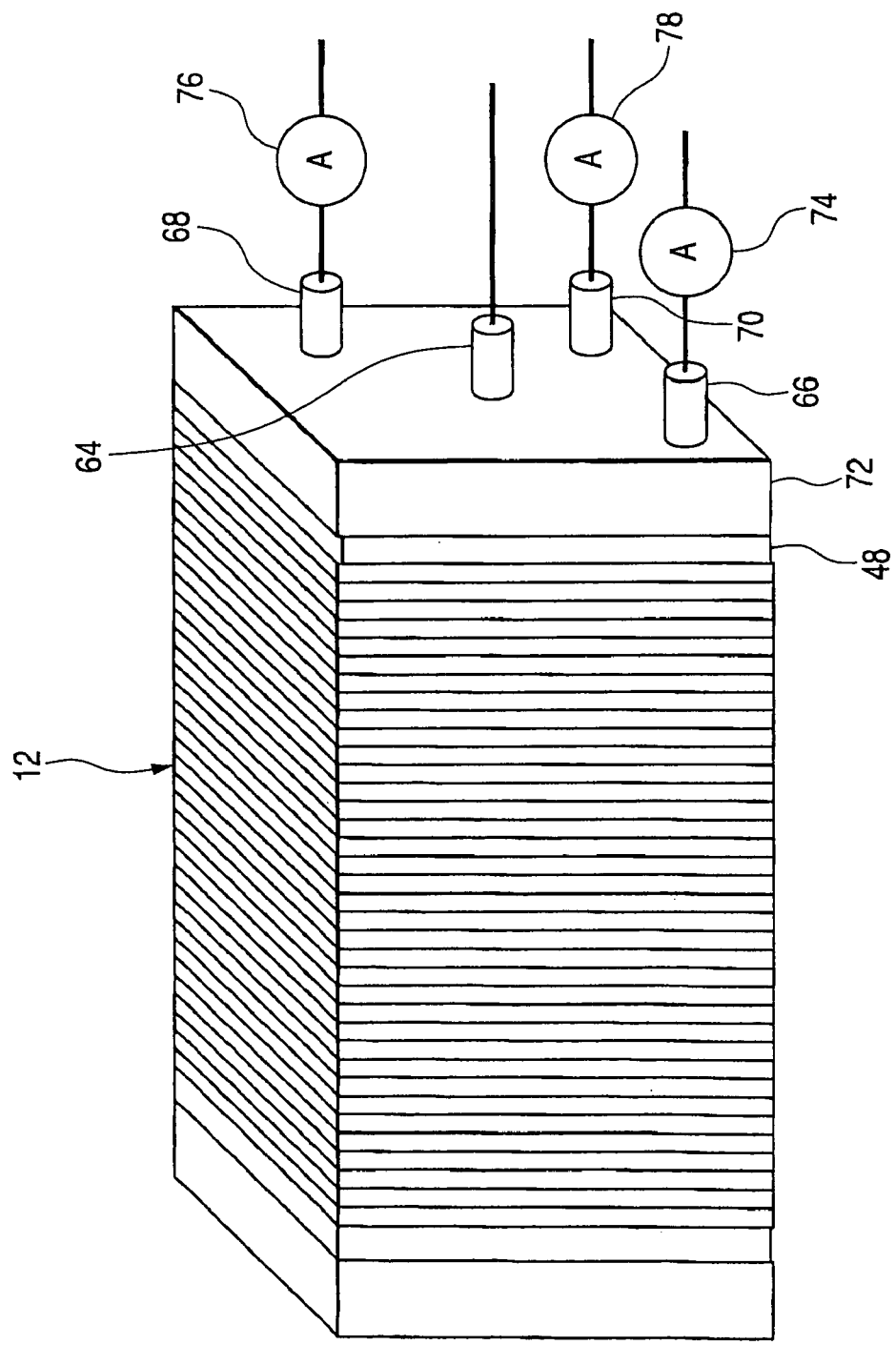
FIG. 15 is a typical perspective view illustrating a fuel cell shown in FIG. 14.

As shown in FIGS. 14 and 15, current sensors 74, 76, 78 are provided for the current collector members 66, 68, 70, respectively, to measure localized currents flowing through the current collector members 66, 68, 70 located on the respective auxiliary current collector plates 48*b*, 48*c*, 48*d*. Examples of the current collectors 74 to 78 may be comprised of Hall elements or other current sensors, respectively, like the first embodiment.

Electric current flowing through the first current collector member 66 corresponds to air-inlet current Ia·in of the MEA 12A and, therefore, the first current sensor 74 is able to detect air-inlet current Ia·in indicative of the drying characteristic of the fuel cell 12. Also, electric current flowing through the second current collector member 68 corresponds to hydrogen-inlet current Ih·in and, therefore, the second current sensor 76 is able to detect hydrogen-inlet current Ih·in indicative of the drying characteristic of the fuel cell 12. In addition, electric current flowing through the third current collector member 70 corresponds to hydrogen-outlet current Ih·out, indicative of the wetting characteristic and the hydrogen concentrating characteristic of the fuel cell 12, and, therefore, the third current sensor 78 is able to detect hydrogen-outlet current Ih·out.

Further, the first auxiliary current collector plate 48*b*, the first current collector member 66 and the first current sensor 74, the second auxiliary current collector plate 48*c*, the second current collector member 68 and the second current sensor 76, and the third auxiliary current collector plate 48*d*, the third current collector member 70 and the third current sensor 78 form current measuring devices, respectively, of the present invention.

With the fuel cell system 100 of the presently filed embodiment, using the current measuring devices with the structures set forth above enables the control section 18 to appropriately diagnose the output drop factors of the fuel cell 12 like the first embodiment.

Further, with the fuel cell system 100 of the presently filed embodiment, localized currents are caused to flow from various local areas of the fuel cell 12 for specifying the various operating characteristics thereof to enable the control section 18 to diagnose the particular operating characteristics of the fuel cell 12 in a reliable manner, resulting in a highly increased operating performance of the fuel cell 12.

Third Embodiment

Next, a fuel cell system of a third embodiment is described with reference to FIGS. 17 to 19. The fuel cell system of the third embodiment differs from the first and second embodiments in respect of a basic sequence of controlling moisture content inside the fuel cell 12 in the event that the fuel cell 12 has the dried area.

Figure 17:
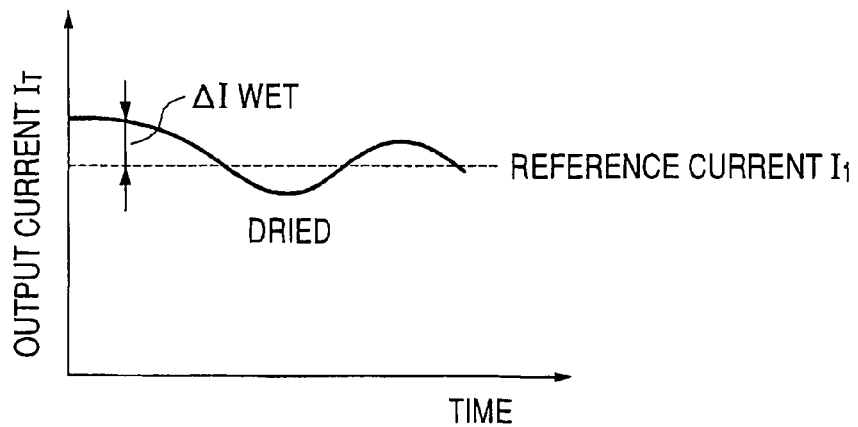
FIG. 17 is a characteristic view illustrating variation in differential current in the presence of fluctuations in moisture content of a fuel cell of a fuel cell system of a third embodiment according to the present invention.

FIG. 17 shows variation in output current $I_T$ in cases where a moisture condition fluctuates in an area close proximity to the air inlet portion 50*a* that involves the area B (see FIG. 3) of the fuel cell 12 which is apt to be dried. In an example shown in FIG. 17, if output current $I_T$ exceeds a given reference current $I_1$, the control section 18 diagnoses that the inside of the fuel cell 12 remains in a wet condition. In contrast, if electric current $I_T$ is less than the given reference current $I_1$, the control section 18 diagnoses that the inside of the fuel cell 12 remains in a dried condition. In the presence of the dried state inside the fuel cell 12, the lesser the moisture content of the inside of the fuel cell 12, the smaller will be the output current $I_T$ of the fuel cell 12.

Figure 18:
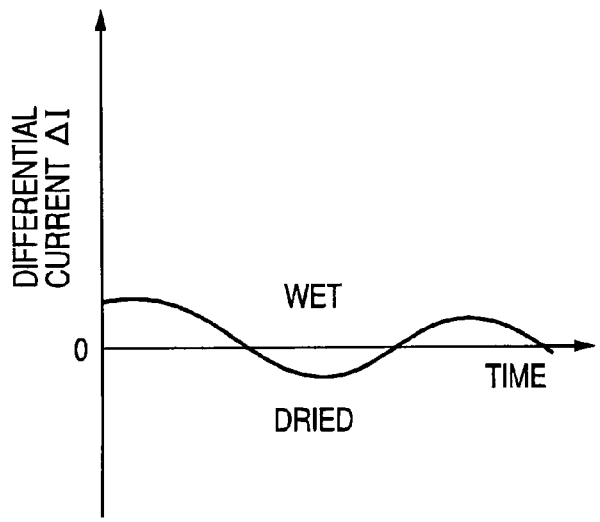
FIG. 18 is a characteristic view illustrating differential current in the presence of fluctuations in moisture content of the fuel cell.
Figure 19:
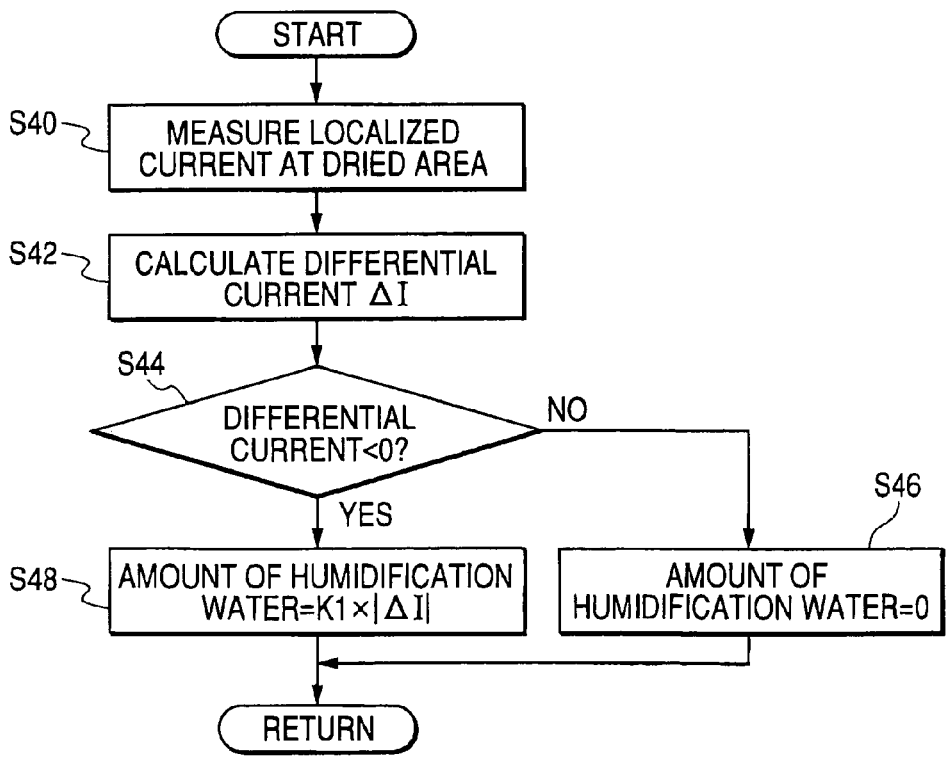
FIG. 19 is a flowchart illustrating a basic sequence of operations to be executed by a control section of the fuel cell system of the third embodiment to carry out a related diagnosing method of the present invention.

FIG. 18 shows variation in differential current $\Delta I$ $(I-I_1)$ that is a difference between output current $I_T$ and reference current $I_1$ in a case where moisture content fluctuates at the area close proximity to the air inlet portion 50*a* that involves the area B (see FIG. 3) of the fuel cell 12 which is apt to be dried. As shown in FIG. 18, in the event that the inside of the fuel cell 12 remains in a wet condition, differential current $\Delta I$ exceeds a value of zero and in an event that the inside of the fuel cell 12 remains in a dried condition, differential current $\Delta I$ decreases below the value of zero. As set forth above, further, since output current $I_T$ of the fuel cell 12 fluctuates depending on the moisture content inside the fuel cell 12, the moisture condition inside the fuel cell 12 can be estimated depending upon a magnitude of output current $I_T$. That is, in cases where output current $I_T$ drops in a minus area, the larger the absolute value of output current $I_T$, the greater will be the rate of shortage of moisture content inside the fuel cell 12 and, so, judgment can be made that the electrolyte membrane remains in a further dried condition.

Now, moisture control to be executed by the fuel cell system of the presently filed embodiment is described with reference to the fuel cell system 100 shown in FIG. 14 and a flowchart shown in FIG. 19.

First in step S40, the current sensor measures localized current I at the dried area B (see FIG. 3) to allow the control section 18 to calculate differential current $\Delta I$, which is a difference between localized current I and reference current $I_1$, in step S42. In succeeding step S44, judgment is made to find whether differential current $\Delta I$ is less than zero. If it is judged that differential current $\Delta I$ exceeds the value of zero, it can be estimated that the inside of the fuel cell 12 remains in the wet condition and, hence, the control section 18 interrupts the operation of the humidifier 28 so as to zero the rate of humidifying air to be supplied to the fuel cell 12. On the contrary, if it is judged that differential current $\Delta I$ is less than zero, it can be estimated that the inside of the fuel cell 12 remains in the dried condition and in step S48, the control section 18 actuates the humidifier 28 so as to increase the amount of humidifycation water to a level of K1×|ΔI|. K1 is a coefficient for calculating the amount of humidifycation water.

As set forth above, controlling the amount of humidifycation water upon estimating the dried condition of the fuel cell 12 depending upon the magnitude of differential current ΔI that is a difference between localized current I of the fuel cell 12 and reference current $I_1$ enables the fuel cell 12 to have an appropriate moisture condition.

With the fuel cell system of the presently filed embodiment, depending upon the difference between current value measured by the current measuring device and the given current value that is preliminarily determined, it becomes possible to diagnose the degree of the dried state inside the fuel cell 12.

With the fuel cell system of the presently filed embodiment, localized current, associated with the local area where the fuel cell 12 is apt to have excess moisture content, which is indicative of the wetting characteristic related to the hydrogen outlet portion 52b of the hydrogen separator is used to calculate differential current based on which the amount of humidification water is determined, enabling the fuel cell 12 to be maintained in an optimum moisture condition to provide a high operating performance.

Fourth Embodiment

Next, a fuel cell system of a fourth embodiment is described with reference to FIGS. 20 to 22. The fourth embodiment differs from the above-described embodiments in respect of a basic sequence of controlling moisture content inside the fuel cell 12 in the occurrence of an excess moisture condition inside the fuel cell 12.

Figure 20:
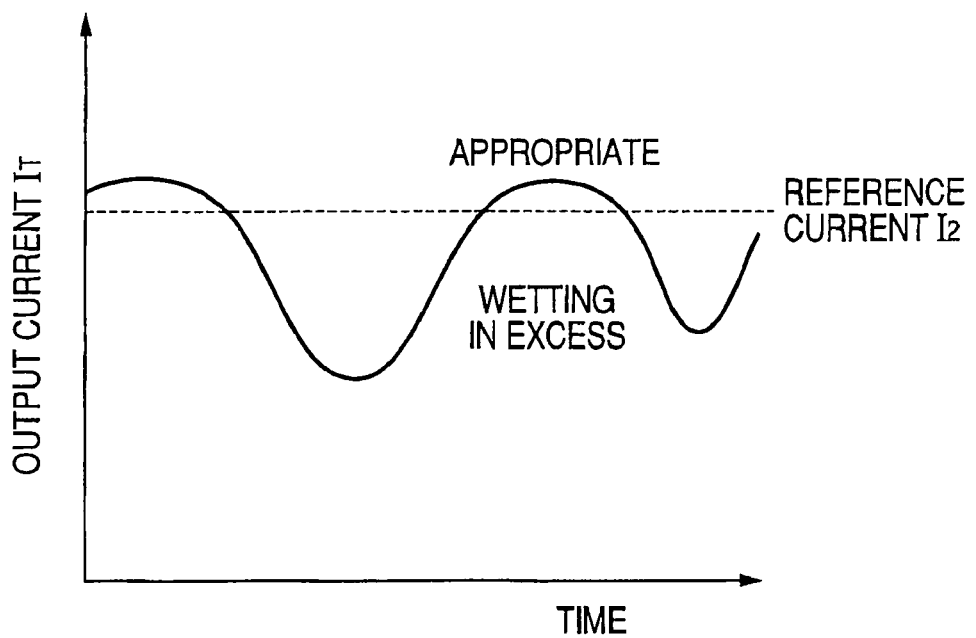
FIG. 20 is a characteristic view illustrating output current of a fuel cell, of a fuel cell system of a fourth embodiment according to the present invention, in the presence of fluctuations in moisture content of the fuel cell.

FIG. 20 shows variation in output current $I_T$ in cases where moisture content fluctuates at the area close proximity to the hydrogen outlet portion 52b that involves the area D (see FIG. 4), which is apt to have excess moisture content, of the fuel cell 12. As shown in an example of FIG. 20, if output current $I_T$ of the fuel cell 12 exceeds a given reference current $I_2$, then, diagnosis is made that the inside of the fuel cell 12 remains in an appropriate moisture condition. In contrast, if output current $I_T$ of the fuel cell 12 is less than the given reference current $I_2$, then, diagnosis is made that the inside of the fuel cell 12 remains in an excess moisture condition. In the event that the inside of the fuel cell 12 remains in the excess moisture condition, the larger the amount of moisture inside the fuel cell 12, the lesser will be the output current $I_T$ of the fuel cell 12.

Figure 21:
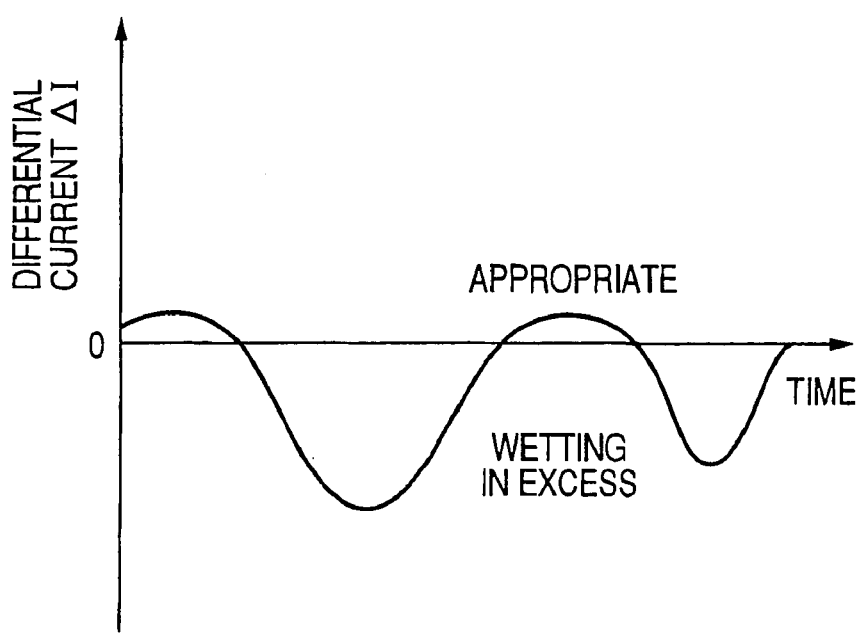
FIG. 21 is a characteristic view illustrating differential current in the presence of fluctuations in moisture content of the fuel cell.
Figure 22:
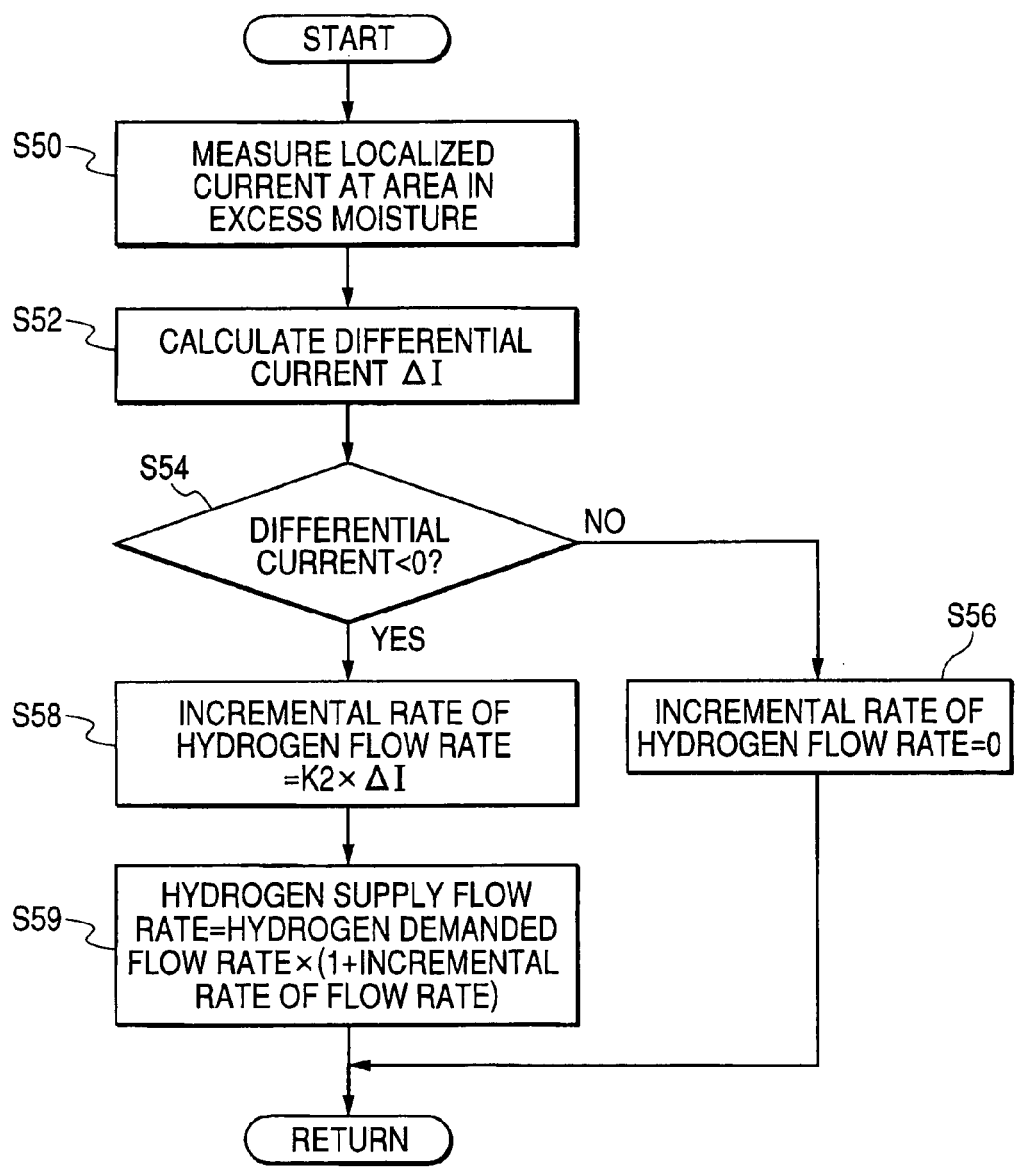
FIG. 22 is a flowchart illustrating a basic sequence of operations to perform moisture content control to be executed by the fuel cell system of the fourth embodiment according to the present invention to carry out a related diagnosing method of the present invention.

FIG. 21 shows variation in differential current ΔI ($I_T$-$I_2$) that is a difference between output current $I_T$ and reference current $I_2$ in cases where moisture content fluctuates at the area close proximity to the hydrogen outlet portion 52b that involves the area D (see FIG. 4), where the fuel cell 12 is apt to be subjected to excess moisture content. As shown in FIG. 21, in the occurrence of appropriate moisture content inside of the fuel cell 12, differential current ΔI exceeds a value of zero and in the occurrence of the excess moisture condition inside of the fuel cell 1, differential current ΔI decreases below zero. As set forth above, further, since output current $I_T$ of the fuel cell 12 fluctuates depending on moisture content inside the fuel cell 12, the degree of the moisture condition inside the fuel cell 12 can be estimated depending upon the magnitude of differential current ΔI. That is, in cases where differential current ΔI remains minus, the larger the absolute value of differential current ΔI, the greater will be the degree of excess moisture content occurring inside the fuel cell 12.

Now, moisture control to be executed by the fuel cell system of the presently filed embodiment is described with reference to the fuel cell system 100 shown in FIG. 14 and a flowchart shown in FIG. 22.

First in step S50, the current sensor measures localized current, as output current $I_T$, at the dried area D (see FIG. 4) to allow the control section 18 to calculate differential current ΔI, which is a difference between localized current $I_T$ and reference current $I_2$, in step S52. In succeeding step S54, diagnosis is made to find whether differential current ΔI is less than zero. If it is diagnosed that differential current ΔI exceeds zero, it can be estimated that the inside of the fuel cell 12 remains in an appropriate moisture condition and, hence, the control section 18 zeroes an incremental rate of the flow rate of hydrogen to be supplied to the fuel cell 12. On the contrary, if it is diagnosed that differential current ΔI is less than zero, it can be estimated that the inside of the fuel cell 12 remains in an excess moisture condition and in step S58, the control section 18 controls the incremental rate of the hydrogen flow rate to a value of K2×|ΔI|. K2 is a coefficient for calculating the incremental rate of the hydrogen flow rate.

In subsequent step S59, the control section 18 controls the flow rate of hydrogen to be supplied to the fuel cell 12 to a value of hydrogen demand flow rate×(1+hydrogen flow incremental rate). The hydrogen demand flow rate is a hydrogen flow rate that is required for the fuel cell 12 to generate demanded electric power. Thus, supplying excess flow rate of hydrogen to the fuel cell 12 enables a stream of hydrogen gas to push out moisture from the area D remaining in the excess moisture condition.

As set forth above, estimating the excess moisture condition of the inside of the fuel cell 12 depending upon the magnitude of differential current ? I that is a difference between localized current $I_T$ of the fuel cell 12 and reference current $I_2$ to control the flow rate of hydrogen to be supplied enables the fuel cell 12 to remain in a further appropriate moisture condition.

With the fuel cell system of the presently filed embodiment, localized current, associated with the local area where the fuel cell 12 is apt to have excess moisture content, which is indicative of the wetting characteristic related to the hydrogen outlet portion 52b of the hydrogen separator is used to calculate differential current based on which the flow rate of hydrogen to be supplied to the fuel cell 12 is accurately determined, enabling the fuel cell 12 to be maintained at an optimum flow rate of hydrogen to provide a high operating performance.

Fifth Embodiment

Next, a fuel cell system of a fifth embodiment is described with reference to FIG. 23. The fifth embodiment differs from the above-described embodiments in that the control section 18 of the fuel cell system 100 shown in FIG. 14 diagnoses a moisture condition of the fuel cell 12 based on a resistance value of the inside of the fuel cell 12.

Figure 23:
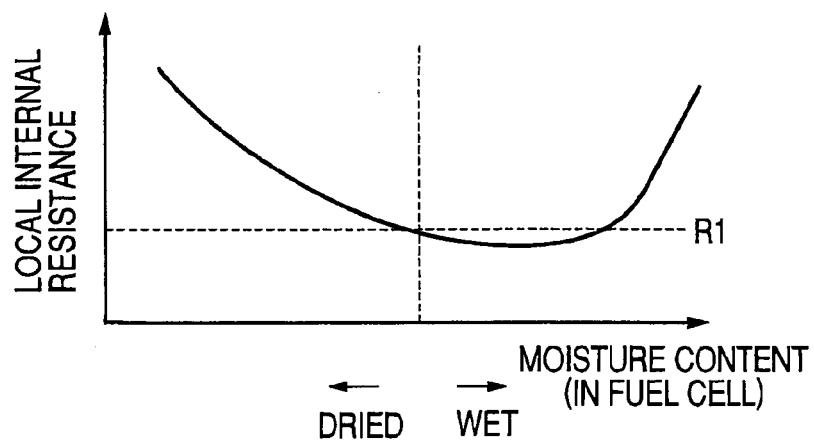
FIG. 23 is a characteristic view illustrating the relationship between local internal resistance and internal moisture content of a fuel cell of a fuel cell system of a fifth embodiment according to the present invention to carry out a related method of the present invention.

FIG. 23 shows the relationship between local internal resistance of the fuel cell 12 and internal moisture content. As shown in FIG. 23, there is the relationship in that as internal moisture content increases inside the fuel cell 12, internal resistance of the fuel cell 12 decreases to a certain degree and as internal moisture content decreases, internal resistance increases.

As a consequence, depending upon localized currents, related to the areas B and C (see FIGS. 3 and 4) where the fuel cell 12 is apt to dry, which are measured by the current sensors 74, 76 and the cell voltages measured by the cell monitor 16, the control section 18 is able to calculate local internal resistance R (=cell voltage/localized current) at the areas of the fuel cell 12 where it is apt to dry and able to diagnose a dried condition inside the fuel cell 12 depending on such local internal resistance R. Of course, it will be appreciated that the fuel cell system 10 of the first embodiment may be modified to utilize localized currents measured by the current sensors 54, 58 for calculating local internal resistances like in the fuel cell system 100 shown in FIG. 14.

More particularly, if local internal resistance R is less than reference local internal resistance $R_1$ that is preliminarily determined, the control section 18 diagnoses that the inside of the fuel cell 12 remains in a dried condition. If diagnosis is made that the inside of the fuel cell 12 remains in the dried condition, it can be estimated that the rate of humidifying hydrogen to be supplied to the fuel cell 12 is low, and the control section 18 executes the operation for actuating the humidifier 36 so as to increase the rate of humidifying hydrogen.

Similarly, with the fuel cell systems 10 and 100 shown in FIGS. 10 and 14, respectively, localized currents, both related to the area D (see FIG. 4) where the fuel cell 12 is apt to have excess moisture content, are measured by the current sensors 62, 78 and the cell voltages are measured by the cell monitor 16. Thus, the control section 18 is able to calculate each local internal resistance R at the local area, corresponding to the area D, of the fuel cell 12 for diagnosing depending on such local internal resistance R that an excess moisture condition occurs inside the fuel cell 12.

More particularly, if local internal resistance R exceeds reference local internal resistance $R_1$ that is preliminarily determined, the control section 18 diagnoses that the inside of the fuel cell 12 remains in the excess moisture condition. When diagnosis is made that the inside of the fuel cell 12 remains in the excess moisture condition, it can be estimated that the rates of humidifying air and hydrogen to be supplied to the fuel cell 12 are too high or that there is a drop in capacity of removing water due to reduction in the hydrogen flow rate, and the control section 18 executes the operation for decreasing the rates of humidifying air and hydrogen to be conducted by the humidifiers 28, 36 while increasing the hydrogen flow rate.

With such a structure mentioned above, the fuel cell system is also able to appropriately diagnose the output drop factors of the fuel cell 12. Further, the output drop factors of the fuel cell 12 can be specified and accordingly, appropriate control can be achieved depending on the specified output drop factor.

With the fuel cell system of the presently filed embodiment, local internal resistance R is obtained from localized current associated with the dried area of the fuel cell 12 and the cell voltage to allow the diagnosis device to accurately diagnose the dried state of the fuel cell 12 in a highly reliable manner.

Sixth Embodiment

Next, a fuel cell system of a sixth embodiment according to the present invention is described with reference to FIGS. 24 to 26. The sixth embodiment differs from the above-described embodiments in that the degree of a dried condition of the fuel cell is diagnosed based on a resistance value of the inside of the fuel cell 12.

Figure 24:
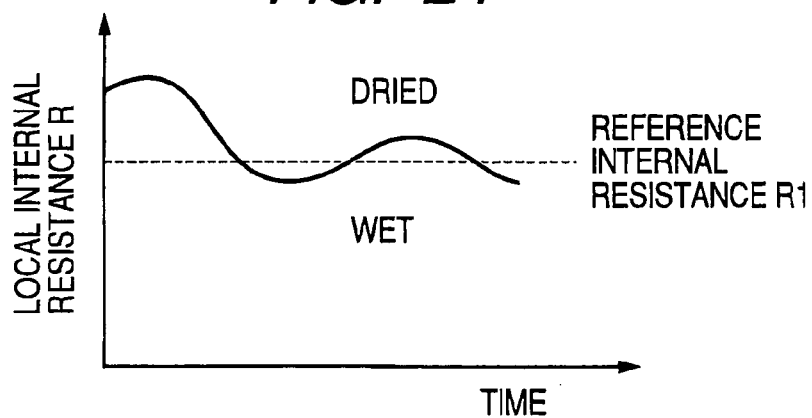
FIG. 24 is a characteristic view illustrating local internal resistance of a fuel cell in the presence of fluctuations in moisture content of the fuel cell of a fuel cell system of a sixth embodiment according to the present invention to carry out a related method.

FIG. 24 shows variation in a local resistance value R in cases where moisture content fluctuates at the area B (see FIG. 3), where the fuel cell 12 is apt to be dried, in the vicinity of the air inlet portion 50a. In an example shown in FIG. 24, if local internal resistance R exceeds reference internal resistance $R_1$, then, diagnosis is made that the inside of the fuel cell 12 remains in a dried state, and if local internal resistance R is less than reference internal resistance $R_1$, then, diagnosis is made that the inside of the fuel cell 12 remains in a wet condition. In the presence of the dried condition inside the fuel cell 12, the lesser the moisture content of the inside of the fuel cell 12, the larger will be the local internal resistance R of the fuel cell 12.

Figure 25:
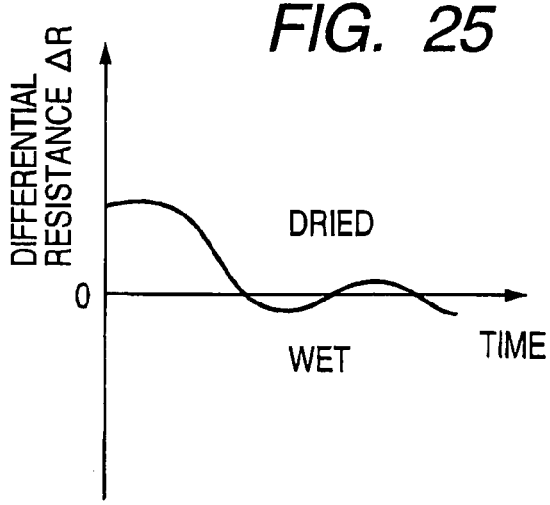
FIG. 25 is a characteristic view illustrating variation in differential resistance in the presence of fluctuations in moisture content of the fuel cell.
Figure 26:
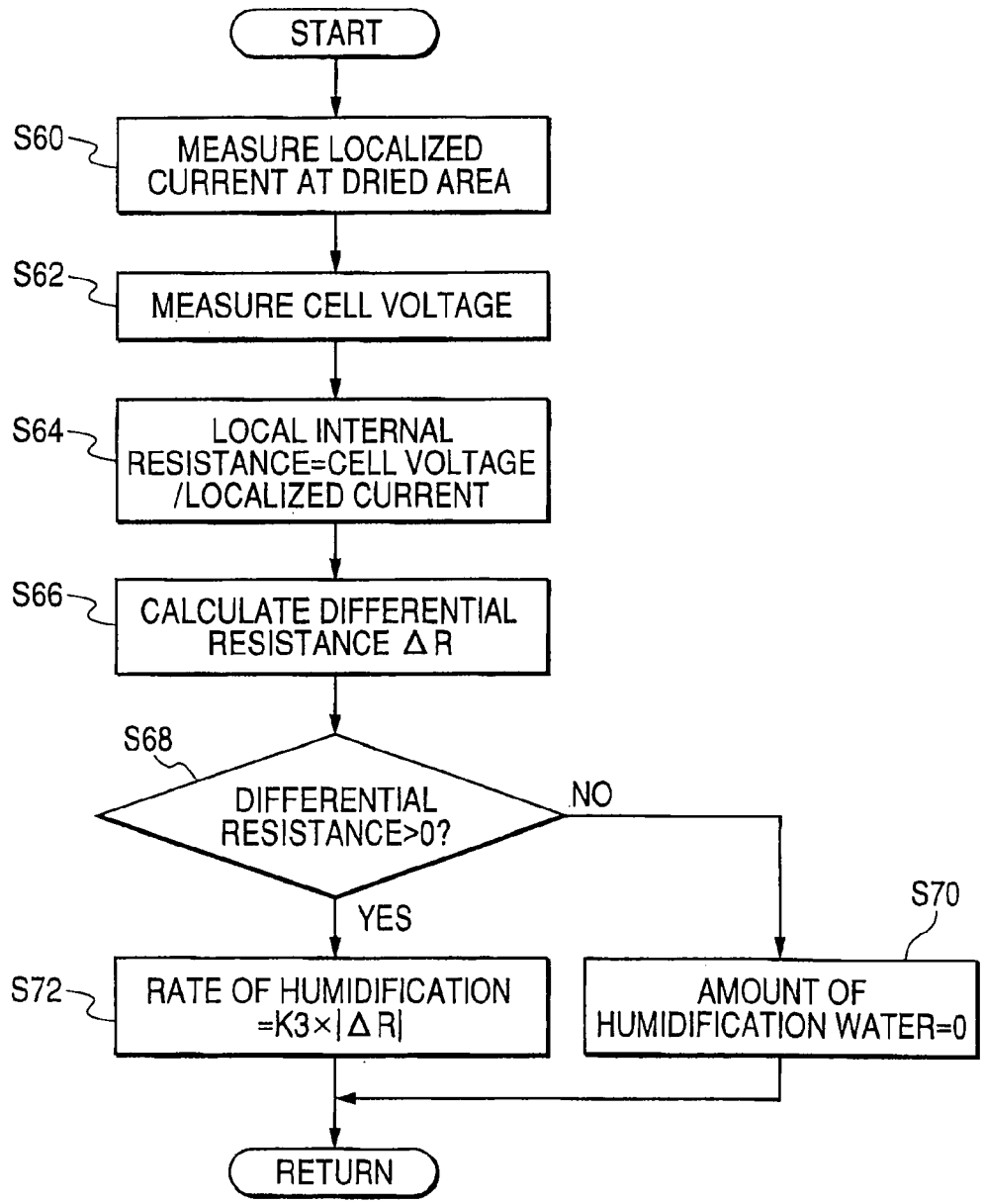
FIG. 26 is a flowchart illustrating a basic sequence of operations to perform moisture content control to be executed by a fuel cell system of a sixth embodiment according to the present invention to carry out a related method of the present invention.

FIG. 25 shows variation in differential resistance $\Delta R$ ($R-R_1$) that is a difference between local internal resistance R and reference internal resistance $R_1$ in a case where moisture content fluctuates at the area close proximity to the air inlet portion 50a that involves the area B, where the fuel cell 12 is apt to dry. As shown in FIG. 25, in the event that the inside of the fuel cell 12 remains in the wet condition, differential resistance $\Delta R$ drops below a value of zero and in the event that the inside of the fuel cell 12 remains in the dried condition, differential resistance $\Delta R$ exceeds the value of zero. As set forth above, further, since local internal resistance R of the fuel cell 12 fluctuates depending on moisture content inside the fuel cell 12, the degree of moisture content inside the fuel cell 12 can be estimated depending upon the magnitude of differential resistance $\Delta R$. That is, in cases where differential resistance $\Delta R$ remains plus, the larger the absolute value of differential resistance $\Delta R$, the greater will be the degree of a shortage in moisture content inside the fuel cell 12 and, thus, diagnosis can be made that the fuel cell 12 remains in a further dried condition.

Now, moisture control to be executed by the fuel cell system of the presently filed embodiment is described with reference to the fuel cell system 100 shown in FIG. 14 and a flowchart shown in FIG. 26.

First in step S60, the current sensor measures localized current I at the dried area B (see FIG. 3) and in next step S 62, the cell monitor 16 measures the cell voltage, whereupon in succeeding step 64, the cell voltage is divided by localized current to calculate local internal resistance R. In next step S66, differential resistance $\Delta R$ is calculated from a difference between local resistance R and reference internal resistance $R_1$.

In succeeding step S68, diagnosis is made whether differential resistance $\Delta R$ exceeds a value of zero. As a result, if it is diagnosed that differential resistance $\Delta R$ is less than zero, it can be estimated that the inside of the fuel cell 12 remains in a wet condition and, hence, the control section 18 inactivates the humidifier 28 to zero the rate of humidifying air to be supplied to the fuel cell 12. On the contrary, if it is diagnosed that differential resistance $\Delta R$ exceeds zero, it can be estimated that the inside of the fuel cell 12 remains in the dried condition and in step S72, the control section 18 controls the amount of humidification water, to be supplied by the humidifier 28, to a value of K3×|$\Delta R$|. Here, K3 is a coefficient for calculating the amount of humidification water.

As set forth above, with the fuel cell system of the presently filed embodiment, the resistance value associated with the specified local area where the fuel cell 12 is apt to dry can be calculated to allow the control section 18 to diagnose the dried status of the fuel cell 12. This enables the diagnosis device 18 to precisely diagnose the dried status of the fuel cell 12.

Also, estimating the drying condition inside of the fuel cell 12 depending upon differential resistance ? R between local internal resistance R and reference internal resistance $R_1$ to control the amount of humidification water enables the fuel cell 12 to remain in a further appropriate moisture condition.

Seventh Embodiment

Next, a fuel cell system of a seventh embodiment according to the present invention is described with reference to FIGS. 27 to 29. The seventh embodiment differs from the above-described embodiments in that the degree of the excess moisture condition of the fuel cell 12 is diagnosed based on a resistance value of the inside of the fuel cell 12 for thereby controlling moisture content inside the fuel cell 12.

Figure 27:
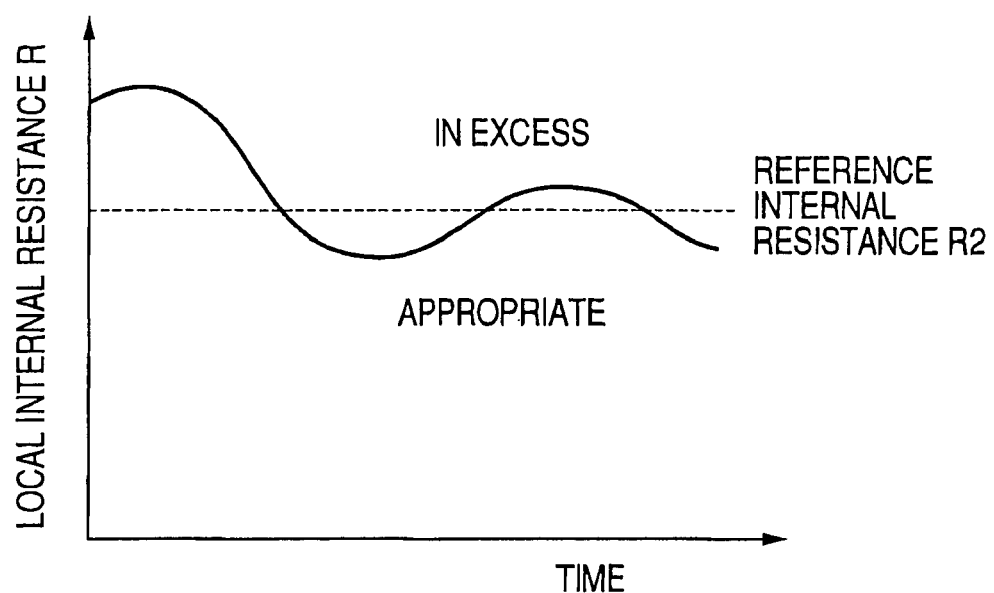
FIG. 27 is a characteristic view illustrating local internal resistance of a fuel cell in the presence of fluctuations in moisture content of a fuel cell of a fuel cell system of a sixth embodiment according to the present invention.

FIG. 27 shows variation in a local resistance value R in cases where moisture content fluctuates at the area D (see FIG. 4), where the fuel cell 12 is apt to have excess moisture, in the vicinity of the hydrogen outlet portion 52b (see FIG. 4). In an example shown in FIG. 27, if local internal resistance R of the fuel cell 12 becomes less than reference internal resistance $R_2$, then, diagnosis is made that the inside of the fuel cell 12 remains in appropriate moisture content, and if local internal resistance R exceeds reference internal resistance $R_2$, then, diagnosis is made that the inside of the fuel cell 12 remains in the excess moisture condition. In the presence of the excess moisture condition inside the fuel cell 12, the larger the degree of moisture content inside the fuel cell 12, the larger will be the local internal resistance R of the fuel cell 12.

Figure 28:
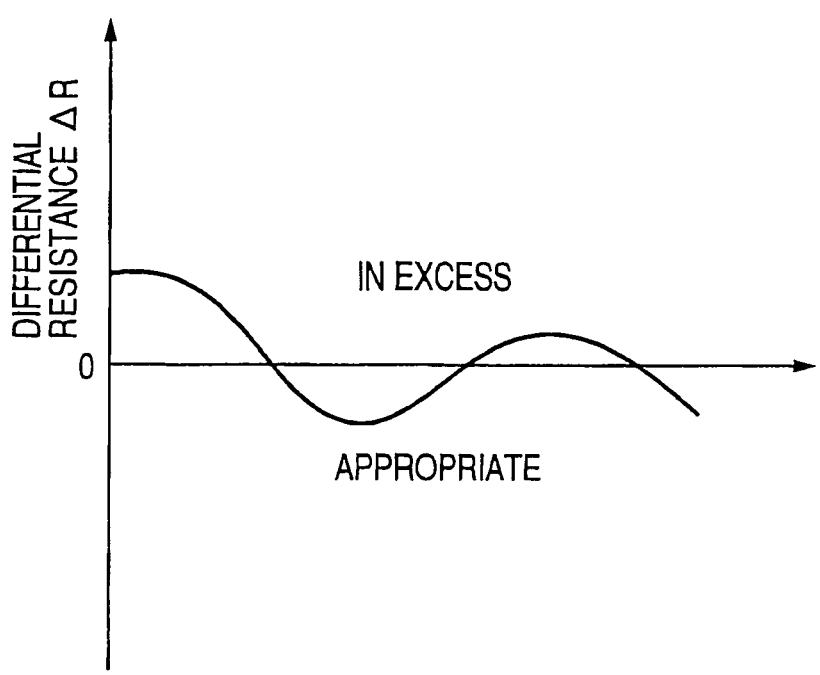
FIG. 28 is a characteristic view illustrating differential resistance in the presence of fluctuations in moisture content of the fuel cell.
Figure 29:
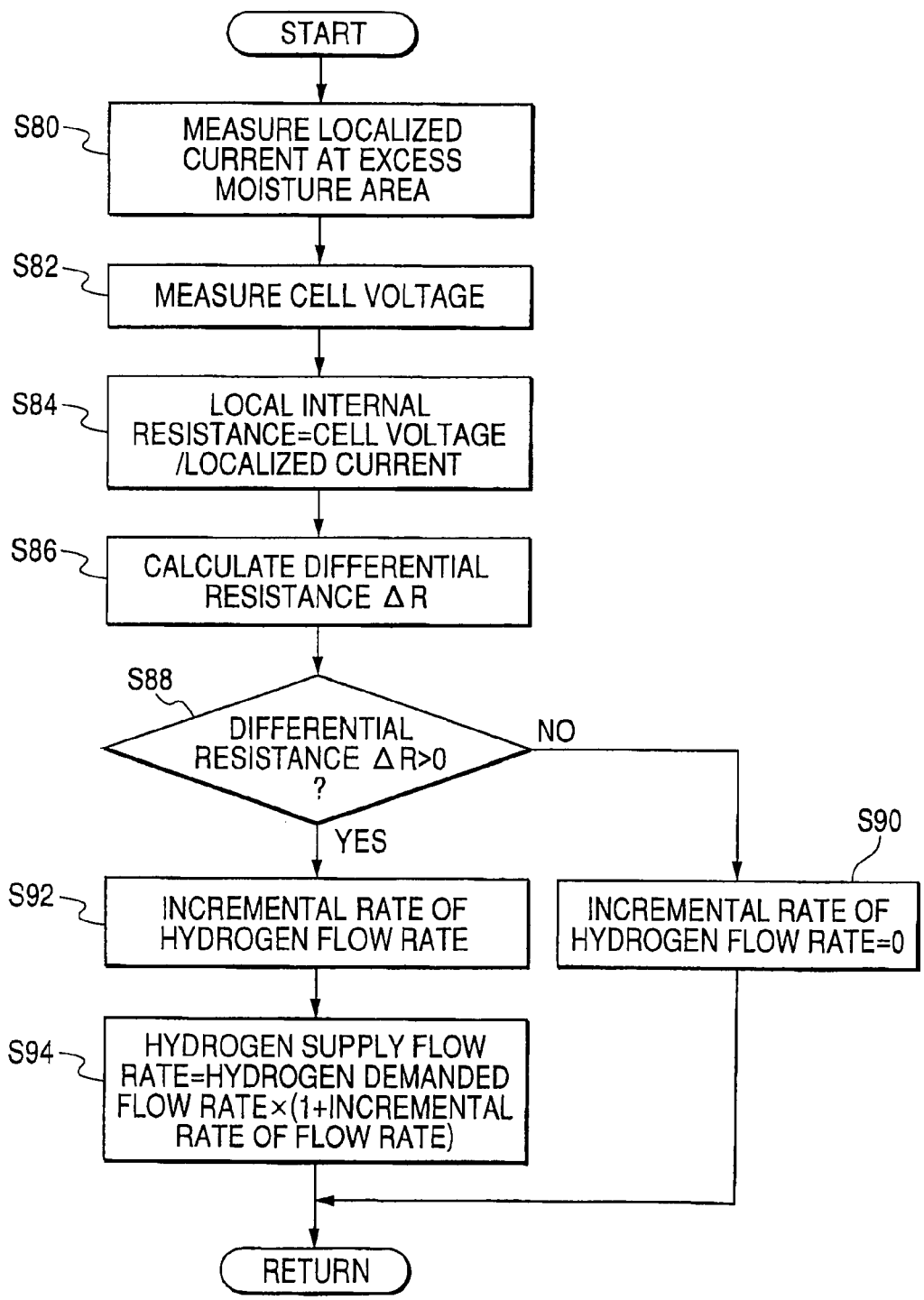
FIG. 29 is a flowchart illustrating a basic sequence of operations to perform moisture content control to be executed by a fuel cell system of a seventh embodiment according to the present invention to carry out a related method of the present invention.

FIG. 28 shows variation in differential resistance $\Delta R$ $(R-R_2)$ that is a difference between local internal resistance R and reference internal resistance $R_2$ in cases where moisture content fluctuates at the area close proximity to the hydrogen outlet portion 52b that involves the area D, where the fuel cell 12 is apt to have excess moisture content. As shown in FIG. 28, in the event that the inside of the fuel cell 12 remains in appropriate moisture content, differential resistance $\Delta R$ drops below a value of zero and in the event that the inside of the fuel cell 12 remains in an excess moisture condition, differential resistance $\Delta R$ exceeds the value of zero. As set forth above, further, since local internal resistance R of the fuel cell 12 fluctuates depending on moisture content inside the fuel cell 12, the degree of moisture content inside the fuel cell 12 can be estimated depending upon the magnitude of differential resistance $\Delta R$. That is, diagnosis can be made that in cases where differential resistance $\Delta R$ remains plus, the larger the absolute value of differential resistance $\Delta R$ the greater will be the degree of excess moisture content inside the fuel cell 12.

Now, moisture control to be executed by the control section of the fuel cell system of the presently filed embodiment is described with reference to a flowchart shown in FIG. 29.

First in step S80, the current sensor measures localized current I at the area D (see FIG. 4) that is apt to be subjected to the excess moisture condition and in next step S82, the cell monitor 16 measures the cell voltage, whereupon in succeeding step 84, the cell voltage is divided by localized current to calculate local internal resistance R. In next step S86, differential resistance $\Delta R$ is calculated from a difference between local resistance R and reference internal resistance $R_2$.

In next step S88, judgment is made to find whether differential resistance $\Delta R$ exceeds a value of zero. As a result, if it is judged that differential resistance $\Delta R$ is less than zero, it can be estimated that the inside of the fuel cell 12 remains in an appropriate moisture condition and in succeeding step S90, the control section 18 zeroes an incremental rate of the hydrogen flow rate. On the contrary, if it is judged that differential resistance $\Delta R$ exceeds zero, it can be estimated that the inside of the fuel cell 12 remains in an excess moisture condition and in step S92, the control section 18 controls the incremental rate of hydrogen flow rate to lie at a value of $K4 \times |\Delta R|$. Here, K4 is a coefficient for calculating the incremental rate of the flow rate of hydrogen.

In subsequent step S94, the control section 18 controls the flow rate of hydrogen to be supplied to the fuel cell 12 to a value of hydrogen demand flow rate$\times$(1+hydrogen flow incremental rate). The hydrogen demand flow rate is a hydrogen flow rate that is required for the fuel cell 12 to generate demanded electric power. Thus, supplying excess flow rate of hydrogen to the fuel cell 12 enables a stream of hydrogen gas to push out moisture from the area D in excess moisture content.

As set forth above, with the fuel cell system of the presently filed embodiment, local internal resistance associated with the local area where the fuel cell 12 is apt to have excess moisture content can be easily calculated based on localized current indicative of the wetting characteristic of the fuel cell to allow the control section to diagnose the excess moisture condition of the fuel cell. This enables the diagnosis device to precisely diagnose the excess moisture condition of the fuel cell, thereby enabling to control the flow rate of hydrogen to be supplied to the fuel cell at an optimum value.

Also, estimating the excess moisture condition of the inside of the fuel cell 12 depending upon differential resistance $\Delta R$ between local internal resistance R and reference internal resistance $R_2$ to control the hydrogen flow rate enables the fuel cell to remain in a further appropriate moisture condition.

Eighth Embodiment

Next, a fuel cell system of an eighth embodiment according to the present invention and related method are described in detail with reference to FIGS. 30 to 38.

Figure 30:
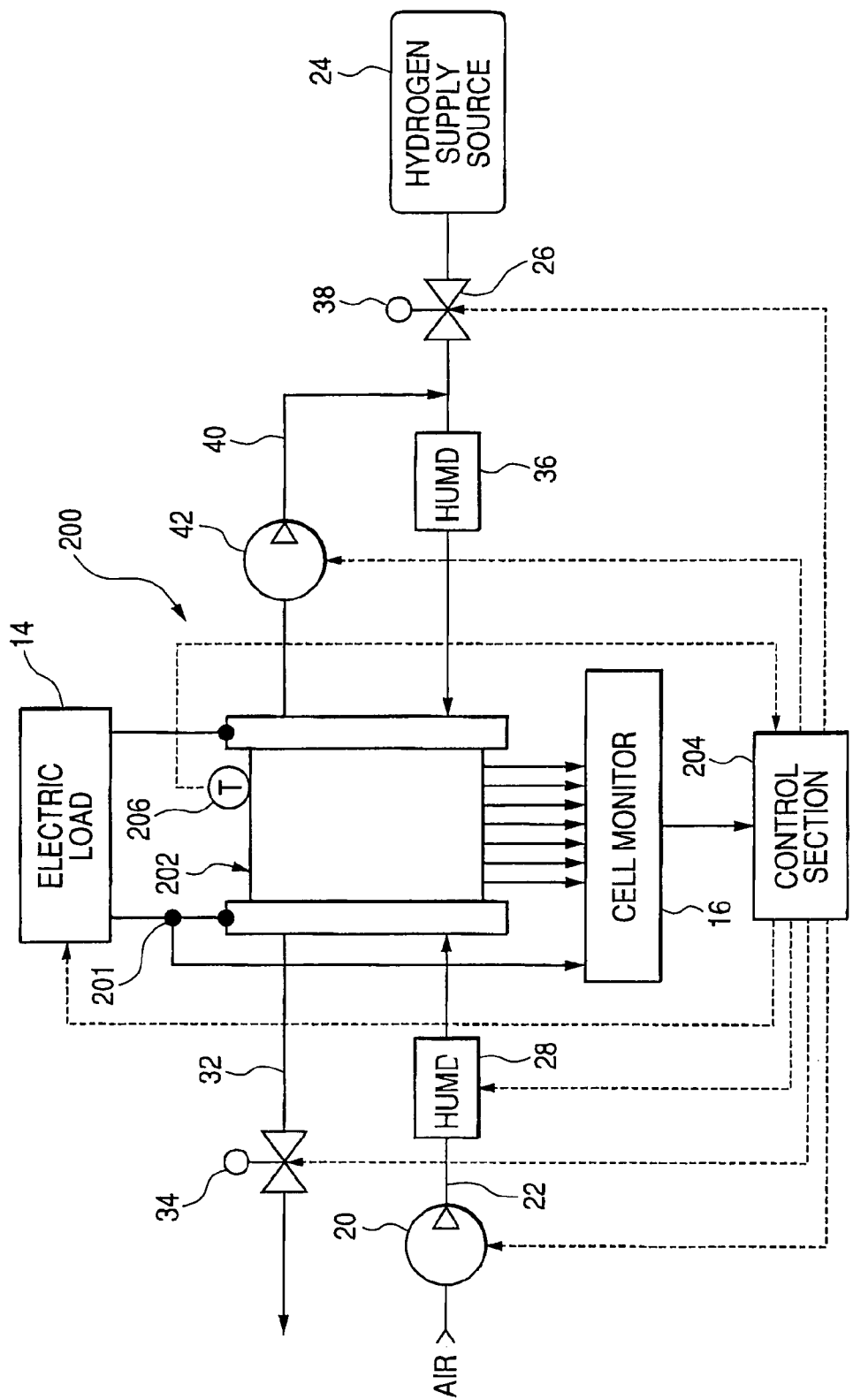
FIG. 30 is a typical view illustrating an overall structure of a fuel cell system of an eighth embodiment according to the present invention.

FIG. 30 is a typical view of the fuel cell system 200 of the presently filed embodiment for use in an electric vehicle.

The presently filed embodiment differs from the first embodiment in that the fuel cell system 200 includes a mean current measuring unit 201 composed of a current sensor (not shown) for measuring a mean current value, a fuel cell 202, a control section 204 and a temperature sensor 206 mounted on the fuel cell 202 to detect a fuel cell temperature thereof and the control section 204 is applied with cell voltages, operating current of the fuel cell 202 and a fuel cell temperature signal detected by the temperature sensor 206.

The control section 204 includes an output-limit controller that is comprised of an electronic control unit (ECU) that includes a microcomputer composed of a CPU, a ROM, a RAM and associated peripheral circuitry. The output-limit controller 204 executes calculation based on the cell voltage signals, the operating current signal and the fuel cell temperature signal to generate control signals that are applied to the air pump 20, the humidifiers 28, 36, the air pressure regulator valve 34, the hydrogen pressure regulator valve 38 and the hydrogen pump 42 for controlling these component parts in a manner as will be described below in detail.

With the fuel cell system 200 of the presently filed embodiment, the output-limit controller 204 serves as a controller to limit a power output of the fuel cell 202 in response to localized currents delivered from localized current sensors that will be described later in detail. Also, the fuel cell 202 is adapted to supply electric power to electric equipment such as electrical load 14 and a secondary battery (not shown), etc. When applied to the electric vehicle, electric load 14 includes an electric motor that plays s a role as a vehicle propelling drive source.

Figure 31:
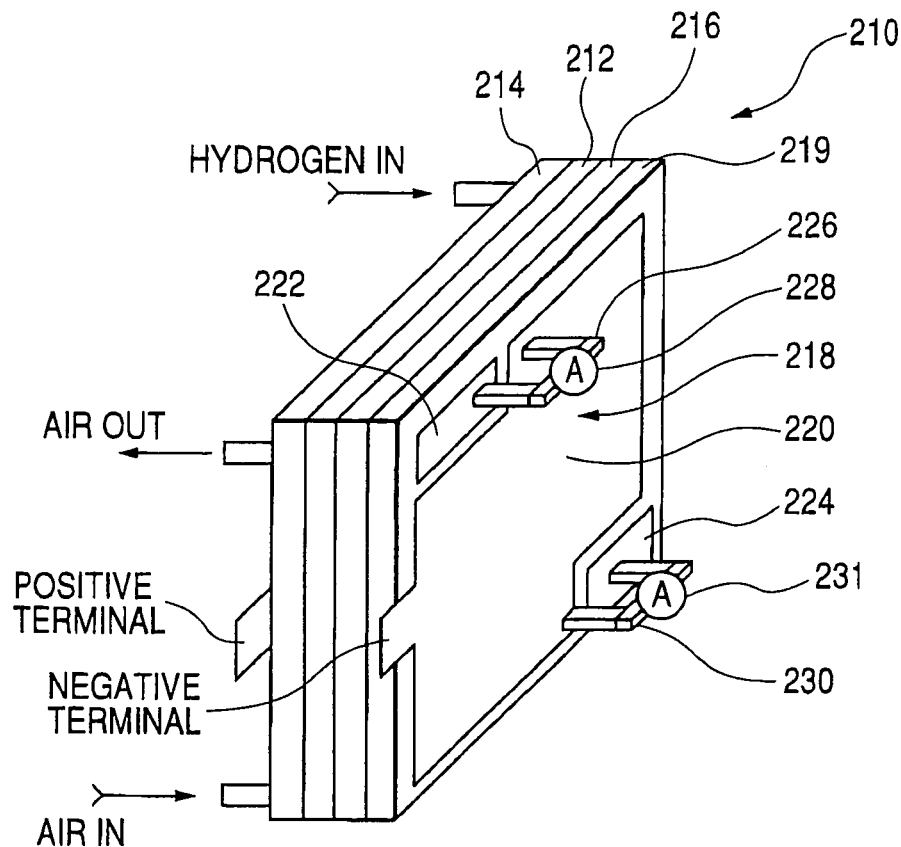
FIG. 31 is a perspective view of a unit cell forming the fuel cell shown in FIG. 30.

FIG. 31 is a perspective view showing a unit cell 210 forming the fuel cell 202. The unit cell 210 is comprised of an MEA (Membrane Electrode Assembly) 212 that includes an electrolyte membrane and a pair of electrodes formed on both sides of the electrolyte membrane, an air separator 214 placed on one side of the MEA 212, and a hydrogen separator 216 placed on the other side of the MEA 212. Further, disposed on one surface of the hydrogen separator 216 is a current collector plate 218 serving as a negative terminal. In this connection, the air separator 214 serves a current collector plate with a positive terminal.

As best shown in FIG. 31, the current collector plate 218 is comprised of an insulator frame 219 formed with a main current collector plate 220, and first and second auxiliary current collector plates 222, 224 in conformity with first and second local areas of the electrolyte membrane of the MEA 212. A current collector wiring 226 extends between the main current collector plate 220 and the first auxiliary current collector plate 222, and a first current sensor 228 is mounted on the first current collector wiring 226 to measure first localized current flowing through the first current collector wiring 226. Likewise, a current collector wiring 230 extends between the main current collector plate 220 and the second auxiliary current collector plate 224, and a second current sensor 231 is mounted on the second current collector wiring 230 to measure second localized current flowing through the second current collector wiring 230.

Figure 32:
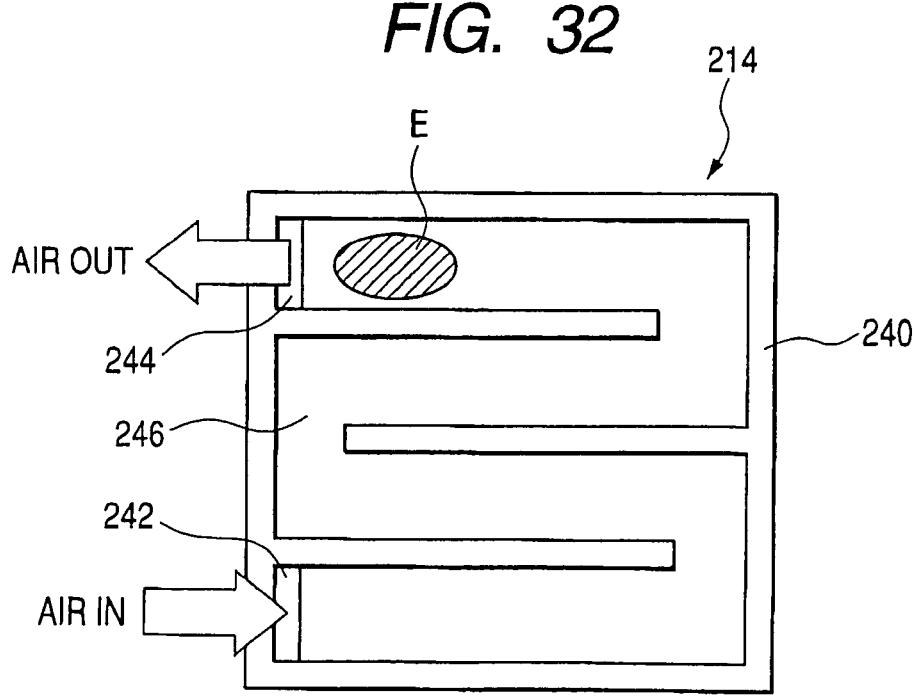
FIG. 32 is a transparent view of an air separator as viewed from a right side in FIG. 31.

FIG. 32 is a transparent view of the air separator 214 as viewed from a right side in FIG. 31. The air separator 214 is comprised of a separator body 240 formed with an air inlet portion 242 adapted to be connected to the air flow passage 22 of the fuel cell 202 (see FIG. 30), an air outlet portion 244 connected to the air exhaust passage 32 of the fuel cell 202 (see FIG. 30), and an air flow channel 246 extending between the air inlet portion 242 and the air outlet portion 244 to allow a stream of air to flow therebetween.

As shown in FIGS. 31 and 32, the electrolyte membrane forming part of the MEA 212 has a specified local area, close proximity to the air outlet portion 244 of the air separator 214, where liquid droplets are liable to collect in the electrolyte membrane. For the sake of convenience, the specified local area of the MEA 212 is shown in a hatched area E in FIG. 32 as a part representing a wetting characteristic, associated with the air outlet portion 244, of the MEA 212.

As used herein, the air separator 214 corresponds to a first separator of the present invention, and the air flow channel 246 corresponds to an oxidant gas flow passage. Likewise, the air inlet portion 242 corresponds to an oxidant gas inlet portion of the present invention, and the air outlet portion 244 corresponds to an oxidant gas outlet portion of the present invention.

Figure 33:
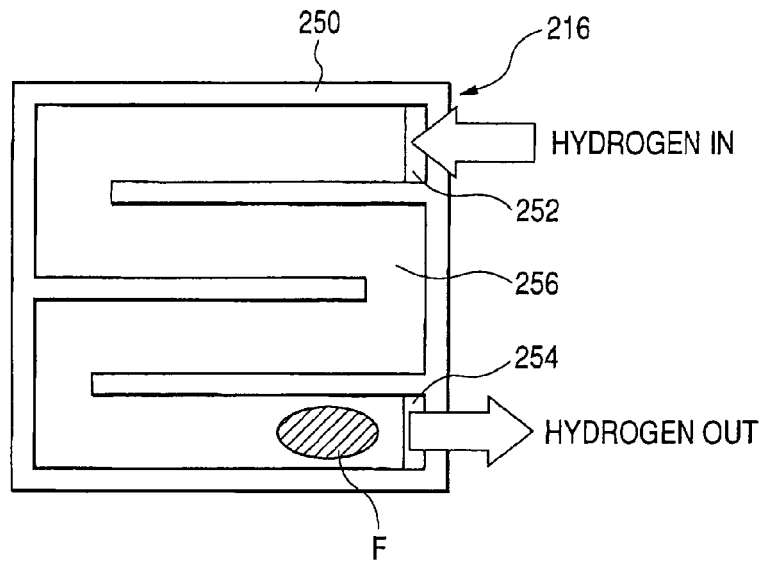
FIG. 33 is a transparent view of a hydrogen separator as viewed from a right side in FIG. 31.

FIG. 33 is a transparent view of the hydrogen separator 216 as viewed from a right side in FIG. 31. The hydrogen separator 216 is comprised of a separator body 250 formed with a hydrogen inlet portion 252 connected to the hydrogen flow passage 26 of the fuel cell 202, a hydrogen outlet portion 254 connected to the hydrogen exhaust flow passage 40, and a hydrogen flow channel 256 extending between the hydrogen inlet portion 252 and the hydrogen outlet portion 254 to allow a stream of hydrogen to flow therebetween.

As shown in FIGS. 31 and 33, the electrolyte membrane forming part of the MEA 212 has another specified local area, close proximity to the hydrogen outlet portion 254 of the hydrogen separator 216, where water droplets are liable to collect in the electrolyte membrane and where the electrolyte membrane is liable to have a shortage of fuel gas such as hydrogen. For the sake of convenience, the specified local area of the MEA 212 is shown in a hatched area F in FIG. 33 as a part representing a wetting characteristic and a hydrogen concentrating characteristic, associated with the hydrogen outlet portion 254, of the MEA 212.

As used herein, the hydrogen separator 216 corresponds to a second separator of the present invention, and the hydrogen flow channel 256 corresponds to a fuel gas flow passage. Likewise, the hydrogen inlet portion 252 corresponds to a fuel gas inlet portion of the present invention, and the hydrogen outlet portion 254 corresponds to a fuel gas outlet portion of the present invention.

Figure 34:
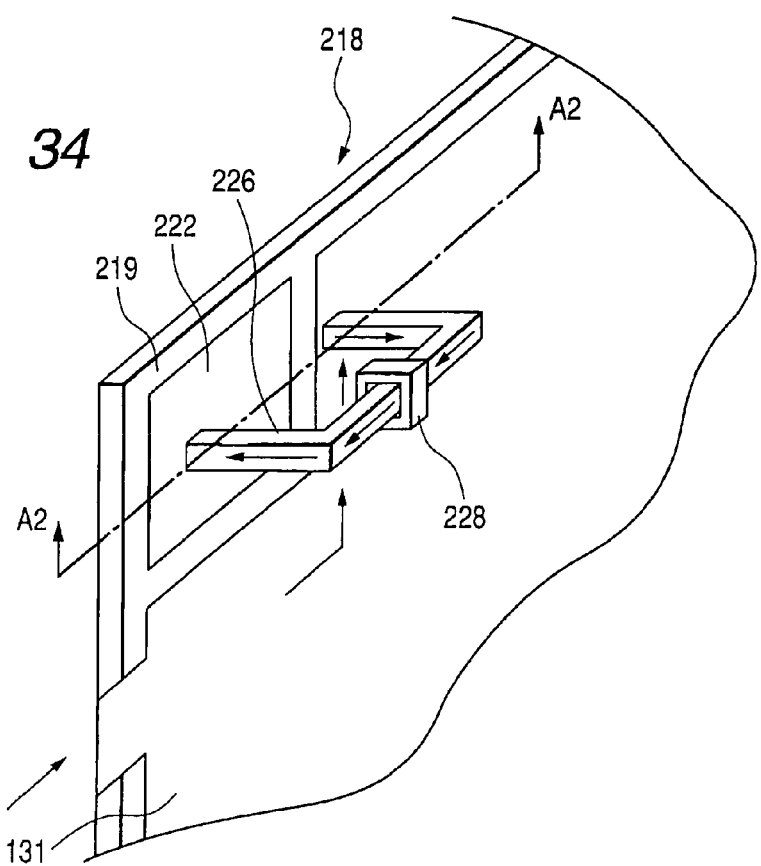
FIG. 34 is an enlarged perspective view illustrating an essential part related to a current measuring device shown in FIG. 31.
Figure 35:
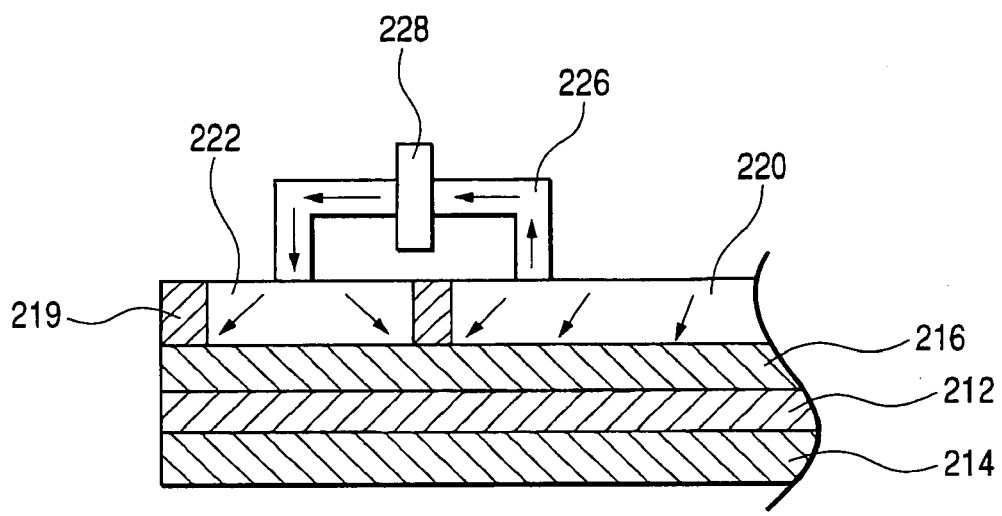
FIG. 35 is a cross sectional view taken on line A2-A2 of FIG. 34.

FIG. 34 is an enlarged perspective view illustrating an essential part of the current collector 218 with the negative terminal, and FIG. 35 is a cross sectional view taken on line A2-A2 of FIG. 34.

As shown in FIGS. 31, 34 and 35, the current collector plate 218 is divided into the main current collector plate 220, and the first and second auxiliary current collector plates 222, 224 that are formed on the insulator frame 219, made of insulation material, in specified local areas of the current collector plate 218 to be electrically insulated from one another.

That is, the first auxiliary current collector plate 222 is disposed on the insulator frame 219 in a first local area substantially in alignment with the air flow channel 246 of the air separator 214 at a position closer to the air outlet portion 244 than the air inlet portion 242, i.e., at a specified local E (see FIG. 32), close proximity to the air outlet portion 244 to represent the wetting characteristic, where excess moisture is apt to take place to allow liquid droplets to be easily collected and, more particularly, at a position in which the first auxiliary current collector plate 222 partly overlaps the air outlet portion 244 along a thickness direction of the fuel cell 202. Connected between the main current collector plate 220 and the first current collector plate 222 is the first current collector wiring 226 that is electrically conductive to allow first localized current to flow therethrough. Mounted on the first current collector wiring 226 is the first current sensor 228 that measures first localized current flowing through the first current collector wiring 226.

Similarly, the second auxiliary current collector plate 224 is disposed on the insulator frame 219 in a second local area substantially in alignment with the hydrogen flow channel 256 of the hydrogen separator 216 at a position closer to the hydrogen outlet portion 254 than the hydrogen inlet portion 252, i.e., at a specified local area (shown in the hatched area F in FIG. 33) close proximity to the hydrogen outlet portion 254 to represent the wetting characteristic and the hydrogen concentrating characteristic, where liquid droplets are easy to collect and the fuel cell is apt to have a shortage of fuel gas and, more particularly, at a position in which the second auxiliary current collector plate 224 partly overlaps the hydrogen outlet portion 254 along a thickness direction of the fuel cell 202. Connected between the main current collector plate 220 and the second current collector plate 224 is the second current collector wiring 230 that is electrically conductive to allow second localized current to flow therethrough. Mounted on the second current collector wiring 230 is the second current sensor 231 that measures second localized current flowing through the second current collector wiring 230.

Also, the current sensors 228, 231 may preferably include, for instance, Hall elements, respectively.

Further, the first auxiliary current collector plate 222 formed in the first local area of the current collector plate 218, the first current collector wiring 226 and the first current sensor 228, and the second auxiliary current collector plate 224 formed in the second local area of the current collector plate 218, the second current collector wiring 230 and the second current sensor 231 form current measuring devices that are associated with the respective specified local areas of the fuel cell 202 to measure localized currents flowing through the specified local areas as will be discussed in detail below. The current measuring devices may be provided for all the unit cells or may be provided for only a few unit cells.

Now, description is made of the operations of the current sensors 228, 231.

First, in response to electric power demand from load 14, the control section 204 controls the flow rate of air and the flow rate of hydrogen to be supplied to the fuel cell 202. In particular, the control section 204 controls a rotational speed of the air pump 20 for thereby controlling the flow rate of air to be supplied and controls a rotational speed of the hydrogen pump 42 for thereby controlling the flow rate of hydrogen to be supplied. When this takes place, the flow rate of air to be supplied is preliminarily set to a given flow rate not to cause fluctuations in output voltage of the fuel cell 202. Supplying air and hydrogen to the fuel cell 202 causes electrochemical reaction to take place for generating electric power, which in turn is supplied to load 14.

Electric current passing across load 14 flows into the current collector plate 218 having the negative terminal. Electric current flowing into the current collector plate 218 is divided into main current that flows into the MEA 212, first localized current flowing into the MEA 212 through the first current collector wiring 226 and the first auxiliary current collector plate 222, and second localized current flowing into the MEA 212 through the second current collector wiring 230 and the second auxiliary current collector plate 224.

First current, flowing through the first current collector wiring 226, corresponds to first localized current (hereinafter referred to as air-outlet current Ia·out) that flows through the first local area, which is close proximity to the air outlet portion 244 of the MEA 212, of the current collector plate 218, thereby enabling the first current sensor 228 to detect air-outlet current Ia·out.

Further, second current, flowing through the second current collector wiring 230, corresponds to second localized current (hereinafter referred to as hydrogen-outlet current Ih·out) that flows through the second local area, which is close proximity to the hydrogen outlet portion 254 of the MEA 212, of the current collector plate 218, thereby enabling the second current sensor 230 to detect hydrogen-outlet current Ih·out.

Figure 36:
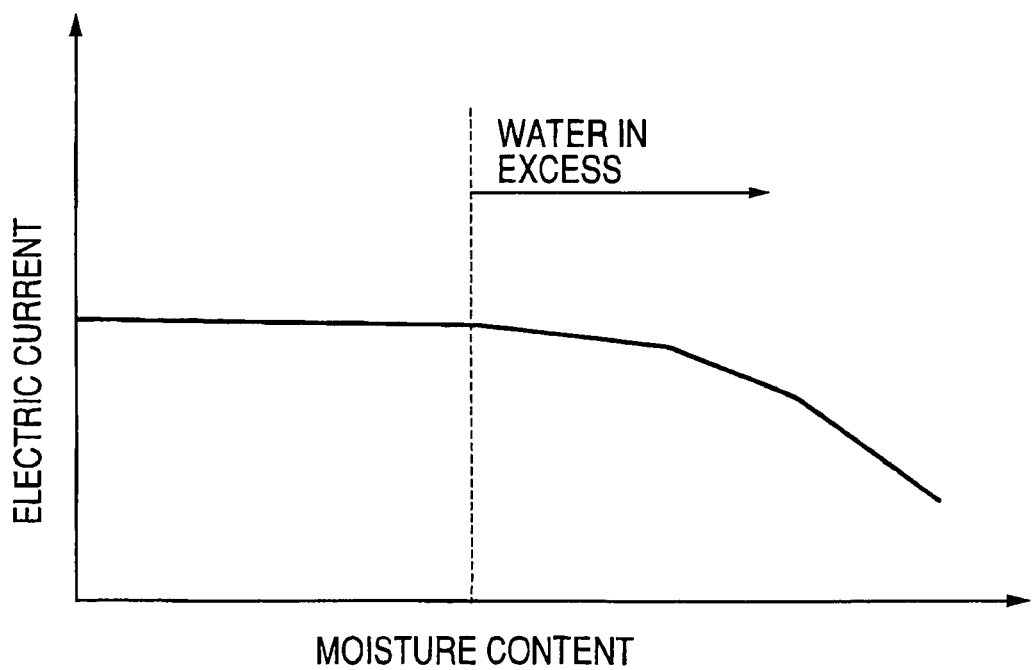
FIG. 36 is a characteristic view illustrating variation in localized current in terms of moisture content in the fuel cell.

FIG. 36 shows the relationship between moisture content in the fuel cell 202 and variation in output current of the fuel cell 202. As shown in FIG. 36, as moisture content in the fuel cell 202 increases, output current of the fuel cell 202 decreases. Thus, moisture content in the fuel cell 202 and output current thereof are correlated.

Further, a value of localized current is liable to drop in specific local areas (such as the specified local area E in FIG. 32 and the specified local area F in FIG. 33). For this reason, in the event that the localized current values associated with the respective specified local areas decrease to some extent to a value less than a mean current value, discrimination can be made that the specified local areas E, F have excess moisture content with the resultant occurrence of defect in the fuel cell 202. As a consequence, a given value (output-limit initiating current value), which forms a reference at which control is executed to initiate the output-limit operation of the fuel cell 202, is set to have a value resulting from a product of the mean current value of the fuel cell 202 multiplied by a given ratio (of, for instance, 50%). Thus, when the localized current values associated with the specified local areas E, F becomes lower than the given value, discrimination is made that defect occurs in the fuel cell 202, and the control section 204 executes output-limit operation of the fuel cell 202.

That is, by monitoring localized current I, associated with the specified local area close proximity to the air outlet portion 244 and the specified local area close proximity to the hydrogen outlet portion 254, i.e., air-outlet current Ia·out and hydrogen-outlet current Ih·out, in conjunction with a given current value, discrimination can be appropriately made to find whether to carry out the output-limit operation of the fuel cell 202. Also, the given value that forms the reference at which the output-limit operation of the fuel cell 202 is initiated is set to the given value, (of, for instance, 50%) of the mean current value of the fuel cell 202, which is a value that varies in accordance with the current value at which the fuel cell 202 provides the output.

Figure 37:
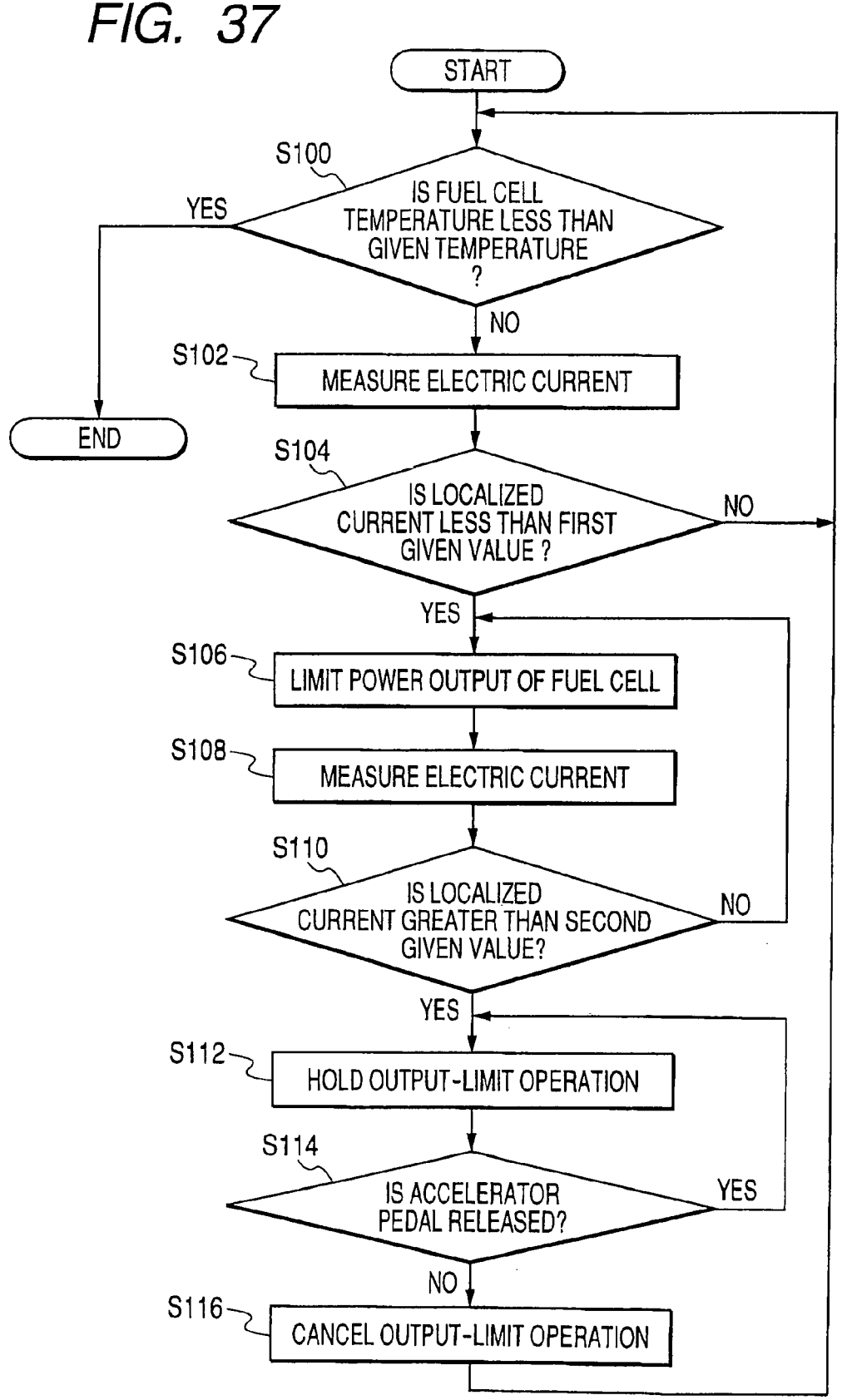
FIG. 37 is a flowchart illustrating a basic sequence of operations to be executed by a control section of the fuel cell system shown in FIG. 30 to carry out a related method of the present invention.
Figure 38:
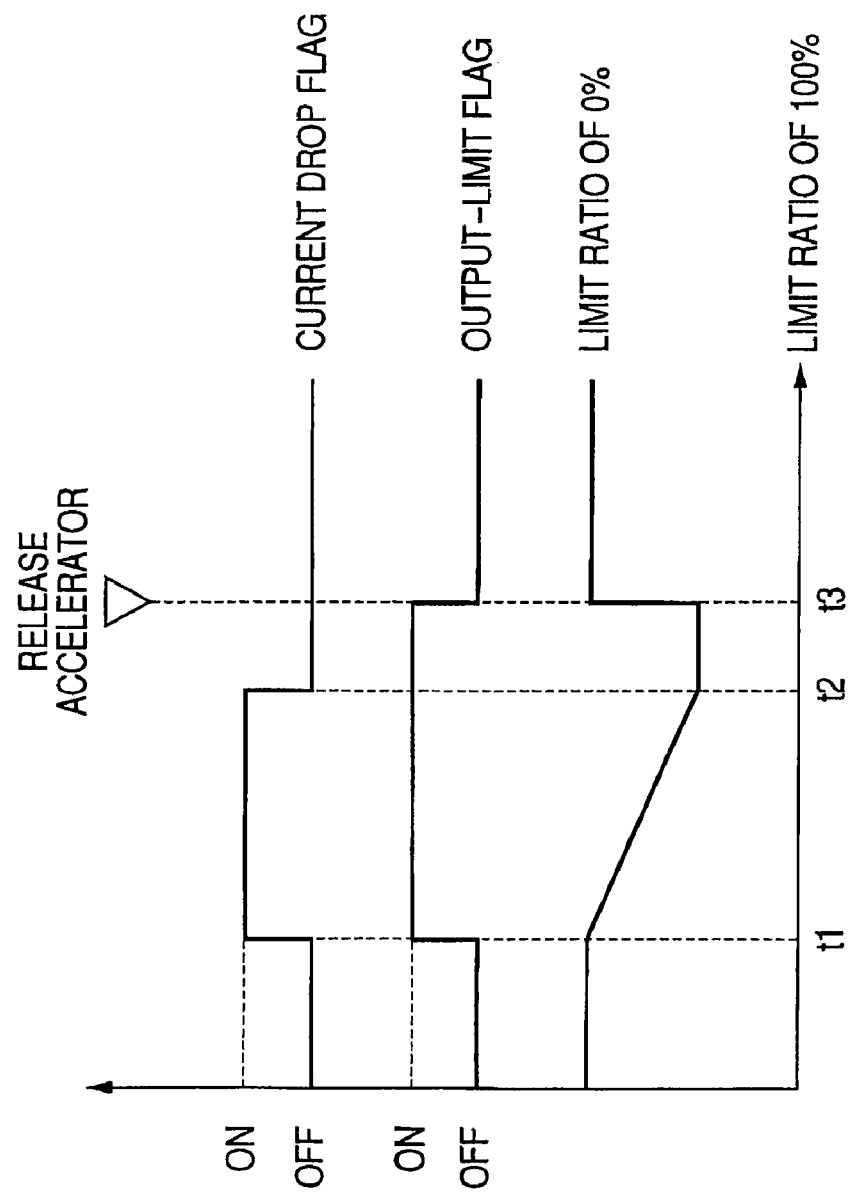
FIG. 38 is a timing chart illustrating timings at which various control flags changes.

Now, detailed description is made of the output-limit operation of the fuel cell 202 during start-up of the fuel cell system 200 of the presently filed embodiment with reference to FIGS. 37 and 38. FIG. 37 is a flowchart illustrating a basic sequence of output-limit operations to be executed by the control section 204 of the fuel cell system 200 of the presently filed embodiment, and FIG. 38 is a timing chart illustrating timings at which various control flags vary.

First in step S100, discrimination is made to find whether the temperature of the fuel cell 202 detected by the temperature sensor 206 exceeds a given temperature (of, for instance, 60° C.). As a result, if the temperature of the fuel cell 202 exceeds the given temperature, the operation is terminated and only when the temperature of the fuel cell 202 is less than the given temperature, the following operations are executed.

In succeeding step S102, the current sensor 201 detects the mean current value of the fuel cell 202 and the current sensors 228, 231 detect the localized current values. In subsequent step S104, discrimination is made to find whether the localized current values is less than a first given value (of, for instance, 50% of the mean current value). In case of the plural current sensors 228, 231 being provided, the operation may be executed to discriminate whether either one of the localized current values measured by the respective current sensors 228, 231 is less than the given current value.

As a consequence, if in step S104, the localized current value is not less than the first given current value, the operation is routed back to step S100, and if in step S104, the localized current value is less than the first given current value, the operation is executed in step S106 to perform output-limit operation. When this takes place, current drop flag is turned on and output-limit flag is turned on (see FIG. 38).

During execution of the output-limit operation, the control section 204 controls in a way to lower the mean current value such that the mean current value of the fuel cell 202 is close to the localized current value. In particular, this is achieved by controlling the air pressure regulator valve 34 so as to decrease the flow rate of oxidant gas (oxygen) to be supplied to the fuel cell 202 or by restricting demanded power of load 14 relative to the fuel cell 202, and the mean current value can be lowered.

Further, the operation is executed to gradually control the output-limit operation. For instance, the mean current value of the fuel cell 202 is not quickly lowered to a level equal to the localized current value, but the mean current value is controlled such that it gradually approaches the localized current value. As shown in FIG. 38, in cases where a limit ratio is set to a value of 0% when no output-limit of the fuel cell 202 is executed and in cases where the limit ratio is set to a value of 100% when the mean current value of the fuel cell 202 is set to a value of 0, the limit ratio is not controlled to quickly cause the mean current value to approach the localized current value, but the control is executed to gradually increase the limit ration from the value of 0%. This enables the vehicle to suppress any uncomfortable feelings to be given to a driver, thereby avoiding the occurrence of deterioration in driveability.

Next in step 108, the current sensor 201 detects the mean current value of the fuel cell 202 and the current sensors 228, 231 detect the localized current values. In subsequent step S110, discrimination is made to find whether the localized current values are less than a second given value (output-limit terminating current value). The second given value is a value that forms a reference at which the operation is executed to terminate the output-limit operation of the fuel cell 202. In the presently filed embodiment, the ratio of the second given value to the mean current value of the fuel cell 202 is made higher than that of the first given value and set to a value of, for instance, 75%.

As a consequence, if the localized current value does not exceed the second given value, the operation is routed back to step S106 to continue the output-limit operation. On the contrary, if in step S120, the localized current value exceeds the second given value, then in step S112, the operation is executed to hold the output-limit operation. In consecutive step S114, discrimination is made to find whether operating conditions of the fuel cell 202 vary, i.e., whether the driver releases an accelerator pedal. When this takes place, current drop flag is turned off and the limit ratio of the fuel cell 202 is kept (see FIG. 38).

As a result, if the driver does not release the accelerator pedal, the operation is routed back to step S112 to continue the output-limit operation of the fuel cell 202. In contrast, if in step S114, the driver releases the accelerator pedal, then in step S116, the output-limit operation of the fuel cell 202 is cancelled. Then, the operation is routed back to step S100. When this takes place, output-limit flag is turned off and the limit ratio of the fuel cell 202 becomes 0%.

For instance, when the driver continues to depress the accelerator pedal and if the output-limit operation of the fuel cell 202 is cancelled, then, a situation takes place where the output of the fuel cell 202 abruptly rises to apply the driver with an uncomfortable feeling, resulting in deterioration in driveability. On the contrary, by maintaining the output-limit operation of the fuel cell 202 until the operating condition varies like in the presently filed embodiment, it becomes possible to prevent the driver from suffering from uncomfortable feeling, thereby precluding the occurrence of deterioration in driveability.

As set forth above, monitoring the localized current value related to an area of the fuel cell 202 where water droplets are easy to collect enables the occurrence of defects in the fuel cell 202 to be detected in an early stage. Further, by executing the output-limit operation of the fuel cell 202 depending on the localized current value, the fuel cell 202 can be restored at the earliest time, thereby enabling to preclude a fuel cell propelled vehicle from stopping on a road.

With the fuel cell system 200 of the presently filed embodiment with the structure set forth above, the presence of a combination between the current measuring device, adapted to measure the localized current value related to the local area of the fuel cell 202 where liquid droplets are easy to collect, and the control section 204 allows the fuel cell 202 to operate in an output-limit mode depending upon the localized current value measured by the current measuring device. This allows the localized current value, indicative of the local area of the fuel cell 202 where water is apt to collect, to be monitored, resulting in a capability of detecting the occurrence of defects in the fuel cell 202 in an early stage. Also, by monitoring the localized current value indicative of the occurrence of such defects, the output-limit operation of the fuel cell 202 can be achieved depending on the localized current value, thereby enabling the fuel cell 202 to be restored at the earliest time. This allows a vehicle, installed with the fuel cell 202 as a drive source of the vehicle, to avoid the need to stop on a road.

Further, with the fuel cell system 200 of the presently filed embodiment, the mean current measuring device 201 for measuring the mean current value of the fuel cell 202 is provided and the given value is set to the value obtained from the mean current value, measured by the mean current measuring device 201, multiplied by the given ratio. This enables the output-limit operation of the fuel cell 202 to be appropriately initiated.

Furthermore, with the fuel cell system 200 of the presently filed embodiment, when in the output-limit operation of the control section 204, the mean current value is lowered such that the mean current value of the fuel cell 202 approaches the localized current value. This enables the output-limit operation of the fuel cell 202 to be properly executed.

Moreover, with the fuel cell system 200 of the presently filed embodiment, the provision of the fuel cell temperature detecting unit 206, for detecting the temperature of the fuel cell 202, combined with the control section 204 allows the control section 204 to interrupt the output-limit operation when the temperature of the fuel cell 202 exceeds the given temperature. The output limit operation of the fuel cell 202 can only be achieved in a desired situation when for example the temperature of the fuel cell is controlled and set at a predetermined coolness such as a low fuel cell temperature.

Besides, with the fuel cell system 200 of the presently filed embodiment, the fuel cell 202 is adapted to be installed on the vehicle, and the control section 204 executes operation such that when the localized current takes a value exceeding the given output-limit terminating current value that forms a reference based on which the output-limit operation is terminated by the power output limiting device, the power output limiting device continues the output-limit operation until a drive condition of the vehicle changes. This enables the vehicle to prevent the driver from suffering from uncomfortable feeling, thereby enabling to preclude the occurrence of deterioration in driveability.

While the fuel cell system 200 of the presently filed embodiment has been described in conjunction with an exemplary case where in step S114, the output-limit operation of the fuel cell 202 is cancelled under a condition in which the driver releases the accelerator pedal, the fuel cell system 200 may have a structure to cancel the output-limit operation of the fuel cell 202 depending upon other changes in the drive condition.

Further, although the fuel cell system 200 of the presently filed embodiment has been described in conjunction with an exemplary case where the fuel cell 202 is provided with two current sensors 228, 231 to measure the localized currents related to two local areas, no limitation is intended to such a particular application and the fuel cell system 200 may take a structure wherein one current sensor is provided to measure the localized current related to one local area of the fuel cell 202 or another structure wherein three or more current sensors are provided to measure the localized currents related to three or more local areas of the fuel cell 202.

Besides, while the fuel cell system 200 of the presently filed embodiment has been described in conjunction with the fuel cell 202, the present invention is not limited to such application and may have application to an electric power unit system that includes a power unit such as a secondary battery and a capacitor, etc.

Ninth Embodiment

Next, a fuel cell system of a third embodiment according to the present invention and related method are described in detail with reference to FIGS. 31 to 34 and FIGS. 39 to 42.

Figure 39:
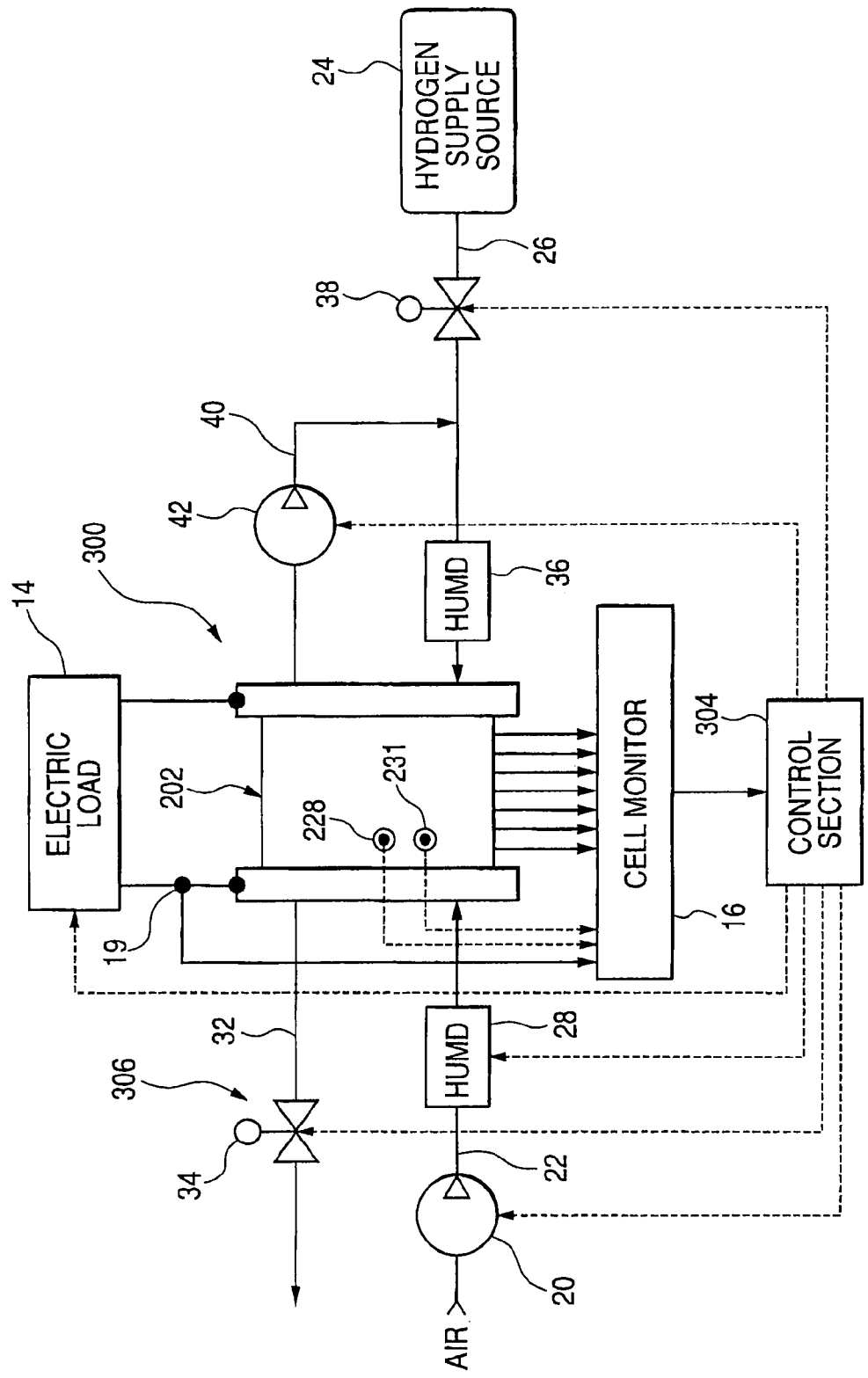
FIG. 39 is a typical view of an overall structure of a fuel cell system of a ninth embodiment according to the present invention.

FIG. 39 is a typical view of the fuel cell system 300 of the presently filed embodiment for use in an electric vehicle.

The ninth embodiment differs from the eighth embodiment in that in the the eighth embodiment, the control section 204 is comprised of the power output limiting device for executing the output-limit operation depending on the localized current value but the ninth embodiment features the provision of a control section 304 and an air purge unit 306 arranged to be activated by the control section 304 to supply a stream of purge air into the fuel cell 202 for removing moisture therefrom when interrupting the operation of the fuel cell 202. The fuel cell 202 of the fuel cell system 300 of the ninth embodiment is identical to that of the fuel cell system 200 of the eighth embodiment and, hence, the detailed structure shown in FIGS. 31 to 34 are utilized here in describing the ninth embodiment.

Therefore, a detailed description is made of the fuel cell system 300 of the ninth embodiment to clarify the above distinctive feature.

That is, in the ninth embodiment, the fuel cell system 300 includes the air purge unit 306 that is comprised of the air pump 20 and the air pressure regulator valve 34. The air purge unit 306 is activated by the control section 304 depending on the localized current values delivered from the current sensors 228, 231 (see FIG. 31) that measure the localized currents related to the specified local areas of the fuel cell 202 where water droplets are easy to collect.

More particularly, the control section 304 includes a controller that is comprised of an electronic control unit (ECU) that includes a microcomputer composed of a CPU, a ROM, a RAM and associated peripheral circuitry. The control section 304 executes calculation based on the cell voltage signals delivered from the cell monitor 16, the operating current signal delivered from the current sensor 19 and the localized current values delivered from the current sensors 228, 231 to generate control signals that are applied to the air pump 20, the humidifiers 28, 36, the air pressure regulator valve 34, the hydrogen pressure regulator valve 38 and the hydrogen pump 42 for fundamentally controlling these component parts in the same manner as that described above except for the air purge operation to be executed by the control section 304 whose operation is described below.

With the fuel cell system 300 of the presently filed embodiment, the control section 304 serves as a purge control device to generate a control signal in response to localized current signals delivered from the current sensors 228, 231 for controlling the air purge operation when interrupting the operation of the fuel cell 202.

As previously noted in the eighth embodiment with reference to FIGS. 31 to 35, electric current passing across load 14 flows into the current collector plate 218 with the negative terminal. Electric current flowing into the current collector plate 218 is divided into main current that flows into the MEA 212, first localized current flowing into the MEA 212 through the first current collector wiring 226 and the first auxiliary current collector plate 222, and second localized current flowing into the MEA 212 through the second current collector wiring 230 and the second auxiliary current collector plate 224.

First current, flowing through the first current collector wiring 226, corresponds to first localized current (air-outlet current Ia·out) that flows through the first local area, which is close proximity to the air outlet portion 244 of the MEA 212, of the current collector plate 218, thereby enabling the first current sensor 228 to detect air-outlet current Ia·out.

Further, second current, flowing through the second current collector wiring 230, corresponds to second localized current (hydrogen-outlet current Ih·out) that flows through the second local area, which is close proximity to the hydrogen outlet portion 254 of the MEA 212, of the current collector plate 218, thereby enabling the second current sensor 231 to detect hydrogen-outlet current Ih·out.

As already discussed above, the first and second local areas correspond to selected local areas of the MEA 212 (see FIGS. 31 to 33) where water is apt to collect and, so, the control section 304 is applied with localized currents delivered from the current sensors 228, 231 for executing the air purge operation of the fuel cell 202.

Figure 40:
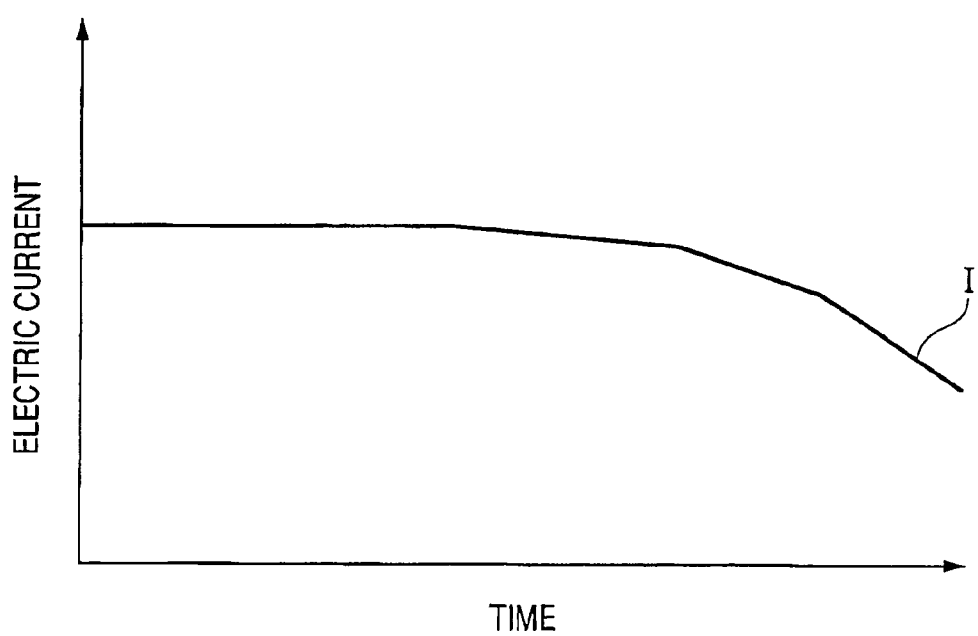
FIG. 40 is a characteristic view illustrating variation in electric current during air purge operation.

FIG. 40 shows variation in electric current I of the fuel cell 202 when executing the air purge operation. As shown in FIG. 40, when the control section 304 executes the air purge operation by activating the air purge unit 306, moisture content inside the fuel cell 202 decreases and the electrolyte membrane of the MEA 212 (see FIG. 31) is dried. When this takes place, proton conductivity resistance increases, thereby causing a drop in electric current I. Thus, there is a correlationship between the moisture content inside the fuel cell 202 and the electric current I thereof. Depending on such a correlationship, the control section 304 is programmed to have a given current value, corresponding to the moisture content inside the fuel cell 202, which is preliminarily determined as a reference at which the air purge operation is terminated whereby when executing the air purge operation to remove water from the fuel cell 202, the control section 304 is enabled to discriminate that when the electric current I of the fuel cell 202 drops below the given current value, the moisture inside the fuel cell 202 decreases to an appropriate level. In this case, if localized currents I, i.e., air-outlet current Ia·out and hydrogen-outlet current Ih·out, which are associated with the air outlet portion 244 of the air separator 214 (see FIG. 32) and the hydrogen outlet portion 254 of the hydrogen separator 216 (see FIG. 33), respectively, are found to be less than the given current value, discrimination can be made that the moisture content in other area can be naturally removed. Accordingly, through the use of air-outlet current Ia·out and hydrogen-outlet current Ih·out measured by the current sensors 228, 231 associated with the local areas of the fuel cell 202 where water is apt to collect, it becomes possible to discriminate moisture content inside the fuel cell 202 in a more appropriate manner, thereby enabling the control section 304 to reliably execute the air purge operation to avoid the occurrence of defects in the fuel cell 202.

Figure 41:
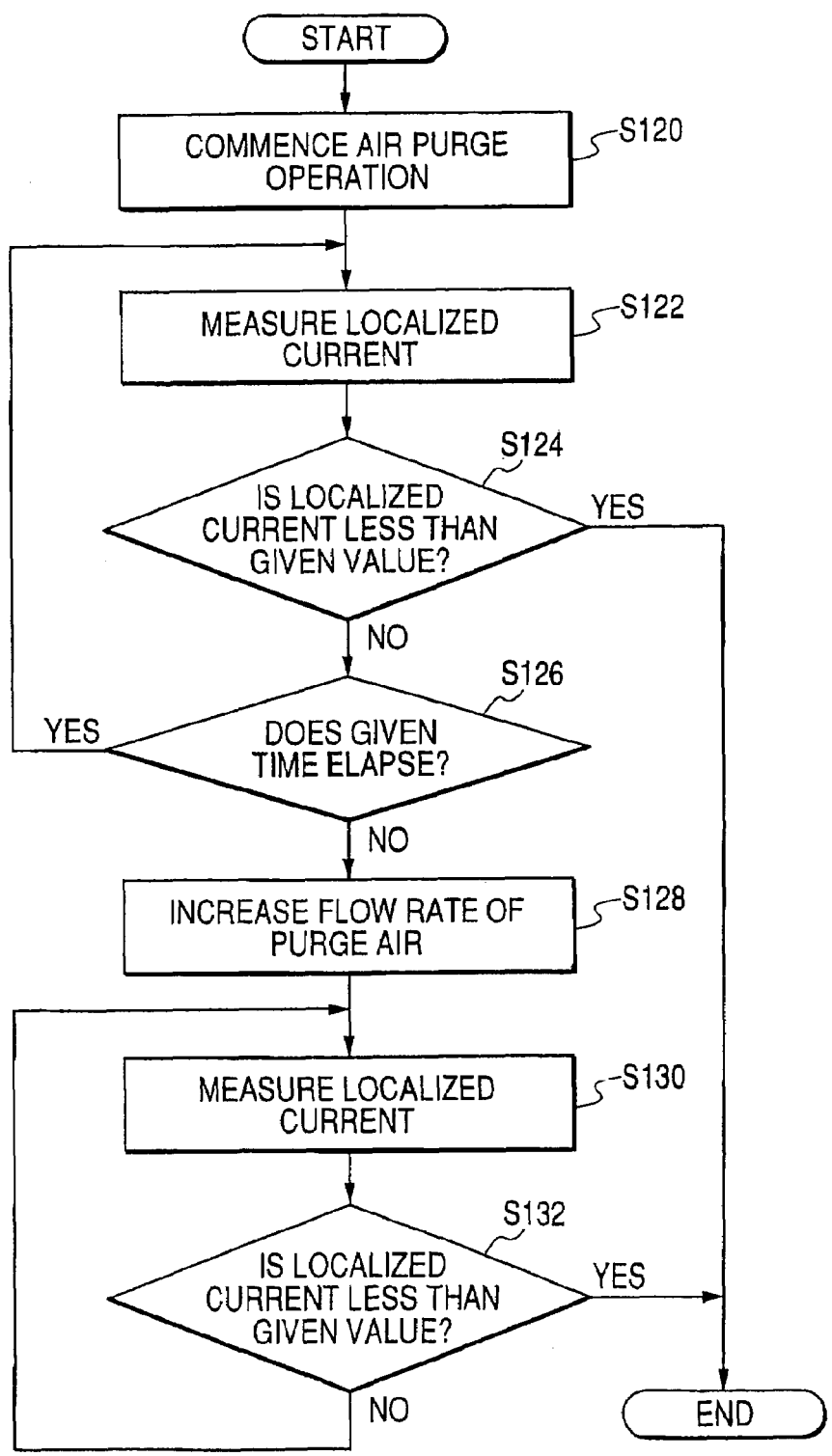
FIG. 41 is a flowchart illustrating a basic sequence of operations to perform air purge operation to be executed by a control section of a fuel cell system shown in FIG. 39 to carry out a related control method of the present invention.
Figure 42:
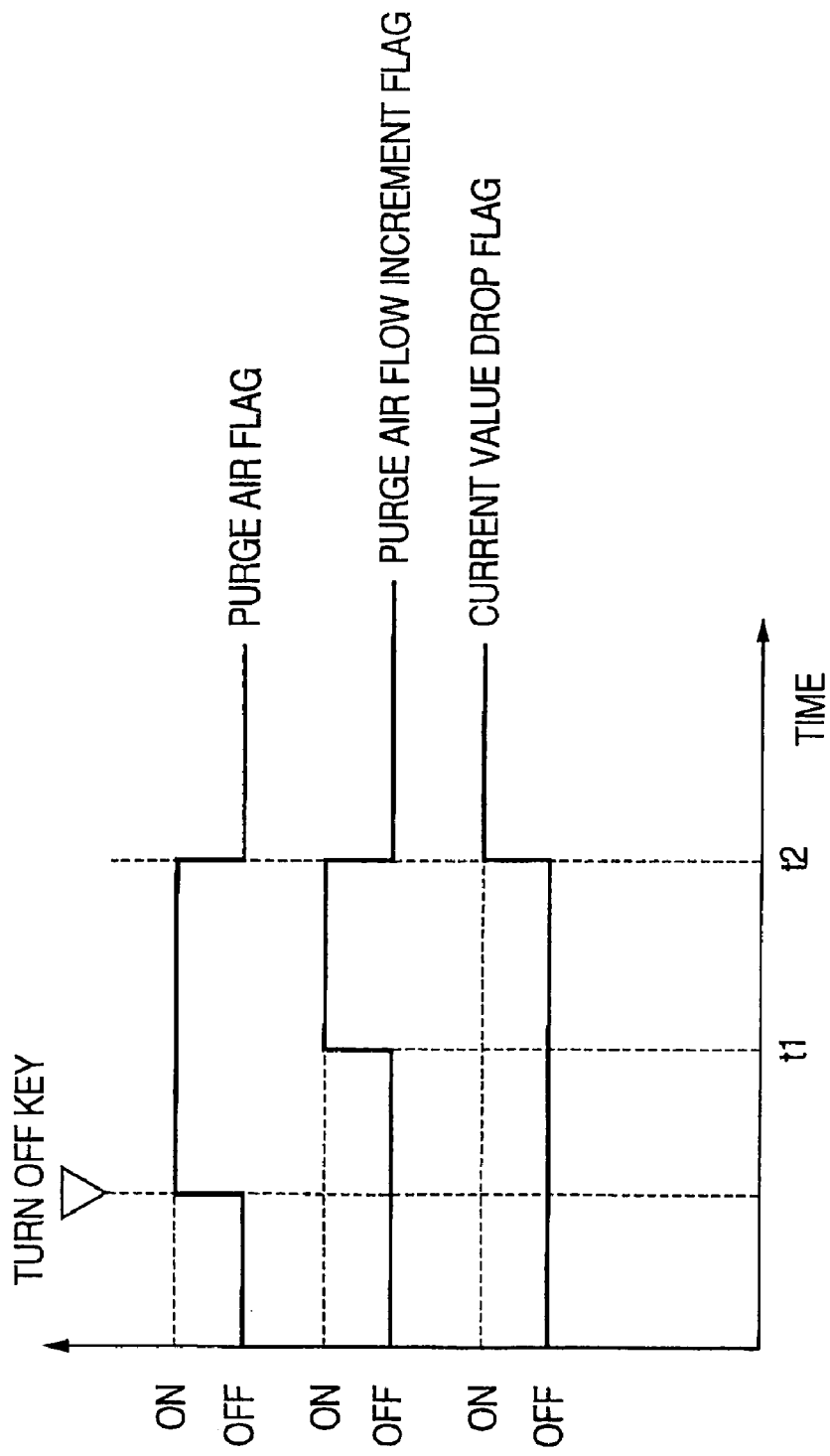
FIG. 42 is a timing chart illustrating timings at which various control flags changes.

Now, a basic sequence of operations of the fuel cell system 300 of the presently filed embodiment and related method are described with reference to FIGS. 41 and 42. FIG. 41 is a flowchart illustrating a control sequence of the air purge operation to be executed by the control section 304, and FIG. 42 is a timing chart illustrating timings at which changes occur in various control flags.

First, when a vehicle occupant turns off a keyswitch (not shown), the control section 304 begins to execute the air purge operation. In step S120, the air pump 20 forming part of the air purge unit 306 is actuated by the control section 304 to supply a stream of purge air into the fuel cell 202. In succeeding step S122, the current sensors 228, 231 measure the localized currents, associated with the respective local areas of the fuel cell 202 where water is apt to collect, and in subsequent step S124, discrimination is made to find whether the localized current values are less than the given current value. In cases where the plural current sensors 228, 231 are provided, discrimination may be made to find whether any one of the localized current values of the respective current sensors 228, 231 is less than the given current value.

As a result, if it is found in step S124 that the localized current values are less than the given value, then, the air purge operation is terminated. In contrast, if in step S124, the localized current values are not less than the given value, then in step S126, the operations in steps S122 and S124 are repeatedly executed until a given time interval (of, for instance, five seconds) has elapsed from the commencement of the air purge operation.

If the localized current values are not less than the given value even when the given time interval has elapsed from the commencement of the air purge operation, it can be estimated that a large volume of water remains in the fuel cell 202 and in step S128, the control section 304 increases the rotational speed of the air pump 20 so as to increase the flow rate of purge air to be supplied into the fuel cell 202. When this takes place, purge-air flow rate incremental flag is turned on (see FIG. 42). In succeeding step S130, the current sensors 228, 231 measure the localized currents, associated with the respective local areas of the fuel cell 202 where water droplets are easy to collect, and in step S132, the control section 304 continues to execute the air purge operation until the localized current values become less than the given value. When the localized current values become less than the given value, current value drop flag is turned on, while turning off air purge flag and purge-air flow rate incremental flag (see FIG. 42).

The fuel cell system 300 of the presently filed embodiment may take an alternative structure wherein, in a case where the localized current values do not drop below the given value even if a certain amount of time has elapsed after increasing the flow rate of purge air, the control section 304 makes discrimination to find the occurrence of some errors to forcibly terminate the air purge operation.

As set forth above, with the fuel cell system 300 of the presently filed embodiment, the control section 304 is programmed to incorporate the timing, determined based on the localized current values, at which the air purge operation is terminated, thereby enabling the air purge operation to be terminated under a condition in which moisture content inside the fuel cell 202 is kept at an appropriate level. Accordingly, since no probability occurs in executing the air purge operation to the extent more than necessary, the air purge time can be shortened, thereby enabling to avoid the electrolyte membrane of the fuel cell 202 from being excessively dried. In addition, since the localized current values, related to the wet condition of the electrolyte membrane, are monitored to render the control section 304 operative to terminate the air purge operation upon discrimination that moisture content inside the fuel cell 202 lies in an appropriate condition, no probability takes place wherein the air purge operation is terminated without adequately removing moisture from the fuel cell 202.

Further, a combination between the current sensors 228, 231, which detect localized currents associated with the local areas of the fuel cell 202 where moisture is apt to gather, and the control section 304 operative to discriminate moisture content inside the fuel cell 202 in a more appropriate manner enables the control section 304 to operate at the timing determined in a further accurate manner.

Furthermore, if the localized current values do not drop below the given value even when the given time interval has elapsed from the commencement of the air purge operation, increasing the flow rate of purge air upon control of the air purge unit 306 enables the air purge operation to be terminated in an early stage.

With the fuel cell system 300 of the presently filed embodiment set forth above, the provision of the current measuring device adapted to measure the current value of the fuel cell 202, the air purge unit 306 and the control section 304 allows the air purge unit 306 to achieve the air purge operation if the localized current measured by the current measuring device 228, 231 exceeds the given value during interrupted operation of the fuel cell 202. This provides a capability of determining the timing, based on the current value correlated with moisture content inside the fuel cell 202, at which the air purge operation is terminated, and therefore, the air purge operation can be terminated under a condition where moisture the fuel cell 202 remains in an appropriate moisture content. Consequently, since no need arises in executing the air purge operation to the extent more than necessary, the air purge time can be effectively shortened, enabling the electrolyte membrane of the fuel cell 202 to be avoided from being excessively dried. Additionally, since the air purge operation is terminated by monitoring the localized current value of the fuel cell 202 and making discrimination that the fuel cell 202 remains in appropriate moisture content, it becomes possible to preclude the air purge operation from being terminated with the occurrence of inadequate removal of moisture from the fuel cell 202.

Further, with the fuel cell system 300 of the presently filed embodiment, the provision of the current measuring device operative to measure localized current associated with the local area of the fuel cell 202 where water is easy to collect enables moisture content inside the fuel cell 202 to be more accurately discriminated, enabling the timing, at which the air purge operation is terminated, to be determined in a more appropriate fashion.

Moreover, with the fuel cell system 300 of the presently filed embodiment, since the air purge unit 306 is operative to increase the flow rate of purge air when the given time interval has elapsed after the commencement of the air purge operation executed by the air purge unit 306, the purge operation can be terminated in an early stage.

While the fuel cell system 300 of the presently filed embodiment has been described with reference to an exemplary structure where the localized currents are monitored after the commencement of the air purge operation to determine the timing at which the air purge operations terminated, the fuel cell system 300 may take an alternative structure wherein if the localized currents drop below the given value prior to commencing the air purge operation, the air purge operation is not initiated.

Further, although the fuel cell system 300 of the presently filed embodiment has been described in conjunction with an exemplary structure where the fuel cell 202 is provided with two current sensors 228, 231 to measure the localized currents related to two local areas, no limitation is intended to such a particular application and the fuel cell system 300 may take an alternative structure wherein one current sensor is provided to measure the localized current related to one local area of the fuel cell 202 or another structure wherein three or more current sensors are provided to measure the localized currents related to three or more local areas of the fuel cell 202.

Besides, while the fuel cell system 300 of the presently filed embodiment has been described in conjunction with the fuel cell 202, the present invention is not limited to such application and may have application to an electric power unit system that includes a power unit such as a secondary battery and a capacitor, etc.

Tenth Embodiment

Next, a fuel cell system of a tenth embodiment according to the present invention and related method are described in detail with reference to FIGS. 43 to 46.

The fuel cell system 400 of the presently filed embodiment is applied to an electric vehicle (fuel cell powered vehicle) adapted to run by a power supply in the form of the fuel cell system of the presently filed embodiment.

Figure 43:
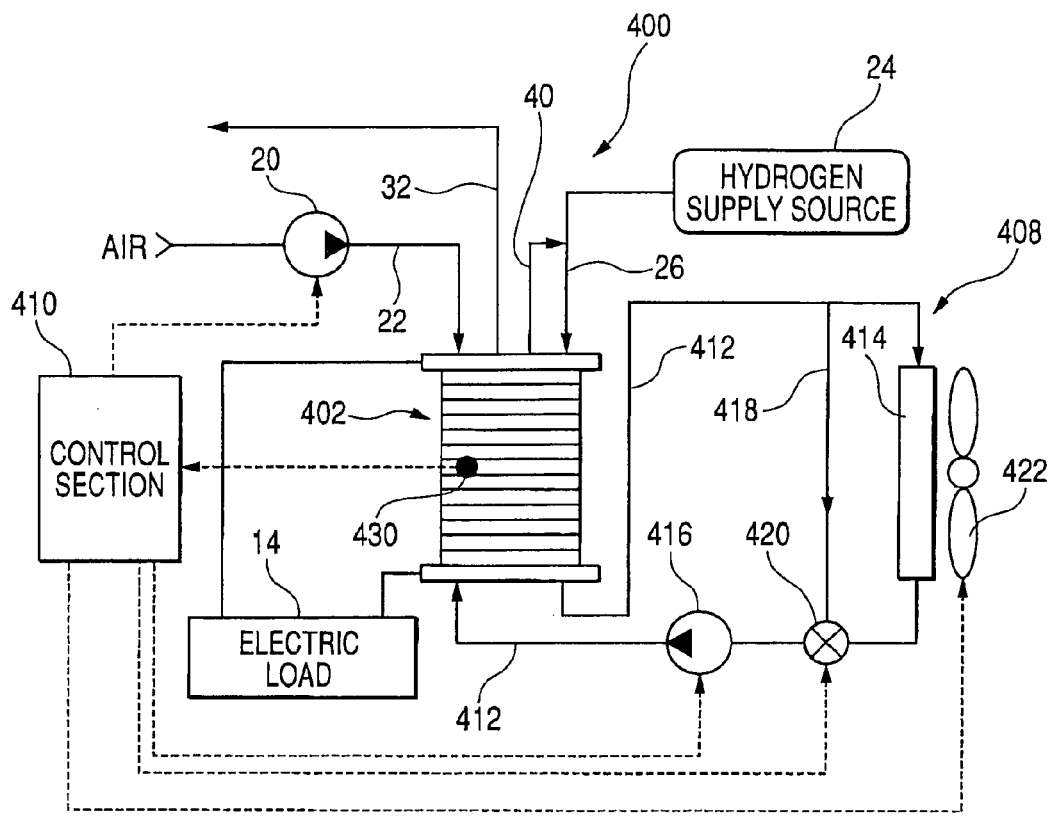
FIG. 43 is a typical view of an overall structure illustrating a fuel cell system of a tenth embodiment according to the present invention.

FIG. 43 is a schematic view illustrating an overall structure of the fuel cell system 400 of the tenth embodiment according to the present invention.

As shown in FIG. 43, the fuel cell system 400 of the presently filed embodiment is comprised of a fuel cell 402, the hydrogen supply source 24, the air supply source 20 comprised of the air pump, a cooling system 408 and a control section 410.

The fuel cell 402 is similar in structure to the fuel cell 12 of the first embodiment and, hence, a detailed description of the fuel cell 402 is herein omitted for the sake of simplicity of description. Also, the current measuring devices comprised of the current sensors, respectively, are also similar in structure to those of the first to third embodiments and, hence, a detailed description of the same is herein omitted for the sake of simplicity of description.

The electric power generated by the fuel cell 402 is applied to electrical load 14 (in the form of a drive motor to propel the vehicle) through an inverter (not shown), and a secondary battery (not shown), etc.

The fuel cell 402 is supplied with hydrogen as fuel gas from the hydrogen supply source 24 and air as oxidant gas from the air supply source 20.

Unreacted exhaust hydrogen is circulated through the fuel gas circulation flow passage 40 to the fuel cell 402 again for reuse through the fuel gas flow passage 26.

Unreacted air is discharged as exhaust gas through the air exhaust passage 32 to the atmosphere.

During the operation of the fuel cell 402, moisture and heat build up in the fuel cell 402 due to electrochemical reaction between oxidant gas, such as air, and fuel gas such as hydrogen. The fuel cell 402 needs to be kept at a given operating temperature (of, for instance, approximately 80° C.) during operation in order to generate electric power at a high efficiency. To this end, the fuel cell system 400 is equipped with the cooling system 408, which employs heating medium to radiate heat, built up in the fuel cell 402, to an outside of the system to regulate the operating temperature of the fuel cell 402 within a given range. Also, it will be appreciated that in the presently filed embodiment, anti-freeze coolant water is employed as heating medium that does not freeze under low temperature environments.

The cooling system 408 serves as a temperature regulator unit and includes a closed loop heating medium flow passage 412, through which coolant water is circulated, which is comprised of a radiator 414 in the form of a heat exchanger for cooling heating medium, and a water pump 416 by which a stream of coolant water is delivered. The coolant water passing across the fuel cell 402 is circulated through the heating medium flow passage 412 to the radiator 414, in which heat exchange takes place between coolant water and the atmosphere. The fuel cell 402 has a structure to allow coolant water to circulate through respective unit cells that form the fuel cell 402.

Further, the cooling system 408 is comprised of a bypass flow passage 418, which allows coolant water to bypass the radiator 414, a three-way valve 420 operative to continuously regulate a division ratio in the flow rate of coolant water, to be circulated to the radiator 414, and the flow rate of coolant water bypassing the radiator 414, and a fan 422 that delivers a stream of air to the radiator 414.

The control section 410 includes a controller that is comprised of an electronic control unit (ECU) that includes a microcomputer composed of a CPU, a ROM, a RAM and associated peripheral circuitry, and serves as a controller responsive to localized current for controlling an operating condition of the fuel cell 402.

As shown in FIG. 43, the fuel cell system 400 of the presently filed embodiment is further comprised of a current sensor 430 that includes a localized current sensor to measure localized current associated with a specified local area of the fuel cell 402 in a manner as will be described below in detail.

The fuel cell 402 is identical in structure to the fuel cell 12 of the fuel cell system 10 of the first embodiment and includes a stack of unit cells each of which includes the same MEA as that of the fuel cell 12 of the first embodiment, an air separator 432 and a hydrogen separator (not shown) between which the MEA is sandwiched. Therefore, a detailed description of the fuel cell 402 is herein omitted for the sake of simplicity of description.

Figure 44:
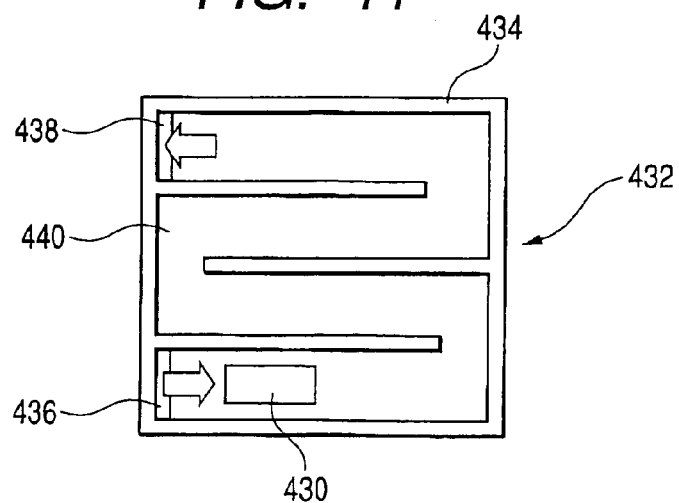
FIG. 44 is a view illustrating a schematic structure of an air separator of a fuel cell shown in FIG. 43.

FIG. 44 shows a schematic structure of the air separator 432 associated with the MEA (not shown). The air separator 432 is comprised of a separator body 434 that is formed with an air inlet portion 436 connected to the air flow passage 22, an air outlet portion 438, connected to the air exhaust passage 32, and an air flow channel 440 in the form of a recess formed between the air inlet portion 436 and the air outlet portion 438 to permit a stream of air to flow from the air inlet portion 436 to the air outlet portion 438.

The air separator 432 is formed in a plate-like configuration and the air inlet portion 436 and the air outlet portion 438 thoroughly extends in a direction perpendicular to a plane of the separator body 434. The air flow channel 440 is recessed in the separator body 434 in a meander pattern.

In the presently filed embodiment, although the current sensor 430 is schematically shown in FIG. 44 as disposed in a specified local area of the separator body 434 at a position near the air inlet portion 436, it will be appreciated that the current sensor 430 is actually mounted on the specified local area of a current collector plate (not shown) in a manner similar to that shown in the first embodiment. That is, the current sensor 430 is disposed on the MEA at a specified local area thereof, close proximity to the air inlet portion 436 of the air separator 432, where the electrolyte membrane is apt to dry and which represents a drying characteristic.

By the way, when in comparison between moisture content in an upstream side of the air flow channel 440 and moisture content in a downstream side of the air flow channel 440, the flow rate of oxidant gas decreases as it goes toward a downstream side of the air flow channel 440, with a resultant tendency of reduction in moisture content in an upstream side. Therefore, in the presently filed embodiment, the current sensor 430 is mounted on the fuel cell 402 in the specified local area thereof corresponding to the air inlet portion 436 of the air separator 432 to measure localized current, indicative of the drying characteristic, where a shortage of moisture content is apt to take place in the unit cell (not shown) of the fuel cell 402. Also, it will be appreciated that the air flow channel 440 corresponds to an oxidant gas flow passage and the current sensor 430 corresponds to a current measuring device.

Figure 45:
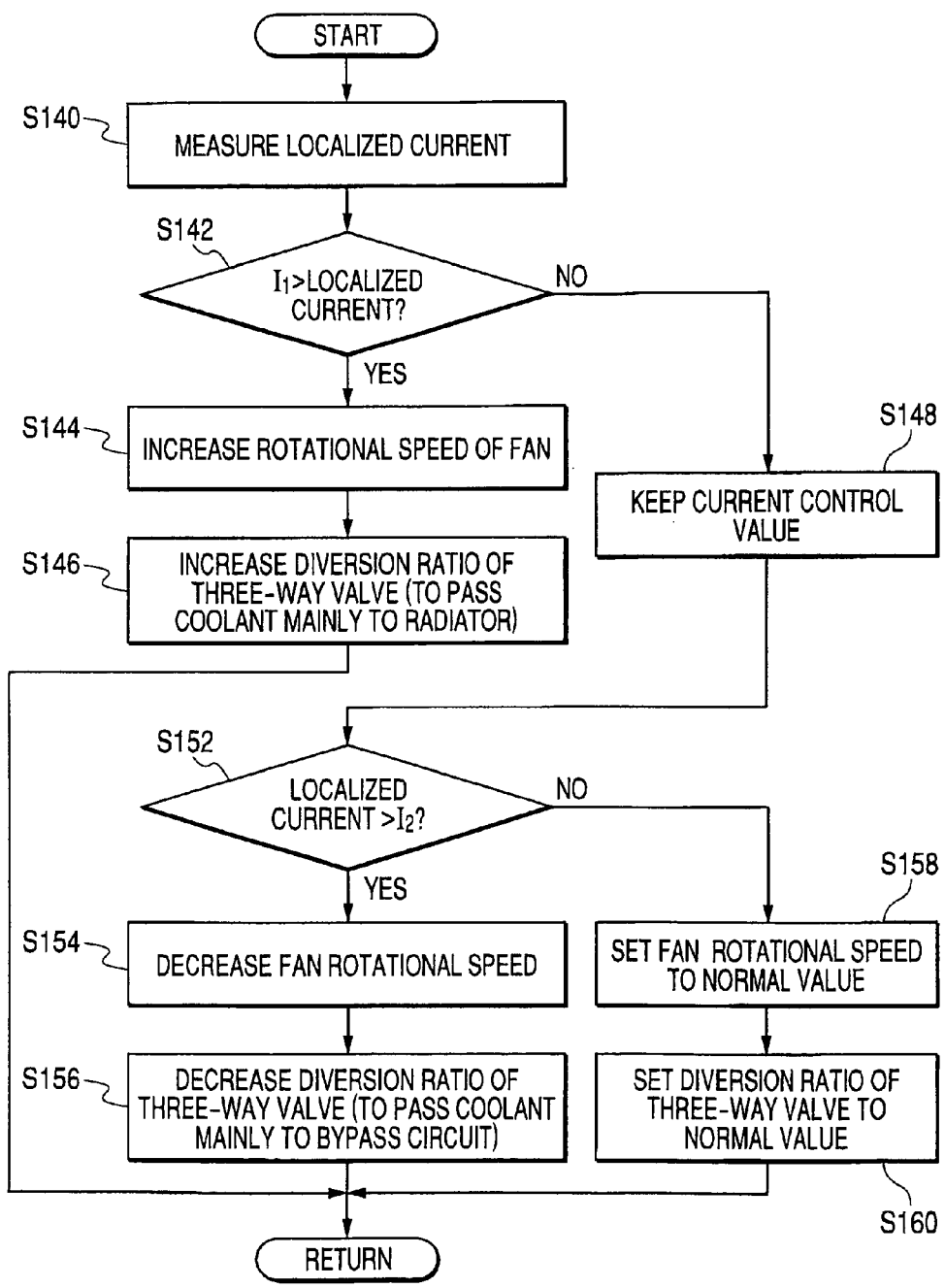
FIG. 45 is a flowchart illustrating a basic sequence of operations to be executed by a control section of the fuel cell system shown in FIG. 43 to carry out a related method of the present invention.
Figure 46:
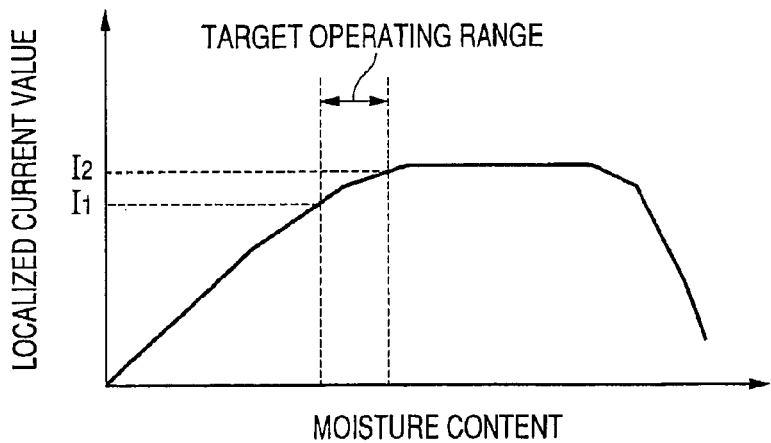
FIG. 46 is a characteristic view illustrating the relationship between moisture content in the fuel cell and localized current.

Now, detailed description is made of a basic sequence of operations of the fuel cell system 400 and related method with reference to FIGS. 45 and 46. FIG. 45 is a flowchart illustrating a basic sequence of operations to control an operating condition of the fuel cell 402, among control operations, to be executed by the control section 410 such that localized current of the unit cell lies in a given range. Also, FIG. 46 shows a graph illustrating the relationship between moisture content inside the unit cell 402 and a localized current value of the unit cell 402.

First in step S140, the current sensor 430 measures localized current indicative of the drying characteristic, and discrimination is made in succeeding step S142 to find whether localized current is less than a first preset current value $I_1$ (see FIG. 46).

If in step S142, localized current is less than the first preset current value $I_1$, then, it is conceivable that the electrolyte membrane is dried at an area close proximity to the air inlet portion 436 with a resultant increase in resistance of the electrolyte membrane to cause localized current, associated with the air inlet portion 436, to decrease. Therefore, under such a situation, discrimination can be made that moisture content inside the fuel cell 402 is in shortage and the control section 410 controls the cooling system 408 so as to lower the operating temperature of the fuel cell 402. In particular, the control section 410 executes control in step S144 so as to increase a rotational speed of the fan 422, while in step S146, increasing an opening degree of the three-way valve 420 so as to increase the flow rate of coolant water to be circulated to the radiator 414 for thereby raising a cooling capacity of the cooling system 408 to a value higher than that of normal operation. This allows the operating temperature of the fuel cell 402 to decrease, resulting in an increase in relative humidity inside the fuel cell 402 to facilitate an increase in a wetting rate of the electrolyte membrane.

On the contrary, if in step S142, localized current exceeds the first preset current value $I_1$, then, in subsequent step S148, the control section 410 keeps a current control value and the operation proceeds to step S152.

In consecutive step S152, discrimination is made to find whether localized current exceeds a second preset current value $I_2$ (provided that $I_1<I_2$. See FIG. 46).

If in step S152, localized current exceeds the second preset current value $I_2$, then, it is conceivable that excessive moisture content takes place inside the fuel cell 402 to cause reduction in resistance in the local area of the electrolyte membrane at a position closer to the air inlet portion 436 with a resultant increase in localized current associated with the air inlet portion 436. Therefore, a need arises in raising the operating temperature of the fuel cell 402 so as to facilitate evaporation of water to cause reduction in moisture content inside the fuel cell 402 for thereby precluding the occurrence of excess moisture content inside the fuel cell 402. Accordingly, in step S154, the control section 410 controls so as to decrease the rotational speed of the fan 422 while in consecutive step S156, altering the opening degree of the three-way valve 420 so as to increase the flow rate of coolant water passing through the bypass flow passage 418 for thereby decreasing the cooling capacity of the cooling system 408 to a lower level than that of the normal operation. This allows the operating temperature of the fuel cell 402 to increase, thereby promoting evaporation of water inside the fuel cell 402.

On the contrary, if in step S152, localized current is less than the second preset current value $I_2$, then in consecutive steps S158, S160, the control section 410 executes the control so as to permit the rotational speed of the fan 422 and the opening degree of the three-way valve 420 to be restored to respective normal values such that the cooling capacity of the cooling system 408 is adjusted to the level at the normal operation.

As set forth above, with the fuel cell system 400 of the presently filed embodiment, the control section 410 controls the fuel cell 420 such that localized current of the unit cell is controlled to lie in a given range between the first preset current value $I_1$, and the second preset current value $I_2$. As shown in FIG. 46, there is the correlationship between the localized current value and moisture content. Thus, by controlling the fuel cell 402 so as to allow localized current, associated with the unit cell at the specified local area where the shortage of moisture content easily takes place, to lie in the given range between the first preset current value $I_1$ and the second preset current value $I_2$, moisture content of the fuel cell 402 is controlled in just proportion.

With the fuel cell system 400 of the presently filed embodiment set forth above, controlling localized current in a way to cause the same to lie in an appropriate range results in a capability of controlling moisture content of the fuel cell 402 in just proportion. Also, since localized current of the unit cell quickly varies depending on variation in moisture content of the fuel cell 402, localized current can be rapidly controlled.

Eleventh Embodiment

A fuel cell system of an eleventh embodiment according to the present invention and related method are described below with reference to FIGS. 47 and 48, with the same component parts as those of the tenth embodiment bearing like reference numerals to omit redundant description.

The fuel cell system 451 of the eleventh embodiment differs from the tenth embodiment in that in the tenth embodiment, moisture content of the fuel cell 402 is controlled by regulating the temperature of the fuel cell 402 whereas in the presently filed embodiment, moisture content of the fuel cell 402 is controlled by regulating a rate of humidifying reaction gases to be supplied to the fuel cell 402.

Figure 47:
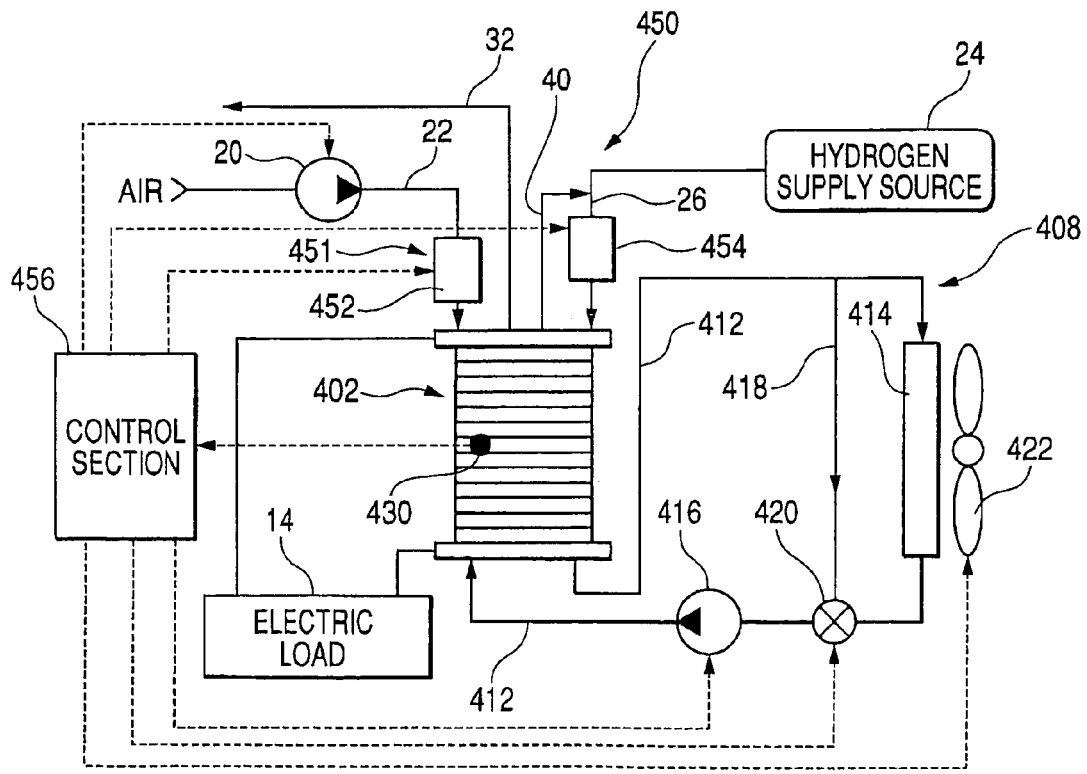
FIG. 47 is a typical view of an overall structure of a fuel cell system of an eleventh embodiment according to the present invention.
Figure 48:
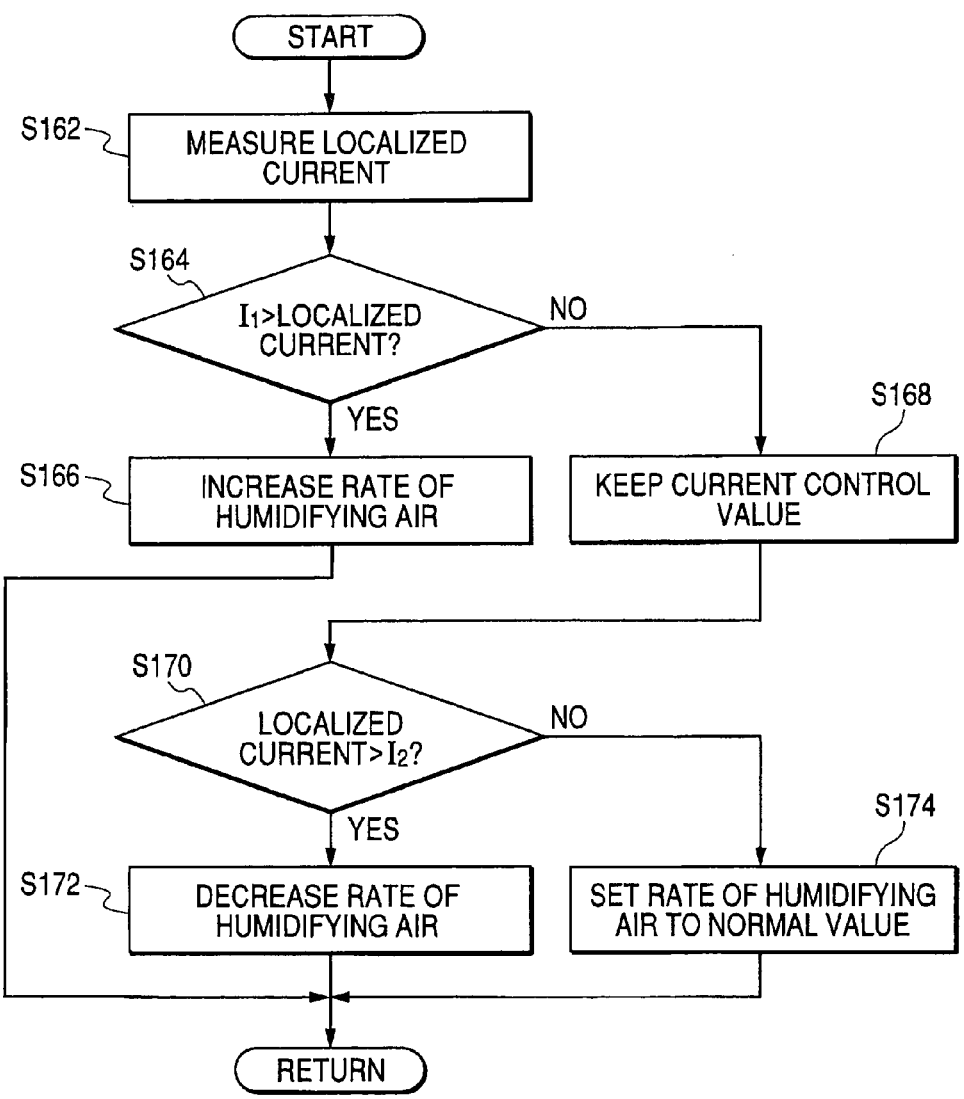
FIG. 48 is a flowchart illustrating a basic sequence of operations to be executed by a control section of the fuel cell system shown in FIG. 47 to carry out a related diagnosing method of the present invention.

FIG. 47 is a schematic view illustrating an overall structure of the fuel cell system 450 of the presently filed embodiment, and FIG. 48 is a flowchart illustrating a basic sequence of operations, for controlling an operating condition of the fuel cell such that localized current lies in a given range, among control operations of the fuel cell system 450 of the presently filed embodiment.

As shown in FIG. 47, the fuel cell system 450 of the presently filed embodiment includes a humidifying device 451 for controlling at least one of a rate of humidifying oxidant gas to be supplied to the fuel cell 402 and a rate of humidifying fuel gas to be supplied to the fuel cell 402. The humidifying device 451 includes an air humidifier 452 disposed in the air supply passage 22 downstream of the air supply source 20 to humidify air, and a hydrogen humidifier 454 disposed in the hydrogen supply passage 26 downstream of the hydrogen supply source 24 to humidify hydrogen.

The fuel cell system 450 further includes a control section 456 by which the humidifiers 452, 454 of the humidifying device 451 are controlled in a manner described below in detail.

As shown in FIG. 48, first in step S162, the current sensor 430 measures localized current of the unit cell of the fuel cell 402. In succeeding step S164, if localized current is less than the first preset current value $I_1$ then, in step S166, the control section 456 increases the rate of humidifying air, thereby facilitating the wetting of the electrolyte membrane (not shown). In contrast, if in step S164, localized current exceeds the first preset current value $I_1$, then, in step S168, the control section 456 keeps a current control value.

In consecutive step S170, if localized current exceeds the second preset current value $I_2$, the control section 456 actuates the air humidifier 452 so as to decrease the rate of humidifying air, thereby reducing moisture content inside the fuel cell 402. On the contrary, if in step S170, localized current is less than the second preset current value $I_2$, then in consecutive step S174, the control section 456 actuates the air humidifier 452 so as to cause the rate of humidifying air to be restored to the normal level.

With the structure previously noted above, controlling localized current of the unit cell 402 allows localized current to lie in the given range between the first preset current value $I_1$ and the second preset current value $I_2$, resulting in reliable operation to control moisture content of the fuel cell 402 in just proportion.

With the fuel cell system 450 of the presently filed embodiment set forth above, the same advantageous effects as those of the tenth embodiment are obtained. Also, when controlling moisture content in a manner disclosed by the presently filed embodiment, moisture content of the fuel cell 402 can be quickly controlled.

Moreover, while the fuel cell system 450 of the presently filed embodiment has been described in conjunction with an exemplary structure wherein only the rate of humidifying air is controlled, no limitation is intended to such a particular structure and an alternative structure may include only the hydrogen humidifier 24 by which only the rate of humidifying hydrogen is controlled. In another alternative, both the air humidifier 452 and the hydrogen humidifier 454 may be actuated to control the rate of humidifying air and the rate of humidifying hydrogen, respectively.

Twelfth Embodiment

A fuel cell system of a twelfth embodiment and related method are described below with reference to FIGS. 49 and 50, with the same component parts as those of the tenth embodiment bearing like reference numerals to omit redundant description.

The presently filed embodiment differs from the tenth embodiment in that in the tenth embodiment, moisture content of the fuel cell is controlled by controlling the temperature of the fuel cell whereas in the presently filed embodiment, controlling pressure of air to be supplied to the fuel cell 402 controls moisture content of the fuel cell 402.

Figure 49:
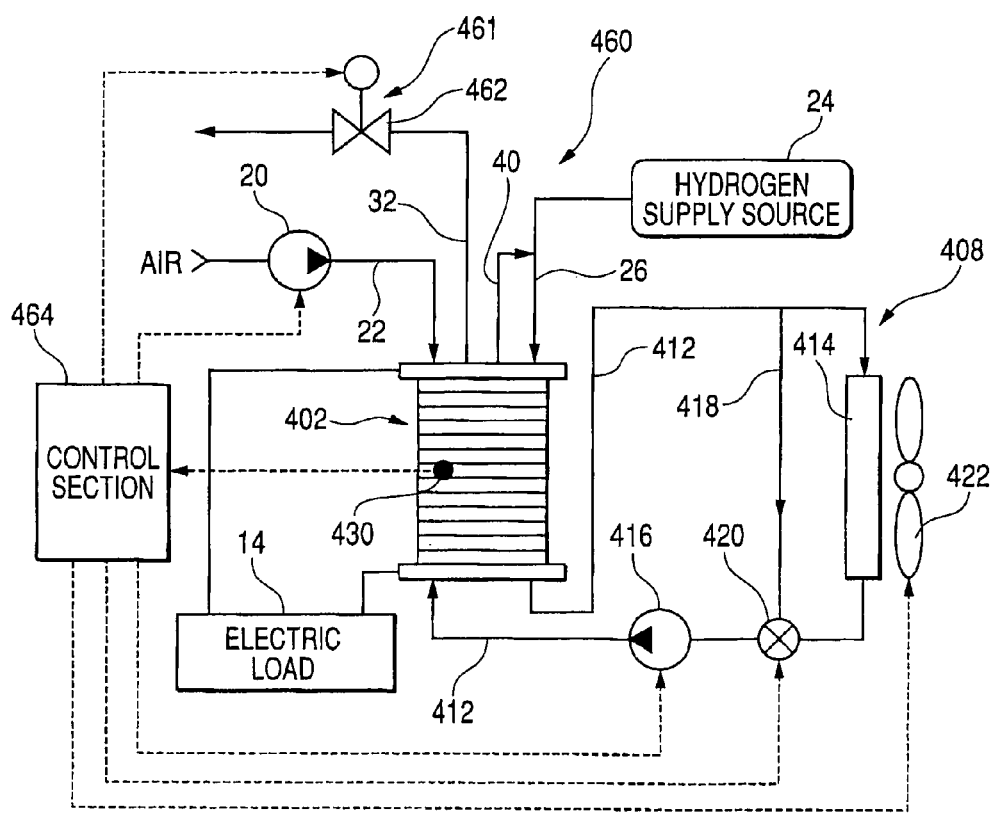
FIG. 49 is a typical view of an overall structure illustrating a fuel cell system of a twelfth embodiment according to the present invention.
Figure 50:
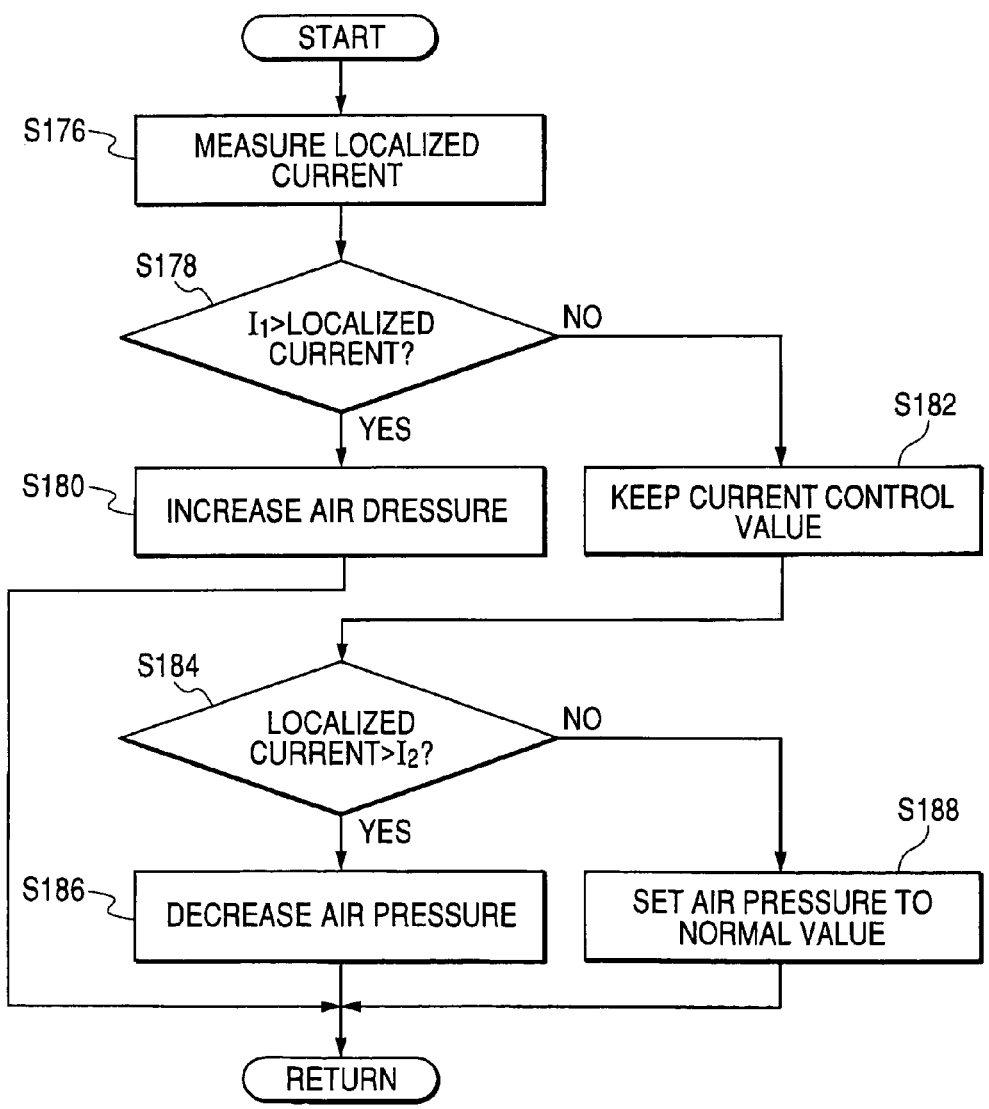
FIG. 50 is a flowchart illustrating a basic sequence of operations to be executed by a control section of the fuel cell system shown in FIG. 49 to carry out a related diagnosing method of the present invention.

FIG. 49 is a schematic view illustrating an overall structure of a fuel cell system 460 of the presently filed embodiment, and FIG. 50 is a flowchart illustrating a basic sequence of operations, for controlling an operating condition of the fuel cell such that localized current lies in a given range, among control operations of the fuel cell system 460 of the presently filed embodiment.

As shown in FIG. 49, the fuel cell system 460 of the presently filed embodiment includes a pressure regulator unit 461 comprised of an air pressure regulator valve 462 disposed in the exhaust air passage 32 downstream of the fuel cell 402.

The fuel cell system 460 further includes a control section 464 by which the air pressure regulator valve 462 is controlled in a manner described below in detail.

As shown in FIG. 50, first in step S176, the current sensor 430 measures localized current of the unit cell of the fuel cell 402. In succeeding step S78, if localized current is less than the first preset current value $I_1$, then, in step S180, the control section 464 actuates the air pressure regulator valve 462 so as to increase the air to be supplied to the fuel cell 402, thereby raising relative humidity to facilitate the wetting of the electrolyte membrane (not shown). In contrast, if in step S178, localized current exceeds the first preset current value $I_1$, then, in step S182, the control section 464 keeps a current control value.

In consecutive step S184, if localized current exceeds the second preset current value $I_2$, then in step S186, the control section 464 actuates the air pressure regulator valve 462 so as to decrease the pressure of air to be supplied to the fuel cell 402, facilitating evaporation of water inside the fuel cell 402. On the contrary, if in step S184, localized current is less than the second preset current value $I_2$, then in consecutive step S188, the control section 464 actuates the air pressure regulator valve 462 such that the pressure of air to be supplied to the fuel cell 402 is restored to the normal level.

With the structure mentioned above, controlling the pressure of air to be supplied to the fuel cell 402 depending on localized current of the unit cell allows the electrolyte membrane to have an appropriate moisture content to permit localized current to lie in the given range between the first preset current value $I_1$ and the second preset current value $I_2$, resulting in reliable operation of the fuel cell 402. Consequently, the fuel cell system 460 of the presently filed embodiment has the same advantage as that of the tenth embodiment.

Thirteenth Embodiment

A fuel cell system of a thirteenth embodiment according to the present invention and related method are described below with reference to FIGS. 51 and 52, with the same component parts as those of the tenth embodiment bearing like reference numerals to omit redundant description.

The thirteenth embodiment differs from the tenth embodiment in that in the tenth embodiment, controlling the temperature of the fuel cell 402 moisture content of the fuel cell 402 achieves to control humidity of the fuel cell 402 whereas in the thirteenth embodiment, controlling a temperature of air to be supplied to the fuel cell 402 controls humidity of the fuel cell 402.

Figure 51:
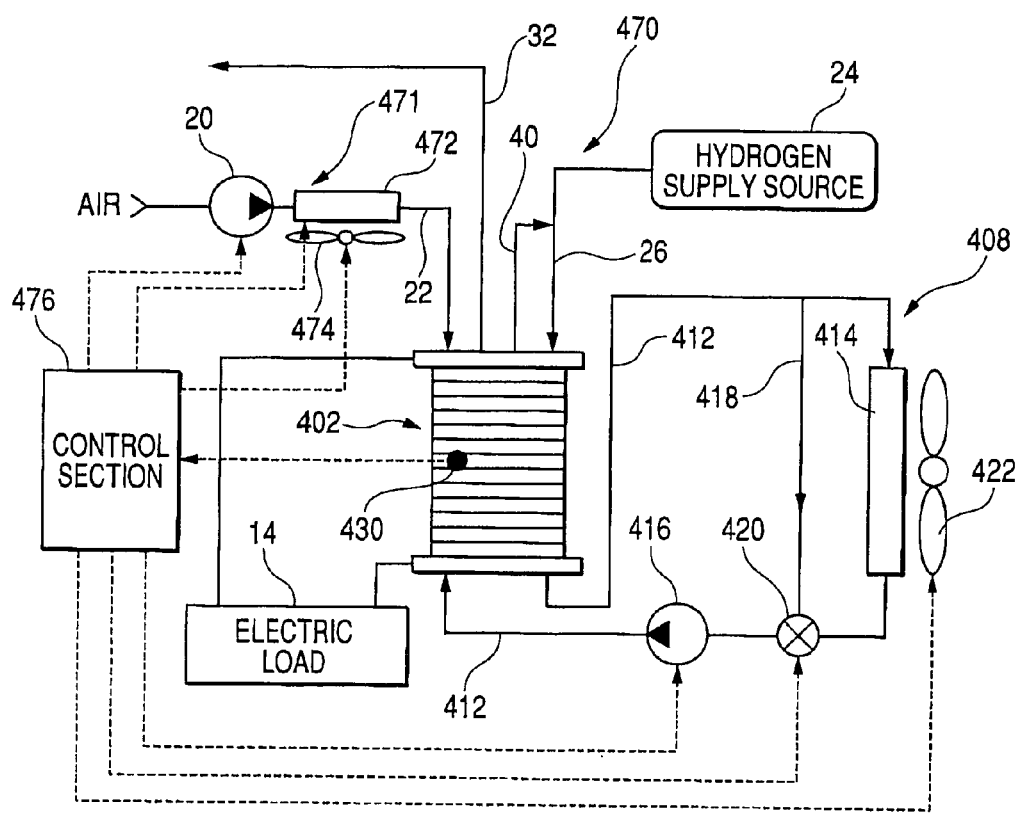
FIG. 51 is a typical view of an overall structure illustrating a fuel cell system of a thirteenth embodiment according to the present invention.
Figure 52:
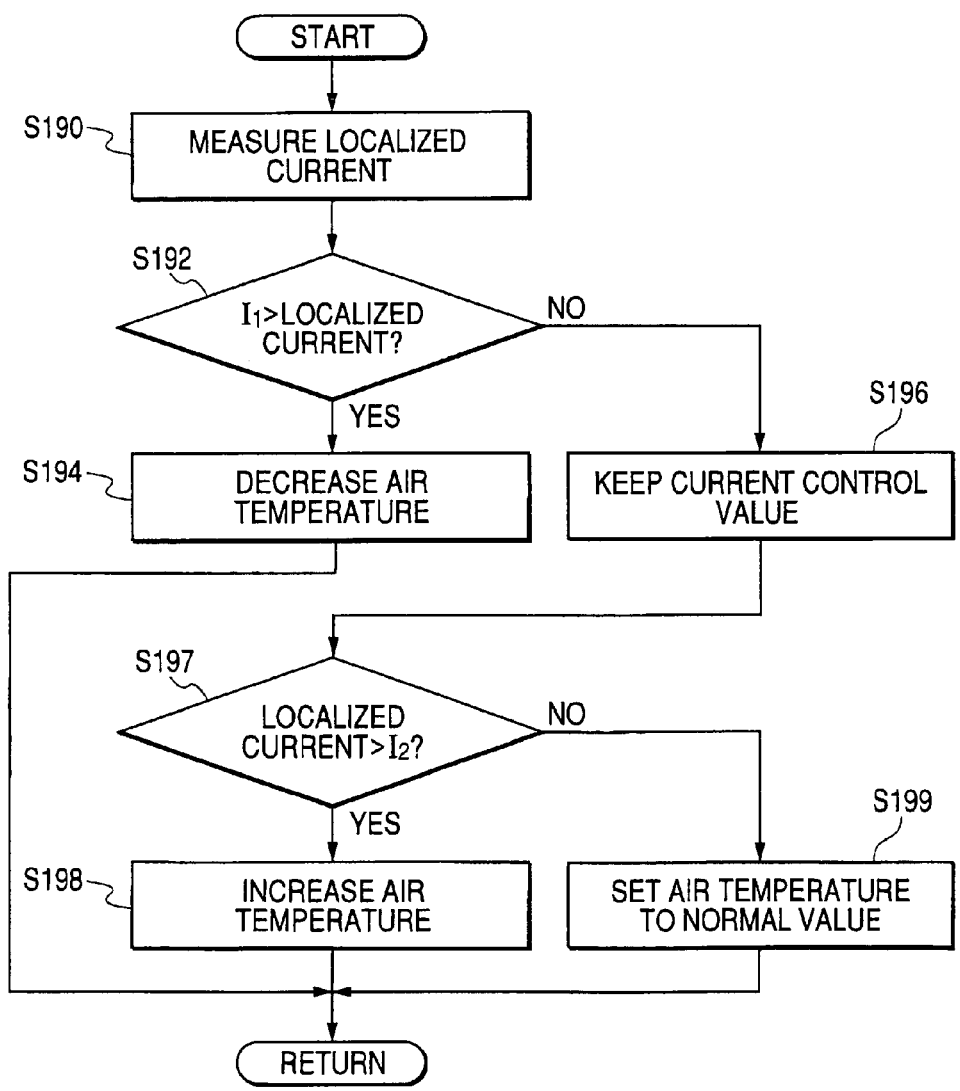
FIG. 52 is a flowchart illustrating a basic sequence of operations to be executed by a control section of the fuel cell system shown in FIG. 51 to carry out a related diagnosing method of the present invention.

FIG. 51 is a schematic view illustrating an overall structure of the fuel cell system 470 of the presently filed embodiment, and FIG. 52 is a flowchart illustrating a basic sequence of operations, for controlling an operating condition of the fuel cell 402 such that localized current lies in a given range, among control operations of the fuel cell system 470 of the presently filed embodiment.

As shown in FIG. 51, the fuel cell system 470 of the presently filed embodiment includes a temperature regulator unit 471 composed of a cooler 472 disposed in the air flow passage 22 downstream of the air supply source 20 to effectuate heat exchange between air to be supplied to the fuel cell 402 and the atmosphere (atmospheric air) to regulate a temperature of oxidant gas to be supplied to the fuel cell 402, and a fan 474 that delivers a stream of air to the cooler 472. The fuel cell system 470 further includes a control section 476 that includes a controller by which the cooler 472 and the fan 474 are controlled in a manner described below in detail.

As shown in FIG. 52, first in step S190, the current sensor 430 measures localized current of the unit cell of the fuel cell 402. In succeeding step S192, if localized current is less than the first preset current value $I_1$, then, in step S194, the control section 476 actuates the fan 474 so as to increase the flow rate of air to be delivered to the cooler 472 for increasing a cooling capacity thereof to lower the temperature of air to be supplied to the fuel cell 402, thereby increasing relative humidity for facilitating the wetting of the electrolyte membrane (not shown). In contrast, if in step S192, localized current exceeds the first preset current value $I_1$, then, in step S196, the control section 476 keeps a current control value.

In consecutive step S197, if localized current exceeds the second preset current value $I_2$, then in step S198, the control section 476 decreases the rotational speed of the fan 474 to lower the cooling capacity of the cooler 472 so as to increase the temperature of air to be supplied to the fuel cell 402, facilitating evaporation of moisture inside the fuel cell 402. On the contrary, if in step S197, localized current is less than the second preset current value $I_2$, then in consecutive step S199, the control section 476 regulates the flow rate of air to be delivered by the fan 474 such that the temperature of air to be supplied to the fuel cell 402 is restored to the normal level.

With the structure mentioned above, regulating the temperature of oxidant gas to be supplied to the fuel cell 402 depending on localized current associated with the specified area of the electrolyte membrane allows the humidity of the fuel cell 402 to be accurately controlled, resulting in reliable operation to control moisture content of the fuel cell 402 in just proportion. Consequently, the fuel cell system 470 of the presently filed embodiment has the same advantage as that of the tenth embodiment.

Fourteenth Embodiment

A fuel cell system of a fourteenth embodiment according to the present invention and related method are described below with reference to FIG. 53, with the same component parts as those of the tenth embodiment bearing like reference numerals to omit redundant description.

In the fuel cell system 480 of the thirteenth embodiment, the humidity of the fuel cell 402 is controlled by controlling the temperature of air to be supplied to the fuel cell 402, and the presently filed embodiment differs from the thirteenth embodiment in that the fourteenth embodiment includes a heat exchanger, for controlling the temperature of air to be supplied to the fuel cell 402, which has a detailed structure different from that of the thirteenth embodiment.

Figure 53:
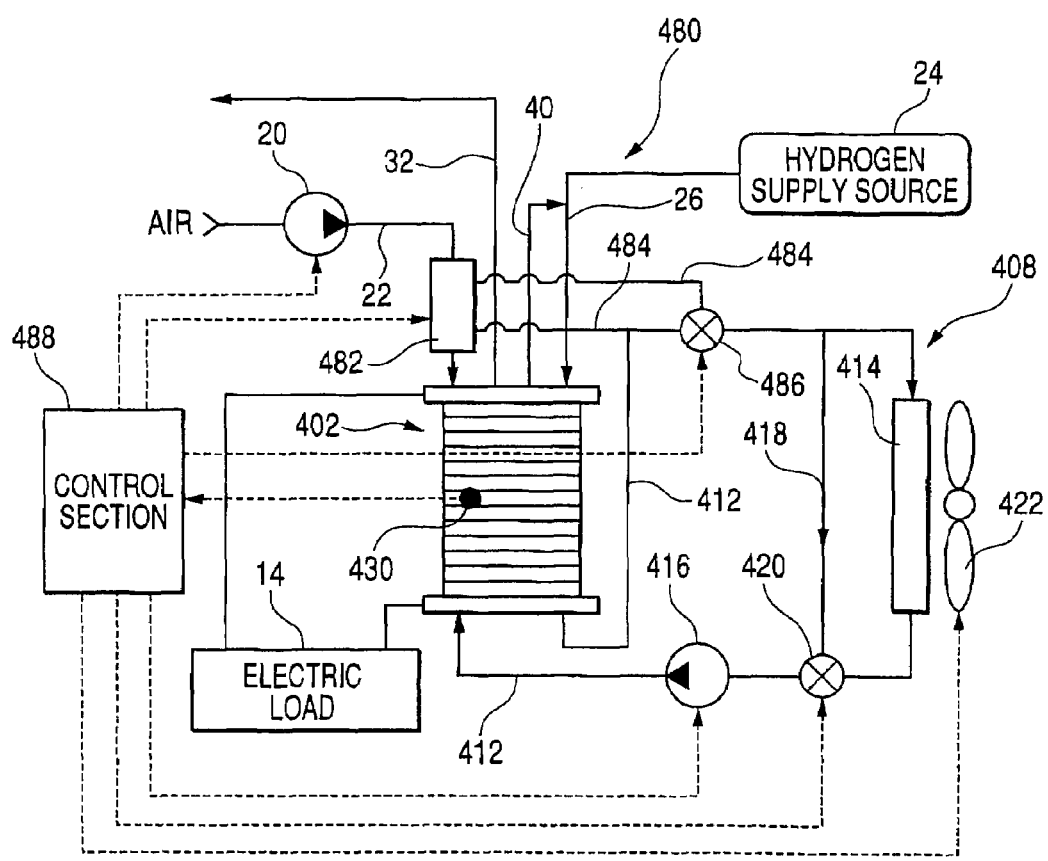
FIG. 53 is a typical view of an overall structure illustrating a fuel cell system of fourteenth embodiment according to the present invention.

FIG. 53 is a schematic view illustrating an overall structure of the fuel cell system 480 of the fourth modified form of the fourth embodiment.

As shown in FIG. 53, the fuel cell system 480 of the presently filed embodiment includes a temperature regulator unit 482 disposed in the air flow passage 22 downstream of the air supply source 20 to effectuate heat exchange between air to be supplied to the fuel cell 402 and coolant water of the cooling system 408. The cooling system 408, serving as the temperature regulator, further includes an air-cooling coolant flow passage 484 to allow coolant water to flow to the temperature regulator unit 482, and a second three-way valve 486 that is able to continuously regulate the flow rate of coolant water to be delivered to the temperature regulator unit 482. The fuel cell system 480 further includes a control section 488 by which the second three-way valve 486 is controlled.

With such a structure, the current sensor 430 measures localized current of the unit cell of the fuel cell 402. And, if localized current is less than the first preset current value $I_1$, then, the control section 488 actuates the second three-way valve 486 so as to increase the flow rate of coolant water to be delivered to the temperature regulator unit 482 for increasing a cooling capacity of the temperature regulator unit 482 to lower the temperature of air to be supplied to the fuel cell 402, thereby increasing relative humidity for facilitating the wetting of the electrolyte membrane (not shown). In contrast, if localized current exceeds the first preset current value $I_1$, then, the control section 488 controls the second three-way valve 486 so as to regulate the flow rate of coolant water to be delivered to the temperature regulator unit 482 such that the temperature of air to be supplied to the fuel cell 402 is restored to a normal level.

Further, if localized current exceeds the second preset current value $I_2$, then, the control section 488 controls the second three-way valve 486 so as to decrease the flow rate of coolant water to be delivered to the temperature regulator unit 482 to lower the cooling capacity of the temperature regulator unit 482, facilitating evaporation of moisture inside the fuel cell 402. On the contrary, if localized current is less than the second preset current value $I_2$, then, the control section 488 controls the second three-way valve 486 so as to regulate the flow rate of coolant water to be delivered by the temperature regulator unit 482 such that the temperature of air to be supplied to the fuel cell 402 is restored to the normal level.

With the structure mentioned above, controlling the temperature of oxidant gas to be supplied to the fuel cell 402 depending on localized current associated with the specified local area of the fuel cell 402 allows the relative humidity of the fuel cell 402 to be controlled so as to lie in an optimum range, resulting in reliable operation to control moisture content of the fuel cell 402 in just proportion. Consequently, the fuel cell system 480 of the presently filed embodiment has the same advantage as that of the tenth embodiment.

Fifteenth Embodiment

Next, a fuel cell system of a fifteenth embodiment according to the present invention and related method are described in detail with reference to FIGS. 54 to 56.

The fuel cell system of the presently filed embodiment is applied to an electric vehicle (fuel cell powered vehicle) adapted to run by a power supply in the form of a fuel cell.

Figure 54:
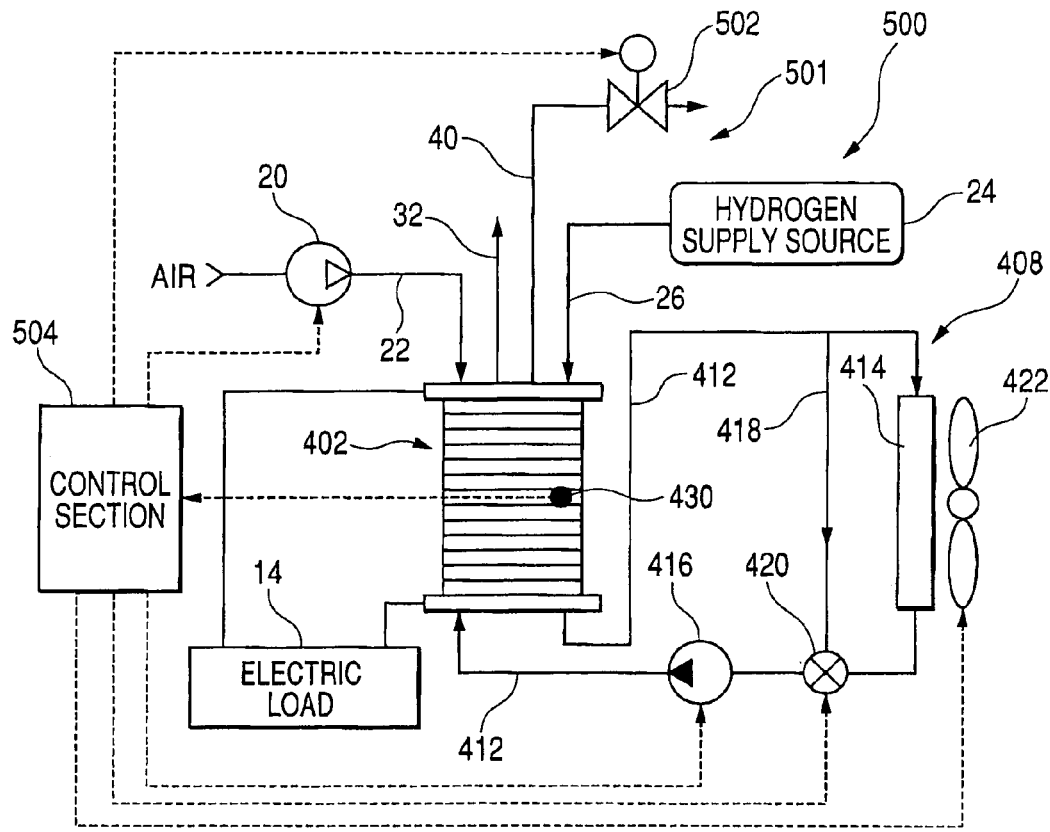
FIG. 54 is a typical view of an overall structure illustrating a fuel cell system of a fifteenth embodiment according to the present invention.

FIG. 54 is a schematic view illustrating an overall structure of the fuel cell system 500 of the fifteenth embodiment according to the present invention, and the same reference numerals as those of the first and tenth embodiments bear like reference numerals to omit redundant description.

As shown in FIG. 54, the fuel cell system 500 of the presently filed embodiment is comprised of the fuel cell 402, a hydrogen supply unit 501 including the hydrogen supply source 24 and a hydrogen exhaust valve 502 disposed in the hydrogen exhaust flow passage 40 to open or close the hydrogen exhaust flow passage 40, the air supply source 20 comprised of the air pump, the cooling system 408 serving as the temperature regulator unit, and a control section 504 for controlling the hydrogen exhaust valve 502 of the hydrogen supply unit 501 so as to vary a hydrogen concentration of the fuel cell 402, the coolant water pump 416, the three-way valve 420 and the fan 422. The hydrogen supply unit 501 is operative to control the hydrogen concentration of the fuel cell 402 depending on localized current representing a hydrogen concentrating characteristic of the fuel cell 402 in a manner as will be described in detail.

The control section 504 includes a controller that is comprised of an electronic control unit (ECU) that includes a microcomputer composed of a CPU, a ROM, a RAM and associated peripheral circuitry.

The fuel cell 402 is identical in structure to the fuel cell 12 of the fuel cell system 10 of the first embodiment and includes a stack of unit cells each of which includes the same MEA as that of the fuel cell 12, the air separator and a hydrogen separator 510 between which the MEA is sandwiched. Therefore, a detailed description of the fuel cell 402 is herein omitted for the sake of simplicity of description.

Figure 55:
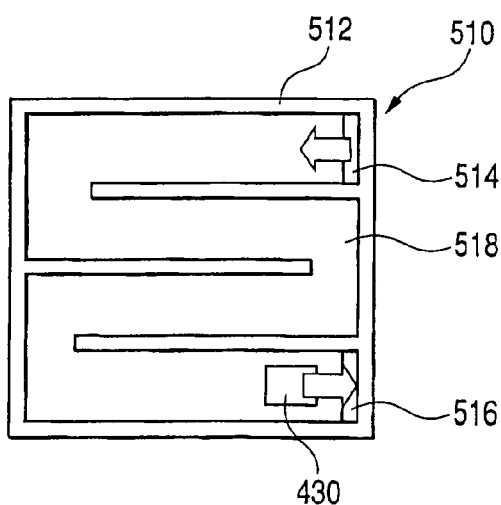
FIG. 55 is a schematic view illustrating a hydrogen separator of a fuel cell shown in FIG. 54.

FIG. 55 shows a schematic structure of the hydrogen separator 510 associated with the MEA (not shown). The hydrogen separator 510 is comprised of a separator body 512 that is formed with a hydrogen inlet portion 514 connected to the hydrogen flow passage 26, a hydrogen outlet portion 516, connected to the hydrogen exhaust flow passage 40, and a hydrogen flow channel 518 in the form of a recess formed between the hydrogen inlet portion 514 and the hydrogen outlet portion 516 to permit a stream of hydrogen to flow from the hydrogen inlet portion 514 to the hydrogen outlet portion 516.

The hydrogen separator 510 is formed in a plate-like configuration and the hydrogen inlet portion 514 and the hydrogen outlet portion 516 thoroughly extends in a direction perpendicular to a plane of the separator body 512. The hydrogen flow channel 518 is recessed in the separator body 512 in a meander pattern.

In the presently filed embodiment, although the current sensor 430 is schematically shown in FIG. 55 as disposed in a local area of the separator body 512 at a position near the hydrogen outlet portion 516, it will be appreciated that the current sensor 430 is actually mounted on a local area of the fuel cell 402, indicative of a hydrogen concentrating characteristic, where a shortage of hydrogen is apt to take place, i.e., at a position close proximity to the hydrogen outlet portion 516 of the hydrogen separator 510.

By the way, due to the presence of nitrogen or steam permeating through the positive electrode (oxidant electrode), a hydrogen concentration decreases in the hydrogen flow channel 518 especially at a local area close proximity to the hydrogen outlet portion 516. Therefore, in the presently filed embodiment, the current sensor 430 is mounted on the fuel cell 402 in a specified local area, indicative of the hydrogen concentrating characteristic, where the shortage of hydrogen is apt to take place, i.e., at a position corresponding to the hydrogen outlet portion 516 of the hydrogen separator 512 to measure localized current representing the hydrogen concentrating characteristic of the fuel cell 402. Also, it will be appreciated that the hydrogen flow channel 518 corresponds to a fuel gas flow passage and the current sensor 430 corresponds to a current measuring device.

Now, a basic sequence of operations of the fuel cell system 500 and related method are described with reference to FIG. 56 and FIGS. 57A and 57B. FIG. 56 is a flowchart illustrating a basic sequence of operations to control an operating condition of the fuel cell 402, among control operations, to be executed by the control section 504 such that the hydrogen concentration is regulated depending on localized current of the unit cell. Also, FIGS. 57A and 57B show graphs illustrating the relationship between a localized current value associated with the hydrogen outlet portion and an exhaust rate of hydrogen.

First in step S200, the current sensor 430 measures localized current of the unit cell at the local section thereof close proximity to the hydrogen outlet portion 516, and discrimination is made in succeeding step S202 to find whether localized current is less than a given current $I_o$ (see FIG. 57A).

If in step S202, localized current representing the hydrogen concentrating characteristic is less than the given current $I_o$, then, it is estimated that the shortage of hydrogen takes place in the specified local area near the hydrogen outlet portion 516. Therefore, under such a situation, in succeeding step S204, the control section 504 opens the hydrogen exhaust valve 502 to cause nitrogen and steam, remaining in the hydrogen outlet portion 516, to be discharged together with unreacted hydrogen to the outside of the system.

This allows residual nitrogen and steam to be expelled with a resultant increase in the hydrogen concentration, resulting in an increase in localized current associated with the hydrogen outlet portion 516.

On the contrary, if in step S202, localized current exceeds the given current $I_o$, it is estimated that a requisite minimum amount of hydrogen is enhanced in the hydrogen outlet portion 516 of the unit cell 402 and, hence, in subsequent step S206, the control section 504 closes the hydrogen exhaust valve 502 to interrupt unreacted hydrogen from being expelled. Thus, exhaust hydrogen is expelled to the atmosphere in intermittent phases As shown in FIG. 57B. Upon execution of a series of these operations, the requisite minimum amount of hydrogen is enhanced in the hydrogen outlet portion 516 and the amount of unreacted hydrogen being discharged is minimized, resulting in a balance between anti-deterioration of the electrode and prevention of deterioration in efficiency.

As set for the above, with the fuel cell system 500 of the presently filed embodiment, due to the provision of the control section 504 executing control such that if localized current associated with the hydrogen outlet portion 516 of the unit cell 402 is less than the given current $I_o$, unreacted hydrogen, etc. are expelled to the outside of the system to increase the hydrogen concentration in the unit cell 402 whereas if localized current associated with the hydrogen outlet portion 516 of the unit cell exceeds the given current $I_o$, the discharging of unreacted hydrogen, etc. are interrupted, the occurrence of the shortage in hydrogen in the unit cell of the fuel cell can be effectively avoided, while minimizing the amount of unreacted hydrogen to be exhausted as less as possible.

While the fuel cell system 500 of the presently filed embodiment has been set forth above in conjunction with an exemplary structure in which the hydrogen exhaust valve 502, disposed in the hydrogen exhaust flow passage 40, is fully opened or fully closed, no limitation is intended to such a particular structure and an alternative may include a structure that includes a hydrogen exhaust valve of the type whose opening degree is variably regulated to control the amount of unreacted hydrogen, etc. to be exhausted.

In such a structure, the hydrogen exhaust valve 502 may be regulated such that when localized current associated with the hydrogen outlet portion 516 of the unit cell exceeds the given current $I_o$, the opening degree of the hydrogen exhaust valve is slightly increased to allow unreacted hydrogen, etc. to be expelled to the outside of the system at a low flow rate whereas when localized current associated with the hydrogen outlet portion 516 of the unit cell is less than the given current $I_o$, the opening degree of the hydrogen exhaust valve is increased to allow unreacted hydrogen, etc. to be expelled to the outside of the system at a flow rate higher than that when localized current exceeds the given current $I_o$. This results in success for the hydrogen outlet portion of the unit cell to avoid a shortage of hydrogen, providing highly increased reliability in operation of the fuel cell system 500.

Sixteenth Embodiment

A fuel cell system of a sixteenth embodiment according to the present invention and related method are described below with reference to FIG. 58.

The fuel cell system 520 of the presently filed embodiment differs from the fuel cell system 500 of the fifteenth embodiment in that in the fifteenth embodiment, the fuel cell system 500 employs a non-circulation type structure wherein unreacted hydrogen, etc., which are not used for reaction in the fuel cell 402, are expelled to the outside of the system through the hydrogen exhaust flow passage 40 and in the presently filed embodiment, the hydrogen supply unit 501 of the fuel cell system 520 employs a circulation type structure wherein unreacted hydrogen, etc., which are not used for reaction in the fuel cell, are circulated to the hydrogen flow passage 26 through a fuel gas circulation passage 522.

Figure 58:
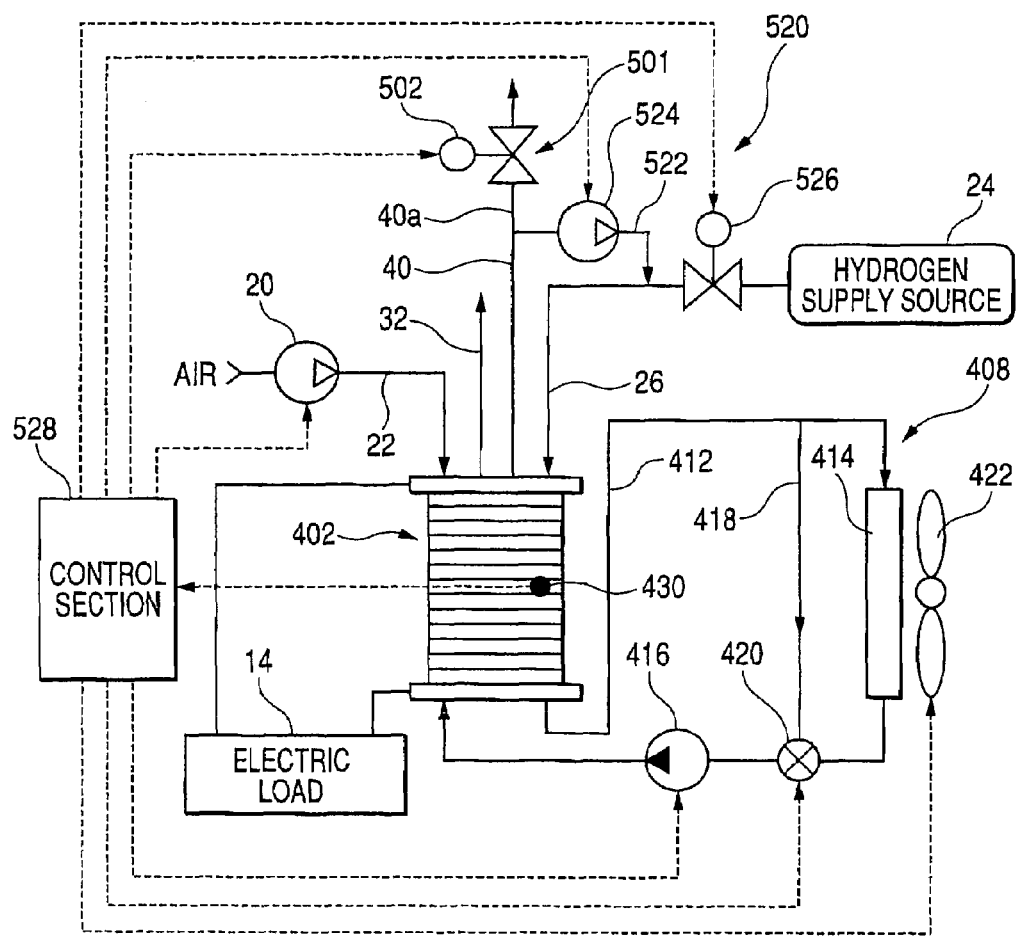
FIG. 58 is a typical view of an overall structure illustrating a fuel cell system of a sixteenth embodiment according to the present invention.

FIG. 58 is a schematic view illustrating an overall structure of the fuel cell system 520 of the presently filed embodiment according to the present invention, and the same component parts as those of the fifteenth embodiment bear like reference numerals to omit redundant description.

As shown in FIG. 58, the fuel cell system 520 of the presently filed embodiment is additionally comprised of the hydrogen circulation flow passage 522 coupled between the hydrogen flow passage 26 and the fuel gas exhaust passage 40, a hydrogen circulation pump 524 disposed in the hydrogen circulation flow passage 522 to circulate unreacted hydrogen, etc., under pressure to the hydrogen flow passage 26. The fuel gas exhaust passage 40 has a branch-off passage 40a branched off from the hydrogen circulation flow passage 522, and the hydrogen exhaust valve 502 is disposed in the branch-off passage 40a. Also, the hydrogen circulation flow passage 522 corresponds to a circulation flow passage of the presently filed embodiment, and the hydrogen exhaust valve 502 corresponds to an exhaust valve of the presently filed embodiment. A hydrogen flow control valve 526 is disposed in the hydrogen flow passage 26 upstream of a junction between the hydrogen flow passage 26 and the hydrogen circulation flow passage 522.

As shown in FIG. 58, the fuel cell system 520 further includes a control section 528 comprised of a controller that responds to localized current of the unit cell 402 to generate control signals that are delivered to the air pump 20, the coolant water pump 416, the three-way valve 420, the fan 422, the hydrogen exhaust valve 502, the hydrogen circulation pump 524 and the hydrogen flow control valve 526.

With the structure mentioned above, in operation, the current sensor 430 measures localized current of the unit cell 402 at the specified local area thereof close proximity to the hydrogen outlet portion 516 (see FIG. 55), and discrimination is made to find whether localized current is less than a given current $I_o$.

If localized current is less than the given current $I_o$, then, the control section 528 opens the hydrogen exhaust valve 502 to cause nitrogen and steam, remaining in the hydrogen outlet portion 516 of the unit cell, to be discharged together with unreacted hydrogen to the outside of the system. This allows residual nitrogen and steam to be expelled with a resultant increase in the hydrogen concentration, resulting in an increase in localized current associated with the hydrogen outlet portion 516.

On the contrary, if localized current exceeds the given current $I_o$, the control section 528 closes the hydrogen exhaust valve 502 to interrupt unreacted hydrogen, etc., from being expelled to the outside. When this takes place, the hydrogen circulation pump 524 is activated by the control section 528 to allow unreacted hydrogen to be circulated through the circulation passage 522 and the hydrogen flow passage 26 to the fuel cell 420 for reuse.

Upon execution of a series of these operations, the requisite minimum amount of hydrogen is enhanced in the hydrogen outlet portion 516 and the amount of unreacted hydrogen being discharged is minimized, resulting in a balance between anti-deterioration of the electrode and prevention of deterioration in efficiency. Thus, the fuel cell system 520 of the presently filed embodiment has the same advantage as that of the fifteenth embodiment.

While the fuel cell system 520 of the presently filed embodiment has been described in conjunction with an exemplary structure wherein if localized current is less than the given current $I_o$ the hydrogen exhaust valve 502 is opened to increase the hydrogen concentration in the hydrogen outlet portion 516 of the unit cell 402, no limitation is intended in such particular application.

An alternative may include a structure wherein if localized current exceeds the given current $I_o$, the control section 528 drives the hydrogen circulation pump 524 at a low speed to circulate unreacted hydrogen, etc., to the unit cell 402 at a low flow rate and if localized current is less than the given current $I_o$, the control section 528 drives the hydrogen circulation pump 524 at an increased rotational speed to circulate unreacted hydrogen, etc., to the fuel cell 402 at a flow rate higher than that when localized current exceeds the given current $I_o$, for thereby causing nitrogen and steam, remaining in the hydrogen outlet portion 516, to be surely circulated to the unit cell 402 for thereby increasing the hydrogen concentration in the hydrogen outlet portion 516 of the unit cell 402.

In another alternative, the fuel cell system 520 may take a structure wherein if localized current exceeds the given current $I_o$, the control section 528 interrupts the operation of the hydrogen circulation pump 524 to preclude unreacted hydrogen, etc. to be circulated to the unit cell 402 whereas when localized current is less than the given current $I_o$, the control section 528 drives the hydrogen circulation pump 524 at the increased speed to circulate unreacted hydrogen, etc. to the unit cell 402 to cause nitrogen and steam, remaining in the hydrogen outlet portion 516, to be circulated to the unit cell 402 for thereby increasing the hydrogen concentration in the hydrogen outlet portion 516 of the unit cell 402.

Also, the hydrogen circulation pump 524 may include a compressor or an ejector pump, etc. In this connection, the ejector pump is comprised of a kinetic momentum transfer pump that transfers fluid through energy exchange action exerted by actuating fluid ejecting at a high speed and, in particular, has a structure that utilizes fluid energy of hydrogen supplied from the hydrogen supply source 24 to draw unreacted hydrogen, etc., to cause the same to be circulated.

Seventeenth Embodiment

A current measuring device of a seventeenth embodiment according to the present invention for use in a fuel cell system is described below in detail with reference to FIGS. 59 to 64.

Figure 59:
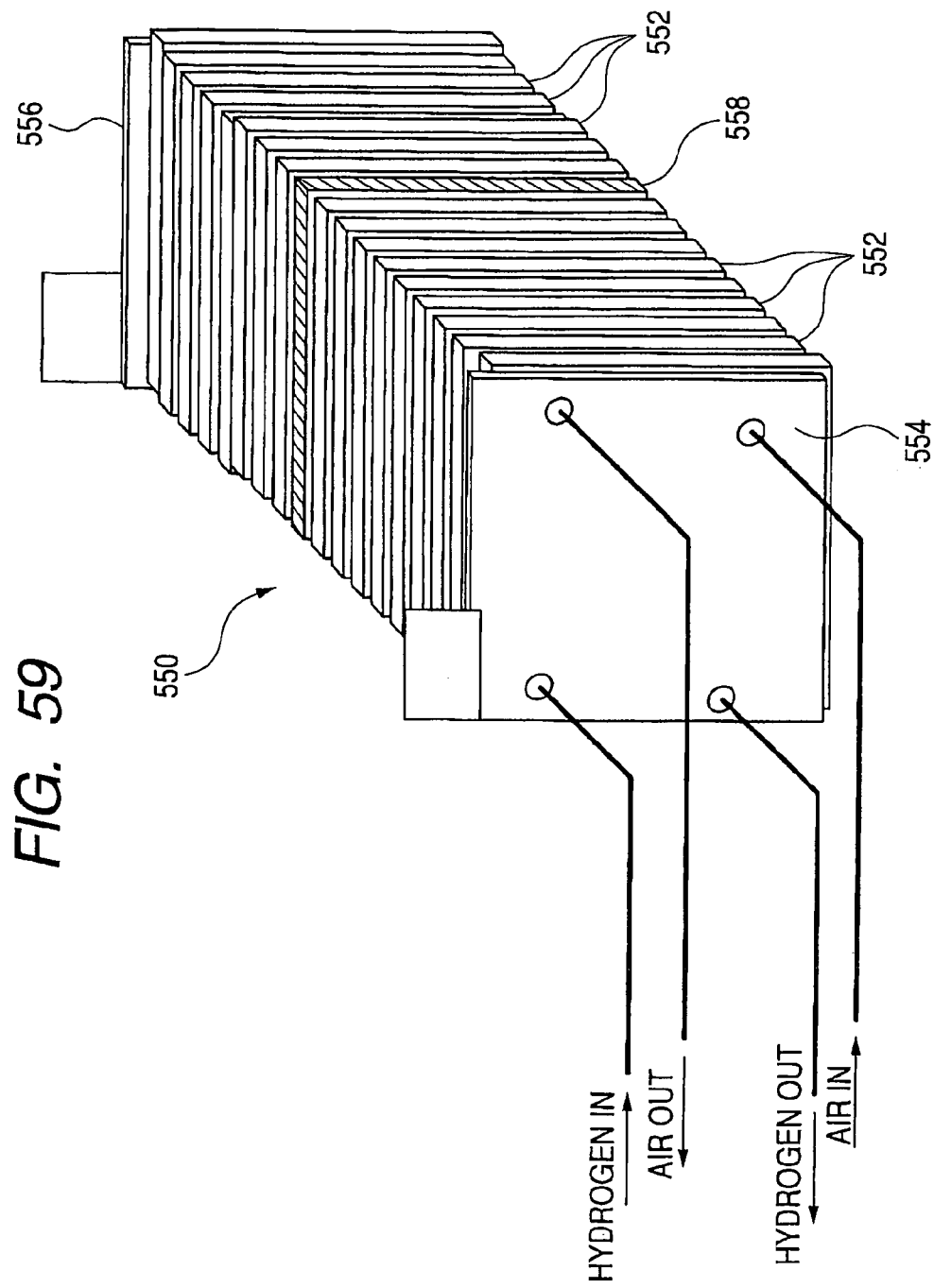
FIG. 59 is a perspective view of a fuel cell installed with a current measuring device of a seventeenth embodiment according to the present invention.
Figure 60:
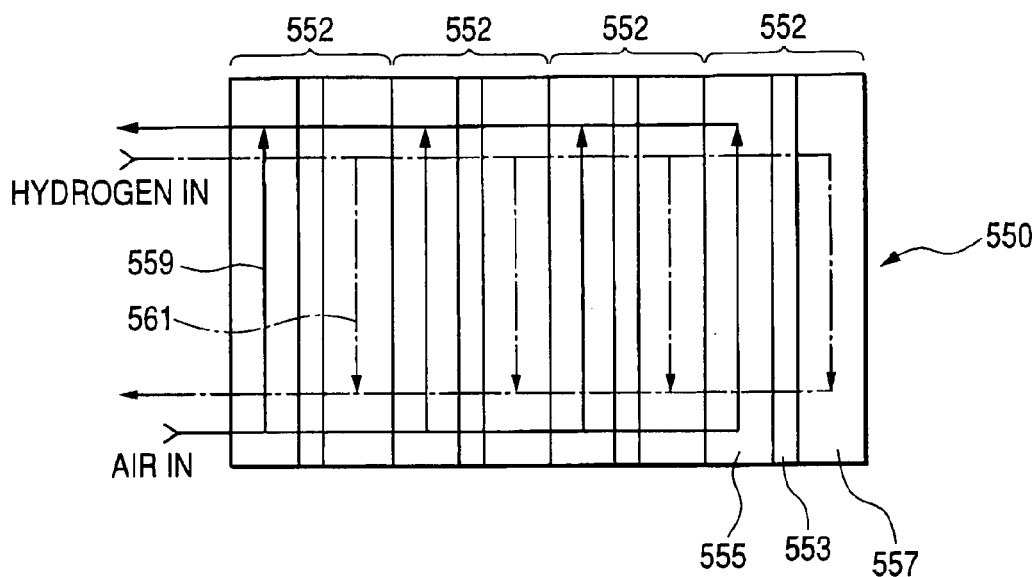
FIG. 60 is a schematic side view of the fuel cell shown in FIG. 59.
Figure 61:
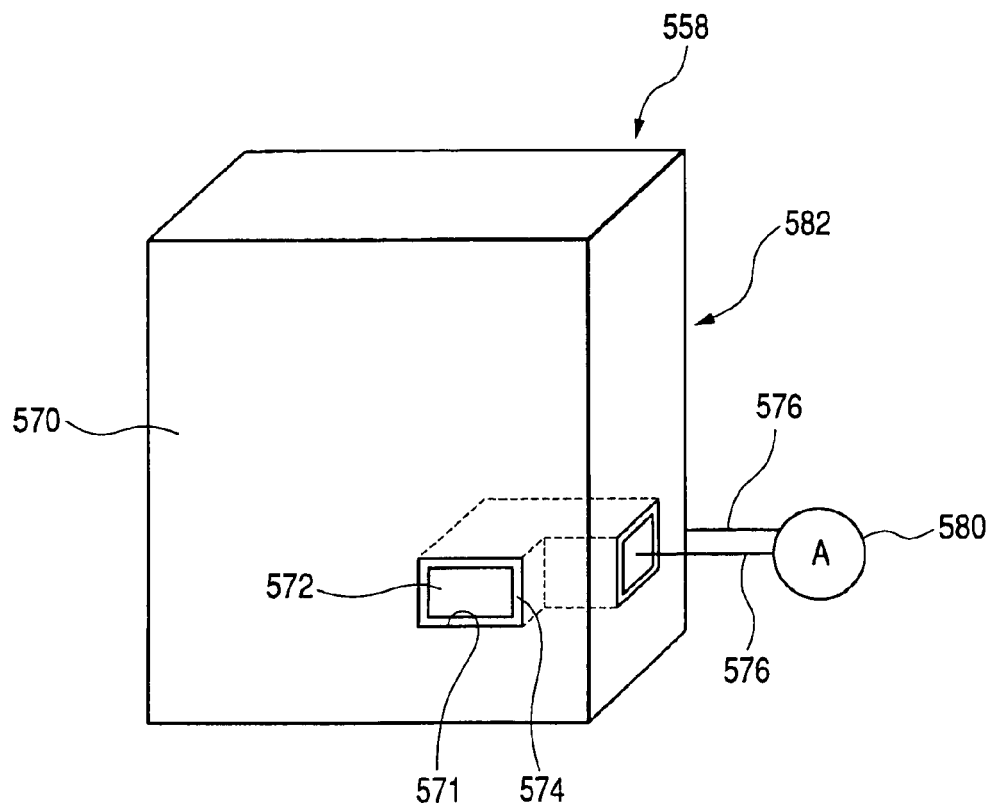
FIG. 61 is a perspective view of the current measuring device shown in FIG. 59.
Figure 63:
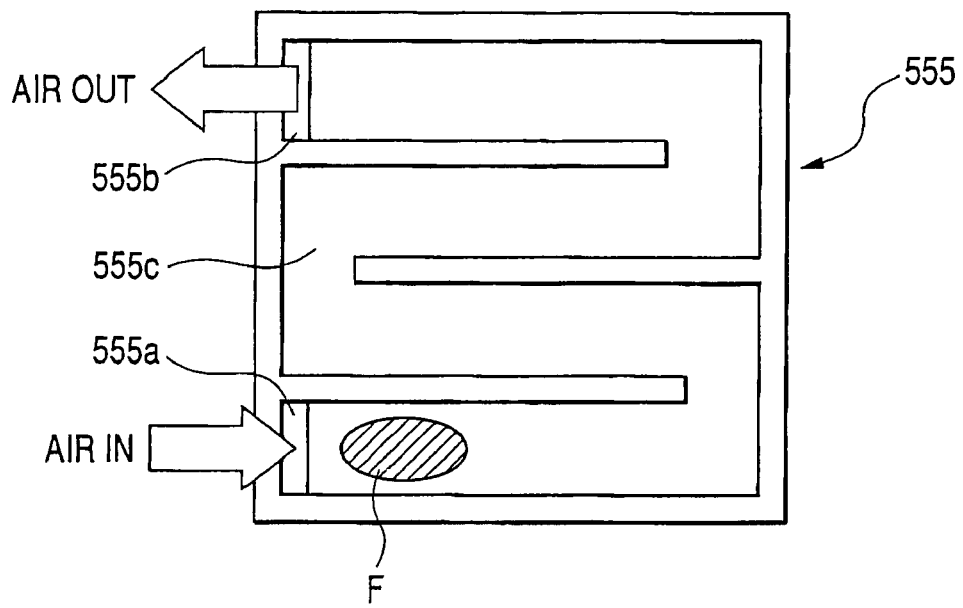
FIG. 63 is a transparent view of an air separator shown in FIG. 60.
Figure 64:
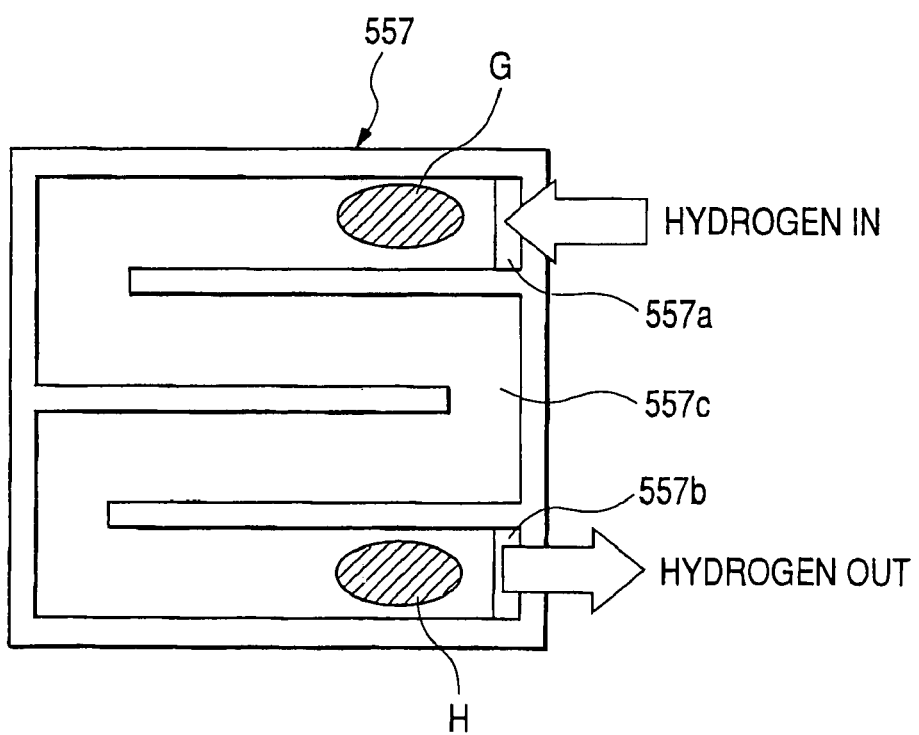
FIG. 64 is a transparent view of a hydrogen separator shown in FIG. 60.

FIG. 59 is a perspective view illustrating a fuel cell, as one example of a power unit, incorporating the current measuring device of the presently filed embodiment; FIG. 60 is a schematic side view of the fuel cell shown in FIG. 59; FIG. 61 is a perspective view of the current measuring device shown in FIG. 59; FIG. 62A is a front view of the current measuring device; FIG. 62B is a right side view of the current measuring device; FIG. 62C is a cross sectional view taken on line A3-A3 of FIG. 62A; FIG. 62D is a cross sectional view taken on line B1-B1 of FIG. 62A; FIG. 63 is a transparent view of an air separator of the fuel cell shown in FIG. 60; and FIG. 64 is a transparent view of a hydrogen separator shown in FIG. 60.

Although the current measuring device of the presently filed embodiment is comprised of a plurality of current sensors, only one current sensor is shown as incorporated in the current measuring device shown in FIG. 61 and FIGS. 62A to 62D.

As shown in FIG. 59, the fuel cell 550 includes a solid polymer electrolyte fuel cell and is comprised of a stack of unit cells 552 connected in series. As shown in FIG. 60, each of the unit cells 552 includes an MEA (Membrane Electrode Assembly: Electrolyte and Electrode Complex body) 553, and an air separator 555 and a hydrogen separator 557 between which the MEA 553 is sandwiched. The MEA 654 is comprised of an electrolyte membrane, an air electrode (oxygen electrode) formed on one surface of the electrolyte membrane, and a hydrogen electrode (fuel electrode) formed on the other surface of the electrolyte membrane.

The separators 555, 557 are each formed of a plate-like member made of carbon material or electrically conductive metal. The fuel cell 550 also has terminal plates 554 and 556 that are disposed on both sides of the stack 550 to take out power output therefrom. And, the current measuring device 558 is placed between adjacent unit cells 552, 552.

As shown in FIG. 59, the fuel cell 550 is supplied with air and hydrogen. As indicated by a solid line in FIG. 60, the air separator 555 has an air flow passage 559 to distribute oxygen to the surfaces of the air electrodes, and As shown by an arrow in a solid line in FIG. 60, oxygen is supplied to the respective unit cells 552 in parallel by means of the air flow passage 559. Likewise, the hydrogen separator 557 has a hydrogen flow passage 561 to distribute hydrogen to the surfaces of the fuel electrodes, and As shown by an arrow in phantom line in FIG. 60, hydrogen is supplied to the respective unit cells 552 in parallel by means of the hydrogen flow passage 561. In order to maintain the electrolyte membrane in an appropriately wetted condition, streams of air and hydrogen to be supplied to the fuel cell 550 are humidified by the humidifying device in a manner as previously described.

As shown in FIG. 61 and FIGS. 62A to 62D, the current measuring device 558 is comprised of a plate-like electrical conductor 570, made of electrically conductive metal, which is formed with a recessed portion 571 having one end exposed to a front face and the other end exposed to a side face of the electrically conductive metal body 570, and a current conductor 572 which is made of electrically conductive metal and serves as a localized current flow path and which extends through the recessed portion 571 of the electrical conductor 570. The current conductor 572 has one end exposed to the front face of the electrically conductive metal body 570 and the other end exposed to the side face of the electrically conductive metal body 570.

The current measuring device 558 further includes an electrically insulating layer 574 disposed inside the recessed portion 571 to provide electrical insulation between the electrical conductor 570 and The current conductor 572, an outside wiring lead 576 extending outward from the electrical conductor 570 and The current conductor 572 to provide electrical connection between the electrical conductor 570 and The current conductor 572 in a detoured area outside of the unit cell 552, and a current sensor 580 disposed in the outside wiring lead 576 to detect localized current flowing therethrough.

A plate member 582, comprised of the electrical conductor 570, The current conductor 572 and the electrically insulating layer 574, is interposed between the two unit cells 552, 552 (see FIG. 59). Under such a situation, both end faces 570a, 570b, facing a stack direction of the unit cells, of the electrical conductor 570 are held in electrical contact with the adjacent unit cells 552, 552.

The current conductor 572 has one exposed end face 572a that is exposed in alignment with the one end face 570a of the electrical conductor 570 to be held in electrical contact with one associated unit cell 552 and the other exposed end face 572b that is exposed to the side face 570c of the electrical conductor 570 not to be held in electrical contact with the unit cell 552.

The side face 570c of the electrical conductor 570 and the other exposed end face 572b of The current conductor 572 are electrically connected to one another through the outside wire lead 576 to pass localized current, which is detected by the current sensor 580.

With the structure set forth above, discharging current delivered from the fuel cell 550 is diverged when passing across the current measuring device 558. That is, discharging current delivered from one unit cell 552 and flowing through the one end face 570a, held in contact with the one unit cell 552, of the electrical conductor 570 to the other unit cell 552 held in electrical contact with the other end face 570b of the electrical conductor 570 is divided into main electric current flowing only through the electrical conductor 570 and an auxiliary current flowing through The current conductor 572, the outside wire lead 576 and the electrical conductor 570.

Localized current flows from the one exposed end face 572a, placed on the associated unit cell 552 in face-to-face relationship, into The current conductor 572 and the outside wire lead 576, thereby enabling the current sensor 580 to measure localized current of the unit cell 552.

FIG. 63 is a transparent view of the air separator 555 as viewed from a right side in FIG. 60. As shown in FIG. 63, the air separator 555 has an air inlet portion 555a adapted to be connected to the air flow passage 559 of the fuel cell 550, an air outlet portion 555b adapted to be connected to the air flow passage 559 of the fuel cell 550, and an air flow channel 555c formed between the air inlet portion 555a and the air outlet portion 555c to pass air therethrough. Also, the air separator 555 corresponds to a first separator of the present invention; the air flow channel 555c corresponds to an oxidant gas flow passage; the air inlet portion 555a corresponds to an oxidant gas inlet portion; and the air outlet portion 555c corresponds to an oxidant gas outlet portion.

FIG. 64 is a transparent view of the hydrogen separator 557 as viewed from a right side in FIG. 60. As shown in FIG. 64, the hydrogen separator 557 has a hydrogen inlet portion 557a adapted to be connected to the hydrogen flow passage 561 of the fuel cell 550, a hydrogen outlet portion 557b adapted to be connected to the hydrogen flow passage 561 of the fuel cell 550, and a hydrogen flow channel 557c formed between the hydrogen inlet portion 557a and the hydrogen outlet portion 557c to pass hydrogen therethrough. Also, the hydrogen separator 557 corresponds to a second separator of the present invention; the hydrogen flow channel 557c corresponds to a fuel gas flow passage; the hydrogen inlet portion 557a corresponds to a fuel gas inlet portion; and the hydrogen outlet portion 557c corresponds to a fuel gas outlet portion.

The current conductor 572, the insulation layer 574, the outside wire lead 576 and the current sensor 580 shown in FIG. 61 and FIGS. 62A to 62D are disposed in a specified local area at which localized current of the fuel cell 550 needs to be measured. In particular, The current conductor 572, the insulation layer 574, the outside wire lead 576 and the current sensor 580 are disposed in the current measuring device 558 at a first area close proximity to the air inlet portion 555a (an area F indicated in a hatched portion in FIG. 63), a second area close proximity to the hydrogen inlet portion 557a (an area G indicated by a hatched portion in FIG. 64) and a third area close proximity to the hydrogen outlet portion 557b (an area H indicated by a hatched portion in FIG. 64).

As the rate of humidifying air to be supplied to the fuel cell 550 decreases, the local area, closer to the air inlet portion 555a, of the electrolyte membrane 555 is dried. As shown in FIG. 7 related to the first embodiment, as the humidity $\Psi a$ of air decreases, the electrolyte membrane is dried at the local area, close proximity to the air inlet portion 555a, at which proton conducting resistance increases to cause a drop in electric current.

Similarly, as the rate of humidifying hydrogen to be supplied to the fuel cell 550 decreases, the local area, closer to the hydrogen inlet portion 557a, of the electrolyte membrane 555 is dried. Proton conducting resistance increases at the dried area of the electrolyte membrane, causing a drop in electric current. Also, electric current of the dried area resulting from the electrolyte membrane being dried due to reduction in the rate of humidifying hydrogen varies in the same manner as electric current, shown in FIG. 7, which decreases with the decrease in humidity Ψa.

Thus, by measuring electric currents I, i.e., air inlet current Ia·In and hydrogen inlet current Ih·in, close proximity to the air inlet portion 555a and the hydrogen inlet portion 557a, where the electrolyte membrane is apt to be dried, it becomes possible to diagnose a dried status of the electrolyte membrane of the fuel cell 550. More particularly, air inlet current Ia·In and hydrogen inlet current Ih·in are less than a given current value, it can be estimated that a dried state exists in the electrolyte membrane. Also, the given current value may be set to a value equal to 90% of a current value with no occurrence of dried status.

On the contrary, if the rates of humidifying air and hydrogen remain in excess, the electrode undergoes a wet condition in excess moisture content. When this takes place, liquid droplets mostly collect at the area in the vicinity of the hydrogen outlet portion 557b to cause excess moisture content to occur and, thus, the presence of excess moisture content becomes noticeable at the area close proximity to the hydrogen outlet portion 557b. The reason why the area close proximity to the hydrogen outlet portion 557b resides in a fact that water is transferred from the hydrogen inlet portion 557a through the hydrogen flow channel 557c and, in addition, hydrogen is consumed with a resultant decrease in the flow rate of hydrogen to cause a drop in a capacity of expelling water droplets. FIG. 8 shows variation in localized current I at the local area, subjected to an excess moisture condition, of the electrode in cases where with the increase in a volume of water droplets Vw collected at the hydrogen outlet portion, the electrode suffers from the excess moisture condition. Thus, as the volume of water droplets increases, the permeation of gas is disturbed, causing a drop in power output of the fuel cell 550.

Further, if the flow rate of hydrogen to be supplied to the fuel cell 550 is insufficient, also, since the shortage of hydrogen occurs at the area in the vicinity of the hydrogen outlet portion 557b, a drop occurs in electric current at the area in the vicinity of the hydrogen outlet portion 557b of the MEA 553 As shown in FIG. 9 related to the first embodiment. As shown in FIG. 9, when the shortage of hydrogen takes place, electric current I at the area close proximity to the hydrogen outlet portion immediately and rapidly drops.

From such a phenomenon, it can be estimated that if electric current, i.e., hydrogen outlet current Ih·out, at the area of the MEA 553 closer to the hydrogen outlet portion 557b, is less than the given current value, then, the excess moisture condition or the shortage of hydrogen occur in the fuel cell 550. Also, the given current value may be set to a value equal to 90% of a current value with the electrolyte membrane remaining in the excess moisture condition and in the shortage of hydrogen.

Here, during the occurrence of the excess moisture condition and the shortage of hydrogen, electric current I at the area close proximity to the hydrogen outlet portion 557b decreases in any case, and there is a need for specifying what is a cause for factors of the drop in electric current.

Electric current I, associated with the local area close proximity to the hydrogen outlet portion 557b, varies in a manner As shown in the graph of FIG. 10 related to the first embodiment during the occurrence of the shortage of hydrogen. Also, electric current I, associated with the local area close proximity to the hydrogen outlet portion 557b, varies at the current drop speed in a manner As shown in the graph of FIG. 11 related to the first embodiment during the occurrences of the excess moisture condition and the shortage of hydrogen. Here, the term "current drop speed" is meant the absolute value of the amount of current variation per unit time. In FIGS. 10 and 11, the solid lines indicate the characteristics during the occurrence of the excess moisture condition, the broken lines indicate the characteristics during the occurrence of the shortage of hydrogen, and t1 designate time at which excess moisture content and the shortage of hydrogen take place.

As shown in FIGS. 10 and 11, upon comparison between electric currents generated during the occurrences of the excess moisture condition and the shortage of hydrogen, electric current I rapidly drops during the occurrence of the shortage of hydrogen. Thus, it becomes possible to specify the factors for the drop in electric current I by using the current drop speed at which electric current drops during the occurrence of the shortage of hydrogen. In particular, when hydrogen outlet current Ih·out is less than the given current value and the current drop speed is less than the given drop speed dI1 (see FIG. 11), it can be estimated that excess moisture content has occurred in the MEA 553. Likewise, when hydrogen outlet current Ih·out is less than the given current value and the current drop speed exceeds the given drop speed dI1, it can be estimated that the shortage of hydrogen has occurred in the MEA 553. Also, the given current drop speed dI1 is set to the value of approximately 1.0 (mA/SEC/cm$^2$).

Next, description is made of a method of diagnosing the output drop factors of the fuel cell 550 using the current measuring device 558.

First, the current sensor 580 mounted onto the MEA 553 at the area in the vicinity of the air inlet portion 555a measures air inlet current Ia·In. This localized current is compared with the given current value and if air inlet current Ia·In is less than the given current value, diagnosis can be made that the electrolyte membrane has the dried area. In contrast, if air inlet current Ia·In exceeds the given current value, diagnosis can be made that the electrolyte membrane has no dried area. Thus, in the presence of diagnosis in that the electrolyte membrane has the dried area, it can be estimated that the humidity Ψa of air to be supplied to the fuel cell 550 remainst at the low level, and the humidifier may be actuated so as to increase the rate of humidifying air to be supplied to the fuel cell 550.

Next, the current sensor 580 mounted onto the MEA 553 at the area in the vicinity of the hydrogen inlet portion 557a measures hydrogen inlet current Ih·In. This localized current is compared with the given current value and if hydrogen inlet current Ih·in is less than the given current value, diagnosis can made that the electrolyte membrane has the dried area. In contrast, if hydrogen inlet current Ih·in exceeds the given current value, diagnosis can be made that the electrolyte membrane has no dried area. Thus, in the presence of diagnosis in that the electrolyte membrane has the dried area, it can be estimated that the humidity 4a of air to be supplied to the fuel cell 550 remainst at the low level, and the humidifier may be actuated so as to increase the rate of humidifying hydrogen to be supplied to the fuel cell 550.

Then, the current sensor 580 mounted onto the MEA 553 at the area in the vicinity of the hydrogen outlet portion 557b measures hydrogen outlet current Ih·out. This localized current is compared with the given current value and if hydrogen outlet current Ih·out exceeds the given current value, diagnosis can be made that no excess moisture content or no shortage of hydrogen take place in the electrolyte membrane. In contrast, if hydrogen outlet current Ih·out is less than the given current value and the current drop speed of hydrogen outlet current Ih·out is less than the given drop speed, diagnosis can be made that the electrode encounters excess moisture condition. Thus, in the presence of diagnosis in that the electrode remains in the excess moisture condition, it can be estimated that the rates of humidifying air and hydrogen remain in excess or that a drop occurs in expelling water droplets due to reduction in the flow rate of hydrogen, and the operation may be executed to decrease the rates of humidifying and hydrogen to be supplied to the fuel cell 550 while increasing the hydrogen flow rate.

Further, if hydrogen outlet current Ih·out is less than the given current value and the current drop speed of hydrogen outlet current Ih·out exceeds the given drop speed, diagnosis can be made that the electrode encounters the shortage of hydrogen. Thus, when the hydrogen flow rate is diagnosed to be in shortage, the hydrogen flow rate may be increased.

With the structure of the presently filed embodiment set forth above, the provision of the current measuring device 558 that is able to measure localized current of the fuel cell 550 allows diagnosis to be made for the dried status of the electrolyte membrane depending on air inlet current Ia·In and hydrogen inlet current Ih·in, enabling diagnosis for the occurrence of excess moisture content or the occurrence of the shortage of hydrogen of the electrode depending on the current drop speed of air outlet current Ia·out and hydrogen outlet current Ih·out. This enables the output drop factors of the fuel cell 550 to be accurately diagnosed. In addition, the output drop factors of the fuel cell 550 can be specified and, accordingly, it becomes possible to appropriately control the fuel cell 550 depending on the output drop factors.

For instance, in the event of the shortage of hydrogen to be supplied to the unit 552, a current density of the local area close proximity to the hydrogen outlet portion 557b extremely drops. If the fuel cell 550 is caused to operate in the shortage of hydrogen, then, damages occur to the electrode of the MEA 553 and, hence, such a situation needs to be immediately detected to allow the fuel cell 550 to be controlled in a way to avoid the occurrence of defect. To this end, by using the current measuring device 558 to measure localized current at the specified local area, close proximity to the hydrogen outlet portion 557b, to find variation of localized current in terms of time, it become possible to diagnose a supply state of hydrogen that deems to be difficult to be detected only with the use of the cell voltage. Depending on such measurement, controlling the supply state of hydrogen makes it possible to minimize the operating condition with a probability of deterioration as less as possible.

Further, with the current measuring device 558 of the presently filed embodiment, since the current sensor 580 is disposed outside the electrical conductor 570, no interference occurs between the current sensor 558 and the electrical conductor 570. Consequently, the electrical conductor 570 can be interposed between the adjacent unit cells 552, 552. For this reason, a single piece of or plural current measuring devices 558 may be disposed in arbitrary positions of the fuel cell 550.

For instance, the unit cell 552 in the vicinity of a center of the fuel cell 550 is hard to radiate heat with a resultant increase in temperature of the fuel cell 550 and, therefore, the central area of the unit cell 552 is dried faster than that closer to terminal ends of the fuel cell 550. Accordingly, locating the current measuring device 558 in the area close proximity to the center portion of the fuel cell 550 enables the dried status of the fuel cell 550 to be appropriately diagnosed. Also, the unit cell 552 closer to the distal end of the fuel cell 550 is apt to radiate heat with a resultant decrease in temperature of the fuel cell 550, providing a tendency of the occurrence in excess moisture content. Therefore, locating the current measuring device 558 in the area close proximity to the distal end of the fuel cell 550 enables the presence of the excess moisture condition of the fuel cell 550 to be accurately diagnosed.

While the current measuring device of the presently filed embodiment has been described with reference to the fuel cell of the solid polymer electrolyte membrane type, no limitation is intended to such application and may have application to a fuel cell including an electrolyte made of non-organic material.

Eighteenth Embodiment

A current measuring device 600 of an eighteenth embodiment of the presently filed embodiment is described below with reference to FIG. 65 and FIGS. 66A and 66B.

Figure 65:
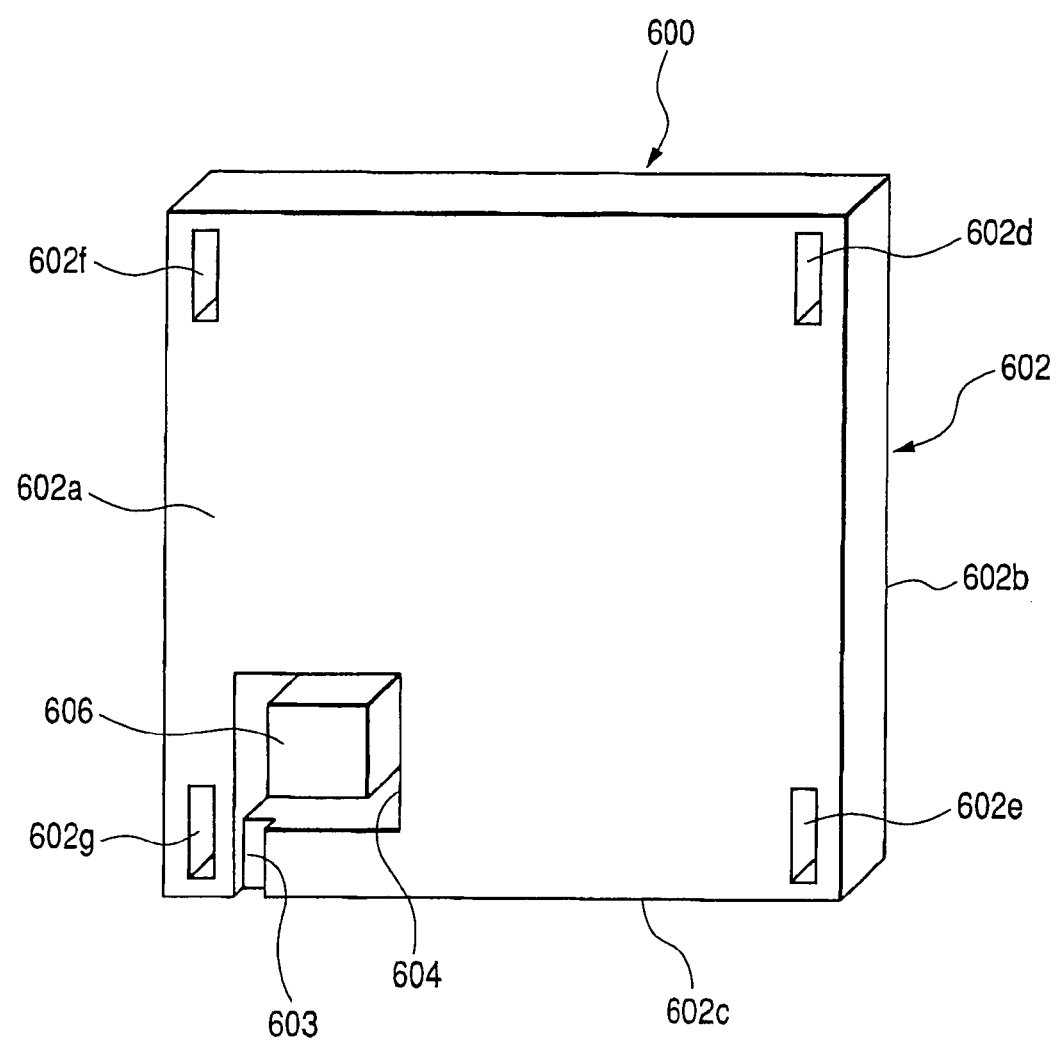
FIG. 65 is a perspective view of a current measuring device of an eighteenth embodiment according to the present invention.
Figure 66A:
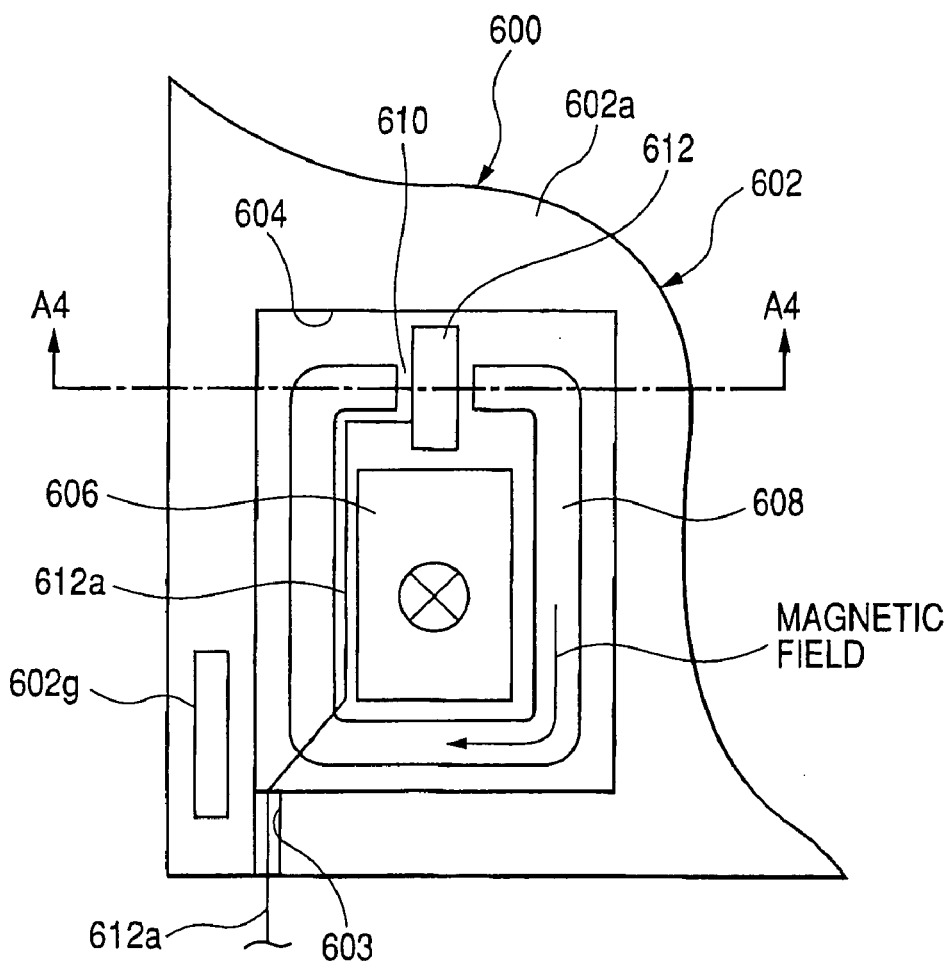
FIG. 66A is an enlarged front view illustrating an essential part of the current measuring device shown in FIG. 65.
Figure 66B:
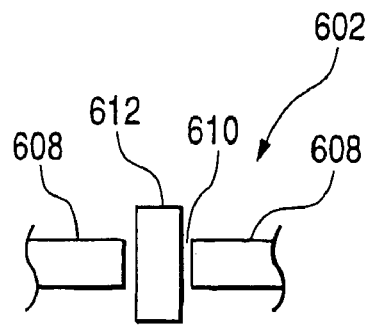
FIG. 66B is a cross sectional view taken on line A4-A4 of FIG. 66A.

FIG. 65 is a perspective view of the current measuring device 600 of the presently filed embodiment, FIG. 66A is a front view of an essential part of the current measuring device 600 shown in FIG. 65, and FIG. 66B is a cross sectional representation taken on line A4-A4 of FIG. 66a.

The current measuring device 600 of the presently filed embodiment differs from that of the seventeenth embodiment in that in the seventeenth embodiment, the current sensor 580 is disposed outside the electrical conductor 570 and in the presently filed embodiment, the current sensor is accommodated inside the electrical conductor. The current measuring device 600 is mounted on the fuel cell 550 like in the seventeenth embodiment.

As shown in FIG. 65 and FIGS. 66A and 66B, the current measuring device 600 includes a plate-like electrical conductor 602 made of electrically conductive metal. The electrical conductor 602 is interposed between the two unit cells 552, 552 (see FIG. 60) under a condition where the electrical conductor 602 has one end face 602a and the other end face 602b, both facing in a stack direction of the unit cells in opposite direction, which are held in electrical contact with respective associated unit cells 522, 522.

In particular, formed on one end face 602a of the electrical conductor 602 at a location close to one corner thereof is a rectangular recessed portion 604 extending in a direction perpendicular to a plane of the end face 602a of the electrical conductor 602. Formed inside the rectangular recessed portion 604 is a columnar portion 606, serving as a current conductor, which has a rectangular solid shape whose end faces are adapted to be held in electrical contact with the associated unit cells 522, 522. Also, although the structure shown in FIG. 65 has been shown in conjunction with the recessed portion 604 formed in the rectangular shape and the columnar portion 606 formed in the solid rectangular shape, no limitation is intended by the present invention and these component parts may be modified to be formed in other shapes. For instance, the recessed portion 604 may have a cylindrical shape and the columnar portion 606 may also have other shape such as a cylindrical body.

Disposed in the rectangular recessed portion 604 so as to surround the columnar portion 606 is an iron core 608 that has both distal ends spaced from one another by an air gap 610 in which a Hall element 612 is disposed. Thus, the iron core 608 and the Hall element 612 form a magnetic sensor that serves as a current sensor.

Formed in the electrical conductor 602 so as to vertically extend between the recessed portion 604 and a bottom surface 602c of the electrical conductor 602 is a guide recess 603 to allow a wire lead 612a of the Hall element 612 to be received. In addition, the electrical conductor 602 has four corners formed with an air inlet passage 602d, an air outlet passage 602e, a hydrogen inlet passage 602f and a hydrogen outlet passage 602g.

With the structure set forth above, as localized current discharged from the local area, opposing to the one end face of the columnar portion 606 of the unit cell 522, flows through the columnar portion 606, a magnetic field is created around the columnar portion 606 with a magnitude proportional to that electric current. The Hall element 612 detects the magnetic field created by localized current to convert the resulting magnetic field to a voltage. Accordingly, by permitting the magnitude of the magnetic field of the iron core 608 to be measured, it becomes possible to detect electric current flowing through the columnar portion 606, i.e., localized current of the unit cell 522.

With the presently filed embodiment set forth above, the use of the current measuring device 600 enables localized current of the unit cell 522 to be detected. Detecting localized current of the unit cell 522 makes it possible to specify the abnormal occurrence factors during operation of the fuel cell 550.

Further, during the occurrence of defects, since variation in electric current remarkably appears at an earlier stage than that of voltage, measuring electric current enables the occurrence of defects to be detected at the earliest time.

Moreover, due to a particular layout wherein the iron core 608 and the Hall element 612 forming the magnetic sensor are accommodated in the recessed portion 604 of the electrical conductor 602, no interference takes place between the magnetic sensor and the unit cell 522. Therefore, the electrical conductor 602 can be interposed between stacked unit cells in an easy and reliable fashion.

Figure 67A:
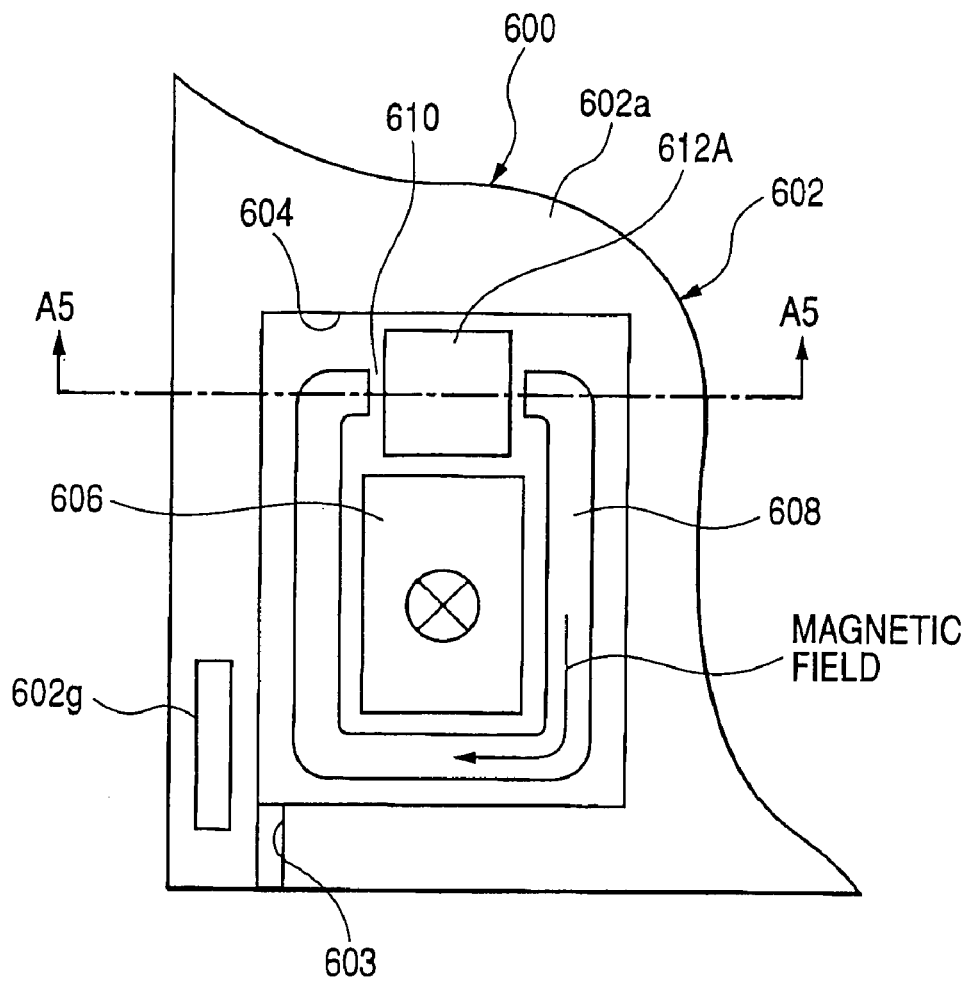
FIG. 67A is an enlarged view of an essential part of a modified form of the current measuring device shown in FIGS. 66A and 66B.
Figure 67B:
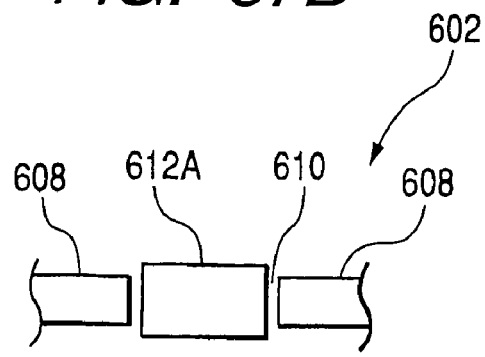
FIG. 67B is a cross sectional view taken on line A5-A5 of FIG. 67A.

Examples of the magnetic sensor may include an MR element, MI element and a flux gate. FIG. 67A is an enlarged front view of an essential part of a modified form of the current measuring device 600 that employs a magnetic sensor 612A formed of th MR element or the MI element, and FIG. 67B is a cross sectional view taken on line A5-A5 of FIG. 67A.

In cases where the magnetic sensor is comprised of the Hall element 612, the Hall element 612 needs to be positioned such that a longitudinal axis of the Hall element 612 is perpendicular to the iron core 608 (see FIG. 66B). In cases where the MR element or the MI element are used as the sensor element 612A, the sensor element 612A has a longitudinal axis in alignment with the iron core 608, enabling reduction in thickness of the electrical conductor 602 with a resultant decrease in thickness of the current measuring device 600A.

Also, the current measuring device of the presently filed embodiment may be incorporated in the air separators 555, 557. That is, at least one of the separators 555, 557 may be made of electrical conductor that is formed with the recessed portion in which the columnar portion 606 is formed so as to be surrounded by the recessed portion to allow the iron core and the Hall element to be accommodated in the recessed portion. With such a structure, by measuring the magnitude of the magnetic field of the iron core 608 using the Hall element, it becomes possible to detect electric current flowing through the columnar portion, i.e., localized current of the unit cell 552. Also, in this case, the use of the separators 555, 557 provides no need for newly preparing a plate-like electrical conductor.

Nineteenth Embodiment

A current measuring device of a nineteenth embodiment of the present invention according to the present invention is described with reference to FIGS. 68, 69A, 69B and 70. The current measuring device 600A of the presently filed embodiment takes the form of a structure comprised of two sheets of the electrically conductive bodies of the eighteenth embodiment, and the same component parts as those of the eighteenth embodiment bear like reference numerals to omit redundant description.

Figure 68:
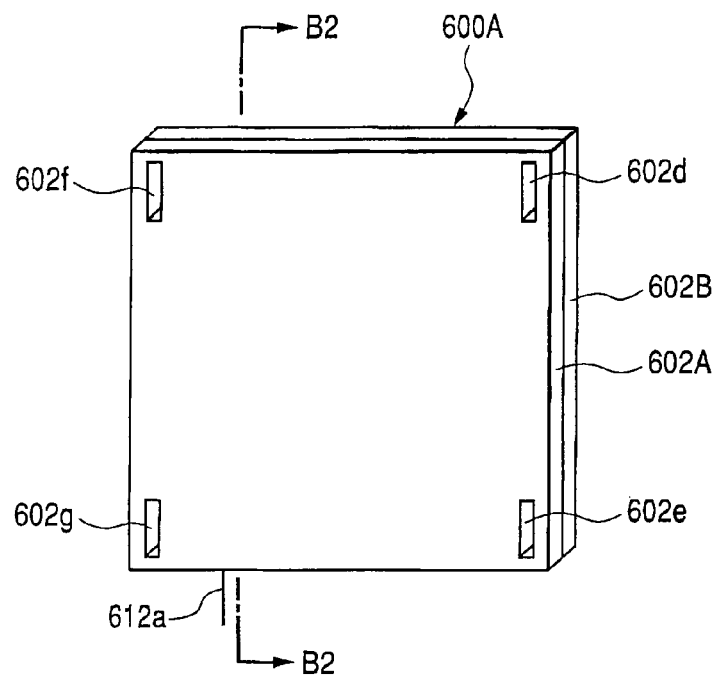
FIG. 68 is a perspective view of a current measuring device of nineteenth embodiment according to the present invention.
Figure 69A:
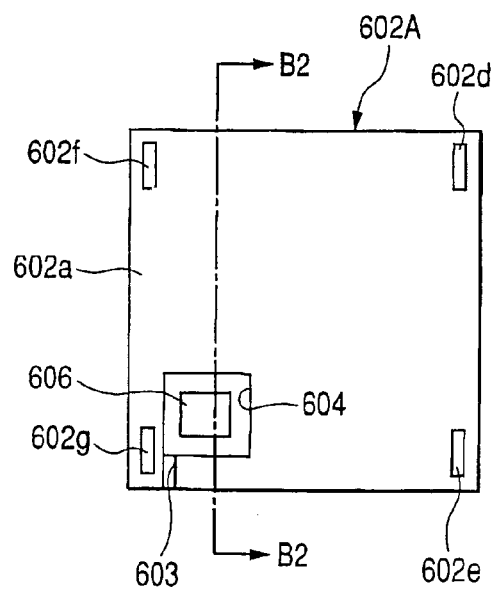
FIG. 69A is a plan view of a first electrical conductor forming part of the current measuring device shown in FIG. 68.
Figure 69B:
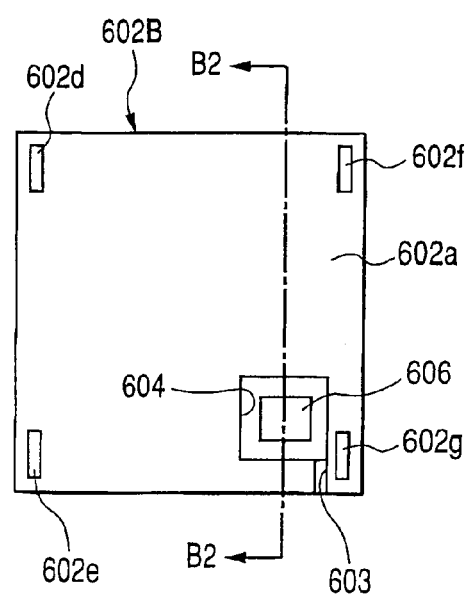
FIG. 69B is a plan view of a second electrical conductor forming another part of the current measuring device shown in FIG. 68.

FIG. 68 is a perspective view of the current measuring device 600A of the presently filed embodiment; FIG. 69A is a front view of a first electrical conductor 602A; FIG. 69B is a front view of a second electrical conductor 602b; and FIG. 70 is a cross sectional representation taken on line B2-B2 of FIG. 68.

As shown in FIGS. 68, 69A, 69B and 70, the current measuring device 600A of the presently filed embodiment is comprised of the two sheets of electrically conductive bodies 602A, 602B. As best shown in FIGS. 69A and 69B, the electrical conductor 602A is identical in structure to the electrical conductor 602 shown in FIG. 6 and the electrical conductor 602B is similar in structure to the electrical conductor 602A except for the respective component parts being symmetric with respect to a center line of the electrical conductor 602A. Therefore, the same component parts as those of the electrical conductor 602A bear like reference numerals for the sake of simplicity in description.

The electrically conductive bodies 602A and 602B are shown in FIGS. 69A and 69B in a deployed form. That is, the electrical conductor 602B has a left side area formed with the air inlet passage 602d and the air outlet passage 602e and a right side area formed with the hydrogen inlet passage 602f and the hydrogen outlet passage 602g. In addition, the electrical conductor 602B has the recessed portion 604 formed in an area in the vicinity of the hydrogen outlet passage 602g like in the electrical conductor 602A. Also, the electrical conductor 602B has the columnar portion 606, formed in the recessed portion 604, and the guide recess 603. Thus, laminating the first and second electrically conductive bodies 602A, 602B provides the current measuring device 600A of the presently filed embodiment to allow respective component parts to be matched on a plane of the current measuring device 600A.

Figure 70:
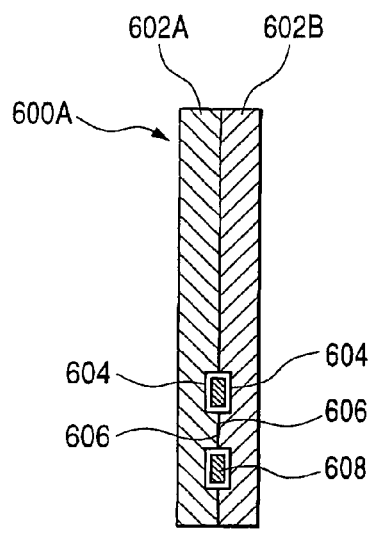
FIG. 70 is a cross sectional view taken on line B2-B2 of FIG. 68.

As shown in FIG. 70, the iron core 608 and the Hall element (not shown) are received in a space defined by the recessed portions 604, 604 of the two sheets of electrically conductive bodies 602A, 602B when these elements are laminated. The iron core 608 and the Hall element are fixedly secured in the space defined by the recessed portions 604, 604 by means of adhesive with an electric isulation property. This allows the recessed portions 604, 604, the columnar portions 606, 606, the iron core 608 and the Hall element to be prevented from being exposed to the outside.

When placing the current measuring device 600A between the adjacent unit cells 552, the current measuring device 600A is sandwiched between the separators 555, 557, which are normally formed with a coolant passage in a recessed configuration to admit the flow of coolant water. With the structure wherein the rectangular shaped recessed portions 604, 604 are brought into contact with the surfaces of the separators 555, 557, a need arises in designing coolant flow passages in the separators 555, 557 so as to detour these recessed portions, resulting in reduction in a freedom in design of the coolant water flow passages. Thus, the provision of the structure wherein the rectangular recessed portions 604, 604 are not exposed makes it possible to expand the freedom in design of the coolant flow passages on the respective surfaces of the separators 555, 557.

Further, the provision of the iron core 608 located in the space between the two sheets of electrically conductive bodies 602A, 602B precludes the iron core 608 from being subjected to external load, enabling to preclude the occurrence of distortion. Thus, it becomes possible to preclude deterioration in the magnetic characteristic of magnetic material resulting from distortion.

Figure 71A:
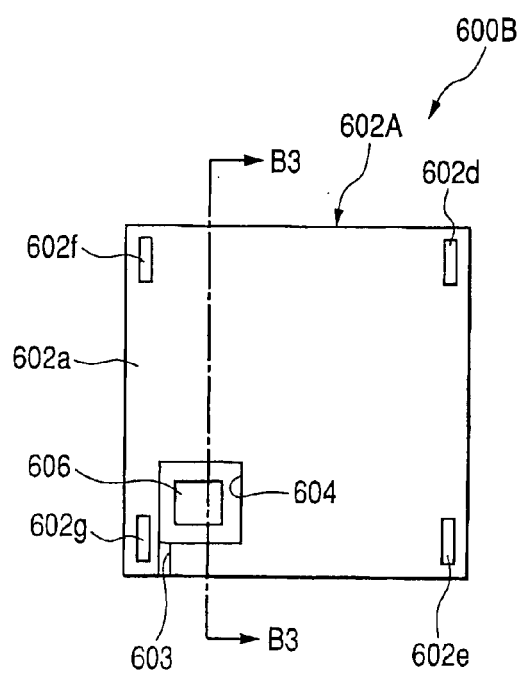
FIG. 71A is a plan view of the electrical conductor shown in FIG. 68.
Figure 71B:
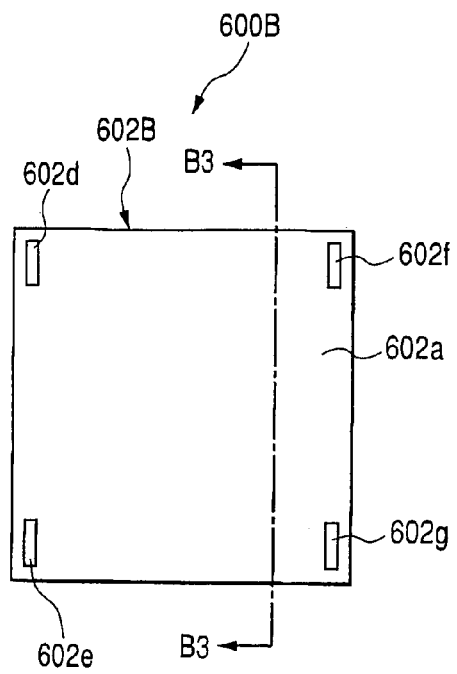
FIG. 71B is a plan view of a modified form of the second electrical conductor of the current measuring device shown in FIG. 68.
Figure 72:
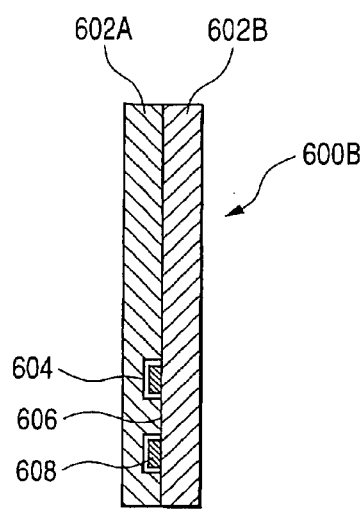
FIG. 72 is a cross sectional view taken on line B3-B3 of FIGS. 71A and 71B.

FIGS. 71A and 71B and FIG. 72 show a modified form of the current measuring device 600A of the nineteenth embodiment. FIGS. 71A and 71B correspond to FIGS. 69A and 69B, and FIG. 72 corresponds to FIG. 70.

As shown in FIGS. 71A, 71B and 72, the first electrical conductor 602A has the recessed portion 604 and the columnar portion 606, whereas the second electrical conductor 602B has no rectangular recessed portion and no columnar portion. When stacking these two electrically conductive bodies 602A, 602B in a unitary structure shown in FIG. 72, this structure has the same effect as that of the structure shown in FIGS. 68 to 70.

Twentieth Embodiment

Next, a current measuring device 600C of a twentieth embodiment according to the present invention is described with reference to FIG. 73.

Figure 73:
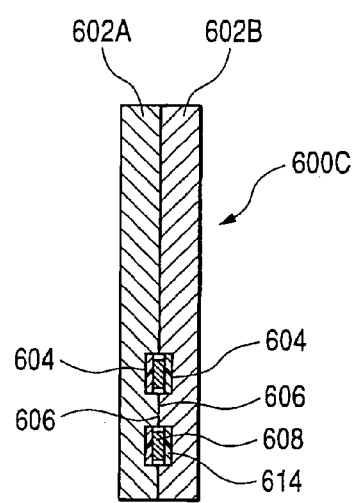
FIG. 73 is a cross sectional view illustrating a current measuring device of a twentieth embodiment according to the present invention.

FIG. 73 is a cross sectional representation similar to the cross sectional view taken on line B2-B2 of FIG. 68.

The current measuring device 600C of the presently filed embodiment differs from the nineteenth embodiment in that the current measuring device 600C of the presently filed embodiment has a cushioning member.

As shown in FIG. 73, the current measuring device 600C is comprised of the first and second electrically conductive bodies 602A, 602B both of which have the rectangular recessed portions 604, 604 to form the space in which the iron core 608 is disposed. Filled in the space defined by the recessed portions 604, 604 is a cushioning member 614 by which the iron core 608 is fixedly secured in the space defined between the recessed portions 604, 604. An example of the cushioning member 614 may include, for instance, resilient material generally in use such as rubber or the like.

Due to the need for electrical insulation to be provided between the iron core 608 and the recessed portions 604, 604, the iron core 608 and the recessed portions 604, 604 may be made of electrically insulating cushioning material or may be subjected to electrical insulation process by providing the iron core and the recessed portions 604, 604 with insulating layers.

Like in the presently filed embodiment, using the cushioning member 614 to fixedly secure the iron core 608 and the Hall element precludes the iron core 608 and the Hall element from loosely fitted in the space defined by the recessed portions 604, 604. This enables the iron core 608 to be prevented from being distorted, making it possible to avoid deterioration in the magnetic characteristic.

Twenty-Oneth Embodiment

Next, a current measuring device of a twenty-oneth embodiment of the present invention according to the present invention is described below with reference to FIG. 74.

The current measuring device 600D of th presently filed embodiment differs from the twentieth embodiment in that a sheet of resilient member 615 is disposed between the first and second electrically conducting bodies 602A and 602B.

Figure 74:
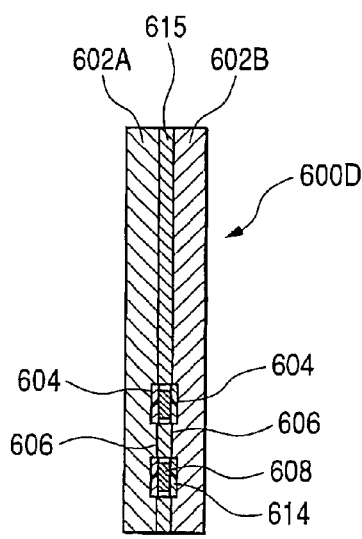
FIG. 74 is a cross sectional view illustrating a current measuring device of a twenty-second embodiment according to the present invention.

FIG. 74 is a cross sectional representation taken along line B2-B2 of FIG. 68. As shown in FIG. 74, with the current measuring device 600D of the presently filed embodiment, the resilient member 615, made of electrically conducting material, is interposed between the first and second electrically conducting bodies 602A and 602B. An example of the resilient member 615 having electrical conductivity may include an electrically conductive resilient member formed of rubber mixed with powder of electrically conducting material (such as, for instance, carbon).

With the structure set forth above, locating the resilient member 615 with electrical conductivity between the two sheets of electrically conducting bodies 602A, 602B enables to absorb irregularities in machining errors or assembling errors of the unit cell 552 or the current measuring device 600D. Additionally, thermal distortion resulting from temperature variation can be absorbed. This results in favorable electrical contact to be provided between the unit cell 552 and the electrically conducting bodies 602A, 602B, resulting in reduction in contact resistance occurring between these component parts.

Twenty-Second Embodiment

Next, a current measuring device of a twenty-second embodiment of the present invention according to the present invention is described below with reference to FIG. 75. The presently filed embodiment differs from the seventeenth embodiment in that in the presently filed embodiment, the current measuring device 558 is sandwiched between resilient bodies in the structure of the fuel cell 550.

Figure 75:
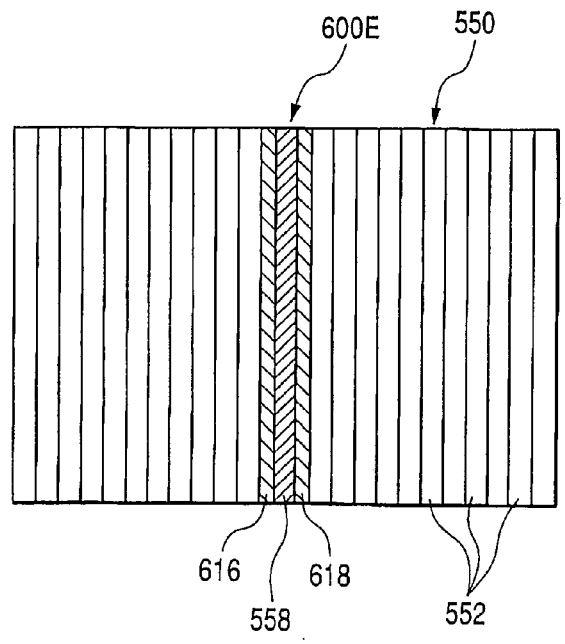
FIG. 75 is a cross sectional view illustrating a current measuring device of a twenty-third embodiment according to the present invention.

FIG. 75 is a side view illustrating an overall structure of the fuel cell of the presently filed embodiment. As shown in FIG. 75, the current measuring device 558 is mounted to the fuel cell 550 such that the current measuring device 558 is interposed between resilient bodies 616, 618 that have electrical conductivity. Examples of the resilient bodies 616, 618 include electrically conductive resilient members each formed of rubber mixed with electrically conductive material (such as carbon).

Thus, the provision of the electrically conductive resilient members 616, 618 placed between the unit cells 552 and the current measuring device 558 enables to absorb irregularities in machining errors or assembling errors of the unit cell 552 and the current measuring device 558. Additionally, thermal distortion resulting from temperature variation can be absorbed. This results in favorable electrical contact to be provided between the unit cell 552 and the electrically conducting bodies, resulting in reduction in contact resistance occurring between these component parts.

Twenty-Third Embodiment

An current inspection apparatus 640 of a twenty-third embodiment is described with reference to FIGS. 76 and 77, FIGS. 78A and 78B and FIGS. 79 and 80. The current inspection apparatus 640 of the presently filed embodiment incorporates the feature of the current measuring device 558 of the seventeenth embodiment shown in FIG. 61 and FIGS. 62A to 62D, and the same component parts as those of the seventeenth embodiment bear like reference numerals to simplify description of this embodiment.

Figure 76:
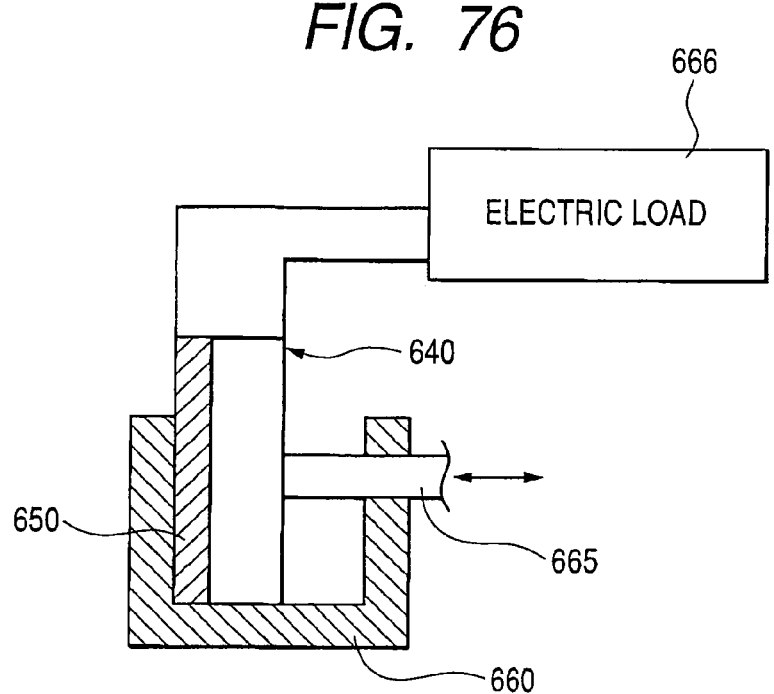
FIG. 76 is a structural view of a current inspection device, incorporating the current measuring device, of a twenty-third embodiment according to the present invention.
Figure 77:
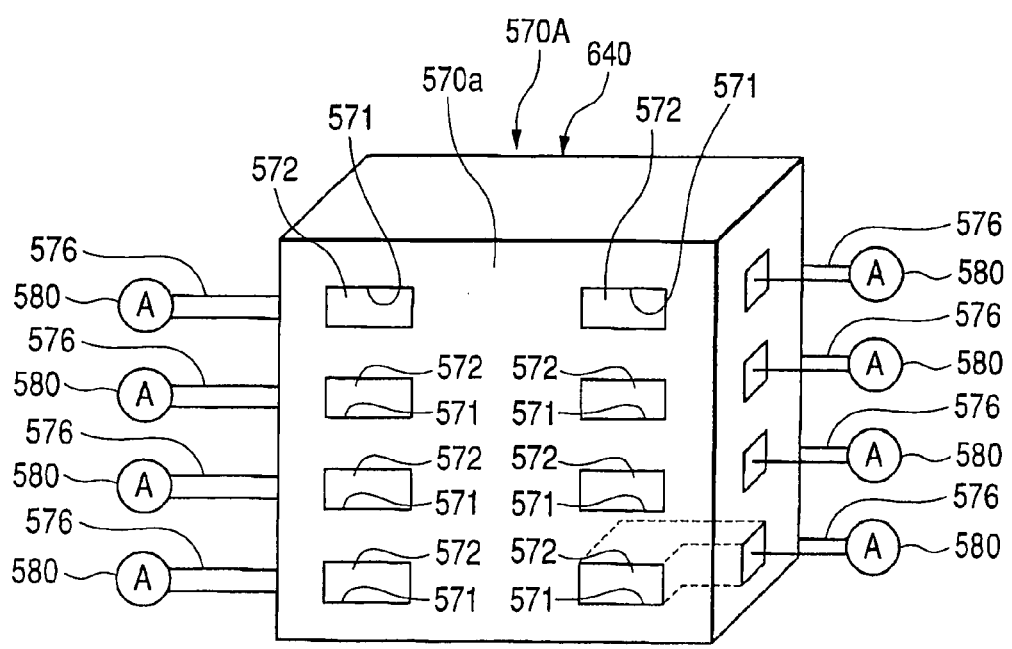
FIG. 77 is a perspective view of the current inspection device shown in FIG. 76.
Figure 78A:
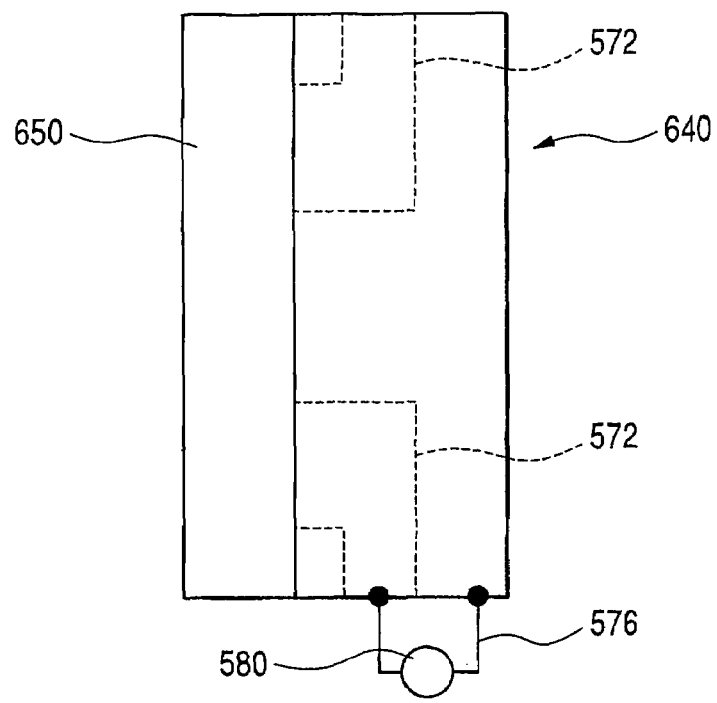
FIG. 78A is a right side view of the current inspection device and a unit cell shown in FIG. 77.
Figure 78B:
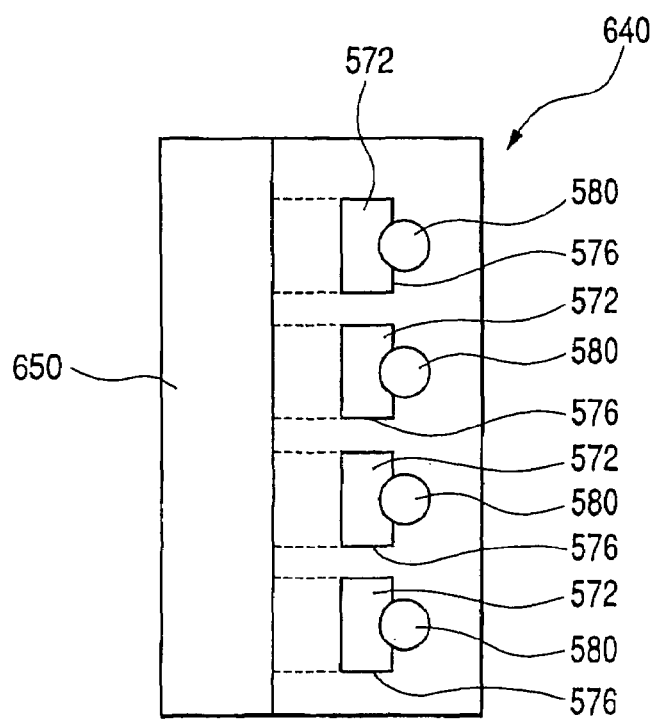
FIG. 78B is a top view of the current inspection device and the unit cell shown in FIG. 77.
Figure 79:
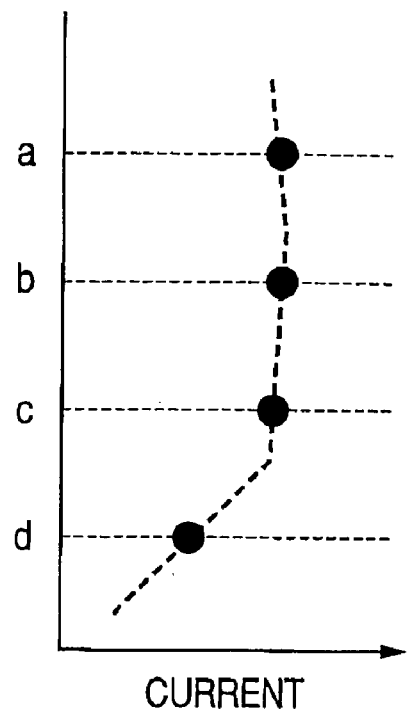
FIG. 79 is a graph plotted with measured samples of current values at various localized current measuring points.
Figure 80:
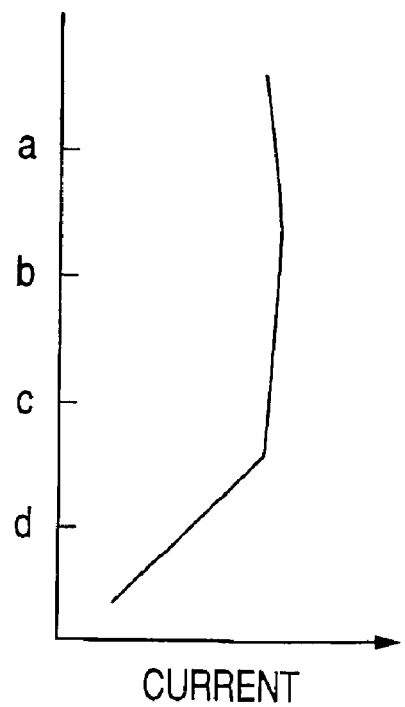
FIG. 80 is a view illustrating an electric current pattern of the unit cell obtained based on the measured result shown in FIG. 79.

FIG. 76 is a structural view of the current inspection apparatus 640 using the current measuring device 558 of the seventeenth embodiment; FIG. 77 is a perspective view of the current measuring device 640 shown in FIG. 76; FIG. 78A is a right side view illustrating the current measuring device 640 and a unit cell; FIG. 78B is a top view illustrating the current measuring device 640 and the unit cell; FIG. 79 is a view illustrating examples of electric current values measured at various localized current measuring points, respectively; and FIG. 80 is a view illustrating an electric current distribution pattern in the unit cell obtained based on the measured result shown in FIG. 79.

In each of the unit cells of the fuel cell, in the event that irregularities remarkably occurs in a machined surface of the fuel cell, the unit cell has an increased irregularities in current density, causing deterioration to occur in the unit cell at a high speed. In the presence of the unit cell, forming one of the stack of the unit cells, with increased irregularities in the machined surface, that unit cell becomes inoperative in an earlier stage and, therefore, the fuel cell stack becomes inoperative even in the presence of other normal unit cells.

Further, in an electric power storage unit, having a large surface area, such as a secondary battery and a capacitor each of which is made of a stack of large number of unit cells, if defects occurs in, for instance, a junction between electrodes during manufacturing process, electrical resistance of that portion increases, resulting in irregularities in electric current on entire surfaces of the unit cells. In the presence of locally defective portions in an electric power-generating characteristic, the characteristic of the relevant unit cell is deteriorated in an earlier stage than that of the unit cell with less irregularities in electric current on the surface of the unit cell. However, mere attempt to simply check only current-voltage characteristic results in a difficulty of detecting the unit cell with increased local irregularities in local capacities of generating electric power. Therefore, the secondary battery or the capacitor structured with a stack of large number of unit cells tend to have a mixture of the unit cells with difference in operating life, resulting in deterioration in a reliability of an assembly.

To address such an issue, with the presently filed embodiment, the current inspection apparatus 640 shown in FIG. 76 is used to measure a current density distribution pattern of each unit cell to discriminate only unit cell with less irregularities in electric current.

As shown in FIG. 76, a single unit cell 650, forming part of the electric power storage unit such as a fuel cell, a secondary battery and a capacitor, and the current measuring device 640 is placed in a channel-shaped inspection jig 660 in close contact relationship. The unit cell 650 and the current measuring device 640 are pressed toward one internal surface of the inspection jig 660 with an urging member 665 that is movable relative to the inspection jig 660. The unit cell 650 is electrically connected to electric load 666 by which electric power is consumed.

With presently filed embodiment, for the purpose of measuring localized currents at a large number of measuring points in the unit cell 650, the current measuring device 640 is comprised of large number of component parts, such as The current conductors 572, the insulation layers (not shown for simplicity of illustration), the outside wire leads 576, and the current sensors 580.

That is, As shown in FIG. 77 and FIGS. 78A and 78B, the current inspection device 640 is comprised of a single sheet of a plate-like electrical conductor 570A made of electrically conductive metal, a large number (eight pieceshown in FIG. 77) of recessed portions 571, The current conductors 572 disposed in the respective recessed portions 571, formed in the electrical conductor 570A, and each made of electrically conductive metal, a large number of insulation layers (not shown) disposed in the respective recessed portions 571 and providing electrical insulation between the electrical conductor 570A and the respective current conductors 572, the outside wire leads 576 connected between the electrical conductor 570A and the respective current conductors 572 at areas outside the electrical conductor 570A and the respective current conductors 572, and the current sensors 580 connected to the respective outside wired leads 576.

The electrical conductor 570A has one end face 570a to which one end faces of The current conductors 572 are exposed, and the one end face 570a of the electrical conductor 570A and the respective end faces of The current conductors 572 are held in electrically contact with the unit cell 650.

Localized currents at eight points of the unit cell 650 flow through the respective current conductors 572, enabling the current sensors 580 to detect localized currents at the eight points of the unit cell 650.

In FIGS. 79 and 80, reference "a" on the ordinate axis indicates an area at which localized current is detected by the first current sensor 580; reference "b" on the ordinate axis indicates an area at which localized current is detected by the second current sensor 580; reference "c" on the ordinate axis indicates an area at which localized current is detected by the third current sensor 580; reference "d" on the ordinate axis indicates an area at which localized current is detected by the fourth current sensor 580.

In examples of localized currents plotted in FIGS. 79 and 80, localized current measured at the local area d of the unit cell 650 by the fourth current sensor 580 has a remarkably lower value as compared to other localized currents measured at the other local areas "a" to "c". In such a case where the unit cell has irregularities in localized currents, discrimination is made that the relevant unit cell has an issue in quality, and the use of such unit cell is rejected. Consequently, this enables the fuel cell and the electric power storage unit to be comprised of unit cells with less irregularities in localized currents, resulting in improvements over reliabilities of the fuel cell and the electric power storage unit.

Twenty-Fourth Embodiment

A current inspection device 700 of a twenty-fourth embodiment according to the present invention is described below with reference to FIGS. 81 and 82.

Figure 81:
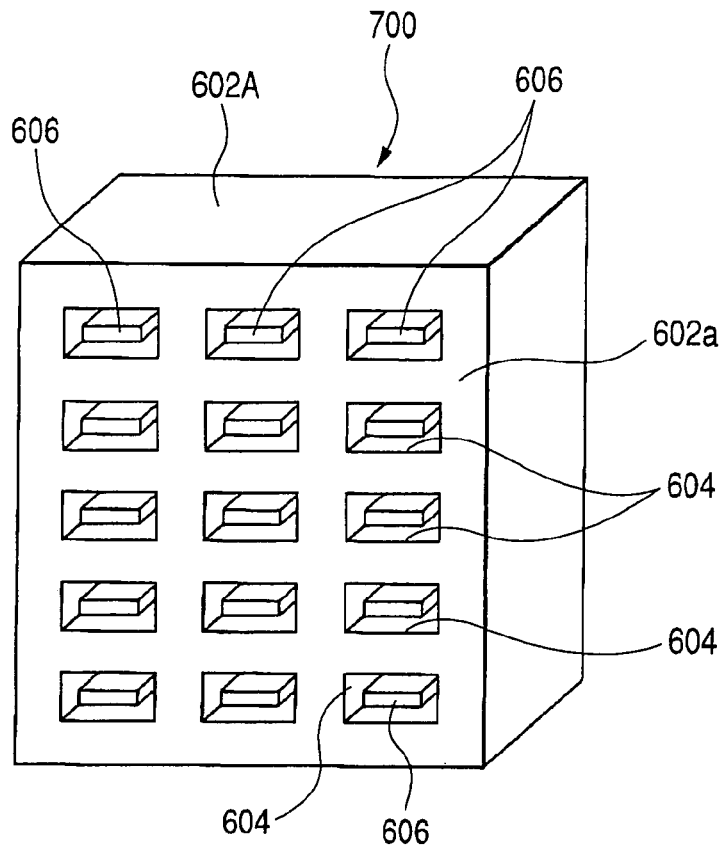
FIG. 81 is a structural view of a current inspection device, incorporating the current measuring device, of a twenty-fourth embodiment according to the present invention.
Figure 82:
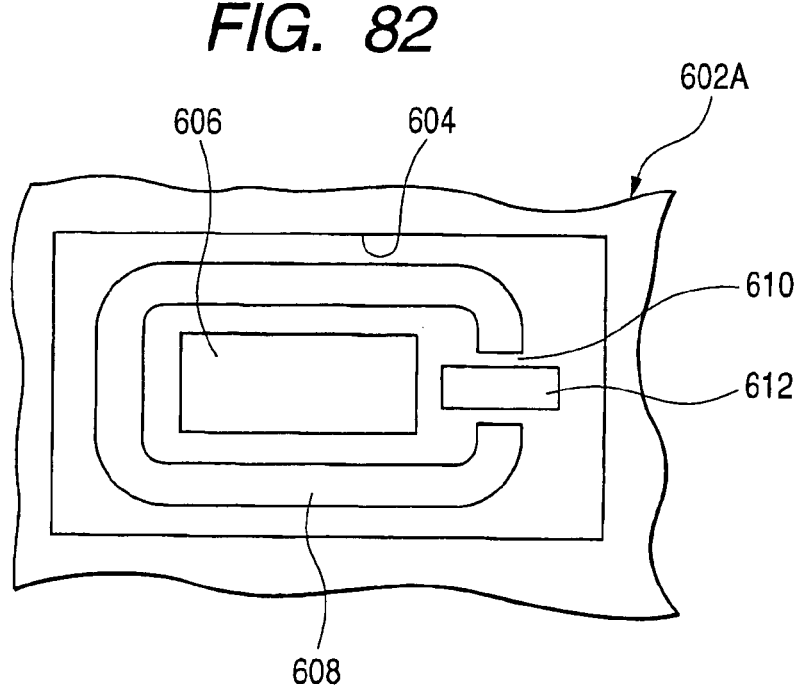
FIG. 82 is an enlarged plan view of the current inspection device shown in FIG. 81.

FIG. 81 is a perspective view of the current inspection device 700 of the twenty-fourth embodiment according to the present invention, and FIG. 82 is a front view of an essential part of the current inspection device 700 shown in FIG. 81. The current inspection device 700 of the presently filed embodiment can be used in place of the current measuring device 640 shown in FIGS. 76 and 77.

The current inspection device 700 of the presently filed embodiment incorporates the feature of the current measuring device 600 of the eighteenth embodiment shown in FIG. 65 and FIGS. 66A and 66B, and the same component parts as those of the eighteenth embodiment bear like reference numerals to omit redundant description.

With presently filed embodiment, for the purpose of measuring localized currents at a large number of measuring points in the unit cell, the current inspection device 700 is comprised of a large number of the recessed portions 604, the electrically conductive columnar portions 606 each formed in a rectangular solid shape, the iron cores 608 and the Hall elements 612.

That is, As shown in FIGS. 81 and 82, the current inspection device 700 is comprised of a single sheet of a plate-like electrical conductor 602A, made of electrically conductive metal, which has a front end face 602a, and a large number (fifteen pieces in an example shown in FIG. 81) of recessed portions 604 and the columnar portions 606, surrounded by the respective recessed portions 604, all of which are disposed on the front end face 602a of the electrical conductor 602A. Further, As shown in FIG. 82, disposed in each recessed portion 604 so as to surround the columnar portion 606 is the iron core 608 that has both distal ends spaced by the air gap 610 in which the magnetic sensor 612 such as a Hall element is disposed. Also, it will be appreciated that the iron core 608 and the Hall element 612 form a magnetic sensor.

When using the current inspection device 700 in place of the current measuring device 640 shown in FIG. 77, discharging currents at various local areas of the unit cell at positions corresponding to respective columnar portions 606 flow through the associated columnar portions 606, creating magnetic fields with magnitudes each in proportion to each localized current. Accordingly, by permitting the Hall elements 612 to measure the magnitudes of the magnetic fields of the respective iron cores 608, it becomes possible to detect electric currents flowing through the respective columnar portions 606, i.e., localized currents at various points of the unit cell 650. Depending upon the degree of irregularities in localized currents on the fifteen points detected in such a way discussed above, judgment can be made to find whether the relevant unit cell has a quality in trouble.

Twenty-Fifth Embodiment

A current measuring device of a twenty-fifth embodiment according to the present invention for use in an electric power unit, such as a fuel cell, is described with reference to FIGS. 83A and 83B and FIGS. 84 and 85.

Figure 84:
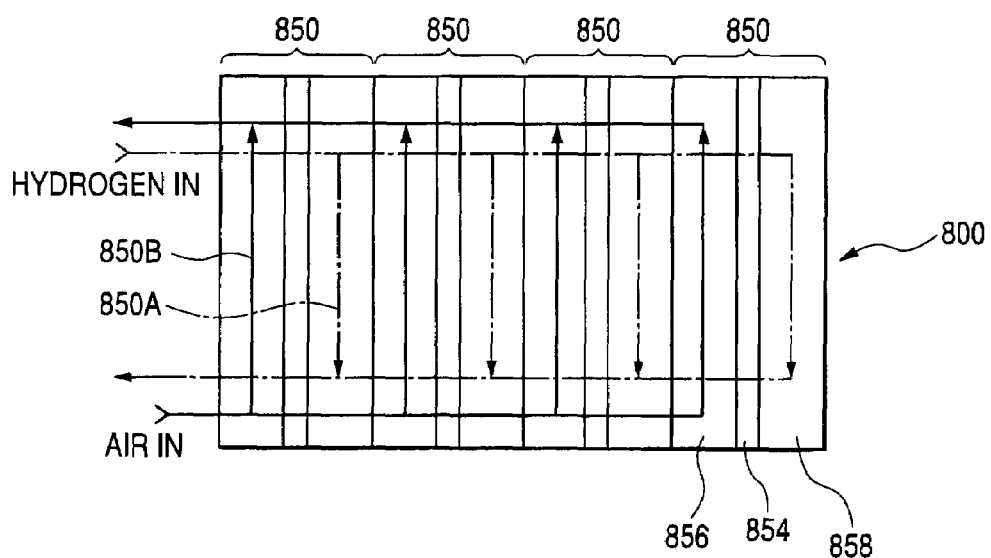
FIG. 84 is a schematic side view of the fuel cell shown in FIG. 83A.

FIG. 83A is a perspective view of the fuel cell incorporating the current measuring device of the presently filed embodiment; and FIG. 83B is an enlarged view of the current measuring device shown in FIG. 83A; FIG. 84 is a schematic view of the fuel cell illustrating a conceptual view showing flows of gases inside the fuel cell.

As shown in FIGS. 83A and 83B and FIG. 84, the fuel cell 800, which corresponds to the electric power unit of the present invention, is comprised of a stack of a plurality of unit cells 850. Each unit cell 850 is comprised of an MEA (Membrane Electrode Assembly) 854, and an air separator 856 and a hydrogen separator 858 between which the MEA 854 is sandwiched. The MEA 854 is comprised of an electrolyte membrane, an air electrode (oxygen electrode) formed on one surface of the electrolyte membrane, and a hydrogen electrode (fuel electrode) formed on the other surface of the electrolyte membrane.

The plate-like air separator 856, made of carbon material or electrically conductive metal, has air flow passages 850A to distribute oxygen to the surfaces of the air electrodes, and As shown by an arrow in a solid line in FIG. 84, oxygen is supplied to the respective unit cells 850 in parallel by means of the air flow passages 850A. Likewise, the plate-like hydrogen separator 858, made of carbon material or electrically conductive metal, has hydrogen flow passages 850B to distribute hydrogen to surfaces of the fuel electrodes, and As shown by an arrow in phantom line in FIG. 84, hydrogen is supplied to the respective unit cells 850 in parallel by means of the hydrogen flow passages 850B.

Figure 85:
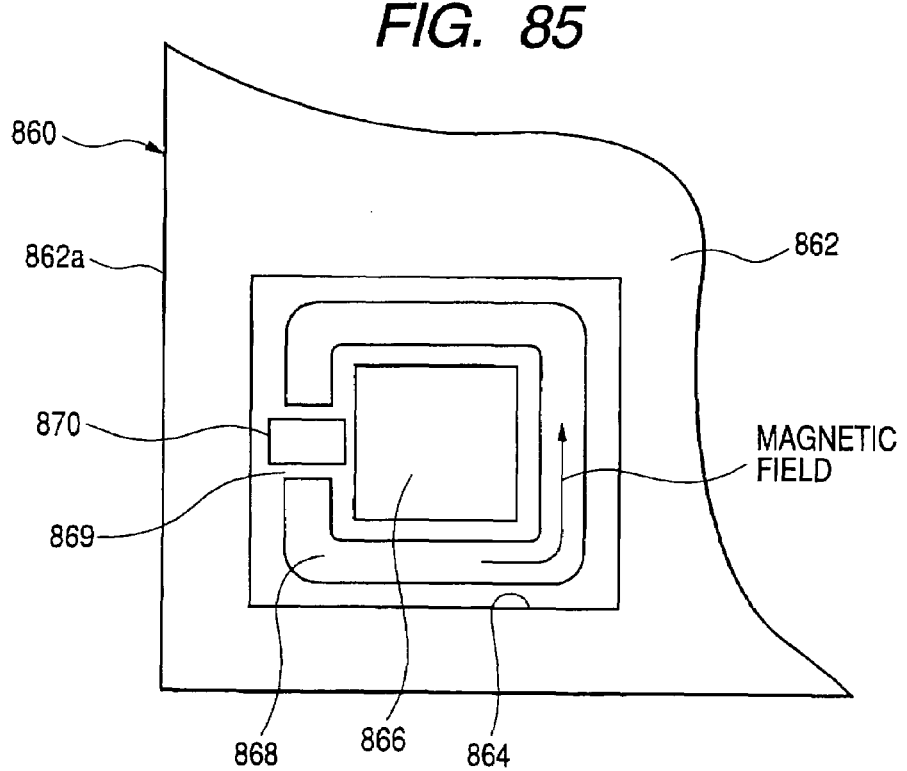
FIG. 85 is an enlarged view of an essential part of the current measuring device shown in FIG. 83B.

As shown in FIGS. 83B and 85, the current measuring device 860 includes a plate-like electrical conductor 862 made of electrically conductive metal. The electrical conductor 862 is interposed between the two unit cells 850, 850 (see FIG. 83A) under a condition where the electrical conductor 862 has one end face and the other end face, both facing in a stack direction of the unit cells in opposite direction, which are held in electrical contact with respective associated unit cells 850, 850.

In particular, the electrical conductor 862 has a rectangular recessed portion 864, extending in a direction perpendicular to a plane of the electrical conductor 862, which is formed in an area near a corner displaced from a center of the electrical conductor 862 and has two sides positioned in the vicinity of an outer circumferential periphery of the electrical conductor 862.

Disposed in the rectangular recessed portion 864 is a columnar portion 866, serving as a current conductor and formed in a rectangular solid shape, which has end faces to be held in electrical contact with the associated local areas of the unit cells 850, 850.

Also, disposed in the rectangular recessed portion 864 so as to surround the columnar portion 866 is an iron core 868 that has both distal ends spaced from one another by an air gap 869, formed in an area closer to a circumferential periphery 862a of the electrical conductor 862, in which a Hall element 870 is disposed. Thus, the iron core 868 and the Hall element 870 form a magnetic sensor, which is located at the corner area of the electrical conductor 862 to be closer to the circumferential periphery thereof.

With the structure set forth above, as localized current discharged from the local area, facing the one end face of the columnar portion 866, of the unit cell 850 flows through the columnar portion 866, a magnetic field is created around the columnar portion 866 in a magnitude proportional to that electric current. In the structure shown in FIG. 85, localized current flows from a rearward area of a page space of FIG. 85 to a front area thereof, and the magnetic filed is generated in a counter-clockwise direction. Accordingly, by permitting the magnitude of the magnetic field of the iron core 868 to be measured, it becomes possible to detect electric current flowing through the columnar portion 866, i.e., localized current of the unit cell 850.

Next, description is made of an influence on the magnetic sensor 876 due to disturbances such as a magnetic field generated by electric current other than localized current with reference to FIG. 86.

FIG. 86 is a schematic view illustrating a magnetic field generated in the current measuring device 860. As shown in FIG. 86, an area, closer to the center of the electrical conductor 862, of the iron core 868, suffers from the magnetic field, generated by electric current flowing through a major area, except for the columnar portion 866, of the electrical conductor 862, which has a magnitude greater than that of the magnetic field generated by localized current flowing through the columnar portion 866. For this reason, in case where attempt is made to measure the magnetic field at an area, closer to the center of the electrical conductor 862, of the iron core 868, a difficulty is encountered in correctly measuring exact localized current generated by localized current.

On the contrary, a corner area, remote from the center of the electrical conductor 862, of the iron core 868 is hard to encounter an adverse affect resulting from the magnetic field generated by electric current other than localized current because the other area, closer to the center of the electrical conductor 862, of the iron core 868 magnetically shields the magnetic field generated by major electric current flowing through the electrical conductor 862.

With the structure of the current measuring device 860 of the presently filed embodiment, by forming the recessed portion 864 at the corner area such that the two sides of the recessed portion 864 is closer to the circumferential periphery 862a of the electrical conductor 862 and by providing the air gap 869 of the iron core 868 in the recessed portion 864 at a position closer to the circumferential periphery 862a of the electrical conductor 862, the magnetic sensor 870 assumes a position remote from the center of the electrical conductor 862. This results in a capability of suppressing adverse affect resulting from magnetic disturbance generated by major current flowing through the electrical conductor 862, enabling the magnetic field generated by localized current to be accurately measured.

Twenty-Sixth Embodiment

A current measuring device of a twenty-sixth embodiment according to the present invention for use in an electric power unit is described with reference to FIGS. 87A and 87B.

FIG. 87A is a front view of the current measuring device of the presently filed embodiment, and FIG. 87B is a cross sectional view taken on line A6-A6 of FIG. 87A.

The current measuring device 860A of the presently filed embodiment differs from the twenty-fifth embodiment in that in the twenty-fifth embodiment, a particular layout of component parts of the current measuring device 860 enables reduction in measurement errors of localized current and in the presently filed embodiment, the current measuring device includes a magnetic shielding member 880 to minimize adverse affect resulting from magnetic disturbance caused by current other than localized current. The same component parts as those of the twenty-fifth embodiment bear like reference numerals to omit redundant description.

As shown in FIGS. 87A and 87B, the current measuring device 860A is comprised of a main electrical conductor 862A to allow major electric current to flow therethrough and having a cutout portion 872 at a corner of the main electrical conductor 862A, and an auxiliary electrical conductor 862B disposed in the cutout portion 872 in a coplanar relationship with the main electrical conductor 862A.

The recessed portion 864 is formed in the auxiliary electrical conductor 862B, in which a protrusion 866 is formed inside the recessed portion 864 and extends from a bottom wall of the recessed portion 864 toward a front face of the auxiliary electrical conductor 862B. The current measuring device 860A further includes the iron core 868 disposed in the recessed portion 864, and the Hall element 870 disposed in the air gap 869 of the iron core 868 in the position closer to the circumferential periphery of the auxiliary electrical conductor 862B.

The magnetic shielding member 880 has an L-shape in cross section and is disposed between the main electrical conductor 862A and the auxiliary electrical conductor 862B to fixedly secure the same to the main electrical conductor 862A. Thus, the magnetic shielding member 880 is located in the cutout portion 872, close proximity to the iron core 868, at a position closer to the center of the main electrical conductor 862A. The magnetic shielding member 880 is made of, for instance, stainless steel that has a magnetic permeability.

With the current measuring device of the presently filed embodiment set forth above, the provision of the magnetic shielding member 880 enables adverse affect resulting from the magnetic field created by major current flowing through the main electrical conductive body 862A to provide a capability of measuring only the magnetic field resulting from localized current, resulting in an increase in measuring precision.

While the presently filed embodiment has been described in conjunction with the structure where the magnetic sensor 870 is placed closer to the circumferential periphery of the auxiliary electrical conductor 862B, no limitation is intended to such a structure. That is, the magnetic sensor 870 may be located not only in the area remote from the center of the main electrical conductor 862A but also anywhere in the recessed portion 864.

Twenty-Seventh Embodiment

A current measuring device of a twenty-seventh embodiment according to the present invention for use in an electric power unit is described with reference to FIG. 88, FIGS. 89A and 89B and FIGS. 90A and 90B.

The current measuring device of the presently filed embodiment contemplates the provision of a magnetic shielding member to eliminate adverse affect resulting from a magnetic field caused by electric current flowing through the other electric power unit First, adverse affect resulting from the magnetic field generated by electric current flowing through the other electric power unit is described with reference to FIGS. 88, 89A and 89B, and the same component parts as those of the twenty-fifth embodiment shown in FIG. 85 bear like reference numerals to omit redundant description.

Figure 88:
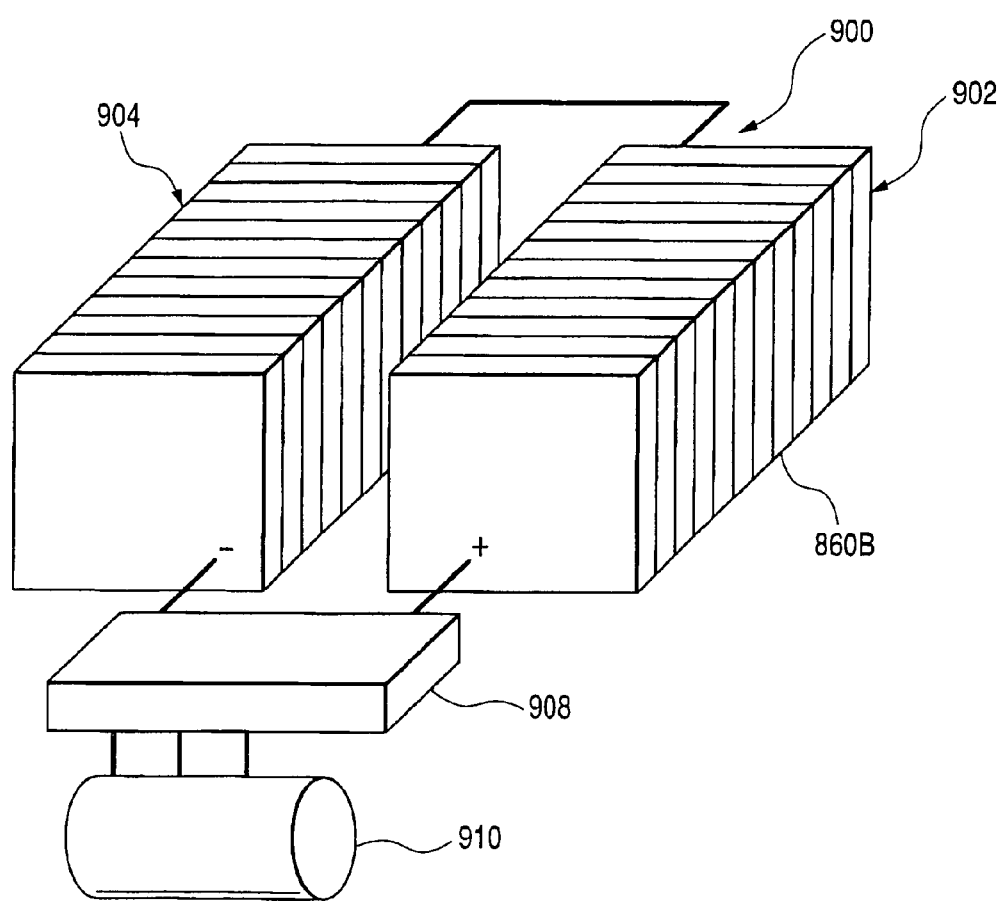
FIG. 88 is a perspective view of a fuel cell system of a twenty-seventh embodiment according to the present invention.

FIG. 88 is a perspective view of a fuel cell system 900 incorporating fuel cells 902, 904 connected in series and the fuel cell 902 is provided with the current measuring device 860B of the presently filed embodiment.

As shown in FIG. 88, the fuel cell system 900, incorporating the fuel cell 902 provided with the current measuring device 906, has other electric power units such as the fuel cell 904, an inverter 908 and an electric motor 910 of which are located in the vicinity of the fuel cell 902 provided with the current measuring device 860B.

FIGS. 89A and 89B are conceptual views illustrating how a magnetic field influences on the current measuring device 860B.

As shown in FIGS. 89A and 89B, since the current measuring device 860B suffers from adverse affect resulting from a magnetic field generated by electric current flowing through the second fuel cell 904 disposed adjacent to the first fuel cell 902, it is hard to correctly measure a magnetic field generated by localized current even when using the magnetic sensor 870 to measure the magnetic field of the iron core 868. Especially, adverse affect becomes great at an area, remote from the center of the electrical conductor 862, of the iron core 868. Also, magnetic noises, generated by the electric power units such as the electric motor 910, have a probability to adversely affect on measurement of the magnetic field to be detected by the magnetic sensor 870.

Twenty-Eighth Embodiment

Figure 90A:
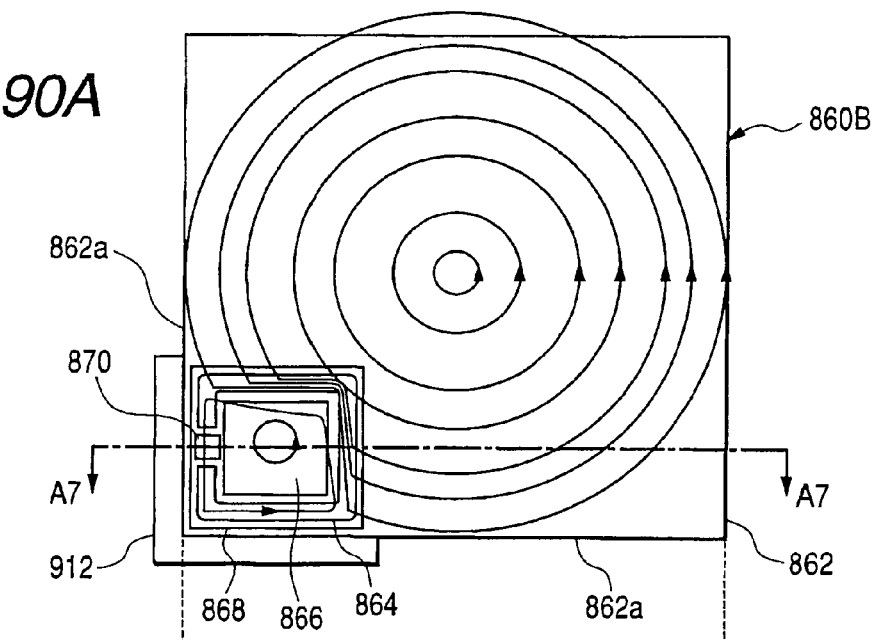
FIG. 90A is a front view of a current measuring device of twenty-eighth embodiment according to the present invention.
Figure 90B:
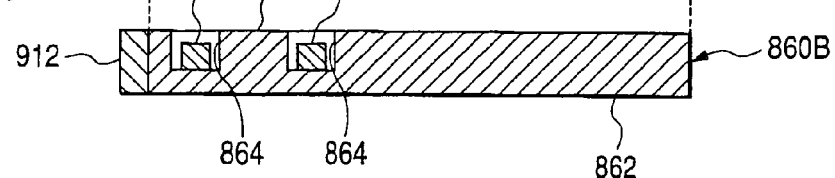
FIG. 90B is a cross sectional view taken on line A7-A7 of FIG. 90A.

FIG. 90A is a front view of a current measuring device of a twenty-eighth embodiment according to the present invention, and FIG. 90B is a cross sectional view taken on line A7-A7 of FIG. 90A.

As shown in FIGS. 90A and 90B, the current measuring device 860B of the presently filed embodiment has the same structure as that shown in FIG. 85 and further includes an L-shaped magnetic shielding member 912 placed on one corner of the electric conductive body 862 at a position closer to an outer periphery of the iron core 868 at a position remote from the center of the electrical conductor 862. With such a structure, the magnetic shielding member 912 magnetically shields the magnetic fields resulting from the electric power units 904, 908 and 910, except for the fuel cell 902 whose localized current is to be measured, enabling the current measuring device 860B to measure localized current at a highly improved precision.

Further, with the current measuring device 860B of the presently filed embodiment, like in the twenty-fifth embodiment shown in FIGS. 83A, 83B and 85, the use of the magnetic sensor 870 located in the recessed portion 864 at the area remote from the center of the electrical conductor 862 enables to minimize adverse affect resulting from major current flowing through the electrical conductor 862 inside the current measuring device 860B. This enables the current measuring device 860B to more accurately measure the magnetic field resulting from localized current.

Modified For of Twenty-Eighth Embodiment

A current measuring device of a modified form of the twenty-eighth embodiment according to the present invention is described with reference to FIGS. 91A and 91B, and the same component parts as those of the thirteenth embodiment bear like reference numerals to omit redundant description.

FIG. 91A is a plan view of the current measuring device of the presently filed embodiment, and FIG. 91B is a cross sectional representation taken on line A8-A8 of FIG. 91A.

As shown in FIGS. 91A and 91B, the current measuring device 860C is comprised of a main electrical conductor 862A to allow major electric current to flow therethrough and having a cutout portion 914 at a corner of the main electrical conductor 862A, and an auxiliary electrical conductor 862B to allow localized current to flow therethrough and disposed in the cutout portion 914 in a coplanar relationship with the main electrical conductor 862A.

The recessed portion 864 is formed in the auxiliary electrical conductor 862B, whose columnar portion 866 extends from a bottom of the recessed portion 864 toward a front face of the auxiliary electrical conductor 862B. The current measuring device 860C further includes the iron core 868 disposed in the recessed portion 864, and the Hall element 870 disposed in the air gap 869 of the iron core 868 in the position closer to the circumferential periphery of the auxiliary electrical conductor 862B.

A magnetic shielding member 916 has a rectangular shape to accommodate therein the auxiliary electrical conductor 862B, formed with the recessed portion 864 in which the columnar portion 866 is formed and surrounded by the iron core 868, and is disposed in the cutout portion 914 and fixedly secured at two sides to the main electrical conductor 862A. The magnetic shielding member 916 is made of, for instance, stainless steel that has a magnetic permeability.

With such a structure, not only the two sides of the magnetic shielding member 916 are located in a position closer to the center of the main electrical conductor 862A but also the other two sides of the magnetic shielding member 916 are located in a position remote from the center of the main electrical conductor 862A, the current measuring device of the presently filed embodiment has the same advantage as that of the twelfth embodiment. That is, through the use of the magnetic shielding member 916 allows not only the magnetic field resulting from the outside electric power unit to be magnetically shielded but also the magnetic field resulting from electric current other than localized current, i.e., major current flowing through the main electrical conductor 862A to be magnetically shielded. Also, with the structure shown in FIGS. 91A and 91B, the magnetic sensor 870 may be located anywhere in the recessed portion 864.

Twenty-Ninth Embodiment

A current measuring device of a twenty-ninth embodiment according to the present invention is described with reference to FIGS. 92A and 92B, and the same component parts as those of the eleventh embodiment bear like reference numerals to omit redundant description.

FIG. 92A is a front view of the current measuring device 860D of the presently filed embodiment, and FIG. 92B is a cross sectional view taken on line A9-A9 of FIG. 92A.

Deterioration takes place in measuring precision of the magnetic sensor 870 due to factors such as deterioration resulting from the passage of time in characteristic of the magnetic sensor 870. Factors under which the characteristic of the magnetic sensor 870 suffers from deterioration with the passage of time include operation and stress under high temperature environments and mechanical stress under load. In cases where the magnetic sensor 870 is incorporated inside an electrically conductive body 920, the magnetic sensor 870 is subjected to high temperature environments at high frequencies. Also, when the current measuring device 860D is disposed in the fuel cell 800 to form part of the stack, the current measuring device 860D is pressed from both sides to bear load. When the magnetic sensor 870 is subjected to expansion and constriction phases at high frequencies as a result of heat occurring in repeated cycles, the magnetic sensor 870 is periodically subjected to load variations, causing the magnetic sensor 870 to suffer from increased mechanical stresses.

To address such an issue, As shown in FIGS. 92A and 92B, the electrical conductor 920 has a U-shaped cutout portion 920a, serving as a recessed portion, whose open end faces one side surface 920b of the electrical conductor 920. An iron core 922 is accommodated in the cutout portion 920a of the electrical conductor 920 and has L-shaped outward extensions 922a, 922a whose distal ends are spaced from one another with an air gap 924 in which the magnetic sensor 870 is disposed outside of the electrical conductor 920. Thus, by locating the magnetic sensor 870 outside of the electrical conductor 920, it becomes possible for the magnetic sensor 870 not to suffer from mechanical stress, resulting in an increase in measuring precision of the magnetic sensor 870.

With the current measuring device of the presently filed embodiment, the magnetic sensor 870 assumes a position remote from the center of the electrical conductor 920 like in the eleventh embodiment, enabling adverse affect, resulting from the magnetic field caused by electric current other than localized current, to be minimized to enable the magnetic field caused by localized current to be accurately measured. Additionally, with the structure of the presently filed embodiment, when placed the magnetic shielding member around the iron core 922, adverse affect resulting from electric current other than localized current can be shielded like in the twelfth and thirteenth embodiments, enabling only the magnetic filed resulting from localized current to be measured with resultant improvement over measuring precision.

While the current measuring devices of the various embodiments mentioned above have been described with reference to exemplary structures where the current measuring device includes the electrical conductor, in case where the current measuring device is employed for measuring localized current of the fuel cell, the current measuring device may be incorporated in the separators 856, 858 (see FIG. 84). That is, at least one of the separators 856, 858 may be made of electrically conductive material having a recessed portion formed with a columnar portion that is surrounded by an iron core formed with an air gap in which a magnetic sensor is located. Measuring a magnitude of a magnetic field of the iron core enables electric current, i.e., localized current of the unit cell, flowing through the columnar portion to be detected in a highly reliable manner. In this alternative, since the separators 856, 858 are utilized, no need arises for newly providing a plate-like electrical conductor.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of th following claims and all equivalents thereof.

What is claimed is:

1. A fuel cell system comprising:
   a fuel cell comprising:
      an electrolyte membrane and a first electrode and a second electrode placed on both sides of the electrolyte membrane, respectively;
      an oxidant gas inlet portion for introducing oxidant gas into the fuel cell;
      an oxidant gas flow channel connected to the oxidant gas inlet portion to supply the oxidant gas into an inside of the electrolyte membrane;
      an oxidant gas outlet portion connected to the oxidant gas flow channel for exhausting residual oxidant gas from the electrolyte membrane to the outside;
      a fuel gas inlet portion for introducing fuel gas into the fuel cell;
      a fuel gas flow channel connected to the fuel gas inlet portion to supply the fuel gas into the inside of the electrolyte membrane; and
      a fuel gas outlet portion for exhausting residual fuel gas from the electrolyte membrane to the outside, the fuel cell being operative to electrochemically react the oxidant gas and the fuel gas to generate electric energy;
   a current measuring device located on at least one of the oxidant gas inlet portion, the oxidant gas outlet portion, the fuel gas inlet portion and the fuel gas outlet portion for detecting a localized current present therein; and
   a diagnosis device for diagnosing a drying state of an internal part of the fuel cell based on the localized current measured by the current measuring device;
   wherein:
      the electrolyte membrane includes a membrane electrode assembly;
      the first electrode includes a positive electrode current collector placed on one side of the membrane electrode assembly;
      the second electrode includes a negative electrode current collector placed on another side of the membrane electrode assembly, which has a main current collector plate placed in close proximity to the fuel gas channel and an auxiliary current collector plate placed in close proximity to at least one of the fuel gas inlet portion and the fuel gas outlet portion; and
      the current measuring device is connected between the main current collector plate and the auxiliary current collector plate.

2. The fuel cell system according to claim 1, wherein:
   the current measuring device detects the localized current flowing between the main current collector plate and the auxiliary current collector plate; and
   the diagnosis device diagnoses the drying state of at least one of the fuel gas inlet portion and the fuel gas outlet portion based on a value of the localized current measured by the current measuring device.

3. The fuel cell system according to claim 2, wherein:
   the diagnosis device is operative to diagnose that when the localized current measured by the current measuring device is less than a given current value, the fuel cell lies in the drying state.

4. The fuel cell system according to claim 2, wherein:
   the diagnosis device is operative to diagnose a degree of the drying state of the fuel cell depending on a difference between a value of the localized current, measured by the current measuring device, and a given current value that is preliminarily determined.

5. The fuel cell system according to claim 2, further comprising:
   a cell voltage measuring unit for measuring a voltage of the fuel cell to generate a cell voltage signal; and
   wherein the diagnosis device is operative to calculate a resistance value of a specified local area related to at least one of the oxidant gas inlet portion, the oxidant gas outlet portion, the fuel gas inlet portion and the fuel gas outlet portion on the basis of the cell voltage signal and is responsive to the cell voltage signal and the localized current, measured by the current measuring device, whereupon the diagnosis device diagnoses the drying state of the inside of the fuel cell based on the resistance value.

6. A fuel cell system comprising:
   a fuel cell comprising an electrolyte membrane and a first electrode and a second electrode placed on both sides of the electrolyte membrane, respectively;
   an oxidant gas inlet portion for introducing oxidant gas into the fuel cell;
   an oxidant gas flow channel connected to the oxidant gas inlet portion to supply the oxidant gas into an inside of the electrolyte membrane;
   an oxidant gas outlet portion connected to the oxidant gas flow channel for exhausting residual oxidant gas from the electrolyte membrane to the outside;
   a fuel gas inlet portion for introducing fuel gas into the fuel cell;
   a fuel gas flow channel connected to the fuel gas inlet portion to supply the fuel gas into the inside of the electrolyte membrane;
   a fuel gas outlet portion for exhausting residual fuel gas from the electrolyte membrane to the outside, the fuel cell being operative to electrochemically react the oxidant gas and the fuel gas to generate electric energy;
   a current measuring device located on at least one of the oxidant gas inlet portion, the oxidant gas outlet portion, the fuel gas inlet portion and the fuel gas outlet portion for detecting a localized current present therein; and
   a diagnosis device for diagnosing a drying state of an internal part of the fuel cell based on the localized current measured by the current measuring device,
   wherein:
      the electrolyte membrane includes a membrane electrode assembly;
      the first electrode includes a positive electrode current collector placed on one side of the membrane electrode assembly; and the second electrode includes a negative electrode current collector placed on another side of the membrane electrode assembly;

the negative electrode current collector includes a main current collector plate, placed in close proximity to the fuel gas flow channel, and an auxiliary current collector plate; and the auxiliary current collector plate is closer to the oxidant gas inlet portion than the oxidant gas outlet portion to allow the current measuring device to measure the localized current related to the oxidant gas inlet portion.

7. The fuel cell system according to claim 1, wherein:

the electrolyte membrane includes a membrane electrode assembly;

the first electrode includes a positive electrode current collector placed on one side of the membrane electrode assembly;

the second electrode includes a negative electrode current collector placed on another side of the membrane electrode assembly;

the negative electrode current collector includes a main current collector plate, placed in close proximity to the fuel gas flow channel, and an auxiliary current collector plate; and the auxiliary current collector plate is closer to the fuel gas inlet portion than the fuel gas outlet portion to allow the current measuring device to measure the localized current related to the fuel gas inlet portion.

8. The fuel cell system according to claim 1, further comprising:

a controller operative to control an operating condition of the fuel cell in response to the localized current measured by the current measuring device such that the localized current lies in a given range.

9. The fuel cell system according to claim 8, wherein:

the current measuring device detects the localized current related to the fuel gas inlet portion.

10. The fuel cell system according to claim 8, wherein:

the controller executes operation so as to control the operating condition of the fuel cell such that when the localized current is less than a given range, moisture content increases in the fuel cell while controlling the operating condition of the fuel cell such that when the localized current exceeds the given range, the moisture content decreases in the fuel cell.

11. The fuel cell system according to claim 8, further comprising:

a temperature regulator unit connected to the fuel cell for controlling an operating temperature of the fuel cell; and wherein the controller controls the temperature regulator unit in response to the localized current for thereby controlling the operating temperature of the fuel cell within a given range.

12. The fuel cell system according to claim 8, further comprising:

a humidifying device operative to control at least one of a rate of humidifying the oxidant gas and a rate of humidifying the fuel gas; and wherein the controller controls the humidifying device in response to the localized current for thereby controlling at least one of the rate of humidifying the oxidant gas and the rate of humidifying the fuel gas.

13. The fuel cell system according to claim 8, further comprising:

a temperature regulator unit operative to regulate a temperature of the oxidant gas; and wherein the controller is operative to control the temperature regulator unit in response to the localized current for thereby controlling the temperature of the oxidant gas.

14. The fuel cell system according to claim 8, further comprising:

a pressure regulator unit operative to regulate a pressure of the oxidant gas to be supplied to the fuel cell; and wherein the controller is operative to control the pressure regulator unit in response to the localized current for thereby controlling the pressure of the oxidant gas.

15. The fuel cell system according to claim 8, wherein:

the fuel cell includes a separator stacked on the electrolyte membrane at the one side thereof and having the oxidant gas flow channel and the oxidant gas inlet portion pass the oxidant gas therethrough; and the current measuring device detects the localized current related to the oxidant gas inlet portion.

* * * * *